US010972188B2

(12) United States Patent
Kato et al.

(10) Patent No.: US 10,972,188 B2
(45) Date of Patent: Apr. 6, 2021

(54) TRANSMISSION APPARATUS AND TRANSMISSION METHOD

(71) Applicant: FUJITSU LIMITED, Kawasaki (JP)

(72) Inventors: Tomoyuki Kato, Yokohama (JP); Shota Mori, Yokohama (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/360,168

(22) Filed: Mar. 21, 2019

(65) Prior Publication Data

US 2019/0305852 A1 Oct. 3, 2019

(30) Foreign Application Priority Data

Mar. 28, 2018 (JP) ............................ JP2018-063253

(51) Int. Cl.
*H04J 14/02* (2006.01)
*H04B 10/572* (2013.01)
*H04B 10/61* (2013.01)

(52) U.S. Cl.
CPC ......... *H04B 10/572* (2013.01); *H04B 10/614* (2013.01); *H04B 10/6166* (2013.01); *H04J 14/02* (2013.01); *H04J 14/0265* (2013.01)

(58) Field of Classification Search
None
See application file for complete search history.

(56) References Cited

U.S. PATENT DOCUMENTS

| | | |
|---|---|---|
| 5,589,969 A | 12/1996 | Taga et al. |
| 6,424,774 B1 | 7/2002 | Takeda et al. |

(Continued)

FOREIGN PATENT DOCUMENTS

| | | |
|---|---|---|
| CN | 1283902 | 2/2001 |
| EP | 1113613 A2 | 7/2001 |

(Continued)

OTHER PUBLICATIONS

EESR—Extended European Search Report dated Aug. 2, 2019 from corresponding European Patent Application No. 19164307.1. JP2003-188830 cited in the EESR was previously submitted in the IDS filed on Mar. 21, 2019.

(Continued)

*Primary Examiner* — Jai M Lee
(74) *Attorney, Agent, or Firm* — Fujitsu Patent Center

(57) ABSTRACT

A transmission apparatus includes a first multiplexer configured to multiplex light of wavelengths of a first wavelength band to output first wavelength multiplex light, a first wavelength converter configured to convert the first wavelength multiplex light into wavelengths of a second wavelength band which is different from the first wavelength band, by using first excitation light, a second multiplexer configured to multiplex light of wavelengths of the first wavelength band which are different from the wavelengths of the first wavelength multiplex light to output second wavelength multiplex light, a second wavelength converter configured to convert the second wavelength multiplex light into wavelengths of the second wavelength band, by using second excitation light, a third multiplexer configured to multiplex the first wavelength multiplex light converted into the wavelengths of the second wavelength band, and the second wavelength multiplex light converted into the wavelengths of the second wavelength band.

2 Claims, 96 Drawing Sheets

(56) References Cited

U.S. PATENT DOCUMENTS

| | | | | |
|---|---|---|---|---|
| 6,501,597 | B1 * | 12/2002 | Pitt | H01S 3/06775 359/333 |
| 6,509,987 | B1 * | 1/2003 | Hunziker | H04B 10/291 398/157 |
| 6,665,113 | B2 * | 12/2003 | Aso | G02F 2/004 359/326 |
| 6,831,775 | B2 | 12/2004 | Matsushita et al. | |
| 6,847,758 | B1 | 1/2005 | Watanabe | |
| 6,980,743 | B1 | 12/2005 | Greene | |
| 8,731,402 | B2 * | 5/2014 | Jander | H04Q 11/0005 398/48 |
| 8,781,322 | B2 * | 7/2014 | Lam | H04L 14/0246 398/68 |
| 2001/0007509 | A1 * | 7/2001 | Aso | H04J 14/02 359/326 |
| 2001/0026384 | A1 | 10/2001 | Sakano et al. | |
| 2002/0141008 | A1 * | 10/2002 | Chbat | H04B 10/2941 398/26 |
| 2002/0163689 | A1 * | 11/2002 | Matsushita | H04B 10/29 385/24 |
| 2003/0048509 | A1 | 3/2003 | Shinoda | |
| 2003/0072062 | A1 | 4/2003 | Pedersen et al. | |
| 2003/0108072 | A1 | 6/2003 | Hedin | |
| 2004/0001715 | A1 * | 1/2004 | Katagiri | H04B 10/2916 398/81 |
| 2004/0075891 | A1 | 4/2004 | Hwang et al. | |
| 2004/0114627 | A1 * | 6/2004 | Han | H04J 14/0246 370/468 |
| 2004/0141229 | A1 * | 7/2004 | Kakui | H01S 3/06716 359/342 |
| 2004/0212875 | A1 | 10/2004 | Li et al. | |
| 2005/0058462 | A1 * | 3/2005 | Talebpour | H04B 10/508 398/199 |
| 2005/0264871 | A1 | 12/2005 | Takahashi et al. | |
| 2006/0233550 | A1 * | 10/2006 | Shin | H04B 10/506 398/79 |
| 2017/0023733 | A1 * | 1/2017 | Florjanczyk | G02B 6/131 |
| 2019/0109666 | A1 * | 4/2019 | Kato | H04J 14/0223 |
| 2019/0386767 | A1 * | 12/2019 | Yuki | H04B 10/572 |
| 2020/0059313 | A1 | 2/2020 | Kato et al. | |

FOREIGN PATENT DOCUMENTS

| | | |
|---|---|---|
| EP | 1439645 A2 | 7/2004 |
| JP | 01-149593 | 6/1989 |
| JP | 08-097771 | 4/1996 |
| JP | 08-256128 | 10/1996 |
| JP | 2001-285323 | 10/2001 |
| JP | 2003-188830 | 7/2003 |
| JP | 2005-301009 | 10/2005 |

OTHER PUBLICATIONS

USPTO—Lee—Non-Final Rejection dated Apr. 9, 2020 for related U.S. Appl. No. 16/660,855 [pending].

EESR—The Extended European Search Report of European Patent Application No. 18790811.6 dated Apr. 20, 2020.

ISR—International Search Report (Forms PCT/ISA/210, 220, 237) dated May 1, 2018 for International Patent Application No. PCT/JP2018/004366.

USPTO—Lee—Final Rejection dated Sep. 8, 2020 for related U.S. Appl. No. 16/660,855 [pending]. All other references cited in the Final Rejection were previously submitted in the IDS or in previous Office Actions.

CNOA—Office Action of Chinese Patent Application No. 201880027067.0 dated Jul. 9, 2020, with full English translation. References No. 1-2 cited in the CNOA were previously submitted in the IDS filed on Oct. 1, 2019 and Jul. 8, 2020.

USOA—Non Final Office Action of related U.S. Appl. No. 16/660,855 dated Dec. 22, 2020.

CNOA—Office Action of Chinese Patent Application No. 201880027067.0 dated Jan. 14, 2021 with full English translation.

* cited by examiner

FIG. 17

(1)(INPUT)UPLINK C BAND ODD NUMBER
(OUTPUT) DOWNLINK C BAND EVEN NUMBER
(2)(INPUT)UPLINK L BAND ODD NUMBER
(OUTPUT) DOWNLINK L BAND EVEN NUMBER
(3)(INPUT)UPLINK C BAND EVEN NUMBER
(OUTPUT) DOWNLINK C BAND ODD NUMBER
(4)(INPUT)UPLINK L BAND EVEN NUMBER
(OUTPUT) DOWNLINK L BAND ODD NUMBER (1)(OUTPUT)UPLINK L BAND ODD NUMBER
(INPUT) DOWNLINK L BAND EVEN NUMBER
(2)(OUTPUT)UPLINK C BAND ODD NUMBER
(INPUT) DOWNLINK C BAND EVEN NUMBER
(3)(OUTPUT)UPLINK L BAND EVEN NUMBER
(INPUT) DOWNLINK L BAND ODD NUMBER
(4)(OUTPUT)UPLINK C BAND EVEN NUMBER
(INPUT) DOWNLINK C BAND ODD NUMBER

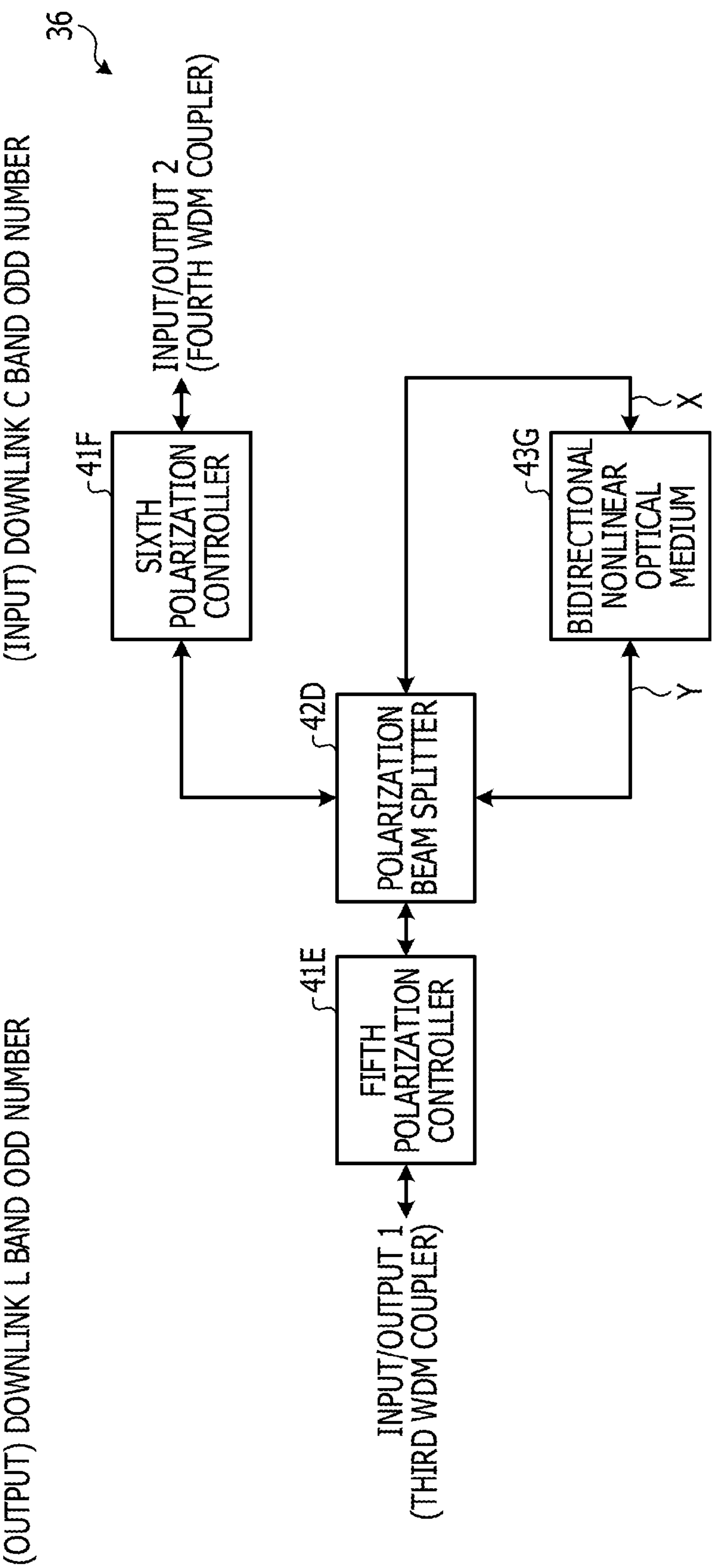

FIG. 21

(1)(INPUT) DOWNLINK L BAND EVEN NUMBER + UPLINK C BAND ODD NUMBER
(OUTPUT) DOWNLINK C BAND EVEN NUMBER + UPLINK L BAND ODD NUMBER
(2)(INPUT) DOWNLINK C BAND EVEN NUMBER + UPLINK L BAND ODD NUMBER
(OUTPUT) DOWNLINK L BAND EVEN NUMBER + UPLINK C BAND ODD NUMBER
(3)(INPUT) DOWNLINK L BAND ODD NUMBER + UPLINK C BAND EVEN NUMBER
(OUTPUT) DOWNLINK C BAND ODD NUMBER + UPLINK L BAND EVEN NUMBER
(4)(INPUT) DOWNLINK C BAND ODD NUMBER + UPLINK L BAND EVEN NUMBER
(OUTPUT) DOWNLINK L BAND ODD NUMBER + UPLINK C BAND EVEN NUMBER

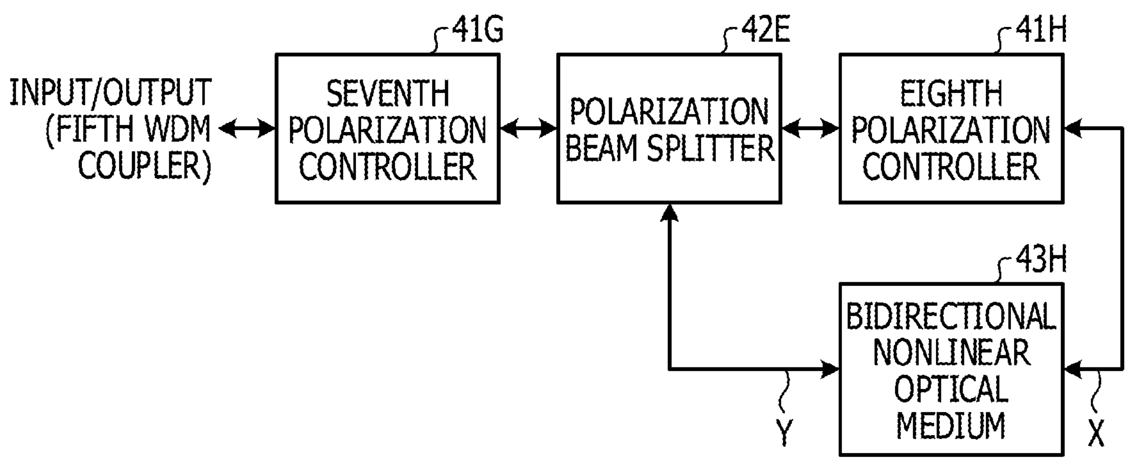

FIG. 61

| INPUT SIGNAL LIGHT | ODD-NUMBERED CHANNELS | |
|---|---|---|
| CHANNEL NUMBER | WAVELENGTH [nm] | FREQUENCY [THz] |
| Cband1 | 1531.90 | 195.70 |
| Cband3 | 1532.68 | 195.60 |
| ... | | |
| Cband85 | 1565.50 | 191.50 |
| Cband87 | 1566.31 | 191.40 |

| EXCITATION LIGHT | |
|---|---|
| WAVELENGTH [nm] | FREQUENCY [THz] |
| 1568.36 | 191.15 |

| OUTPUT SIGNAL LIGHT | ODD-NUMBERED CHANNELS | |
|---|---|---|
| CHANNEL NUMBER | WAVELENGTH [nm] | FREQUENCY [THz] |
| Cband87 | 1606.60 | 186.60 |
| Cband85 | 1605.74 | 186.70 |
| ... | | |
| Cband3 | 1571.24 | 190.80 |
| Cband1 | 1570.42 | 190.90 |

| INPUT SIGNAL LIGHT | EVEN-NUMBERED CHANNELS | |
|---|---|---|
| CHANNEL NUMBER | WAVELENGTH [nm] | FREQUENCY [THz] |
| Cband2 | 1532.29 | 195.65 |
| Cband4 | 1533.07 | 195.55 |
| ... | | |
| Cband86 | 1565.90 | 191.45 |
| Cband88 | 1566.72 | 191.35 |

| EXCITATION LIGHT | |
|---|---|
| WAVELENGTH [nm] | FREQUENCY [THz] |
| 1568.77 | 191.10 |

| OUTPUT SIGNAL LIGHT | EVEN-NUMBERED CHANNELS | |
|---|---|---|
| CHANNEL NUMBER | WAVELENGTH [nm] | FREQUENCY [THz] |
| Cband88 | 1607.04 | 186.55 |
| Cband86 | 1606.17 | 186.65 |
| ... | | |
| Cband4 | 1571.65 | 190.75 |
| Cband2 | 1570.83 | 190.85 |

FIG. 62

INPUT SIGNAL LIGHT — ODD-NUMBERED CHANNELS

| CHANNEL NUMBER | WAVELENGTH [nm] | FREQUENCY [THz] |
|---|---|---|
| Cband1 | 1531.90 | 195.70 |
| Cband3 | 1532.68 | 195.60 |
| ... | | |
| Cband85 | 1565.50 | 191.50 |
| Cband87 | 1566.31 | 191.40 |

EXCITATION LIGHT

| WAVELENGTH [nm] | FREQUENCY [THz] |
|---|---|
| 1529.94 | 195.95 |

OUTPUT SIGNAL LIGHT — ODD-NUMBERED CHANNELS

| CHANNEL NUMBER | WAVELENGTH [nm] | FREQUENCY [THz] |
|---|---|---|
| Cband87 | 1527.99 | 196.20 |
| Cband85 | 1527.22 | 196.30 |
| ... | | |
| Cband3 | 1495.97 | 200.40 |
| Cband1 | 1495.22 | 200.50 |

INPUT SIGNAL LIGHT — EVEN-NUMBERED CHANNELS

| CHANNEL NUMBER | WAVELENGTH [nm] | FREQUENCY [THz] |
|---|---|---|
| Cband2 | 1532.29 | 195.65 |
| Cband4 | 1533.07 | 195.55 |
| ... | | |
| Cband86 | 1565.90 | 191.45 |
| Cband88 | 1566.72 | 191.35 |

EXCITATION LIGHT

| WAVELENGTH [nm] | FREQUENCY [THz] |
|---|---|
| 1530.33 | 195.90 |

OUTPUT SIGNAL LIGHT — EVEN-NUMBERED CHANNELS

| CHANNEL NUMBER | WAVELENGTH [nm] | FREQUENCY [THz] |
|---|---|---|
| Cband88 | 1528.38 | 196.15 |
| Cband86 | 1527.60 | 196.25 |
| ... | | |
| Cband4 | 1496.34 | 200.35 |
| Cband2 | 1495.60 | 200.45 |

TRANSMISSION APPARATUS AND TRANSMISSION METHOD

CROSS-REFERENCE TO RELATED APPLICATION

This application is based upon and claims the benefit of priority of the prior Japanese Patent Application No. 2018-63253, filed on Mar. 28, 2018, the entire contents of which are incorporated herein by reference.

FIELD

The embodiments discussed herein are related to a transmission apparatus and a transmission method.

BACKGROUND

In recent years, with a growing demand for communications, there has been a demand for expansion of a transmission capacity by way of an increase in the number of cores of optical fibers, an increase in the capacity of optical signal per wavelength, and an increase in the number of wavelength division multiplexing (WDM) channels, for example.

However, because of high costs of laying optical fibers, it is desired to expand the transmission capacity by increasing the capacity of the optical signal or increasing the number of WDM channels, without increasing the number of optical fiber cores. A transmission apparatus implements communications using an optical wavelength of a conventional band (C band) of 1530 nm to 1565 nm, for example. However, the expansion of the transmission capacity is limited if only the C band is used.

Hence, the transmission apparatus aims at expanding the transmission capacity using communication bands such as a long band (L band) of 1565 nm to 1625 nm and a short band (S band) of 1460 nm to 1530 nm, in addition to the C band.

As a related art, disclosed are Japanese Laid-open Patent Publication Nos. 2003-188830, 1-149593, 8-256128, 8-97771, and the like.

However, as optical components such as optical transmitters and receivers, wavelength multiplexers and demultiplexers, and optical amplifiers supporting the C band, the S band, and the L band are to be developed individually, the cost is higher than in a case where an optical component only supporting one band is developed. Therefore, if a plurality of bands are used, the transmission apparatus desirably has optical components supporting the respective bands, which thus increases parts cost and operational cost.

SUMMARY

According to an aspect of the embodiments, a transmission apparatus includes a first multiplexer configured to multiplex light of wavelengths of a first wavelength band to output first wavelength multiplex light, a first wavelength converter configured to convert the first wavelength multiplex light into wavelengths of a second wavelength band which is different from the first wavelength band, by using first excitation light, a second multiplexer configured to multiplex light of wavelengths of the first wavelength band which are different from the wavelengths of the first wavelength multiplex light to output second wavelength multiplex light, a second wavelength converter configured to convert the second wavelength multiplex light into wavelengths of the second wavelength band, by using second excitation light, a third multiplexer configured to multiplex the first wavelength multiplex light converted into the wavelengths of the second wavelength band, and the second wavelength multiplex light converted into the wavelengths of the second wavelength band.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is an explanatory diagram illustrating an example of a PD nonlinear optical medium of an example 13;

FIG. 21 is an explanatory diagram illustrating an example of a PD nonlinear optical medium of an example 17;

FIG. 61 is an explanatory diagram illustrating an example of settings of odd-numbered channels, even-numbered channels, and the excitation light of a C/L wavelength converter;

FIG. 62 is an explanatory diagram illustrating an example of the settings of the odd-numbered channels, the even-numbered channels, and the excitation light of the C/S wavelength converter;

DESCRIPTION OF EMBODIMENTS

Hereinafter, examples of a transmission apparatus and a transmission method disclosed in the present application are described in detail with reference to the drawings. Respective examples do not limit the disclosed technology. The respective examples described below may be appropriately combined as far as the respective examples do not conflict.

Example 1

Figure 1A:
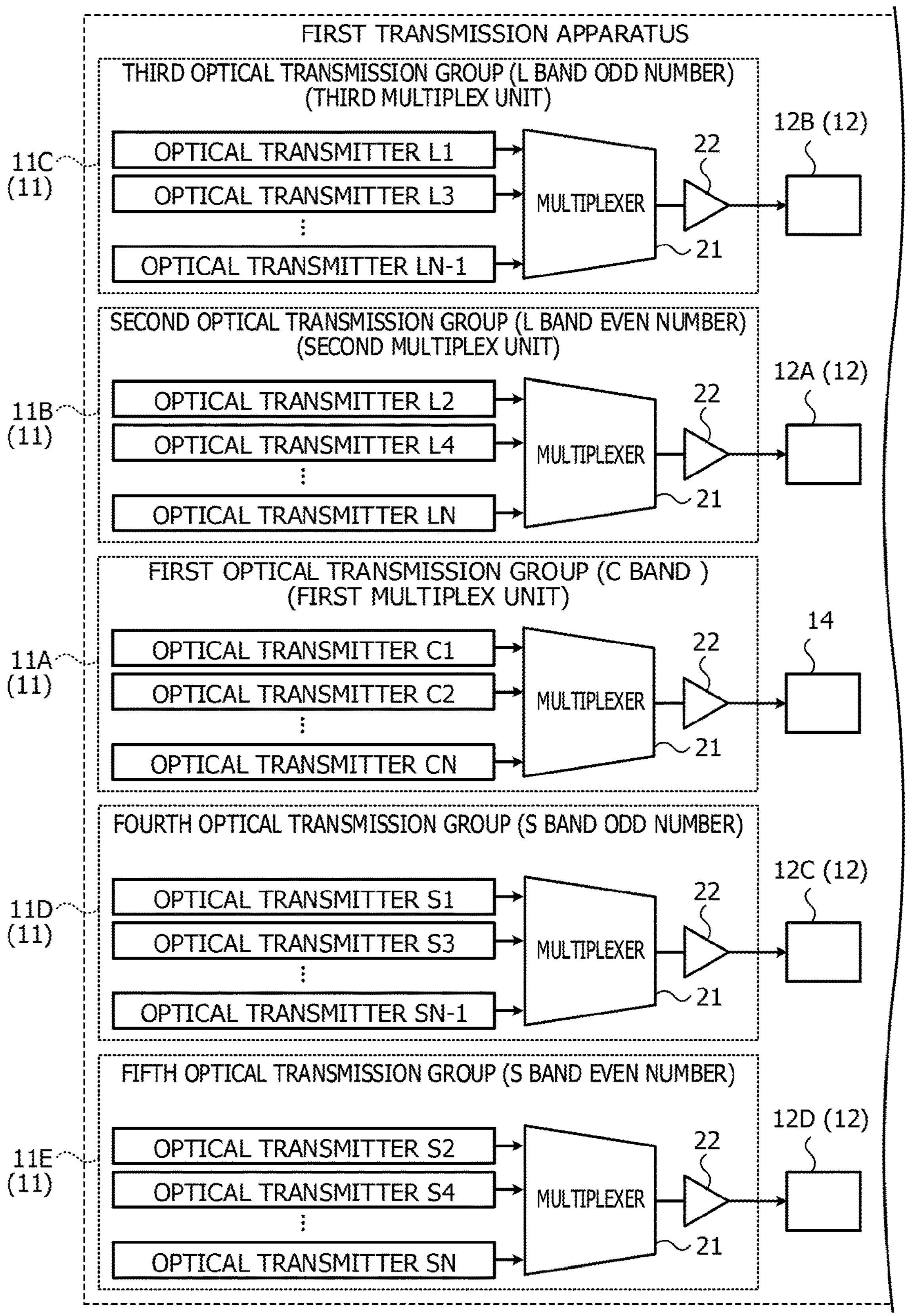
FIGS. 1A, 1B and 1C are explanatory diagrams illustrating an example of a transmission system of an example 1.
Figure 1B:
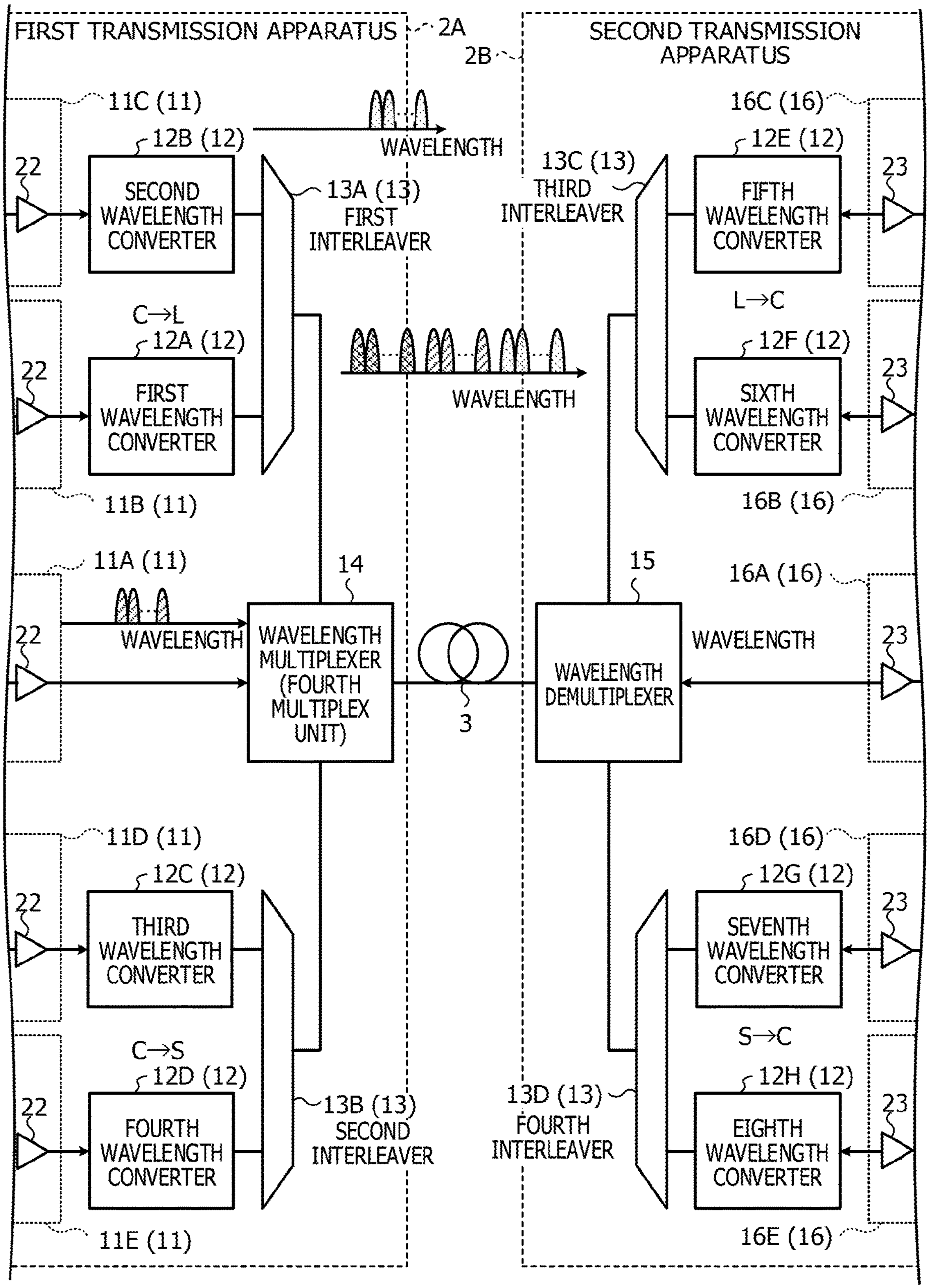
Figure 1C:
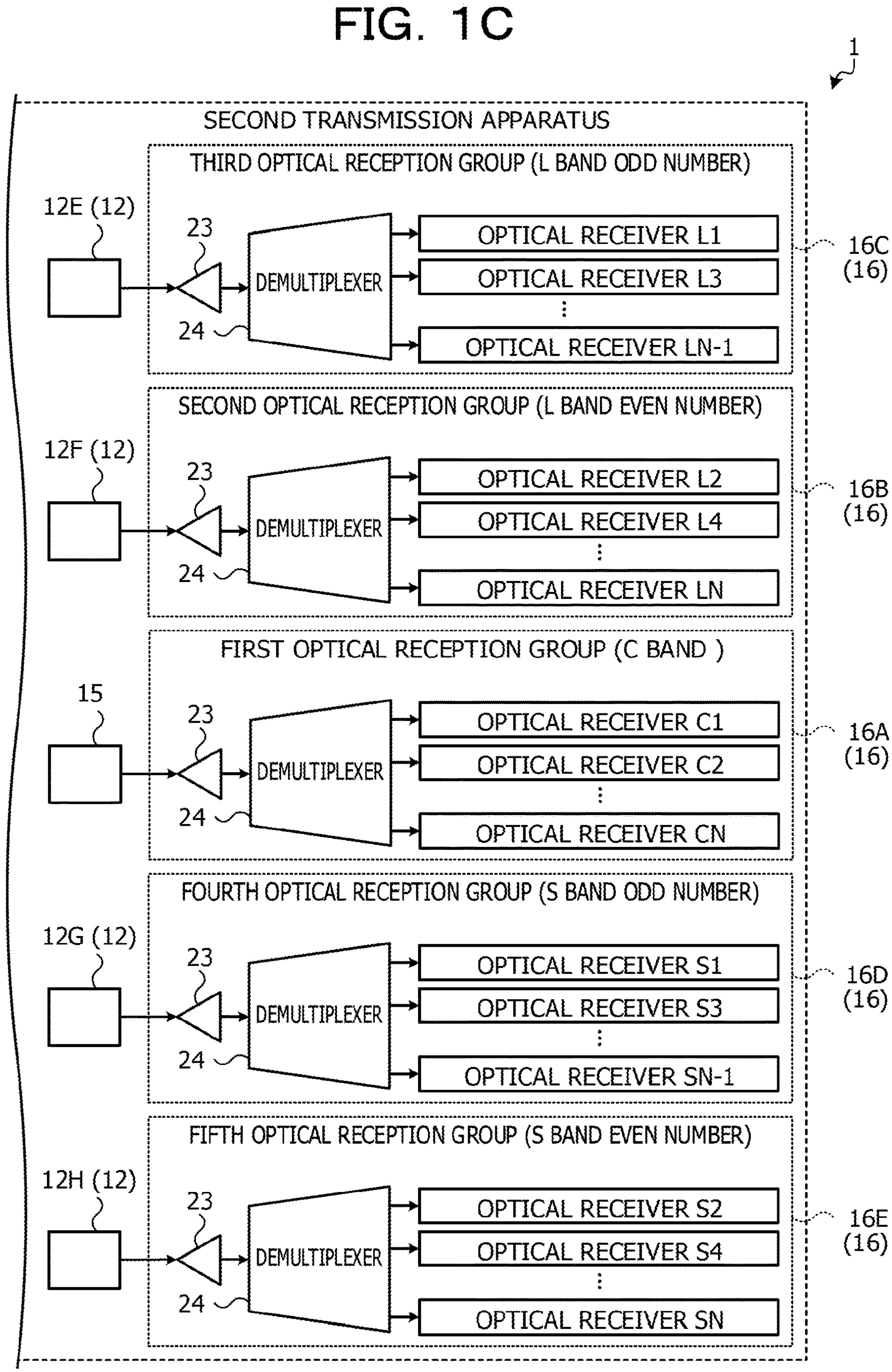

FIG. 1 is an explanatory diagram illustrating an example of a transmission system 1 of an example 1. The transmission system 1 illustrated in FIG. 1 includes a first transmission apparatus 2A, a second transmission apparatus 2B, and a transmission line 3 such as an optical fiber that transmits wavelength multiplex light between the first transmission apparatus 2A and the second transmission apparatus 2B. The first transmission apparatus 2A includes a plurality of optical transmission groups 11, a plurality of wavelength converters 12, a plurality of interleavers 13, and a wavelength multiplexer 14.

The optical transmission group 11 includes a first optical transmission group (C band) 11A, a second optical transmission group (L band even number) 11B, a third optical transmission group (L band odd number) 11C, a fourth optical transmission group (S band odd number) 11D, and a fifth optical transmission group (S band even number) 11E. A wavelength range of the C band is 1530 nm to 1565 nm, for example. The wavelength range of the L band is a long-wavelength region of 1565 nm to 1625 nm, for example. The wavelength range of the S band is a short-wavelength region of 1460 nm to 1530 nm, for example. The third optical transmission group 11C represents a third multiplexer unit including a plurality of optical transmitters L1 to LN−1, a multiplexer 21, and an optical amplifier 22. The plurality of optical transmitters L1 to LN−1 transmit first light of odd-numbered channels of first light having different wavelengths within the C band wavelength range (1530 nm to 1565 nm, for example), for example. The multiplexer 21 multiplexes the first light of the odd-numbered channels from the respective optical transmitters L1 to LN−1 to output to the optical amplifier 22 third multiplex light, which is third wavelength multiplex light of the odd-numbered channels. The odd-numbered channels represent light of odd channel numbers of channel numbers that identify the first light of the C band, for example. The ports of the multiplexer 21 are designed to pass wavelengths of the odd-numbered channels of the C band according to bands of light to be outputted from the respective optical transmitters L1 to LN−1. The optical amplifier 22 optically amplifies the third multiplex light of the odd-numbered channels. The optical amplifier 22 applies an erbium doped optical fiber amplifier (EDFA) that is able to efficiently amplify light of a wavelength of the C band.

The second optical transmission group 11B represents a second multiplexer unit including a plurality of optical transmitters L2 to LN, the multiplexer 21, and the optical amplifier 22. The plurality of optical transmitters L2 to LN each transmit first light of even-numbered channels, of the first light having the different wavelengths within the wavelength range of the C band, for example. The multiplexer 21 multiplexes the first light of the even-numbered channels from the respective optical transmitters L2 to LN to output to the optical amplifier 22 second multiplex light, which is second wavelength multiplex light of the even-numbered channels. The even-numbered channels represent light of an even channel number of the channel number that identifies the first light of the C band, for example, the light being different from the odd channel number. The ports of the multiplexer 21 are designed to pass wavelengths of the even-numbered channels of the C band according to bands of light to be outputted from the respective transmitters L2 to LN. The optical amplifier 22 optically amplifies the second multiplex light.

The first optical transmission group 11A represents a first multiplexer unit including a plurality of optical transmitters C1 to CN, the multiplexer 21, and the optical amplifier 22. The plurality of optical transmitters C1 to CN each transmit first light having different wavelengths within the wavelength range of the C band, for example. The multiplexer 21 multiplexes the first light from the respective optical transmitters C1 to CN to output to the optical amplifier 22 first multiplex light, which is first wavelength multiplex light. The ports of the multiplexer 21 are designed to pass wavelengths of the C band according to bands of light to be outputted from the respective optical transmitters C1 to CN. The optical amplifier 22 optically amplifies the first multiplex light to output to the wavelength multiplexer 14 the first multiplex light of the C band after being optically amplified.

The fourth optical transmission group 11D includes a plurality of optical transmitters S1 to SN−1, the multiplexer 21, and the optical amplifier 22. The plurality of optical transmitters S1 to SN−1 each transmit the first light of the odd-numbered channels, of the first light having the different wavelengths within the wavelength band of the C band, for example. The multiplexer 21 multiplexes the first light of the odd-numbered channels from the respective optical transmitters S1 to SN−1 to output to the optical amplifier 22 fifth multiplex light of the odd-numbered channels. The ports of the multiplexer 21 are designed to pass wavelengths of the odd-numbered channels of the C band according to bands of light to be outputted from the respective optical transmitters S1 to SN−1. The optical amplifier 22 optically amplifies the fifth multiplex light of the odd-numbered channel.

The fifth optical transmission group 11E includes a plurality of optical transmitters S2 to SN, the multiplexer 21, and the optical amplifier 22. The plurality of optical transmitters S2 to SN each transmit the first light of the even-numbered channels, of the first light having the different wavelengths within the wavelength range of the C band, for example. The multiplexer 21 multiplexes the first light of the even-numbered channels from the respective optical transmitters S2 to SN to output to the optical amplifier 22 fourth multiplex light of the even-numbered channels. The ports of the multiplexer 21 are designed to pass wavelengths of the even-numbered channels of the band C according to bands of light to be outputted from the respective optical transmitters S2 to SN. The optical amplifier 22 optically amplifies the fourth multiplex light of the even-numbered channels.

Figure 2A:
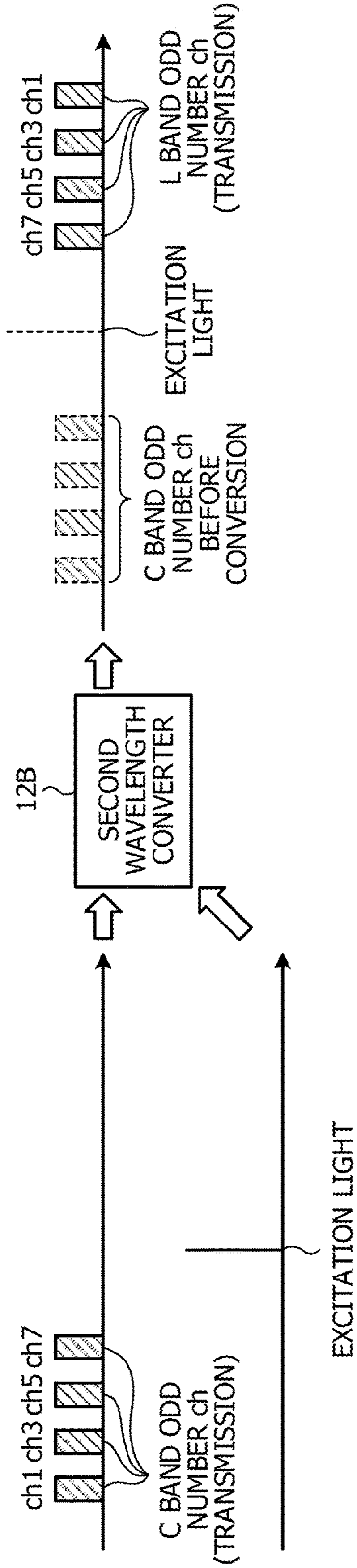
FIG. 2A is an explanatory diagram illustrating an example of a wavelength conversion operation of a second wavelength converter.

The plurality of wavelength converters 12 include first to fourth wavelength converters 12A to 12D. The plurality of interleavers 13 include first to fourth interleavers 13A to 13D. FIG. 2A is an explanatory diagram illustrating an example of a wavelength conversion operation of the second wavelength converter 12B. In the second wavelength converter 12B illustrated in FIG. 2A, the third multiplex light and excitation light of the C band of the odd-numbered channels from the optical amplifier 22 in the third optical transmission group 11C propagate via a nonlinear optical medium, which is not illustrated. Using the excitation light, the second wavelength converter 12B wavelength-converts the third multiplex light of the C band of the odd-numbered channels into the third multiplex light of the L band of the odd-numbered channels. As a result, the second wavelength converter 12B performs wavelength conversion, using degenerated four-wave mixing or the like that symmetrically generates the third multiplex light of the L band of the odd-numbered channels from the third multiplex light of the C band of the odd-numbered channels, with an optical wavelength of the excitation light as a center. The second wavelength converter 12B outputs only the third multiplex light of the L band of the odd-numbered channels, by filtering out the excitation light, depicted by a dot line, and the third multiplex light of the C band from the excitation light, the third multiplex light of the C band, and the third multiplex light of the L band. The second wavelength converter 12B outputs the third multiplex light of the L band of the odd-numbered channels to the first interleaver 13A. The wavelength converter 12 is able to freely convert multiplex light before being converted into multiplex light having a different wavelength, by changing a frequency of the excitation light.

Figure 2B:
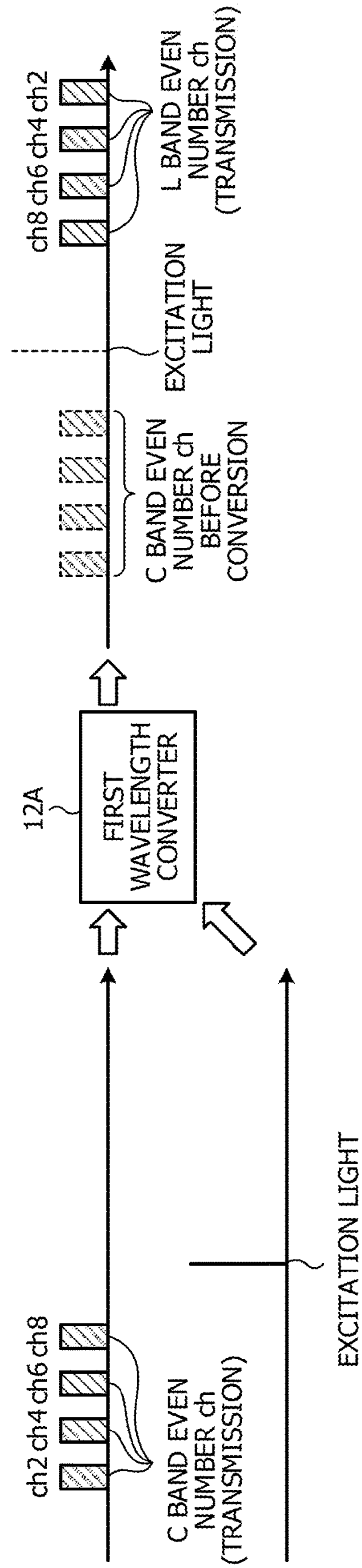
FIG. 2B is an explanatory diagram illustrating an example of a wavelength conversion operation of a first wavelength converter.

FIG. 2B is an explanatory diagram illustrating an example of the wavelength conversion operation of the first wavelength converter 12A. The first wavelength converter 12A illustrated in FIG. 2B propagates the second multiplex light and the excitation light of the C band of the even-numbered channels from the optical amplifier 22 in the second optical transmission group 11B via the nonlinear optical medium, which is not illustrated. Using the excitation light, the first wavelength converter 12A wavelength-converts the second multiplex light of the C band of the even-numbered channels to the second multiplex light of the L band of the even-numbered channels. As a result, the first wavelength converter 12A performs the wavelength conversion, using the degenerated four-wave mixing or the like that symmetrically generates the second multiplex light of the L band of the even-numbered channel and the second multiplex light of the C band of the even-numbered channels, with respect to the optical wavelength of the excitation light. The first wavelength converter 12A outputs only the second multiplex light of the L band of the even-numbered channels, by filtering out the excitation light depicted by the dot line and the second multiplex light of the band C from the excitation light, the second multiplex light of the C band, and the second multiplex light of the L band. The first wavelength converter 12A outputs the second multiplex light of the L band of the even-numbered channels to the first interleaver 13A. For the purpose of illustration, although a case is exemplified in which the first to fourth wavelength converters 12A to 12D internally filter the excitation light and the multiplex light before being converted, the excitation light and the multiplex light before being converted may also be removed on a path before being outputted to the transmission line 3, which may thus be changed appropriately.

Figure 3:
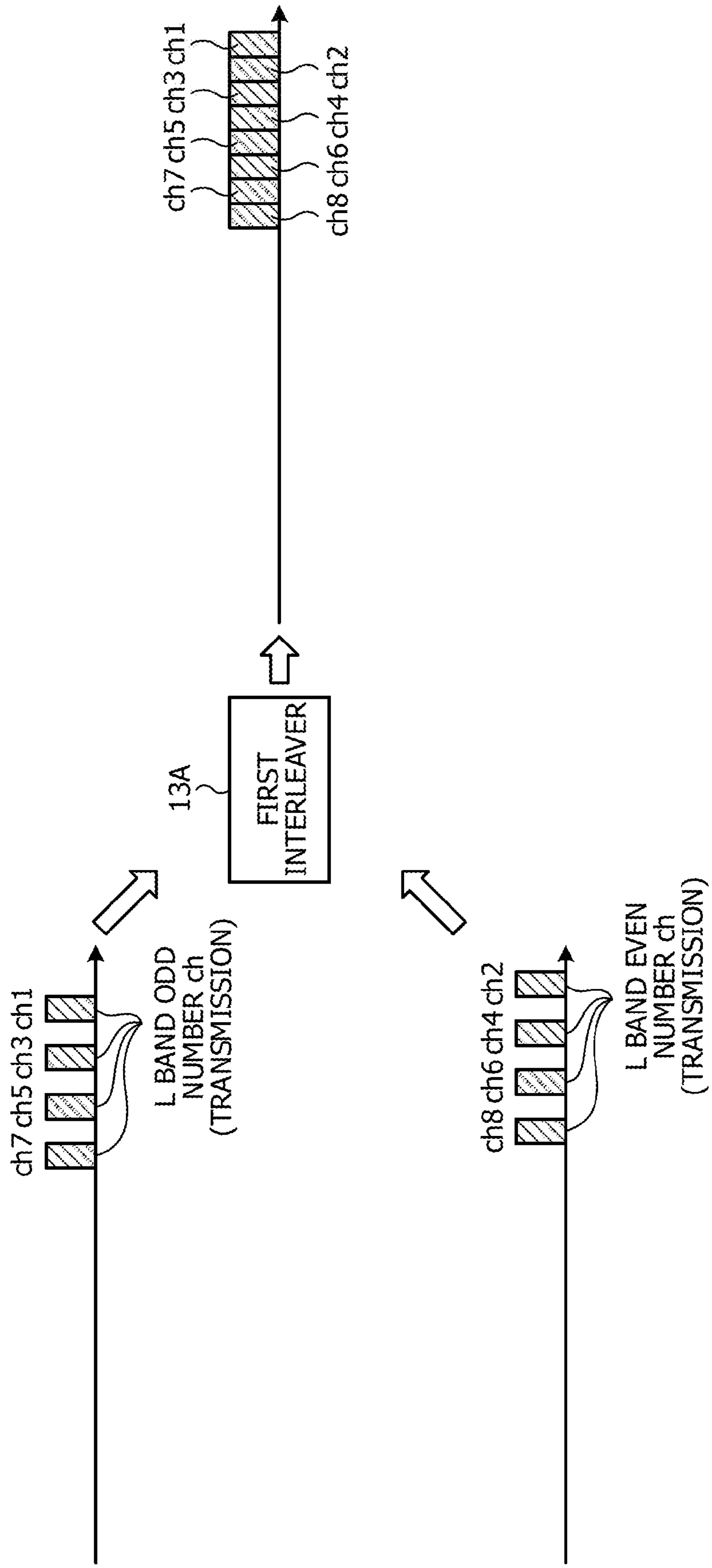
FIG. 3 is an explanatory diagram illustrating an interleaver operation of a first interleaver.

FIG. 3 is an explanatory diagram illustrating an interleaver operation of a first interleaver 13A. The first interleaver 13A illustrated in FIG. 3 rearranges the third multiplex light of the L band of the odd-numbered channels and the second multiplex light of the L band of the even-numbered channels in numerical order of the channel numbers, and outputs the second multiplex light of the L band after being rearranged to the wavelength multiplexer 14.

In the third wavelength converter 12C, fifth multiplex light and the excitation light of the C band of the odd-numbered channels from the optical amplifier 22 in the fourth optical transmission group 11D propagate via the nonlinear optical medium, which is not illustrated. Using the excitation light, the third wavelength converter 12C wavelength-converts the fifth multiplex light of the C band of the odd-numbered channels into fifth multiplex light of the S band of the odd-numbered channels. The third wavelength converter 12C outputs the fifth multiplex light of the S band of the odd-numbered channels to the second interleaver 13B.

In the fourth wavelength converter 12D, fourth multiplex light of the C band of the even-numbered channels and the excitation light from the optical amplifier 22 in the fifth optical transmission group 11E propagate via the nonlinear optical medium. Using the excitation light, the fourth wavelength converter 12D wavelength-converts the fourth multiplex light of the C band of the even-numbered channels into fourth multiplex light of the S band of the even-numbered channels. The fourth wavelength converter 12D outputs the fourth multiplex light of the S band of the even-numbered channels to the second interleaver 13B. The second interleaver 13B rearranges the fourth multiplex light of the S band of the odd-numbered channels and the fourth multiplex light of the S band of the even-numbered channels in numerical order of the channel numbers, and outputs the fourth multiplex light of the S band after being rearranged to the wavelength multiplexer 14.

The wavelength multiplexer 14 represents a fourth multiplexer unit that multiplexes and outputs to the transmission line 3 the second and third multiplex light of the L band from the first interleaver 13A, the first multiplex light of the C band, and the fourth and fifth multiplex light of the S and from the second interleaver 13B. As a result, as the L band or the S band, which is different from the C band, is used, a substantial expansion of the transmission capacity is achieved, as compared to the C band alone. Furthermore, it is possible to configure the first to fifth optical transmission groups 11 with the optical transmitter and the optical components of the same C band, thus allowing for a reduction of product cost and the operating cost.

The second transmission apparatus 2B includes a wavelength demultiplexer 15, the plurality of interleavers 13, the plurality of wavelength converters 12 and a plurality of optical reception groups 16. The plurality of interleavers 13 includes the third interleaver 13C and the fourth interleaver 13D. The plurality of wavelength converters 12 includes fifth to eighth wavelength converters 12E to 12H.

The optical reception group 16 includes a first optical reception group (C band) 16A, a second optical reception group (L band even number) 16B, a third optical reception group (L band odd number) 16C, a fourth optical reception group (S band odd number) 16D, and a fifth optical reception group (S band even number) 16E.

The wavelength demultiplexer 15 of the second transmission apparatus 2B is a demultiplexer that demultiplexes multiplex light from the transmission line 3 to the second and third multiplex light of the L band, the first multiplex light of the C band, and the fourth and fifth multiplex light of the S band. Then, the wavelength demultiplexer 15 outputs the second and third multiplex light of the L band to the third interleaver 13C, the first multiplex light of the C band to the first optical reception group 16A, and the fourth and fifth multiplex light of the S band to the fourth interleaver 13D.

The third interleaver 13C separates and outputs the second and third multiplex light of the L band from the wavelength demultiplexer 15 to the third multiplex light of the odd-numbered channels and the second multiplex light of the even-numbered channels. The third interleaver 13C outputs the third multiplex light of the L band of the odd-numbered channels to the fifth wavelength converter 12E and the second multiplex light of the L band of the even-numbered channels to the sixth wavelength converter 12F.

The fifth wavelength converter 12E wavelength-converts the third multiplex light of the L band of the odd-numbered channels into the second multiplex light of the C band of the odd-numbered channels after being wavelength-converted, by the third multiplex light of the L band of the odd-numbered channels and the excitation light propagating in the nonlinear optical medium, which is not illustrated. Then, the fifth wavelength converter 12E outputs to the third optical reception group 16C the third multiplex light of the C band of the odd-numbered channels after being wavelength-converted.

The third optical reception group 16C includes an optical amplifier 23, a demultiplexer 24, and a plurality of optical receivers L1 to LN−1. The optical amplifier 23 optically amplifies the third multiplex light of the C band of the odd-numbered channels after being wavelength-converted at the fifth wavelength converter 12E, and outputs to the demultiplexer 24 the third multiplex light of the C band of the odd-numbered channels after being optically amplified. The demultiplexer 24 outputs each first light of the third multiplex light of the C band of the odd-numbered channels to the respective optical receivers L1 to LN−1 of a corresponding channel. The output ports of the demultiplexer 24 are designed to pass bands according to bands of wavelengths to be received from the connected optical receivers L1 to LN−1. As the bands of the wavelengths received by the optical receivers L1 to LN−1 are the C band, the output ports of the demultiplexer 24 are designed to pass bands according to the wavelengths of the C band.

The sixth wavelength converter 12F wavelength-converts the second multiplex light of the L band of the even-numbered channels into the second multiplex light of the C band of the even-numbered channels by propagating the second multiplex light of the L band of the even-numbered channels and the excitation light, which is not illustrated, in the nonlinear optical medium. Then, the sixth wavelength converter 12F outputs to a second optical reception group 16B the second multiplex light of the C band of the even-numbered channels after being wavelength-converted.

The second optical reception group 16B includes the optical amplifier 23, the demultiplexer 24, and a plurality of optical receivers L2 to LN. The optical amplifier 23 optically amplifies the second multiplex light of the C band of the even-numbered channels after being wavelength-converted at the sixth wavelength converter 12F and outputs to the demultiplexer 24 the second multiplex light of the C band of the even-numbered channels after being optically amplified. The demultiplexer 24 each first light of the second multiplex light of the C band of the even-numbered channels to the respective optical receivers L2 to LN of the corresponding channels. The output ports of the demultiplexer 24 are designed to pass bands according to the bands of the wavelengths received by the connected optical receivers L2 to LN. As the bands of the wavelengths received by the optical receivers L2 to LN are the C band, the output ports of the demultiplexer 24 are designed to pass the bands according to the wavelengths of the C band.

The first optical reception group 16A includes the optical amplifier 23, the demultiplexer 24, and a plurality of optical receivers C1 to CN. The optical amplifier 23 optically amplifies the second multiplex light of the C band from the wavelength demultiplexer 15, and outputs to the demultiplexer 24 the second multiplex light of the C band after being optically amplified. The demultiplexer 24 outputs each second light of the first multiplex light of the C band to the respective optical receivers C1 to CN of the corresponding channels. The output ports of the demultiplexer 24 are designed to pass bands according to the bands of the wavelengths received by the connected optical receivers C1 to CN. As the bands of the wavelengths received by the optical receivers C1 to CN are the C band, the output ports of the demultiplexer 24 are designed to pass the bands according to the wavelengths of the C band.

The fourth interleaver 13D separates the fourth and fifth multiplex light of the S band from the wavelength demultiplexer 15 into the fifth multiplex light of the odd-numbered channels and the fourth multiplex light of the even-numbered channels and outputs the fifth multiplex light of the odd-numbered channels and the fourth multiplex light of the even-numbered channels. The fourth interleaver 13D outputs the fifth multiplex light of the S band of the odd-numbered channels to the seventh wavelength converter 12G and outputs the fourth multiplex light of the S band of the even-numbered channels to the eighth wavelength converter 12H.

The seventh wavelength converter 12G wavelength-converts the fifth multiplex light of the S band of the odd-numbered channels into the fifth multiplex light of the C band of the odd-numbered channels by the fifth multiplex light of the S band of the odd-numbered channels and the excitation light, which is not illustrated, propagating in the nonlinear optical medium. Then, the seventh wavelength converter 12G outputs to the fourth optical reception group 16D the fifth multiplex light of the C band of the odd-numbered channels after being wavelength-converted.

The fourth optical reception group 16D includes the optical amplifier 23, the demultiplexer 24, and a plurality of optical receivers S1 to SN−1. The optical amplifier 23 optically amplifies the fifth multiplex light of the C band of the odd-numbered channels after being wavelength-converted at the seventh wavelength converter 12G and outputs to the demultiplexer 24 the fifth multiplex light of the C band of the odd-numbered channels after being optically amplified. The demultiplexer 24 outputs each first light of the fifth multiplex light of the C band of the odd-numbered channels to the respective optical receivers S1 to SN−1 of the corresponding channels. The output ports of the demultiplexer 24 are designed to pass bands according to the bands of the wavelengths received by the connected optical receivers S1 to SN−1. As the bands of the wavelengths received by the optical receivers S1 to SN−1 are the C band, the output ports of the demultiplexer 24 are designed to pass the bands according to the wavelengths of the C band.

The eighth wavelength converter 12H wavelength-converts the fourth multiplex light of the S band of the even-numbered channels into the fourth multiplex light of the C band of the even-numbered channels by the fourth multiplex light of the S band of the even-numbered channels and the excitation light propagating the nonlinear optical medium, which is not illustrated. Then, the eighth wavelength converter 12H outputs to the fifth optical reception group 16E the fourth multiplex light of the C band of the even-numbered channels after being wavelength-converted.

The fifth optical reception group 16E includes the optical amplifier 23, the demultiplexer 24, and a plurality of optical receivers S2 to SN. The optical amplifier 23 optically amplifies the fourth multiplex light of the C band of the even-numbered channels after being wavelength-converted at the eighth wavelength converter 12H, and outputs to the demultiplexer 24 the fourth multiplex light of the C band of the even-numbered channels after being optically amplified. The demultiplexer 24 outputs each first light of the fourth multiplex light of the C band of the even-numbered channels to the respective receivers S2 to SN of the corresponding channels. The output ports of the demultiplexer 24 are designed to pass bands according to the bands of the wavelengths received by the connected optical receivers S2 to SN. As the bands of the wavelengths received by the optical receivers S2 to SN are the C band, the output ports of the demultiplexer 24 are designed to pass the bands according to the wavelengths of the C band.

The second transmission apparatus 2B may configure first to fifth optical reception groups 16 and the optical components by the optical components of the C band, thus making it possible to reduce the product cost and the operational cost. That is, in order to achieve wavelength multiplexed communications in different bands from the first transmission apparatus 2A to the second transmission apparatus 2B, the optical components such as common optical transmitters, optical receivers, optical amplifiers, or the like are utilized without using the optical components of the individual bands. As a result, the transmission apparatus 2 may be configured by more low-cost optical components.

In the transmission system 1 of the example 1, the multiplex light of the C band is divided into the even-numbered channels and the odd-numbered channels and is wavelength-converted using the wavelength converter 12 for each of the channel groups. Because of the division into the even-numbered channels and the odd-numbered channels, input optical power of a WDM signal to the wavelength converter 12 may be made smaller: that is, the number of wavelengths to be converted by the one wavelength converter 12 may be reduced. As a result, it is possible to expand the dynamic range, while reducing deterioration of signal quality by reducing the nonlinear optical distortions in the wavelength converter 12.

The first transmission apparatus 2A divides the second and third multiplex light of the C band into the even-numbered channels and the odd-numbered channels, and not only inputs the third multiplex light of the C band of the odd-numbered channels to the second wavelength converter 12B but also inputs the second multiplex light of the C band of the even-numbered channels to the first wavelength converter 12A. Then, the second wavelength converter 12B wavelength-converts the third multiplex light of the C band of the odd-numbered channels into the third multiplex light of the L band of the odd-numbered channels. Furthermore, the first wavelength converter 12A wavelength-converts the second multiplex light of the C band of the even-numbered channels into the second multiplex light of the L band of the even-numbered channels. As a result, the first wavelength converter 12A and the second wavelength converter 12B may reduce the nonlinear optical distortions between signals, because each wavelength converter is in charge of only either the odd number channels or the even number channels, which are channels not next to each other.

The first transmission apparatus 2A divides the fourth and fifth multiplex light of the C band into the even-numbered channels and the odd-numbered channels, and not only inputs the fifth multiplex light of the C band of the odd-numbered channels to the third wavelength converter 12C but also inputs the fourth multiplex light of the C band of the even-numbered channels to the fourth wavelength converter 12D. Then, the third wavelength converter 12C wavelength-converts the fifth multiplex light of the C band of the odd-numbered channels into the fifth multiplex light of the S band of the odd-numbered channels. Furthermore, the fourth wavelength converter 12D wavelength-converts the fourth multiplex light of the C band of the even-numbered channels into the fourth multiplex light of the S band of the even-numbered channels. As a result, the third wavelength converter 12C and the fourth wavelength converter 12D may reduce the nonlinear optical distortions between the signals, because each wavelength converter is in charge of only either the odd number channels or the even number channels, which are channels not next to each other.

The second transmission apparatus 2B divides the second and third multiplex light of the L band into the even-numbered channels and the odd-numbered channels, and not only inputs the third multiplex light of the L band of the odd-numbered channels to the fifth wavelength converter 12E, but also inputs the second multiplex light of the L band of the even-numbered channels to the sixth wavelength converter 12F. Then, the fifth wavelength converter 12E wavelength-converts the third multiplex light of the L band of the odd-numbered channels into the third multiplex light of the C band of the odd-numbered channels. Furthermore, the sixth wavelength converter 12F wavelength-converts the second multiplex light of the L band of the even-numbered channels into the second multiplex light of the C band of the even-numbered channels. As a result, the fifth wavelength converter 12E and the sixth wavelength converter 12F may reduce the nonlinear optical distortions between the signals, because each wavelength converter is in charge of only either the odd number channels or the even number channels, which are channels not next to each other.

The second transmission apparatus 2B divides the fourth and fifth multiplex light of the S band into the even-numbered channels and the odd-numbered channels, and not only inputs the fifth multiplex light of the S band of the odd-numbered channels to the seventh wavelength converter 12G, but also inputs the fourth multiplex light of the S band of the even-numbered channels to the eighth wavelength converter 12H. Then, the seventh wavelength converter 12G wavelength-converts the fifth multiplex light of the S band of the odd-numbered channels into the fifth multiplex light of the C band of the odd-numbered channels. Furthermore, the eighth wavelength converter 12H wavelength-converts the fourth multiplex light of the S band of the even-numbered channels into the fourth multiplex light of the C band of the even-numbered channels. As a result, the seventh wavelength converter 12G and the eighth wavelength converter 12H may reduce the nonlinear optical distortions between the signals, because each wavelength converter is in charge of only either the odd number channels or the even number channels, which are channels not next to each other.

In addition, the transmission system 1 aims at expanding the transmission capacity through common use of the optical components such as the optical transmitters, optical receivers, optical amplifiers, or the like of the C band, thereby cutting the product cost and utilizing the S and the L band during transmission.

For the first transmission apparatus 2A illustrated in FIG. 1, processing of wavelength conversion between the second and third multiplex light of the C band and the second and third multiplex light of the L band as well as processing of the wavelength conversion between the fourth and fifth multiplex light of the C band and the fourth and fifth multiplex light of the S and are exemplarily illustrated. Then, although for the transmission system 1 of the example 1, description is given of uplink transmission from the first transmission apparatus 2A to the second transmission apparatus 2B, there is also downlink transmission from the second transmission apparatus 2B to the first transmission apparatus 2A, an embodiment of which is described below as an example 2.

Example 2

Figure 4A:
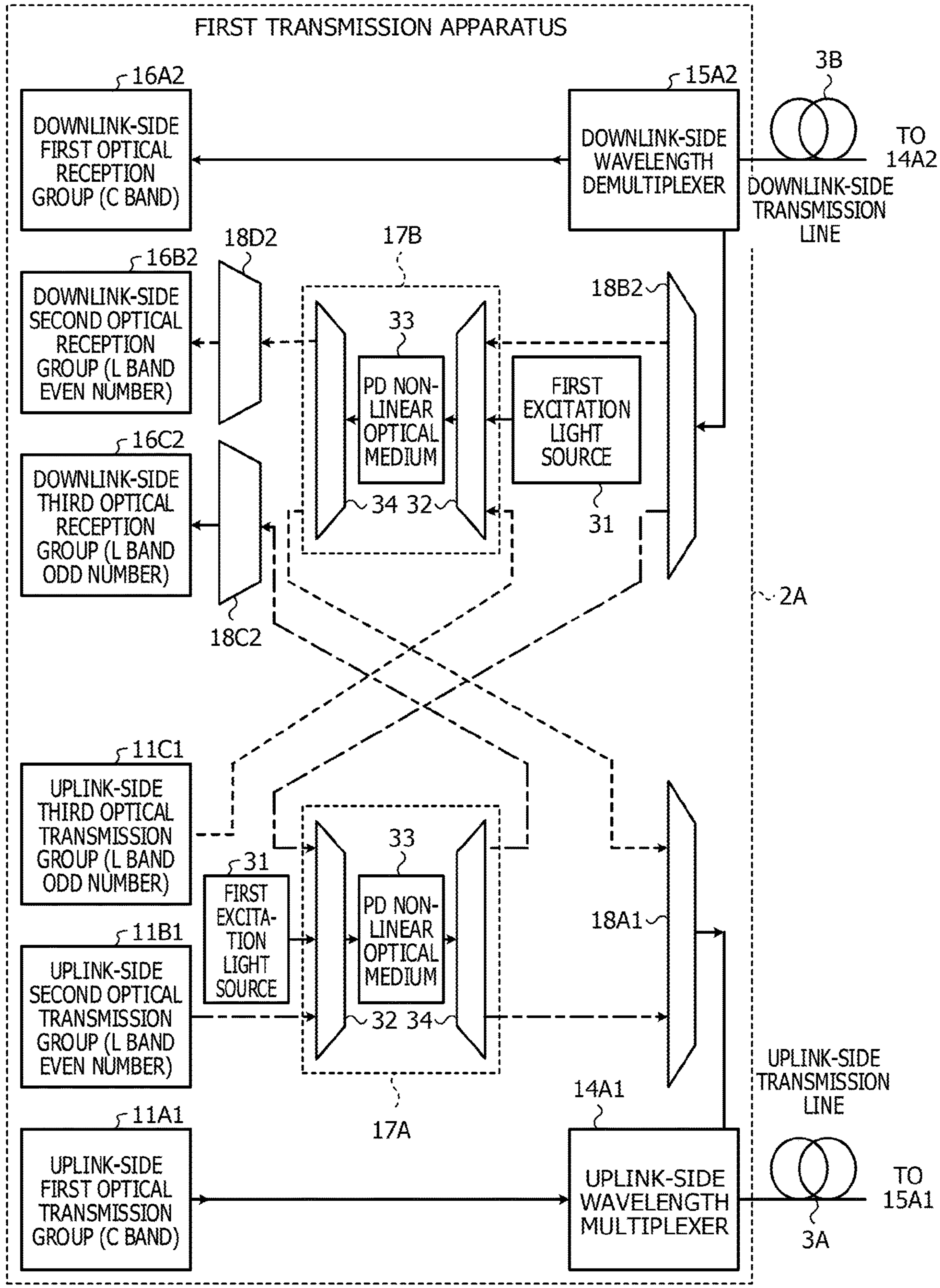
FIGS. 4A and 4B are explanatory diagrams illustrating an example of a transmission system of an example 2.
Figure 4B:
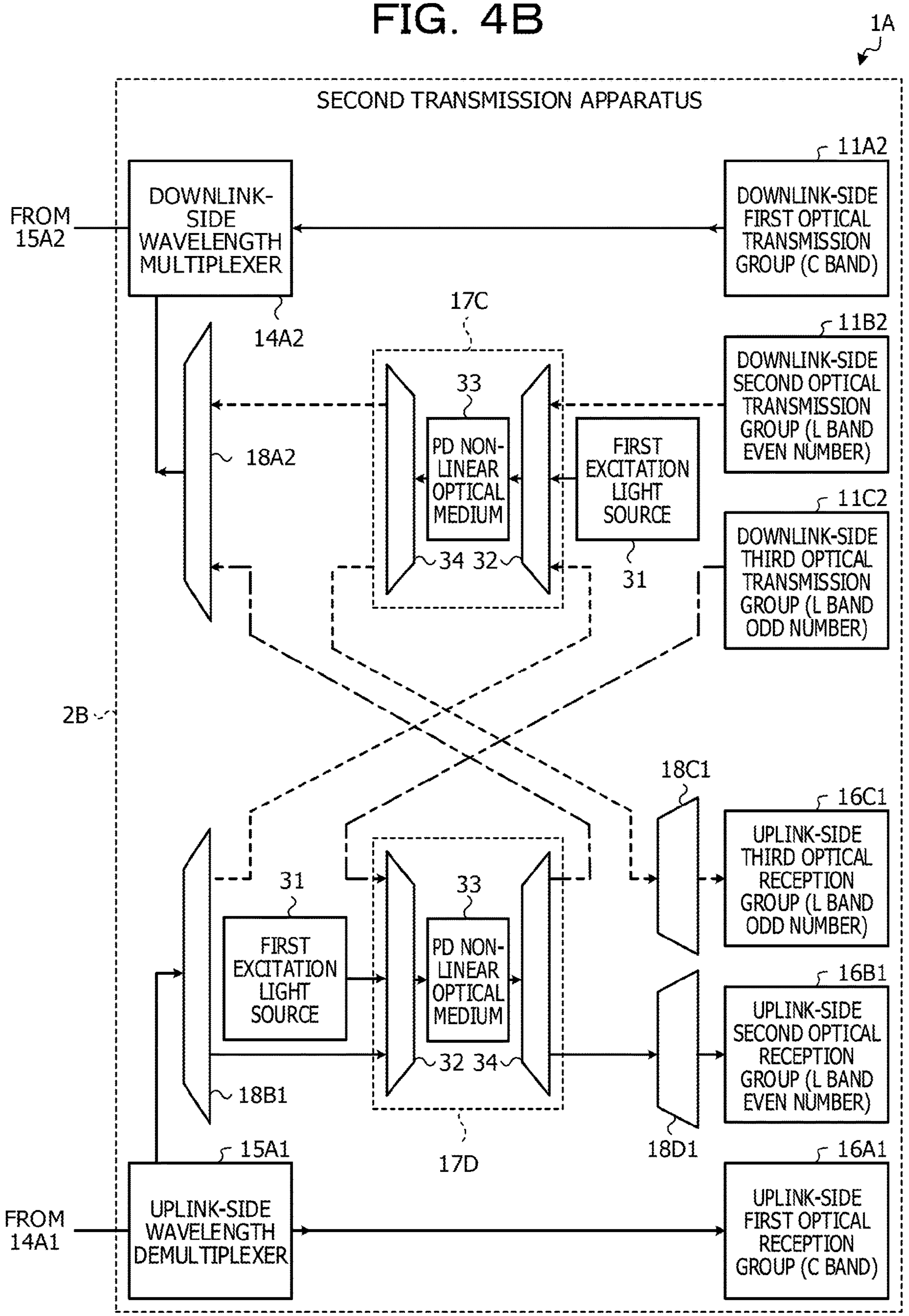

FIG. 4 is an explanatory diagram illustrating an example of a transmission system 1A of an example 2. For the purpose of illustration, identical symbols are assigned to a configuration identical to the transmission system 1 of the example 1, thus omitting description of the overlapping configuration and operation. For the purpose of illustration, although description is given of the processing of wavelength conversion between the second and third multiplex light of the C band and the second and third multiplex light of the L band, description of the processing of wavelength conversion between the fourth and fifth multiplex light of the C band and the fourth and fifth multiplex light of the S band is omitted because the operations are substantially identical.

The first transmission apparatus 2A illustrated in FIG. 4 includes an uplink-side third optical transmission group 11C1, an uplink-side second optical transmission group 11B1, an uplink-side first optical transmission group 11A1, an eleventh wavelength converter 17A, an uplink-side eleventh interleaver 18A1, and an uplink-side wavelength multiplexer 14A1. The eleventh wavelength converter 17A includes a first excitation light source 31, a first WDM coupler 32, a polarized diversity (PD) nonlinear optical medium 33, and a second WDM coupler 34. The PD nonlinear optical medium 33 is the nonlinear optical medium of single directional input and output.

The first transmission apparatus 2A includes a downlink-side wavelength demultiplexer 15A2, a downlink-side twelfth interleaver 18B2, a twelfth wavelength converter 17B, a downlink-side thirteenth interleaver 18C2, and a downlink-side fourteenth interleaver 18D2. The first transmission apparatus 2A includes a downlink-side third optical reception group 16C2, a downlink-side second optical reception group 16B2, and a downlink-side first optical reception group 16A2. The twelfth wavelength converter 17B includes the first excitation light source 31, the first WDM coupler 32, the PD nonlinear optical medium 33, and the second WDM coupler 34.

The second transmission apparatus 2B includes a downlink-side third optical transmission group 11C2, a downlink-side second optical transmission group 1162, a downlink-side first optical transmission group 11A2, a thirteenth wavelength converter 17C, a downlink-side eleventh interleaver 18A2, and a downlink-side wavelength multiplexer 14A2. The thirteenth wavelength converter 17C includes the first excitation light source 31, the first WDM coupler 32, the PD nonlinear optical medium 33, and the second WDM coupler 34.

The second transmission apparatus 2B includes an uplink-side wavelength demultiplexer 15A1, an uplink-side twelfth interleaver 18B1, a fourteenth wavelength converter 17D, an uplink-side thirteenth interleaver 18C1, and an uplink-side fourteenth interleaver 18D1. Furthermore, the second transmission apparatus 2B includes an uplink-side third optical reception group 16C1, an uplink-side second optical reception group 16B1, and an uplink-side first optical reception group 16A1. The fourteenth wavelength converter 17D includes the first excitation light source 31, the first WDM coupler 32, the PD nonlinear optical medium 33, and the second WDM coupler 34.

The first WDM coupler 32 of the eleventh wavelength converter 17A outputs to the PD nonlinear optical medium 33 the uplink-side second multiplex light of the C band of the even-numbered channels from the uplink-side second optical transmission group 11B1. Furthermore, the first WDM coupler 32 outputs to the PD nonlinear optical medium 33 the down-side third multiplex light of the L band of the odd-numbered channels from the down-side twelfth interleaver 18B2. Moreover, the first WDM coupler 32 outputs the excitation light from the first excitation light source 31 to the PD nonlinear optical medium 33. The PD nonlinear optical medium 33 in the eleventh wavelength converter 17A propagates the uplink-side second multiplex light of the C band of the even-numbered channels, the downlink-side third multiplex light of the L band of the odd-numbered channels, and the excitation light from the first excitation light source 31. Then, using the excitation light, the PD nonlinear optical medium 33 wavelength-converts the uplink-side second multiplex light of the C band of the even-numbered channels into the uplink-side second multiplex light of the L band of the even-numbered channels, and outputs to the second WDM coupler 34 the uplink-side second multiplex light of the L band of the even-numbered channels after the wavelength conversion. The eleventh wavelength converter 17A filters the uplink-side second multiplex light of the C band and the excitation light before the wavelength conversion, from the uplink-side second multiplex light of the C band of the even-numbered channels, the excitation light, and the uplink-side second multiplex light of the L band of the even-numbered channels to output the uplink-side second multiplex light of the L band. Furthermore, using the excitation light, the PD nonlinear optical medium 33 wavelength-converts the downlink-side third multiplex light of the L band of the odd-numbered channels into the downlink-side third multiplex light of the C band of the odd-numbered channels, and outputs to the second WDM coupler 34 the downlink-side third multiplex light of the C band of the odd-numbered channels after the wavelength conversion. The eleventh wavelength converter 17A filters the downlink-side third multiplex light of the L band and the excitation light before the wavelength conversion from the downlink-side third multiplex light of the L band of the odd-numbered channels, the excitation light, and the downlink-side third multiplex light of the C band of the odd-numbered channels to output the downlink-side third multiplex light of the C band.

The second WDM coupler 34 in the eleventh wavelength converter 17A outputs the uplink-side second multiplex light of the L band of the even-numbered channels to the uplink-side eleventh interleaver 18A1. Furthermore, the second WDM coupler 34 in the eleventh wavelength converter 17A the downlink-side third multiplex light of the C band of the odd-numbered channels to the downlink-side thirteenth interleaver 18C2. The downlink-side thirteenth interleaver 18C2 outputs the downlink-side third multiplex light of the C band of the odd-numbered channels to the downlink-side third optical reception group 16C2. As a result, the eleventh wavelength converter 17A outputs the uplink-side second multiplex light of the even-numbered channels and the downlink-side third multiplex light of the odd-numbered channels. That is, because of the division to the odd-numbered channels and the even-numbered channels, the wavelength converter may be diverted to an uplink signal and a downlink signal. In addition, the nonlinear optical distortion generated in the adjacent wavelengths may be reduced through assignment of the even-numbered channels to the uplink signal and the odd-numbered channels to the downlink signal.

Figure 5:
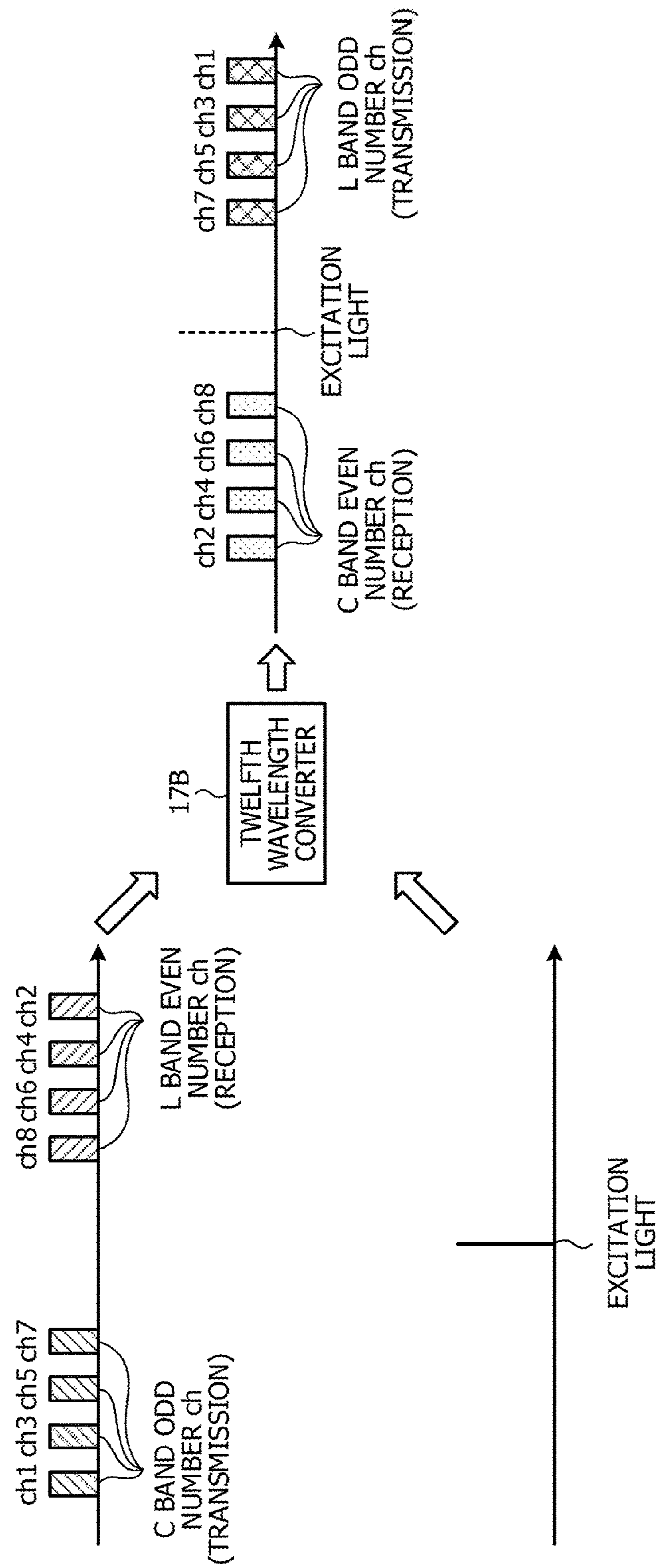
FIG. 5 is an explanatory diagram illustrating an example of a wavelength conversion operation of a twelfth wavelength converter.

The first WDM coupler 32 in the twelfth wavelength converter 17B outputs to the PD nonlinear optical medium 33 the downlink-side second multiplex light of the L band of the even-numbered channels from the downlink-side twelfth interleaver 18B2 and the excitation light from the first excitation light source 31. Furthermore, the first WDM coupler 32 outputs the uplink-side third multiplex light of the C band of the odd-numbered channels from the uplink-side third optical transmission group 11C1 to the PD nonlinear optical medium 33. The PD nonlinear optical medium 33 in the twelfth wavelength converter 17B propagates the downlink-side second multiplex light of the L band of the even-numbered channels, the uplink-side third multiplex light of the C band of the odd-numbered channels, and the excitation light. FIG. 5 is an explanatory diagram illustrating an example of the wavelength conversion operation of the twelfth wavelength converter 17B. Using the excitation light, the twelfth wavelength converter 17B wavelength-converts the downlink-side second multiplex light of the L band of the even-numbered channels into the downlink-side second multiplex light of the C band of the even-numbered channels and outputs to the second WDM coupler 34 the downlink-side second multiplex light of the C band of the even-numbered channels after the wavelength conversion. The twelfth wavelength converter 17B filters the downlink-side second multiplex light of the L band and the excitation light before the wavelength conversion from the downlink-side second multiplex light of the L band of the even-numbered channels, the excitation light, and the downlink-side second multiplex light of the C band of the even-numbered channels and outputs the downlink-side second multiplex light of the C band. Furthermore, using the excitation light, the twelfth wavelength converter 17B wavelength-converts the uplink-side third multiplex light of the C band of the odd-numbered channels into the uplink-side third multiplex light of the L band of the odd-numbered channels and outputs to the second WDM coupler 34 the uplink-side third multiplex light of the L band of the odd-numbered channels after the wavelength conversion. The twelfth wavelength converter 17B filters the uplink-side third multiplex light of the C band and the excitation light before the wavelength conversion from the uplink-side third multiplex light of the C band of the odd-numbered channels, the excitation light, and the uplink-side third multiplex light of the L band of the odd-numbered channels to output the uplink-side third multiplex light of the L band.

The second WDM coupler 34 in the twelfth wavelength converter 17B outputs the uplink-side third multiplex light of the L band of the odd-numbered channels to the uplink-side eleventh interleaver 18A1. Furthermore, the second WDM coupler 34 in the twelfth wavelength converter 17B outputs the downlink-side second multiplex light of the C band of the even-numbered channels to the downlink-side fourteenth interleaver 18D2. The downlink-side fourteenth interleaver 18D2 outputs the downlink-side second multiplex light of the band C of the even-numbered channels to the downlink-side second optical reception group 16B2. As a result, the twelfth wavelength converter 17B outputs the uplink-side third multiplex light of the odd-numbered channels and the downlink-side second multiplex light of the even-numbered channels. That is, because of the division into the odd-numbered channels and the even-numbered channels, the wavelength converter may be diverted to the uplink signal and the downlink signal. In addition, the nonlinear optical distortion generated between the adjacent wavelengths may be reduced through assignment of the odd-numbered channels to the uplink signal and the even-numbered channels to the downlink signal.

The uplink-side eleventh interleaver 18A1 in the first transmission apparatus 2A rearranges the uplink-side second multiplex light of the L band of the even-numbered channels and the uplink-side third multiplex light of the L band of the odd-numbered channels in numerical order. Then, the uplink-side eleventh interleaver 18A1 outputs to the uplink-side wavelength multiplexer 14A1 the uplink-side second and third multiplex light of the L band of the odd-numbered and even-numbered channels after the rearrangement. Furthermore, the uplink-side wavelength multiplexer 14A1 multiplexes the uplink-side second and third multiplex light of the L band with the uplink-side first multiplex light of the C band from the uplink-side first optical transmission group 11A1 to output to an uplink-side transmission line 3A.

The uplink-side wavelength demultiplexer 15A1 in the second transmission apparatus 2B demultiplexes the multiplex light from the uplink-side transmission line 3A to the uplink-side second and third multiplex light of the L band and the uplink-side first multiplex light of the C band. Then, the uplink-side wavelength demultiplexer 15A1 outputs the uplink-side second and third multiplex light of the L band to the uplink-side twelfth interleaver 18B1 and outputs the uplink-side first multiplex light of the C band to the uplink-side first optical reception group 16A1.

The uplink-side twelfth interleaver 18B1 separates the uplink-side second and third multiplex light of the L band to the uplink-side second multiplex light of the L band of the even-numbered channels and the uplink-side third multiplex light of the L band of the odd-numbered channels. Then, the uplink-side twelfth interleaver 18B1 outputs the uplink-side second multiplex light of the L band of the even-numbered channels to the first WDM coupler 32 in the fourteenth wavelength converter 17D. The uplink-side twelfth interleaver 18B1 outputs the uplink-side third multiplex light of the L band of the odd-numbered channels to the first WDM coupler 32 in the thirteenth wavelength converter 17C.

The first WDM coupler 32 in the fourteenth wavelength converter 17D outputs to the PD nonlinear optical medium 33 the uplink-side second multiplex light of the L band of the even-numbered channels from the uplink-side twelfth interleaver 1861. Furthermore, the first WDM coupler 32 outputs to the PD nonlinear optical medium 33 the downlink-side third multiplex light of the C band of the odd-numbered channels from the downlink-side third optical transmission group 11C2. The PD nonlinear optical medium 33 in the fourteenth wavelength converter 17D propagates the uplink-side second multiplex light of the L band of the even-numbered channels, the downlink-side third multiplexed light of the C band of the odd-numbered channels, and the excitation light from the first excitation light source 31. Then, using the excitation light, the PD nonlinear optical medium 33 wavelength-converts the uplink-side second multiplex light of the L band of the even-numbered channels into the uplink-side second multiplex light of the C band of the even-numbered channels and outputs to the second WDM coupler 34 the uplink-side second multiplex light of the C band of the even-numbered channels after the wavelength conversion. Furthermore, using the excitation light, the PD nonlinear optical medium 33 wavelength-converts the downlink-side third multiplex light of the C band of the odd-numbered channels into the downlink-side third multiplex light of the L band of the odd-numbered channels and outputs to the second WDM coupler 34 the downlink-side third multiplex light of the L band of the odd-numbered channels after the wavelength conversion. The second WDM coupler 34 in the fourteenth wavelength converter 17D outputs the uplink-side third multiplex light of the C band of the even-numbered channels to the uplink-side fourteenth interleaver 18D1.

The uplink-side fourteenth interleaver 18D1 outputs the uplink-side second multiplex light of the C band of the even-numbered channels to the uplink-side second optical reception group 16B1. Furthermore, the second WDM coupler 34 in the fourteenth wavelength converter 17D outputs the downlink-side third multiplex light of the L band of the odd-numbered channels to the downlink-side eleventh interleaver 18A2. As a result, the fourteenth wavelength converter 17D outputs the uplink-side second multiplex light of the even-numbered channels and the downlink-side third multiplex light of the odd-numbered channels. That is, because of the division into the even-numbered channels and the odd-numbered channels, the wavelength converter may be diverted to the uplink signal and the downlink signal. In addition, the nonlinear optical distortion generated between the adjacent wavelengths may be reduced through assignment of the even-numbered channels to the uplink signal and the odd-numbered channels to the downlink signal.

The first WDM coupler 32 in the thirteenth wavelength converter 17C outputs to the PD nonlinear optical medium 33 the uplink-side third multiplex light of the L band of the odd-numbered channels from the uplink-side twelfth interleaver 18B1 and the excitation light from the first excitation light source 31. The first WDM coupler 32 outputs the downlink-side second multiplex light of the C band of the even-numbered channels from the downlink-side second optical transmission group 11B2 to the PD nonlinear optical medium 33. The PD nonlinear optical medium 33 propagates the uplink-side third multiplex light of the L band of the odd-numbered channels, the downlink-side second multiplex light of the C band of the even-numbered channels, and the excitation light. Then, using the excitation light, the PD nonlinear optical medium 33 wavelength-converts the uplink-side third multiplex light of the L band of the odd-numbered channels into the uplink-side third multiplex light of the C band of the odd-numbered channels and outputs to the second WDM coupler 34 the uplink-side third multiplex light of the C band of the odd-numbered channels after the wavelength conversion. Furthermore, using the excitation light, the PD nonlinear optical medium 33 wavelength-converts the downlink-side second multiplex light of the C band of the even-numbered channels into the downlink-side second multiplex light of the L band of the even-numbered channels and outputs to the second WDM coupler 34 the downlink-side second multiplex light of the L band of the even-numbered channels after the wavelength conversion.

The second WDM coupler 34 in the thirteenth wavelength converter 17C outputs the downlink-side second multiplex light of the L band of the even-numbered channels to the downlink-side eleventh interleaver 18A2. Furthermore, the second WDM coupler 34 in the thirteenth wavelength converter 17C outputs the uplink-side third multiplex light of the C band of the odd-numbered channels to the uplink-side thirteenth interleaver 18C1. The uplink-side thirteenth interleaver 18C1 outputs the uplink-side third multiplex light of the C band of the odd-numbered channels to the uplink-side third optical reception group 16C1. The downlink-side eleventh interleaver 18A2 rearranges the downlink-side second multiplex light of the L band of the even-numbered channels and the downlink-side third multiplex light of the L band of the odd-numbered channels in numerical order of the channel numbers, and outputs the downlink-side second and third multiplex light of the L band after the rearrangement to the downlink-side wavelength multiplexer 14A2. Furthermore, downlink-side wavelength multiplexer 14A2 multiplexes the downlink-side second and third multiplex light of the L band with the downlink-side first multiplex light of the C band from the downlink-side first optical transmission group 11A2 to output to a downlink-side transmission line 3B. As a result the thirteenth wavelength converter 17C outputs the downlink-side second multiplex light of the even-numbered channels and the uplink-side third multiplex light of the odd-numbered channels. That is, because of the division of the odd-numbered channels and the even-numbered channels, the wavelength converter may be diverted to the uplink signal and the downlink signal. In addition, the no linear optical distortion generated between the adjacent wavelengths may be reduced through assignment of the even-numbered channels to the downlink signal and the odd-numbered channels to the uplink signal.

In the example 2, the input optical power to the wavelength converter of the WDM signal in the same bands (C band and L band) is made smaller. That is, the number of wavelengths in the same bands (C band and L band) to be converted by one wavelength converter is decreased to reduce the nonlinear optical distortions. As a result, it is possible to expand the dynamic range while reducing the deterioration in the signal quality.

The uplink-side eleventh interleaver 18A1 in the first transmission apparatus 2A of the example 2 rearranges the uplink-side third multiplex light of the L band of the odd-numbered channels and the uplink-side second multiplex light of the L band of the even-numbered channels in numerical order of the channel numbers to output the second and third multiplex light to the uplink-side wavelength multiplexer 14A1. The uplink-side wavelength multiplexer 14A1 multiplexes the uplink-side first multiplex light of the C band with the uplink-side second and third multiplex light of the L band to output to the uplink-side transmission line 3A. As a result, the uplink-side first multiplex light of the C band and the uplink-side second and third multiplex light of the L and may achieve large-capacity uplink transmission.

The downlink-side eleventh interleaver 18A2 in the second transmission apparatus 2B rearranges the downlink-side third multiplex light of the L band of the odd-numbered channels and the downlink-side second multiplex light of the L band of the even-numbered channels in numerical order of the channel numbers to output the second and third multiplex light to the downlink-side wavelength multiplexer 14A2. The downlink-side wavelength multiplexer 14A2 multiplexes the downlink-side third multiplex light of the C band with the downlink-side second and third multiplex light of the L band to output to the downlink-side transmission line 3B. As a result, the downlink-side first multiplex light of the C band and the downlink-side second and third multiplex light of the L band may achieve large-capacity downlink transmission.

The eleventh wavelength converter 17A wavelength-converts the uplink-side second multiplex light of the C band of the even-numbered channels into the uplink-side second multiplex light of the L band of the even-numbered channels and wavelength-converts the downlink-side third multiplex light of the L band of the odd-numbered channels into the downlink-side third multiplex light of the C band of the odd-numbered channels. As a result, it is possible to reduce the nonlinear optical distortion generated between the adjacent wavelengths by diverting the wavelength converter to the uplink signal and the downlink signal, and assigning the even-numbered channels to the uplink signal and the odd-numbered channels to the downlink signal.

The fourteenth wavelength converter 17D wavelength-converts the uplink-side second multiplex light of the L band of the even-numbered channels into the uplink-side second multiplex light of the C band of the even-numbered channels, and wavelength-converts the downlink-side third multiplex light of the C band of the odd-numbered channels into the downlink-side third multiplex light of the L band of the odd-numbered channels. As a result, it is possible to reduce the nonlinear optical distortion generated between the adjacent wavelengths by diverting the wavelength converter to the uplink signal and the downlink signal and assigning the even-numbered channels to the uplink signal and the odd-numbered channels to the downlink signal.

The thirteenth wavelength converter 17C wavelength-converts the downlink-side second multiplex light of the C band of the even-numbered channels into the downlink-side second multiplex light of the L band of the even-numbered channels, and wavelength-converts the uplink-side third multiplex light of the L band of the odd-numbered channels into the uplink-side third multiplex light of the C band of the odd-numbered channels. As a result, it is possible to reduce the nonlinear optical distortion generated between the adjacent wavelengths by diverting the wavelength converter to the uplink signal and the downlink signal and assigning the even-numbered channels to the downlink signal and the odd-numbered channels to the uplink signal.

The twelfth wavelength converter 17B wavelength-converts the downlink-side second multiplex light of the L band of the even-numbered channels into the downlink-side second multiplex light of the C band of the even-numbered channels, and wavelength-converts the uplink-side third multiplex light of the C band of the odd-numbered channels into the uplink-side third multiplex light of the L band of the odd-numbered channels. As a result, it is possible to reduce the nonlinear optical distortion generated between the adjacent wavelengths by diverting the wavelength converter to the uplink signal and the downlink signal and assigning the even-numbered channels to the downlink signal and the odd-numbered channels to the uplink signal.

The eleventh and twelfth wavelength converters 17A and 17B in the first transmission apparatus 2A of the foregoing example 2 converts the wavelength of the second multiplex light as a result of propagation of the excitation light from the first excitation light source 31, which is included in each of the eleventh and twelfth wavelength converters 17A and 17B, and the second multiplex light over the PD nonlinear optical medium 33. However, the eleventh and twelfth wavelength converters 17A and 17B may share a single excitation light source, an embodiment of which is described below as an example 3.

Example 3

Figure 6A:
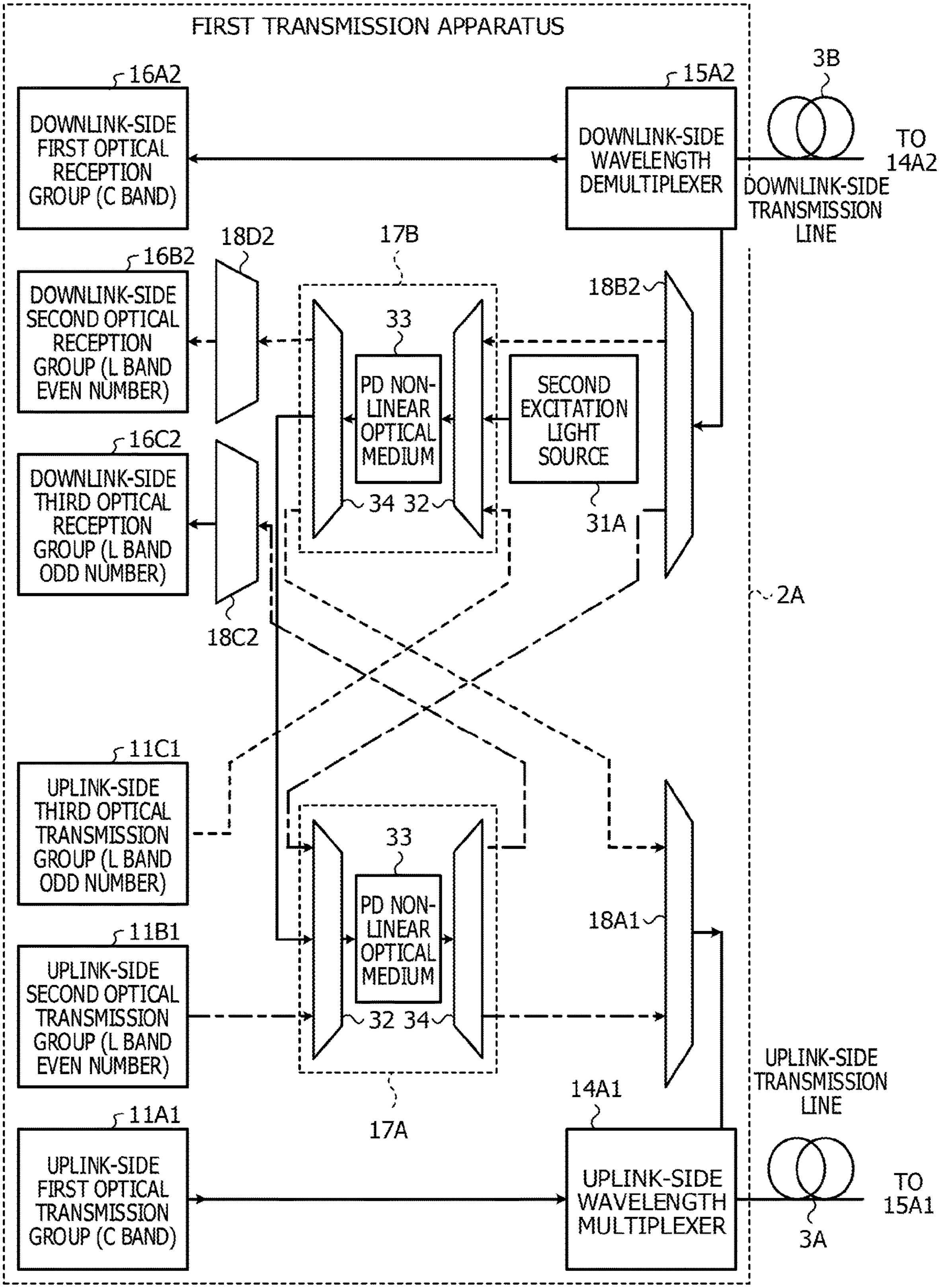
FIGS. 6A and 6B are explanatory diagrams illustrating an example of a transmission system of an example 3.
Figure 6B:
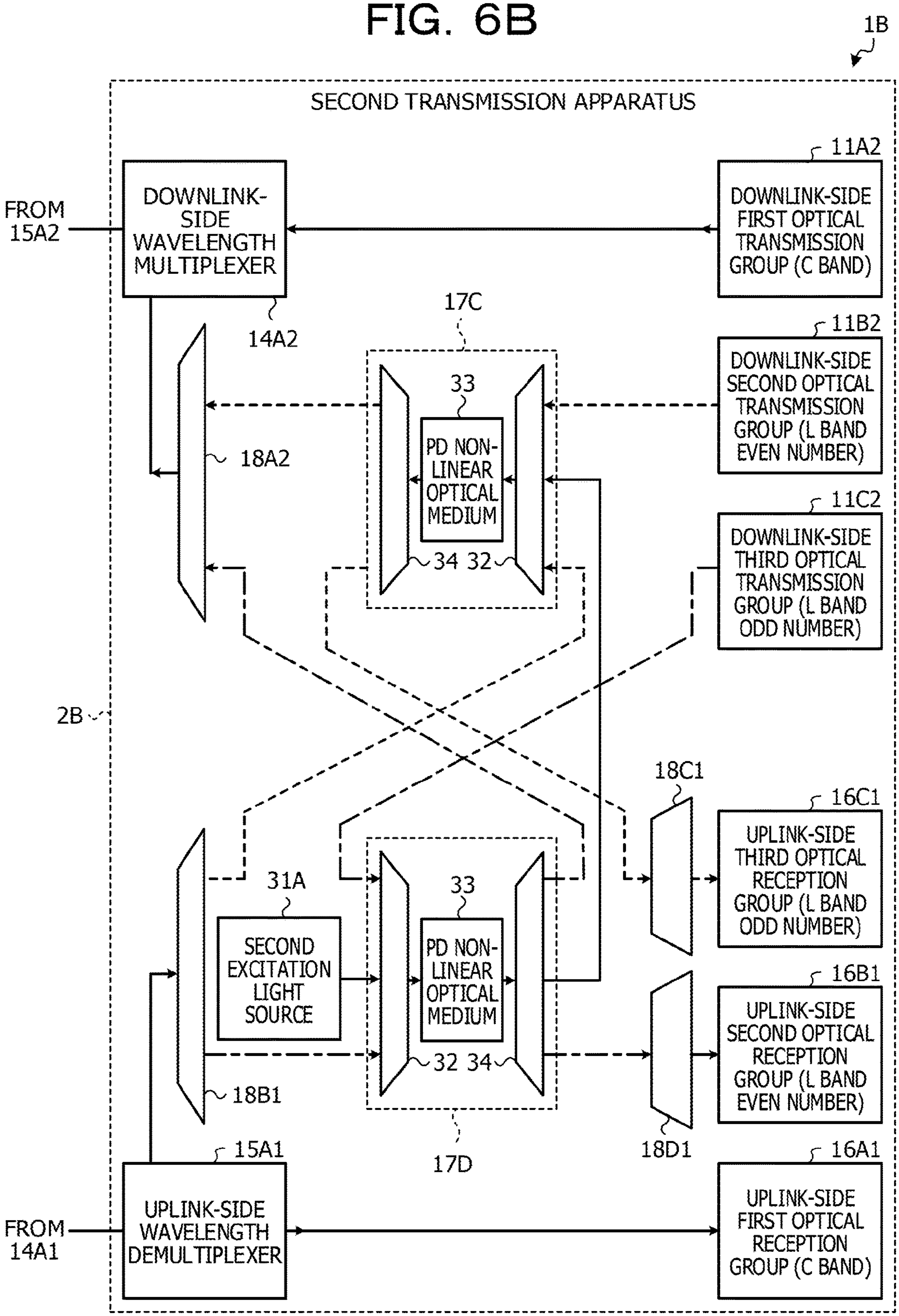

FIG. 6 is an explanatory diagram illustrating an example of a transmission system 1B of an example 3. Identical symbols are assigned to a configuration identical to the transmission system 1A of the example 2, thus omitting description of the overlapping configuration and operation.

The eleventh to fourteenth wavelength converters 17A to 17D illustrated in FIG. 4 convert the wavelengths of the second and third multiplex light by causing the excitation light from the first excitation light source 31, which is included in each of the eleventh to fourteenth wavelength converters 17A to 17D, and the second and third multiplex light to propagate via the PD nonlinear optical medium 33. In contrast to this, the first transmission apparatus 2A illustrated in FIG. 6 includes a second excitation light source 31A in place of the first excitation light source 31, and uses excitation light from the second excitation light source 31A for the eleventh wavelength converter 17A and the twelfth wavelength converter 17B. The second excitation light source 31A in the twelfth wavelength converter 17B supplies the excitation light to the first WDM coupler 32 in the twelfth wavelength converter 17B. The twelfth wavelength converter 17B supplies remaining excitation light, which are the transmitted light utilized in the wavelength conversion, to the first WDM coupler 32 in the eleventh wavelength converter 17A. More specifically, the eleventh wavelength converter 17A uses the remaining excitation light used in the wavelength conversion from the twelfth wavelength converter 17B for the wavelength conversion.

The second transmission apparatus 2B illustrated in FIG. 6 includes the second excitation light source 31A in place of the first excitation light source 31 and uses the excitation light from the second excitation light source 31A for the thirteenth wavelength converter 17C and the fourteenth wavelength converter 17D. The second excitation light source 31A in the fourteenth wavelength converter 17D supplies the excitation light to the first WDM coupler 32 in the fourteenth wavelength converter 17D. The fourteenth wavelength converter 17D supplies the remaining excitation light, which are the transmitted light utilized in the wavelength conversion, to the first WDM coupler 32 in the thirteenth wavelength converter 17C. More specifically, the thirteenth wavelength converter 17C uses the remaining excitation light used in the wavelength conversion from the fourteenth wavelength converter 17D for the wavelength conversion.

The first transmission apparatus 2A of the example 3 supplies the excitation light from the second excitation light source 31A to the twelfth wavelength converter 17B and reuses the remaining excitation light of the twelfth wavelength converter 17B for the eleventh wavelength converter 17A. As a result, the first transmission apparatus 2A may reduce the second excitation light source 31A utilized in the eleventh wavelength converter 17A. In addition, it is possible to improve utilization efficiency of the excitation light, reduce electric energy involved in the reduction of the excitation light sources, downsize component size, and reduce part cost.

The second transmission apparatus 2B supplies the excitation light from the second excitation light source 31A to the fourteenth wavelength converter 17D and reuses the remaining excitation light of the fourteenth wavelength converter 17D for the thirteenth wavelength converter 17C. As a result, the second transmission apparatus 2B may reduce the second excitation light source 31A utilized for the thirteenth wavelength converter 17C. In addition, it is possible to improve the utilization efficiency of the excitation light, reduce the electric energy involved in the reduction of the excitation light sources, downsize the component size, and reduce the part cost.

The remaining excitation light of the twelfth wavelength converter 17B in the transmission system 1B of the foregoing example 3 is used for the eleventh wavelength converter 17A, and the remaining excitation light of the fourteenth wavelength converter 17D is used for the thirteenth wavelength converter 17C. However, the example is not limited to these, and may be changed appropriately, an embodiment of which is described below as an example 4.

Example 4

Figure 7A:
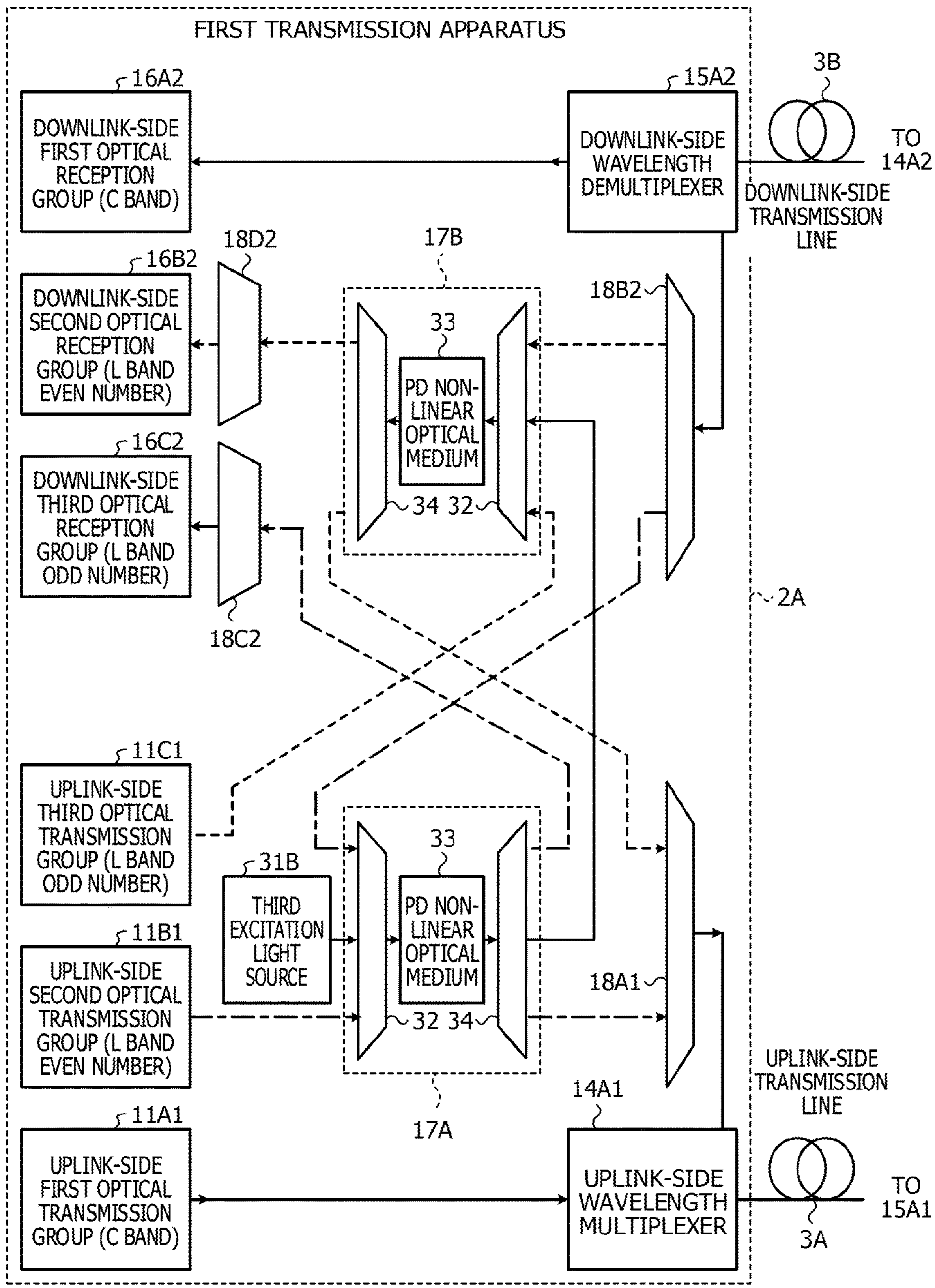
FIGS. 7A and 7B are explanatory diagrams illustrating an example of a transmission system of an example 4.
Figure 7B:
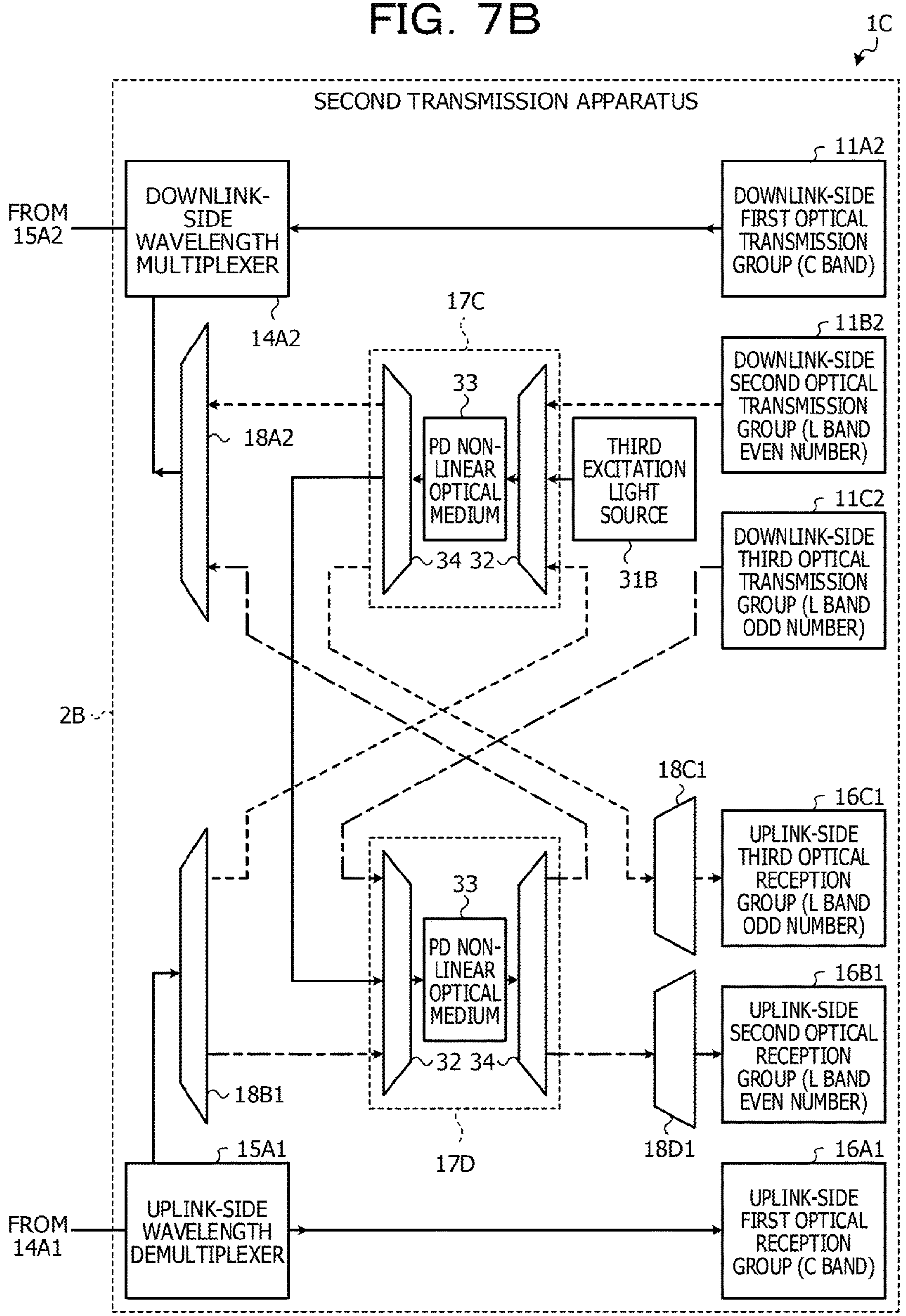

FIG. 7 is an explanatory diagram illustrating an example of a transmission system 1C of an example 4. Identical symbols are assigned to a configuration identical to the transmission system 1B of the example 3, thus omitting description of the overlapping configuration and operation.

The first transmission apparatus 2A illustrated in FIG. 6 supplies the excitation light from the second excitation light source 31A to the twelfth wavelength converter 17B and supplies the remaining excitation light, which passes through the twelfth wavelength converter 17B, to the eleventh wavelength converter 17A. Similarly, the second transmission apparatus 2B supplies the excitation light from the second excitation light source 31A to the fourteenth wavelength converter 17D, and supplies the remaining excitation light, which passes through the fourteenth wavelength converter 17D, to the thirteenth wavelength converter 17C.

In contrast to this, the first transmission apparatus 2A illustrated in FIG. 7 includes a third excitation light source 31B in place of the second excitation light source 31A, supplies excitation light from the third excitation light source 31B to the eleventh wavelength converter 17A. The first transmission apparatus 2A supplies the remaining excitation light, which passes through the eleventh wavelength converter 17A, to the twelfth wavelength converter 17B. The second transmission apparatus 2B includes the third excitation light source 31B in place of the second excitation light source 31A and supplies the excitation light from the third excitation light source 31B to the thirteenth wavelength converter 17C. The second transmission apparatus 2B supplies the remaining excitation light, which passes through the thirteenth wavelength converter 17C, to the fourteenth wavelength converter 17D.

The first transmission apparatus 2A of the example 4 supplies the excitation light from the third excitation light source 31B to the eleventh wavelength converter 17A and reuses the remaining excitation light of the eleventh wavelength converter 17A for the twelfth wavelength converter 17B. As a result, the first transmission apparatus 2A may reduce the second excitation light source 31A utilized for the twelfth wavelength converter 17B.

The second transmission apparatus 2B supplies the excitation light from the third excitation light source 31B to the thirteenth wavelength converter 17C and reuses the remaining excitation light of the thirteenth wavelength converter 17C for the fourteenth wavelength converter 17D. As a result, the second transmission apparatus 2B may reduce the second excitation light source 31A utilized for the fourteenth wavelength converter 17D.

There are a variety of kinds of the PD nonlinear optical medium 33 in the wavelength converter 17, an embodiment of which is described below as an example 5.

Example 5

Figure 8:
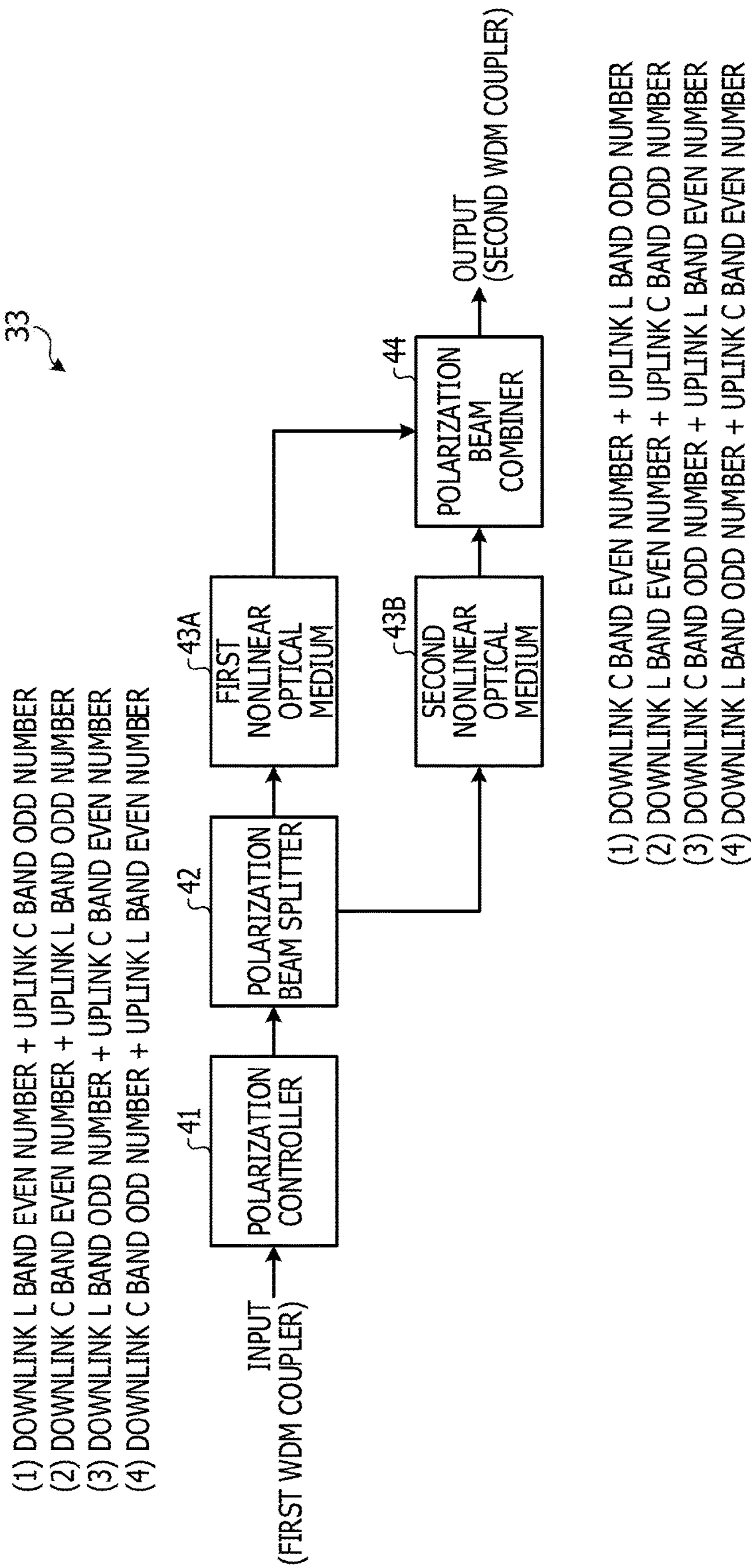
FIG. 8 is an explanatory diagram illustrating an example of a PD nonlinear optical medium of an example 5.

FIG. 8 is an explanatory diagram illustrating an example of the PD nonlinear optical medium 33 of the example 5. The PD nonlinear optical medium 33 illustrated in FIG. 8 includes a polarization controller 41, a polarization beam splitter 42, a first nonlinear optical medium 43A, a second nonlinear optical medium 43B, and a polarization beam combiner 44. The PD nonlinear optical medium 33 illustrated in FIG. 8 has a branching processing configuration of the single directional input and output.

The polarization controller 41 polarization-controls the second and third multiplex light from the first WDM coupler 32 and the excitation light. The polarization controller 41 outputs to the polarization beam splitter 42 the second and third multiplex light and the excitation light of vertical polarization and horizontal polarization after the polarization control. The polarization beam splitter 42 outputs the second and third multiplex light and the excitation light of the vertical polarization to the first nonlinear optical medium 43A and outputs the second and third multiplex light and the excitation light of the horizontal polarization to the second nonlinear optical medium 43B.

Using the excitation light of the vertical polarization, the first nonlinear optical medium 43A wavelength-converts the second and third multiplex light of the vertical polarization and supplies to the polarization beam combiner 44 the second and third multiplex light of the vertical polarization after the wavelength conversion. Using the excitation light of the horizontal polarization, the second nonlinear optical medium 43B wavelength-converts the second and third multiplex light of the horizontal polarization and outputs to the polarization beam combiner 44 the second and third multiplex light of the horizontal polarization after the wavelength conversion. The polarization beam combiner 44 outputs to the second WDM coupler 34 the second and third multiplex light from the first nonlinear optical medium 43A and the second and third multiplex light of the horizontal polarization from the second nonlinear optical medium 43B.

For example, the polarization controller 41 in the eleventh wavelength converter 17A polarization-controls, from the first WDM coupler 32, the uplink-side second multiplex light of the C band of the even-numbered channels, the downlink-side third multiplex light of the L band of the odd-numbered channels, and the excitation light. The polarization controller 41 outputs to the polarization beam splitter 42 the second and third multiplex light and the excitation light of the vertical polarization and the horizontal polarization after the polarization control. The polarization beam splitter 42 outputs to the first nonlinear optical medium 43A the uplink-side second multiplex light of the C band of the even-numbered channels of the vertical polarization, the downlink-side third multiplex light of the L band of the odd-numbered channels of the vertical polarization, and the excitation light of the vertical polarization. Furthermore, the polarization beam splitter 42 outputs to the second nonlinear optical medium 43B the uplink-side second multiplex light of the C band of the even-numbered channels of the horizontal polarization, the downlink-side third multiplex light of the L band of the odd-numbered channels of the horizontal polarization, and the excitation light of the horizontal polarization.

The first nonlinear optical medium 43A wavelength-converts the uplink-side second multiplex light of the C band of the even-numbered channels of the vertical polarization into the uplink-side second multiplex light of the L band of the even-numbered channels. The first nonlinear optical medium 43A wavelength-converts the downlink-side third multiplex light of the L band of the odd-numbered channels of the vertical polarization into the downlink-side third multiplex light of the C band of the odd-numbered channels. The second nonlinear optical medium 43B wavelength-converts the uplink-side second multiplex light of the C band of the even-numbered channels of the horizontal polarization into the uplink-side second multiplex light of the L band of the even-numbered channels. The second nonlinear optical medium 43B wavelength-converts the downlink-side third multiplex light of the L band of the odd-numbered channels of the horizontal polarization into the downlink-side third multiplex light of the C band of the odd-numbered channels.

The polarization beam combiner 44 multiplexes the uplink-side third multiplex light of the L band of the even-numbered channels from the first nonlinear optical medium 43A with the uplink-side second multiplex light of the L band of the even-numbered channels of the horizontal polarization from the second nonlinear optical medium 43B. Then, the polarization beam combiner 44 outputs to the second WDM coupler 34 the uplink-side second multiplex light of the L band of the multiplexed even-numbered channels. The polarization beam combiner 44 multiplexes the downlink-side third multiplex light of the C band of the odd-numbered channels of the vertical polarization from the first nonlinear optical medium 43A with the downlink-side third multiplex light of the C band of the odd-numbered channels of the horizontal polarization from the second nonlinear optical medium 43B. Then, the polarization beam combiner 44 outputs to the second WDM coupler 34 the downlink-side third multiplex light of the C band of the multiplexed odd-numbered channels.

For the purpose of illustration, although the PD nonlinear optical medium 33 of the eleventh wavelength converter 17A is illustratively described, processing operations are also similar in the twelfth wavelength converter 17B, the thirteenth wavelength converter 17C, and the fourteenth wavelength converter 17D.

The PD nonlinear optical medium 33 of the twelfth wavelength converter 17B wavelength-converts the downlink-side second multiplex light of the L band of the even-numbered channels into the downlink-side second multiplex light of the C band of the even-numbered channels. The PD nonlinear optical medium 33 wavelength-converts the uplink-side third multiplex light of the C band of the odd-numbered channels into the uplink-side third multiplex light of the L band of the odd-numbered channels. The PD nonlinear optical medium 33 of the fourteenth wavelength converter 17D wavelength-converts the uplink-side second multiplex light of the L band of the even-numbered channels into the uplink-side second multiplex light of the C band of the even-numbered channels. The PD nonlinear optical medium 33 wavelength-converts the downlink-side third multiplex light of the C band of the odd-numbered channels into the downlink-side third multiplex light of the L band of the odd-numbered channels. The PD nonlinear optical medium 33 of the thirteenth wavelength converter 17C wavelength-converts the downlink-side second multiplex light of the C band of the even-numbered channels into the downlink-side second multiplex light of the L band of the even-numbered channels. The PD nonlinear optical medium 33 wavelength-converts the uplink-side third multiplex light of the L band of the odd-numbered channels into the uplink-side third multiplex light of the C band of the odd-numbered channels.

In the wavelength converter 17 of the example 5, even if the PD nonlinear optical medium 33 of the branching processing configuration of the single directional input and output is adopted, the wavelength conversion of the second multiplex light is possible through division of the uplink signal and the downlink signal into the odd-numbered channels and the even-numbered channels.

Although in the wavelength converter 17 of the foregoing example 5, the PD nonlinear optical medium 33 of the branching processing configuration of the single directional input and output is adopted, the PD nonlinear optical medium 33 of a light-transmissive-type loop processing configuration of the single direction input and output may be adopted, and embodiment in that case is described below as an example 6.

Example 6

Figure 9:
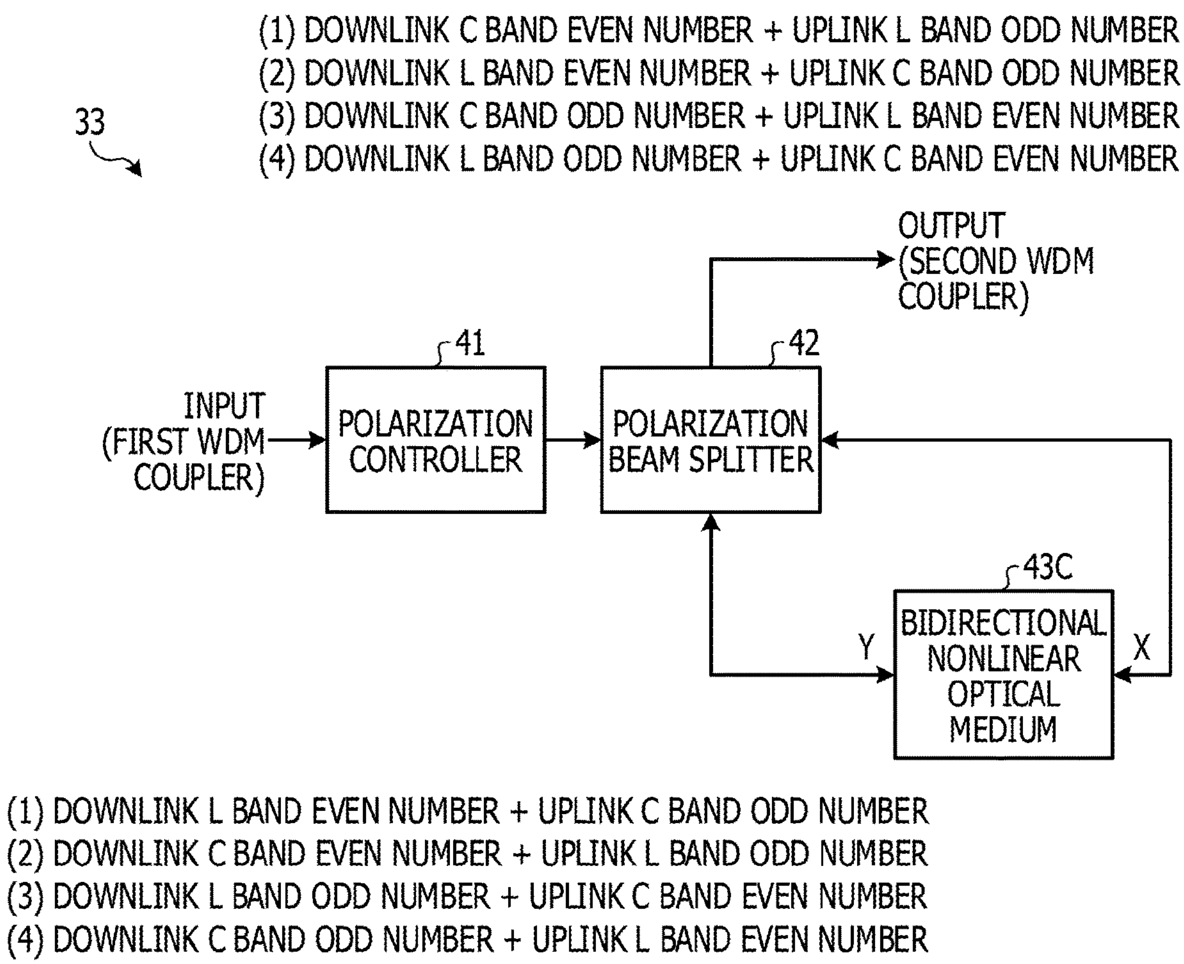
FIG. 9 is an explanatory diagram illustrating an example of a PD nonlinear optical medium of an example 6.

FIG. 9 is an explanatory diagram illustrating an example of the PD nonlinear optical medium 33 of the example 6. The PD nonlinear optical medium 33 illustrated in FIG. 9 is the nonlinear optical medium of the light-transmissive-type loop processing configuration of the single direction input and output, and includes the polarization controller 41, the polarization beam splitter 42, and a bidirectional nonlinear optical medium 43C.

The polarization controller 41 polarization-controls the second and third multiplex light and the excitation light from the first WDM coupler 32. The polarization controller 41 outputs to the polarization beam splitter 42 the second and third multiplex light and the excitation light of the vertical polarization and the horizontal polarization after the polarization control. The polarization beam splitter 42 outputs the second and third multiplex light and the excitation light of the vertical polarization to a forward port X of the bidirectional nonlinear optical medium 43C. The polarization beam splitter 42 outputs the second and third multiplex light and the excitation light of the horizontal polarization to a backward port Y of the bidirectional nonlinear optical medium 43C.

Using the excitation light, the bidirectional nonlinear optical medium 43C wavelength-converts the second and third multiplex light of the vertical polarization inputted from the forward port X and outputs the second and third multiplex light after being wavelength-converted to the polarization beam splitter 42. Using the excitation light, the bidirectional nonlinear optical medium 43C wavelength-converts the second and third multiplex light of the horizontal polarization inputted from the backward port Y and outputs the second and third multiplex light after being wavelength-converted to the polarization beam splitter 42. The bidirectional nonlinear optical medium 43C wavelength-converts the second and third multiplex light of the horizontal polarization and wavelength-converts the second and third multiplex light of the vertical polarization. Then, the polarization beam splitter 42 outputs to the second WDM coupler 34 the second and third multiplex light of the vertical polarization and the second and third multiplex light of the horizontal polarization.

For example, the polarization controller 41 in the eleventh wavelength converter 17A polarization-controls, from the first WDM coupler 32, the uplink-side second multiplex light of the C band of the even-numbered channels, the downlink-side third multiplex light of the L band of the odd-numbered channels, and the excitation light. The polarization controller 41 outputs to the polarization beam splitter 42 the second and third multiplex light and the excitation light of the vertical polarization and the horizontal polarization after the polarization control. The polarization beam splitter 42 outputs the uplink-side second multiplex light of the C band of the even-numbered channels of the vertical polarization, the downlink-side third multiplex light of the L band of the odd-numbered channels of the vertical polarization, and the excitation light of the vertical polarization to the forward port X of the bidirectional nonlinear optical medium 43C. The polarization beam splitter 42 outputs the uplink-side second multiplex light of the C band of the even-numbered channels of the horizontal polarization, the downlink-side third multiplex light of the L band of the odd-numbered channels of the horizontal polarization, and the excitation light of the horizontal polarization to the backward port Y of the bidirectional nonlinear optical medium 43C.

The bidirectional nonlinear optical medium 43C wavelength-converts the uplink-side second multiplex light of the C band of the even-numbered channels of the vertical polarization inputted from the forward port X into the uplink-side second multiplex light of the L band of the even-numbered channels. The bidirectional nonlinear optical medium 43C wavelength-converts the downlink-side third multiplex light of the L band of the odd-numbered channels of the vertical polarization inputted from the forward port X into the downlink-side third multiplex light of the C band of the odd-numbered channels. Then, the bidirectional nonlinear optical medium 43C outputs to the polarization beam splitter 42 the uplink-side second multiplex light of the L band of the even-numbered channels of the vertical polarization after the wavelength conversion and the downlink-side third multiplex light of the C band of the odd-numbered channels of the vertical polarization after the wavelength conversion.

The bidirectional nonlinear optical medium 43C wavelength-converts the uplink-side second multiplex light of the C band of the even-numbered channels of the horizontal polarization inputted from the backward port Y into the uplink-side second multiplex light of the L band of the even-numbered channels. The bidirectional nonlinear optical medium 43C wavelength-converts the downlink-side third multiplex light of the L band of the odd-numbered channels of the horizontal polarization inputted from the backward port Y into the downlink-side third multiplex light of the C band of the odd-numbered channels. Then, the bidirectional nonlinear optical medium 43C outputs to the polarization beam splitter 42 the uplink-side second multiplex light of the L band of the even-numbered channels of the horizontal polarization after the wavelength conversion and the downlink-side third multiplex light of the C band of the odd-numbered channels of the horizontal polarization after the wavelength conversion.

The polarization beam splitter 42 multiplexes the uplink-side second multiplex light of the L band of the even-numbered channels of the vertical polarization with the uplink-side second multiplex light of the L band of the even-numbered channels of the horizontal polarization to output the uplink-side second multiplex light of the L band of the even-numbered channels to the second WDM coupler 34. The polarization beam splitter 42 multiplexes the downlink-side third multiplex light of the C band of the odd-numbered channels of the vertical polarization with the downlink-side third multiplex light of the C band of the odd-numbered channels of the horizontal polarization to output the downlink-side third multiplex light of the C band of the odd-numbered channels to the second WDM coupler 34.

For the purpose of illustration, although the PD nonlinear optical medium 33 of the eleventh wavelength converter 17A is illustratively described, the processing operations are also similar in the twelfth wavelength converter 17B, the thirteenth wavelength converter 17C, and the fourteenth wavelength converter 17D.

For example, the bidirectional nonlinear optical medium 43C of the twelfth wavelength converter 17B wavelength-converts the downlink-side second multiplex light of the L band of the even-numbered channels of the vertical polarization and the horizontal polarization into the downlink-side second multiplex light of the C band of the even-numbered channels. Then, the bidirectional nonlinear optical medium 43C outputs the downlink-side second multiplex light of the C band of the even-numbered channels after the wavelength conversion to the polarization beam splitter 42. The bidirectional nonlinear optical medium 43C wavelength-converts the uplink-side third multiplex light of the C band of the odd-numbered channels of the vertical polarization and the horizontal polarization into the uplink-side third multiplex light of the L band of the odd-numbered channels. Then, the bidirectional nonlinear optical medium 43C outputs the uplink-side third multiplex light of the L band of the odd-numbered channels after the wavelength conversion to the polarization beam splitter 42. The polarization beam splitter 42 outputs to the second WDM coupler 34 the downlink-side second multiplex light of the C band of the even-numbered channels of the vertical polarization and the horizontal polarization into the uplink-side third multiplex light of the L band of the odd-numbered channels of the vertical polarization and the horizontal polarization.

For example, the bidirectional nonlinear optical medium 43C of the fourteenth wavelength converter 17D wavelength-converts the uplink-side second multiplex light of the L band of the even-numbered channels of the vertical polarization and the horizontal polarization into the uplink-side second multiplex light of the C band of the even-numbered channels. Then, the bidirectional nonlinear optical medium 43C outputs the uplink-side second multiplex light of the C band of the even-numbered channels after the wavelength conversion to the polarization beam splitter 42. The bidirectional nonlinear optical medium 43C wavelength-converts the downlink-side third multiplex light of the C band of the odd-numbered channels of the vertical polarization and the horizontal polarization into the downlink-side third multiplex light of the L band of the odd-numbered channels. Then, the bidirectional nonlinear optical medium 43C outputs the downlink-side third multiplex light of the L band of the odd-numbered channels after the wavelength conversion to the polarization beam splitter 42. The polarization beam splitter 42 outputs to the second WDM coupler 34 the uplink-side second multiplex light of the C band of the even-numbered channels of the vertical polarization and the horizontal polarization, the downlink-side third multiplex light of the L band of the odd-numbered channels of the vertical polarization and the horizontal polarization.

For example, the bidirectional nonlinear optical medium 43C of the thirteenth wavelength converter 17C wavelength-converts the downlink-side second multiplex light of the C band of the even-numbered channels of the vertical polarization and the horizontal polarization into the downlink-side second multiplex light of the L band of the even-numbered channels. Then, the bidirectional nonlinear optical medium 43C outputs to the polarization beam splitter 42 the downlink-side second multiplex light of the L band of the even-numbered channels after the wavelength conversion. The bidirectional nonlinear optical medium 43C wavelength-converts the uplink-side third multiplex light of the L band of the odd-numbered channels of the vertical polarization and the horizontal polarization into the uplink-side third multiplex light of the C band of the odd-numbered channels. Then, the bidirectional nonlinear optical medium 43C outputs the uplink-side third multiplex light of the C band of the odd-numbered channels after the wavelength conversion to the polarization beam splitter 42. The polarization beam splitter 42 outputs to the second WDM coupler 34 the downlink-side second multiplex light of the L band of the even-numbered channels of the vertical polarization and the horizontal polarization and the uplink-side third multiplex light of the C band of the odd-numbered channels of the vertical polarization and the horizontal polarization.

In the wavelength converter 17 of the example 6, even if the PD nonlinear optical medium 33 of the light-transmissive-type loop processing configuration of the single direction input and output is adopted, the wavelength conversion of the second and third multiplex light is possible through division of the uplink signal and the downlink signal into the odd-numbered channels and the even-numbered channels.

In the wavelength converter 17 of the foregoing example 5, the PD nonlinear optical medium 33 of a reflection-type loop processing configuration of the single direction input and output may also be adopted, and an embodiment in that case of which is described below as an example 7.

Example 7

Figure 10:
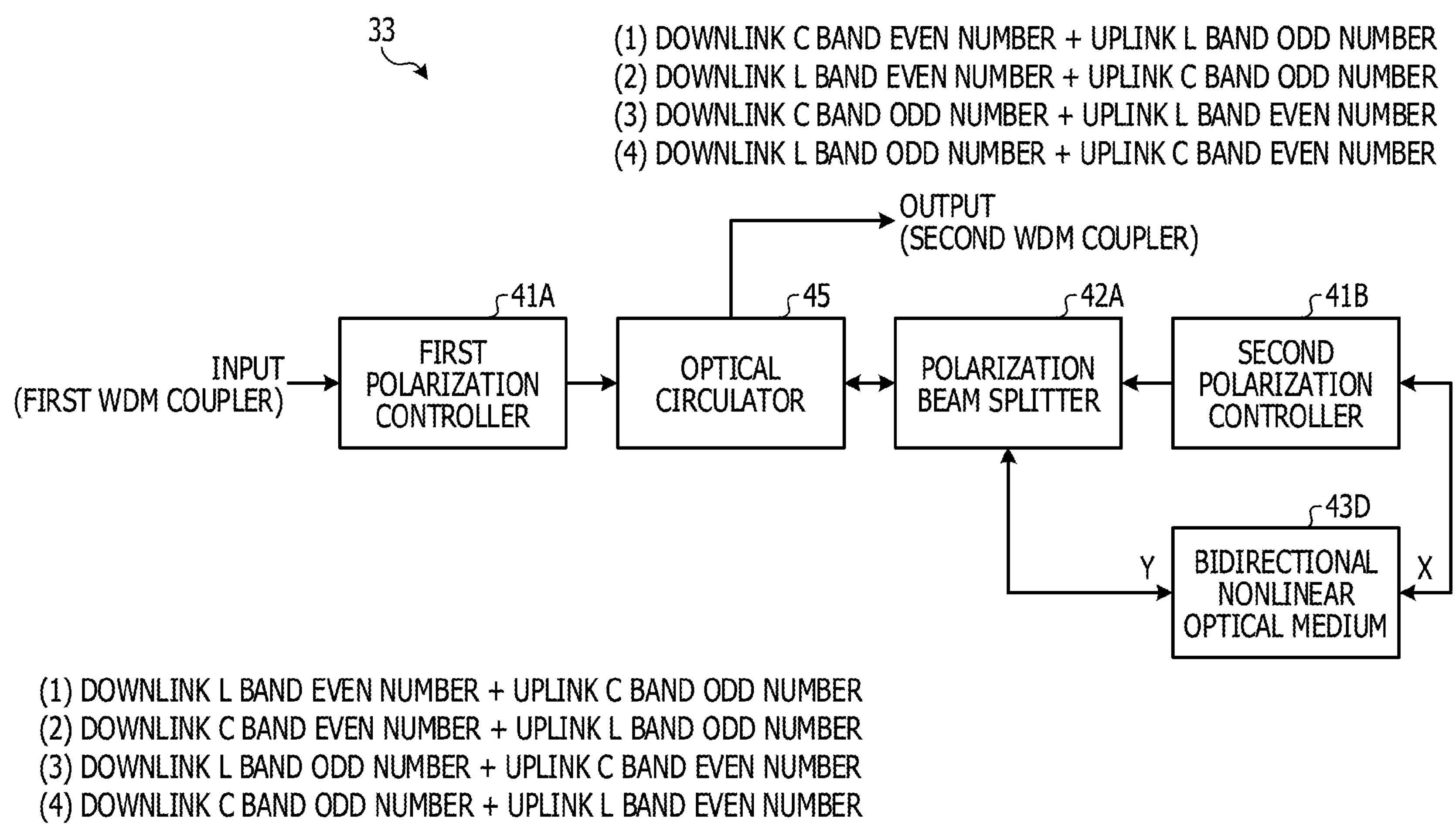
FIG. 10 is an explanatory diagram illustrating an example of a PD nonlinear optical medium of an example 7.

FIG. 10 is an explanatory diagram illustrating an example of the PD nonlinear optical medium 33 of the example 7. The PD nonlinear optical medium 33 illustrated in FIG. 10 has the reflection-type loop processing configuration of the single direction input and output, and includes the first polarization controller 41A, an optical circulator 45, the polarization beam splitter 42A, a second polarization controller 41B, and a bidirectional nonlinear optical medium 43D.

The first polarization controller 41A polarization-controls the second and third multiplex light and the excitation light from the first WDM coupler 32. The first polarization controller 41A outputs to the optical circulator 45 the second and third multiplex light and the excitation light of the vertical polarization and the horizontal polarization after the polarization control. The optical circulator 45 outputs the second and third multiplex light and the excitation light of the vertical polarization and the horizontal polarization to the polarization beam splitter 42A.

The polarization beam splitter 42A the second and third multiplex light and the excitation light of the vertical polarization from the optical circulator 45 to the second polarization controller 41B. The second polarization controller 41B polarization-controls the second and third multiplex light and the excitation light of the vertical polarization to the second and third multiplex light and the excitation light of the horizontal polarization, and outputs the second and third multiplex light and the excitation light of the horizontal polarization to the forward port X of the bidirectional nonlinear optical medium 43D. Using the excitation light, the bidirectional nonlinear optical medium 43D wavelength-converts the second and third multiplex light of the horizontal polarization, and outputs to the polarization beam splitter 42A the second and third multiplex light of the horizontal polarization after the wavelength conversion.

The polarization beam splitter 42A outputs the second and third multiplex light and the excitation light of the horizontal polarization from the optical circulator 45 to the backward port Y of the bidirectional nonlinear optical medium 43D. Using the excitation light, the bidirectional nonlinear optical medium 43D wavelength-converts the second and third multiplex light of the horizontal polarization, and outputs to the second polarization controller 41B the second and third multiplex light and the excitation light of the horizontal polarization after the wavelength conversion. The second polarization controller 41B polarization-controls the second and third multiplex light of the horizontal polarization after the wavelength control to the second and third multiplex light of the vertical polarization, and outputs the second and third multiplex light of the vertical polarization to the polarization beam splitter 42A.

Then, the polarization beam splitter 42A outputs to the optical circulator 45 the second and third multiplex light after the wavelength conversion of the vertical polarization and the second and third multiplex light after the wavelength conversion of the horizontal polarization. Then, the optical circulator 45 outputs the second and third multiplex light after the wavelength conversion of the vertical polarization and the horizontal polarization to the second WDM coupler 34.

For example, the first polarization controller 41A in the eleventh wavelength converter 17A polarization-controls, from the first WDM coupler 32, the uplink-side third multiplex light of the C band of the odd-numbered channels, the downlink-side second multiplex light of the L band of the even-numbered channels, and the excitation light. The first polarization controller 41A outputs the second and third multiplex light and the excitation light of the vertical polarization and the horizontal polarization after the polarization control to the optical circulator 45. The optical circulator 45 outputs the second and third multiplex light and the excitation light of the vertical polarization and the horizontal polarization to the polarization beam splitter 42A.

The polarization beam splitter 42A outputs to the second polarization controller 41B the uplink-side third multiplex light of the C band of the odd-numbered channels of the vertical polarization from the optical circulator 45, the downlink-side second multiplex light of the L band of the even-numbered channels of the vertical polarization, and the excitation light of the vertical polarization. The second polarization controller 41B polarization-controls the uplink-side third multiplex light of the C band of the odd-numbered channels of the vertical polarization to the uplink-side third multiplex light of the C band of the odd-numbered channels of the horizontal polarization, and polarization-controls the excitation light of the vertical polarization to the excitation light of the horizontal polarization. Furthermore, the second polarization controller 41B polarization-controls the downlink-side second multiplex light of the L band of the even-numbered channels of the vertical polarization and the excitation light of the vertical polarization to the downlink-side second multiplex light of the L band of the even-numbered channels of the horizontal polarization. The second polarization controller 41B outputs to the forward port X of the bidirectional nonlinear optical medium 43D the uplink-side third multiplex light of the C band of the odd-numbered channels of the horizontal polarization, the downlink-side second multiplex light of the L band of the even-numbered channels of the horizontal polarization, and the excitation light of the horizontal polarization. Using the excitation light of the horizontal polarization, the bidirectional nonlinear optical medium 43D wavelength-converts the uplink-side third multiplex light of the C band of the odd-numbered channels of the horizontal polarization into the uplink-side third multiplex light of the L band of the odd-numbered channels. Using the excitation light of the horizontal polarization, the bidirectional nonlinear optical medium 43D wavelength-converts the downlink-side second multiplex light of the L band of the even-numbered channels of the horizontal polarization into the downlink-side second multiplex light of the C band of the even-numbered channels. The bidirectional nonlinear optical medium 43D outputs to the polarization beam splitter 42A the uplink-side third multiplex light of the L band of the odd-numbered channels of the horizontal polarization after the wavelength conversion and the uplink-side third multiplex light of the L band of the odd-numbered channels of the horizontal polarization after the wavelength conversion.

The polarization beam splitter 42A outputs to the backward port of the bidirectional nonlinear optical medium 43D the uplink-side third multiplex light of the C band of the odd-numbered channels of the horizontal polarization from the optical circulator 45, the downlink-side second multiplex light of the L band of the even-numbered channels of the horizontal polarization, and the excitation light of the horizontal polarization. Using the excitation light of the horizontal polarization, the bidirectional nonlinear optical medium 43D wavelength-converts the uplink-side third multiplex light of the C band of the odd-numbered channels of the horizontal polarization into the uplink-side third multiplex light of the L band of the odd-numbered channels. Using the excitation light of the horizontal polarization, the bidirectional nonlinear optical medium 43D wavelength-converts the downlink-second multiplex light of the L band of the even-numbered channels of the horizontal polarization into the downlink-side second multiplex light of the C band of the even-numbered channels. The second polarization controller 41B polarization-controls the uplink-side third multiplex light of the L band of the odd-numbered channels of the horizontal polarization after the wavelength conversion to the uplink-side third multiplex light of the L band of the odd-numbered channels. Furthermore, the second polarization controller 41B polarization-controls the uplink-side second multiplex light of the C band of the even-numbered channels of the horizontal polarization after the wavelength conversion to the uplink-side second multiplex light of the C band of the even-numbered channels of the vertical polarization. Then, the second polarization controller 41B outputs to the polarization beam splitter 42A the uplink-side third multiplex light of the L band of the odd-numbered channels of the vertical polarization after the polarization control and the downlink-side second multiplex light of the C band of the even-numbered channels of the vertical polarization after the polarization control.

The polarization beam splitter 42A multiplexes the uplink-side third multiplex light of the L band of the odd-numbered channels of the vertical polarization with the uplink-side third multiplex light of the L band of the odd-numbered channels of the horizontal polarization. The polarization beam splitter 42A outputs the multiplexed uplink-side third multiplex light of the L band of the odd-numbered channels to the second WDM coupler 34 by way of the optical circulator 45. The polarization beam splitter 42A combines the downlink-side second multiplex light of the C band of the even-numbered channels of the vertical polarization with the downlink-side second multiplex light of the C band of the even-numbered channels of the horizontal polarization to output the downlink-side second multiplex light of the C band of the even-numbered channels to the second WDM coupler 34 by way of the optical circulator 45.

For the purpose of illustration, although the PD nonlinear optical medium 33 of the eleventh wavelength converter 17A is illustratively described, the processing operations are also similar in the twelfth wavelength converter 17B, the thirteenth wavelength converter 17C, and the fourteenth wavelength converter 17D.

For example, the bidirectional nonlinear optical medium 43D of the twelfth wavelength converter 17B wavelength-converts the downlink-side second multiplex light of the L band of the even-numbered channels of the vertical polarization and the horizontal polarization into the downlink-side second multiplex light of the C band of the even-numbered channels. Then, the bidirectional nonlinear optical medium 43D outputs the downlink-side second multiplex light of the C band of the even-numbered channels after the wavelength conversion to the polarization beam splitter 42A. The bidirectional nonlinear optical medium 43D wavelength-converts the uplink-side third multiplex light of the C band of the odd-numbered channels of the vertical polarization and the horizontal polarization into the uplink-side third multiplex light of the L band of the odd-numbered channels. Then, the bidirectional nonlinear optical medium 43D outputs the uplink-side third multiplex light of the L band of the odd-numbered channels after the wavelength conversion to the polarization beam splitter 42A. The polarization beam splitter 42A multiplexes the downlink-side second multiplex light of the C band of the even-numbered channels of the vertical polarization and the horizontal polarization to output the downlink-side second multiplex light of the C band of the even-numbered channels to the second WDM coupler 34 by way of the optical circulator 45. The polarization beam splitter 42A combines the uplink-side third multiplex light of the L band of the odd-numbered channels after the wavelength conversion of the vertical polarization and the horizontal polarization to output the uplink-side third multiplex light of the L band of the odd-numbered channels to the second WDM coupler 34 by way of the optical circulator 45.

The bidirectional nonlinear optical medium 43D of the fourteenth wavelength converter 17D wavelength-converts the uplink-side second multiplex light of the L band of the even-numbered channels of the vertical polarization and the horizontal polarization into the uplink-side second multiplex light of the C band of the even-numbered channels. Then, the bidirectional nonlinear optical medium 43D outputs the uplink-side second multiplex light of the C band of the even-numbered channels after the wavelength conversion to the polarization beam splitter 42A. The bidirectional nonlinear optical medium 43D wavelength-converts the downlink-side third multiplex light of the C band of the odd-numbered channels of the vertical polarization and the horizontal polarization into the downlink-side third multiplex light of the L band of the odd-numbered channels. Then, the bidirectional nonlinear optical medium 43D outputs the downlink-side third multiplex light of the L band of the odd-numbered channels after the wavelength conversion to the polarization beam splitter 42A. The polarization beam splitter 42A multiplexes the uplink-side second multiplex light of the C band of the even-numbered channels of the vertical polarization and the horizontal polarization to output the uplink-side second multiplex light of the C band of the even-numbered channels to the second WDM coupler 34 by way of the optical circulator 45. The polarization beam splitter 42A combines the downlink-side third multiplex light of the L band of the odd-numbered channels of the vertical polarization and the horizontal polarization to output the downlink-side third multiplex light of the L band of the odd-numbered channels to the second WDM coupler 34 by way of the optical circulator 45.

The bidirectional nonlinear optical medium 43D of the thirteenth wavelength converter 17C wavelength-converts the downlink-side second multiplex light of the C band of the even-numbered channels of the vertical polarization and the horizontal polarization into the downlink-side second multiplex light of the L band of the even-numbered channels. Then, the bidirectional nonlinear optical medium 43D outputs the downlink-side second multiplex light of the L band of the even-numbered channels after the wavelength conversion to the polarization beam splitter 42A. The bidirectional nonlinear optical medium 43D wavelength-converts the uplink-side third multiplex light of the L band of the odd-numbered channels of the vertical polarization and the horizontal polarization into the uplink-side third multiplex light of the C band of the odd-numbered channels. Then, bidirectional nonlinear optical medium 43D outputs the uplink-side third multiplex light of the C band of the odd-numbered channels after the wavelength conversion to the polarization beam splitter 42A. The polarization beam splitter 42A multiplexes the downlink-side second multiplex light of the L band of the even-numbered channels after the wavelength conversion of the vertical polarization and the horizontal polarization to output the downlink-side second multiplex light of the L band of the even-numbered channels to the second WDM coupler 34 by way of the optical circulator 45. The polarization beam splitter 42A combines the uplink-side third multiplex light of the C band of the odd-numbered channels after the wavelength conversion of the vertical polarization and the horizontal polarization to output the uplink-side third multiplex light of the C band of the odd-numbered channels to the second WDM coupler 34 by way of the optical circulator 45.

In the wavelength converter 17 of the example 7, even if the PD nonlinear optical medium 33 of the reflection-type loop processing configuration of the single direction input and output is adopted, the wavelength conversion of the second multiplex light is possible through division of the uplink signal and the downlink signal into the odd-numbered channels and the even-numbered channels.

The eleventh wavelength converter 17A of the foregoing example exemplifies the single-direction PD nonlinear optical medium 33 that wavelength-converts the uplink-side second multiplex light of the C band of the even-numbered channels and the downlink-side third multiplex light of the L band of the odd-numbered channels. However, the eleventh wavelength converter 17A is not limited this. An embodiment of a case in which a bidirectional PD nonlinear optical medium 36 that wavelength-converts the uplink-side second multiplex light of the C band of the even-numbered channels and the downlink-side third multiplex light of the L band of the odd-numbered channels is described below as an example 8.

Example 8

Figure 11A:
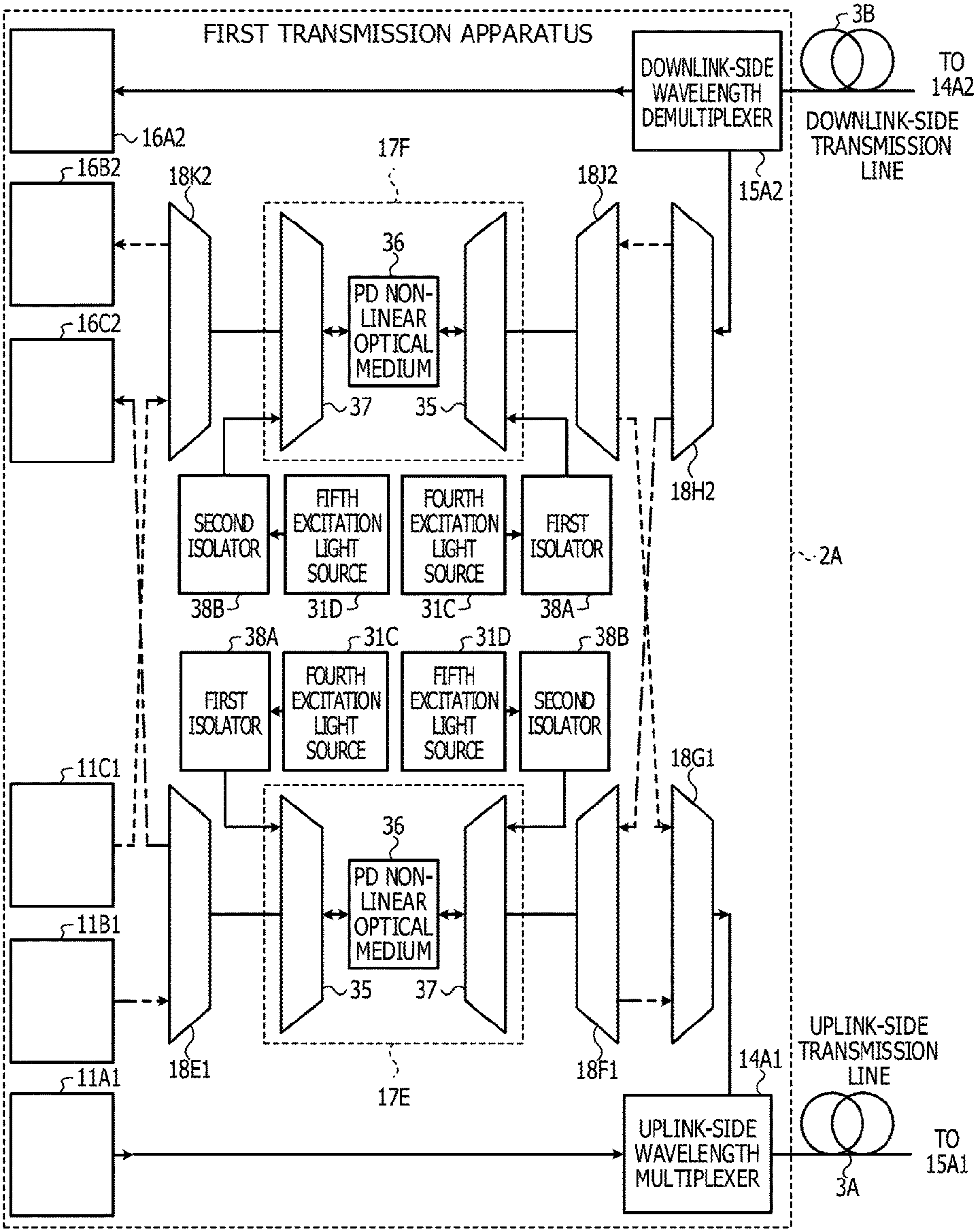
FIGS. 11A and 11B are explanatory diagrams illustrating an example of a transmission system of an example 8.
Figure 11B:
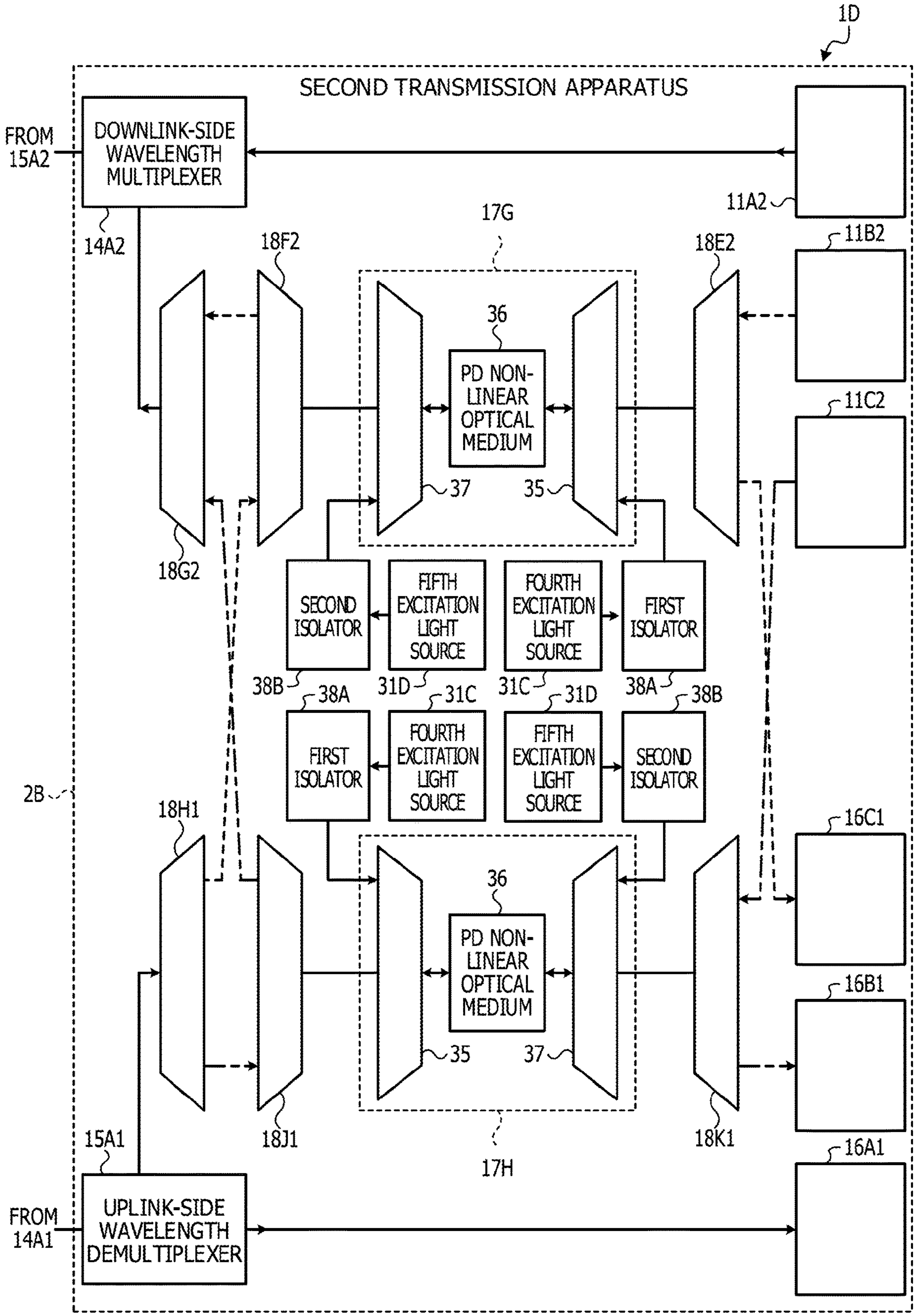

FIG. 11 is an explanatory diagram illustrating an example of a transmission system 1D of the example 8. The identical symbols are assigned to a configuration identical to the transmission system 1A in the example 2, and thus description of the overlapping configurations and operations is omitted.

The first transmission apparatus 2A illustrated in FIG. 11 includes the uplink-side third optical transmission group 11C1, the uplink-side second optical transmission group 1161, and the uplink-side first optical transmission group 11A1. The first transmission apparatus 2A includes the downlink-side third optical reception group 16C2, the downlink-side second optical reception group 1662, the downlink-side first optical reception group 16A2, the uplink-side wavelength multiplexer 14A1, and the downlink-side wavelength demultiplexer 15A2. Furthermore, the first transmission apparatus 2A includes a fifteenth wavelength converter 17E, a sixteenth wavelength converter 17F, an uplink-side fifteenth interleaver 18E1, an uplink-side sixteenth interleaver 18F1, and an uplink-side seventeenth interleaver 18G1. The first transmission apparatus 2A includes a downlink-side eighteenth interleaver 18H2, a downlink-side nineteenth interleaver 18J2, and a downlink-side twentieth interleaver 18K2.

The fifteenth wavelength converter 17E includes a third WDM coupler 35, the PD nonlinear optical medium 36, and a fourth WDM coupler 37. The third WDM coupler 35 inputs the excitation light from a fourth excitation light source 31C by way of a first isolator 38A. The PD nonlinear optical medium 36 has a bidirectional input/output configuration. The fourth WDM coupler 37 inputs the excitation light from a fifth excitation light source 31D by way of a second isolator 38B. The sixteenth wavelength converter 17F also includes the third WDM coupler 35, the PD nonlinear optical medium 36, and the fourth WDM coupler 37. The third WDM coupler 35 inputs the excitation light from the fourth excitation light source 31C by way of the first isolator 38A. The fourth WDM coupler 37 inputs the excitation light from the fifth excitation light source 31D by way of the second isolator 38B.

The uplink-side fifteenth interleaver 18E1 connects to the uplink-side second optical transmission group 11B1 and outputs the uplink-side second multiplex light of the C band of the even-numbered channels from the uplink-side second optical transmission group 11B1 to the third WDM coupler 35 in the fifteenth wavelength converter 17E. Furthermore, the uplink-side fifteenth interleaver 18E1 connects to the downlink-side third optical reception group 16C2 and outputs the downlink-side third multiplex light of the C band of the odd-numbered channels from the third WDM coupler 35 in the fifteenth wavelength converter 17E to the downlink-side third optical reception group 16C2.

The uplink-side sixteenth interleaver 18F1 connects to the uplink-side seventeenth interleaver 18G1 and outputs to the uplink-side seventeenth interleaver 18G1 the uplink-side second multiplex light of the L band of the even-numbered channels inputted from the fourth WDM coupler 37 in the fifteenth wavelength converter 17E. The uplink-side sixteenth interleaver 18F1 connects to the downlink-side eighteenth interleaver 18H2 and outputs the downlink-side third multiplex light of the L band of the odd-numbered channels inputted from the downlink-side eighteenth interleaver 18H2 to the fourth WDM coupler 37 in the fifteenth wavelength converter 17E.

The uplink-side seventeenth interleaver 18G1 connects to the uplink-side sixteenth interleaver 18F1 and the downlink-side nineteenth interleaver 18J2. The uplink-side seventeenth interleaver 18G1 multiplexes the uplink-side second multiplex light of the L band of the even-numbered channels from the uplink-side sixteenth interleaver 18F1 with the uplink-side third multiplex light of the L band of the odd-numbered channels from the downlink-side nineteenth interleaver 18J2. The uplink-side seventeenth interleaver 18G1 outputs the multiplexed uplink-side second and third multiplex light of the L band to the uplink-side wavelength multiplexer 14A1.

The downlink-side eighteenth interleaver 18H2 connects to the downlink-side nineteenth interleaver 18J2 and the uplink-side sixteenth interleaver 18F1. The downlink-side eighteenth interleaver 18H2 outputs to the downlink-side nineteenth interleaver 18J2 the downlink-side second multiplex light of the L band of the even-numbered channels, of the downlink-side second and third multiplex light of the L band from the downlink-side wavelength demultiplexer 15A2. Furthermore, the downlink-side eighteenth interleaver 18H2 outputs to the uplink-side sixteenth interleaver 18F1 the downlink-side third multiplex light of the L band of the odd-numbered channels, of the downlink-side second and third multiplex light of the L band from the downlink-side wavelength demultiplexer 15A2.

The downlink-side nineteenth interleaver 18J2 connects to the third WDM coupler 35 in the sixteenth wavelength converter 17F and the uplink-side seventeenth interleaver 18G1. The downlink-side nineteenth interleaver 18J2 outputs to the third WDM coupler 35 in the sixteenth wavelength converter 17F the second multiplex light of the L band of the even-numbered channels from the downlink-side eighteenth interleaver 18H2. Furthermore, the downlink-side nineteenth interleaver 18J2 outputs the third multiplex light of the L band of the odd-numbered channels after the wavelength conversion from the sixteenth wavelength converter 17F to the uplink-side seventeenth interleaver 18G1.

The downlink-side twentieth interleaver 18K2 connects to the downlink-side second optical reception group 16B2 and the uplink-side third optical transmission group 11C1. The downlink-side twentieth interleaver 18K2 outputs the second multiplex light of the C band of the even-numbered channels after the wavelength conversion from the sixteenth wavelength converter 17F to the downlink-side second optical reception group 16B2. The downlink-side twentieth interleaver 18K2 outputs to the sixteenth wavelength converter 17F the third multiplex light of the C band of the odd-numbered channels from the uplink-side third optical transmission group 11C1.

The PD nonlinear optical medium 36 in the fifteenth wavelength converter 17E propagates the excitation light inputted from the third WDM coupler 35 and the uplink-side second multiplex light of the C band of the even-numbered channels. Using the excitation light, the PD nonlinear optical medium 36 wavelength-converts the uplink-side second multiplex light of the C band of the even-numbered channels into the uplink-side second multiplex light of the L band of the even-numbered channels and outputs to the fourth WDM coupler 37. The PD nonlinear optical medium 36 in the fifteenth wavelength converter 17E propagates the excitation light inputted from the fourth WDM coupler 37 and the downlink-side third multiplex light of the L band of the odd-numbered channels. The PD nonlinear optical medium 36 wavelength-converts the downlink-side third multiplex light of the L band of the odd-numbered channels into the downlink-side third multiplex light of the C band of the odd-numbered channels and outputs to the third WDM coupler 35. That is, the fifteenth wavelength converter 17E may achieve at once processing of the wavelength conversion of the uplink-side second multiplex light of the even-numbered channels and the wavelength conversion of the downlink-side third multiplex light of the odd-numbered channels without interference.

Figure 12A:
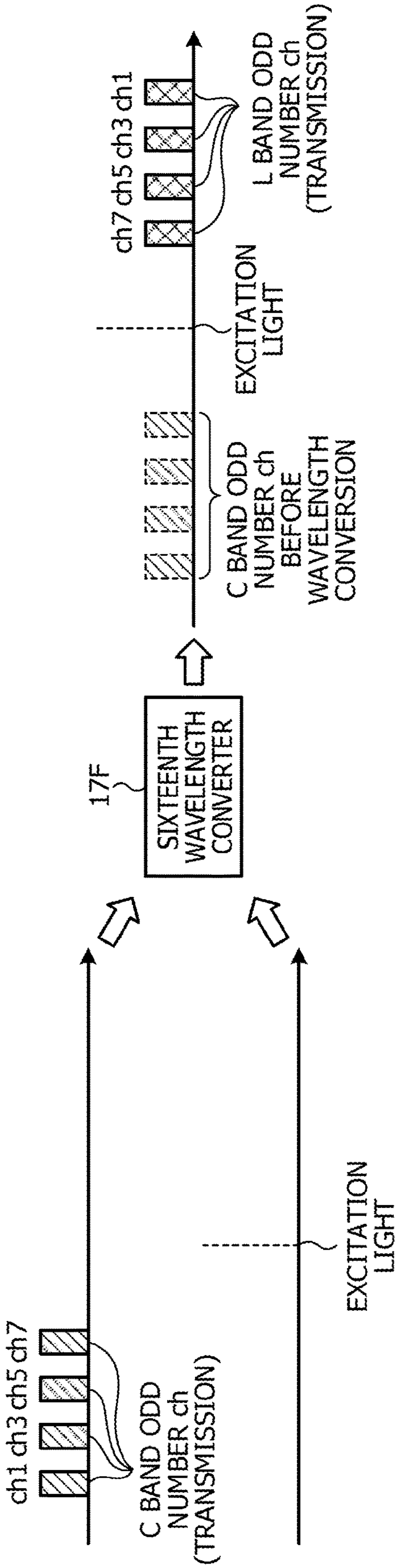
FIG. 12A is an explanatory diagram illustrating an example of a wavelength conversion operation of a sixteenth wavelength converter.
Figure 12B:
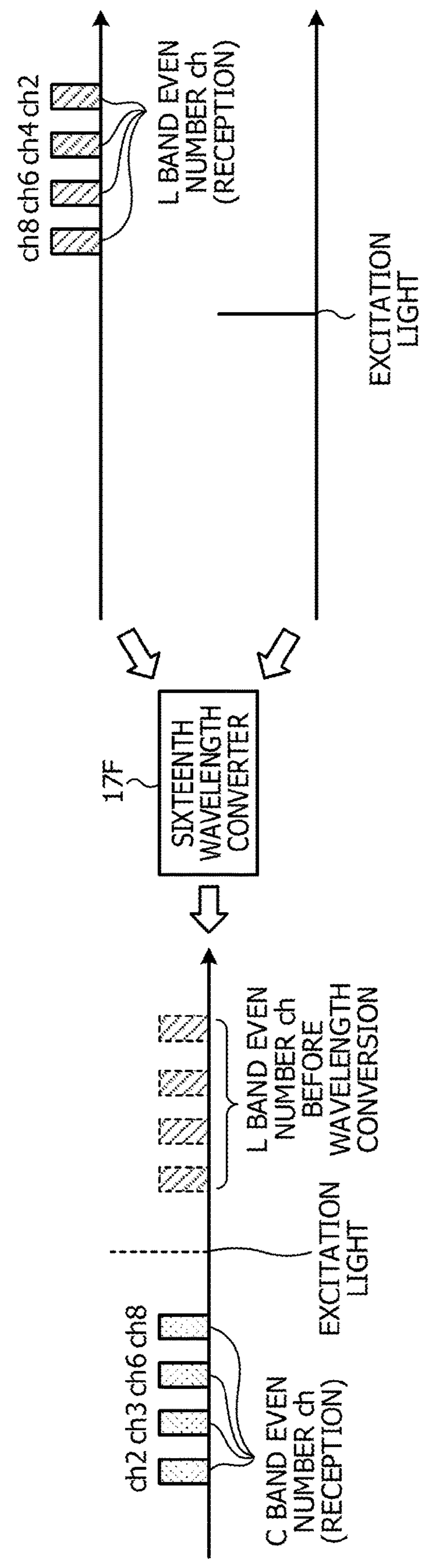
FIG. 12B is an explanatory diagram illustrating an example of the wavelength conversion operation of the sixteenth wavelength converter.

FIG. 12A is an explanatory diagram illustrating an example of the wavelength conversion operation of the sixteenth wavelength converter 17F. The PD nonlinear optical medium 36 in the sixteenth wavelength converter 17F illustrated in FIG. 12A propagates the excitation light inputted from the fourth WDM coupler 37 and the uplink-side third multiplex light of the C band of the odd-numbered channels. Using the excitation light, the PD nonlinear optical medium 36 wavelength-converts the uplink-side third multiplex light of the C band of the odd-numbered channels into the uplink-side third multiplex light of the L band of the odd-numbered channels and outputs to the third WDM coupler 35. The sixteenth wavelength converter 17F filters the uplink-side third multiplex light and the excitation light of the C band before being wavelength-converted from the uplink-side third multiplex light of the C band of the odd-numbered channels, the excitation light, and the uplink-side third multiplex light of the L band of the odd-numbered channels to output the uplink-side third multiplex light of the L band. FIG. 12B is an explanatory diagram illustrating an example of the wavelength conversion operation of the sixteenth wavelength converter 17F. The PD nonlinear optical medium 36 in the sixteenth wavelength converter 17F illustrated in FIG. 12B propagates the excitation light inputted from the third WDM coupler 35 and the downlink-side second multiplex light of the L band of the even-numbered channels. Using the excitation light, the PD nonlinear optical medium 36 wavelength-converts the downlink-side second multiplex light of the L band of the even-numbered channels into the downlink-side second multiplex light of the C band of the even-numbered channels and outputs to the fourth WDM coupler 37. The sixteenth wavelength converter 17F filters the downlink-side second multiplex light of the C band and the excitation light before being wavelength-converted from the downlink-side second multiplex light of the C band of the even-numbered channels, the excitation light, and the downlink-side second multiplex light of the L band of the even-numbered channels to output the downlink-side second multiplex light of the L band. That is, the sixteenth wavelength converter 17F may achieve at once the processing of the wavelength conversion of the uplink-side third multiplex light of the odd-numbered channels and the downlink-side second multiplex light of the even-numbered channels without interference.

The second transmission apparatus 2B includes the downlink-side third optical transmission group 11C2, the downlink-side second optical transmission group 11B2, and the downlink-side first optical transmission group 11A2. The second transmission apparatus 2B includes the uplink-side third optical reception group 16C1, the uplink-side second optical reception group 16B1, and the uplink-side first optical reception group 16A1. Furthermore, the second transmission apparatus 2B includes the downlink-side wavelength multiplexer 14A2 and the uplink-side wavelength demultiplexer 15A1. The second transmission apparatus 2B includes a seventeenth wavelength converter 17G, an eighteenth wavelength converter 17H, a downlink-side fifteenth interleaver 18E2, a downlink-side sixteenth interleaver 18F2, and a downlink-side seventeenth interleaver 18G2. The second transmission apparatus 2B includes an uplink-side eighteenth interleaver 18H1, an uplink-side nineteenth interleaver 1831, and an uplink-side twentieth interleaver 18K1.

The seventeenth wavelength converter 17G includes the third WDM coupler 35, the PD nonlinear optical medium 36, and the fourth WDM coupler 37. The third WDM coupler 35 inputs the excitation light from the fourth excitation light source 31C by way of the first isolator 38A. The fourth WDM coupler 37 inputs the excitation light from the fifth excitation light source 31D by way of the second isolator 38B. The eighteenth wavelength converter 17H also includes the third WDM coupler 35, the PD nonlinear optical medium 36, and the fourth WDM coupler 37. The third WDM coupler 35 inputs the excitation light from the fourth excitation light source 31C by way of the first isolator 38A. The fourth WDM coupler 37 inputs the excitation light from the fifth excitation light source 31D by way of the second isolator 38B.

The downlink-side fifteenth interleaver 18E2 connects to the downlink-side second optical transmission group 11B2 and outputs the uplink-side second multiplex light of the C band of the even-numbered channels from the downlink-side second optical transmission group 11B2 to the third WDM coupler 35 in the seventeenth wavelength converter 17G. Furthermore, the downlink-side fifteenth interleaver 18E2 connects to the uplink-side third optical reception group 16C1 and outputs the uplink-side third multiplex light of the C band of the odd-numbered channels from the third WDM coupler 35 in the seventeenth wavelength converter 17G to the uplink-side third optical reception group 16C1.

The downlink-side sixteenth interleaver 18F2 connects to the downlink-side seventeenth interleaver 18G2 and outputs to the downlink-side seventeenth interleaver 18G2 the downlink-side second multiplex light of the L band of the even-numbered channels inputted from the fourth WDM coupler 37 in the seventeenth wavelength converter 17G. The downlink-side sixteenth interleaver 18F2 connects to the uplink-side eighteenth interleaver 18H1 and outputs to the fourth WDM coupler 37 in the seventeenth wavelength converter 17G the uplink-side third multiplex light of the L band of the odd-numbered channels inputted from the uplink-side eighteenth interleaver 18H1.

The downlink-side seventeenth interleaver 18G2 connects to the downlink-side sixteenth interleaver 18F2 and the uplink-side nineteenth interleaver 18J1. The downlink-side seventeenth interleaver 18G2 multiplexes the downlink-side second multiplex light of the L band of the even-numbered channels from the downlink-side sixteenth interleaver 18F2 with the downlink-side third multiplex light of the L band of the odd-numbered channels from the uplink-side nineteenth interleaver 18J1. The downlink-side seventeenth interleaver 18G2 outputs the multiplexed downlink-side second and third multiplex light of the L band to the downlink-side wavelength multiplexer 14A2.

The uplink-side eighteenth interleaver 18H1 connects to the uplink-side nineteenth interleaver 18J1 and the downlink-side sixteenth interleaver 18F2. The uplink-side eighteenth interleaver 18H1 outputs to the uplink-side nineteenth interleaver 18J1 the uplink-side second multiplex light of the L band of the even-numbered channels, of the uplink-side second and third multiplex light of the L band from the uplink-side wavelength demultiplexer 15A1. Furthermore, the uplink-side eighteenth interleaver 18H1 outputs to the downlink-side sixteenth interleaver 18F2 the uplink-side third multiplexed light of the L band of the odd-numbered channels, of the uplink-side second and third multiplex light of the L band from the uplink-side wavelength demultiplexer 15A1.

The uplink-side nineteenth interleaver 18J1 connects to the third WDM coupler 35 in the eighteenth wavelength converter 17H and the downlink-side seventeenth interleaver 18G2. The uplink-side nineteenth interleaver 18J1 outputs to the third WDM coupler 35 in the eighteenth wavelength converter 17H the second multiplex light of the L band of the even-numbered channels from the uplink-side eighteenth interleaver 18H1. Furthermore, the uplink-side nineteenth interleaver 18J1 outputs to the downlink-side seventeenth interleaver 18G2 the third multiplex light of the L band of the odd-numbered channels after the wavelength conversion from the eighteenth wavelength converter 17H.

The uplink-side twentieth interleaver 18K1 connects to the uplink-side second optical reception group 16B1 and the downlink-side third optical transmission group 11C2. The uplink-side twentieth interleaver 18K1 outputs the second multiplex light of the C band of the even-numbered channels after the wavelength conversion from the eighteenth wavelength converter 17H to the uplink-side second optical reception group 16B1. The uplink-side twentieth interleaver 18K1 outputs the third multiplex light of the C band of the odd-numbered channels from the downlink-side third optical transmission group 11C2 to the eighteenth wavelength converter 17H.

The PD nonlinear optical medium 36 in the seventeenth wavelength converter 17G propagates the excitation light inputted from the third WDM coupler 35 and the downlink-side second multiplex light of the C band of the even-numbered channels. Using the excitation light, the PD nonlinear optical medium 36 wavelength-converts the downlink-side second multiplex light of the C band of the even-numbered channels into the downlink-side second multiplex light of the L band of the even-numbered channels and outputs to the fourth WDM coupler 37. The PD nonlinear optical medium 36 in the seventeenth wavelength converter 17G propagates the excitation light inputted from the fourth WDM coupler 37 and the uplink-side third multiplex light of the L band of the odd-numbered channels. Using the excitation light, the PD nonlinear optical medium 36 wavelength-converts the uplink-side third multiplex light of the L band of the odd-numbered channels into the uplink-side third multiplex light of the C band of the odd-numbered channels and outputs to the third WDM coupler 35. That is, the seventeenth wavelength converter 17G may achieve at once the processing of the wavelength conversion of the uplink-side third multiplex light of the odd-numbered channels and the wavelength conversion of the downlink-side second multiplex light of the even-numbered channels without interference.

The PD nonlinear optical medium 36 in the eighteenth wavelength converter 17H propagates the excitation light inputted from the fourth WDM coupler 37 and the downlink-side third multiplex light of the C band of the odd-numbered channels. Using the excitation light, the PD nonlinear optical medium 36 wavelength-converts the downlink-side third multiplex light of the C band of the odd-numbered channels into the downlink-side third multiplex light of the L band of the odd-numbered channels and outputs to the third WDM coupler 35. The PD nonlinear optical medium 36 in the eighteenth wavelength converter 17H propagates the excitation light inputted from the third WDM coupler 35 and the uplink-side second multiplex light of the L band of the even-numbered channels. Using the excitation light, the PD nonlinear optical medium 36 wavelength-converts the uplink-side second multiplex light of the L band of the even-numbered channels into the uplink-side second multiplex light of the C band of the even-numbered channels and outputs to the fourth WDM coupler 37. That is, the eighteenth wavelength converter 17H may achieve at once the processing of the wavelength conversion of the downlink-side third multiplex light of the odd-numbered channels and the wavelength conversion of the uplink-side second multiplex light of the even-numbered channels without interference.

In the example 8, the input optical power of the WDM signal that is inputted to the wavelength converter in an identical direction is made smaller. That is, the number of wavelengths to be inputted to the identical direction, which is converted by one wavelength converter, is decreased to reduce the nonlinear optical distortion. As a result, it is possible to expand the dynamic range while reducing the deterioration of the signal quality.

In the sixteenth wavelength converter 17F of the example 8, the uplink-side third multiplex light of the C band of the odd-numbered channels is wavelength-converted into the uplink-side third multiplex light of the L band, by means of the PD nonlinear optical medium 36 of the bidirectional input and output. Furthermore, in the sixteenth wavelength converter 17F, the downlink-side second multiplex light of the L band of the even-numbered channels is wavelength-converted into the downlink-side second multiplex light of the C band by means of the same PD nonlinear optical medium 36. As a result, it is possible to reduce the nonlinear optical distortion generated between the adjacent wavelengths by diverting the PD nonlinear optical medium 36 in the uplink signal and the downlink signal and assigning the even-numbered channel to the downlink signal and the odd-numbered channel to the uplink signal. In addition, the PD nonlinear optical medium 36 of the bidirectional input and output is used, thus making it easier to remove extra components.

Using the PD nonlinear optical medium 36 of the bidirectional input and output, the fifteenth wavelength converter 17E wavelength-converts the uplink-side second multiplex light of the C band of the even-numbered channels into the uplink-side second multiplex light of the L band. Furthermore, using the same PD nonlinear optical medium 36, the fifteenth wavelength converter 17E wavelength-converts the downlink-side third multiplexed light of the L band of the odd-numbered channels into the downlink-side third multiplex light of the C band. As a result, it is possible to reduce the nonlinear optical distortion generated between the adjacent wavelengths by diverting the PD nonlinear optical medium 36 in the uplink signal and the downlink signal and assigning the odd-numbered channel to the downlink signal and even-numbered channel to the uplink signal.

Using the PD nonlinear optical medium 36 of the bidirectional input and output, the seventeenth wavelength converter 17G wavelength-converts the uplink-side third multiplex light of the L band of the odd-numbered channels into the uplink-side third multiplex light of the C band. Furthermore, using the same PD nonlinear optical medium 36, the seventeenth wavelength converter 17G wavelength-converts the downlink-side second multiplex light of the C band of the even-numbered channels into the downlink-side second multiplex light of the L band. As a result, it is possible to reduce the nonlinear optical distortion generated between the adjacent wavelengths by diverting the PD nonlinear optical medium 36 in the uplink signal and the downlink signal and assigning the even-numbered channel to the downlink signal and the odd-numbered channel to the uplink signal.

Using the PD nonlinear optical medium 36 of the bidirectional input and output, the eighteenth wavelength converter 17H wavelength-converts the uplink-side second multiplex light of the L band of the even-numbered channels into the uplink-side second multiplexed light of the C band. Using the same PD nonlinear optical medium 36, the eighteenth wavelength converter 17H wavelength-converts the downlink-side third multiplex light of the C band of the odd-numbered channels into the downlink-side third multiplex light of the L band. As a result, it is possible to reduce the nonlinear optical distortion generated between the adjacent wavelengths by diverting the PD nonlinear optical medium 36 in the uplink signal and the downlink signal and assigning the odd-numbered channel to the downlink signal and the even-numbered channel to the uplink signal.

In the transmission system 1D of the example 8, the fourth excitation light source 31C is disposed for every third WDM coupler 35 in the wavelength converter 17 and the fifth excitation light source 31D for every fourth WDM coupler 37. However, the excitation light source is not limited to this, and a single excitation light source may be used in the third WDM coupler 35 and the fourth WDM coupler 37 in the wavelength converter 17, and an embodiment in that case is described below as an example 9.

Example 9

Figure 13A:
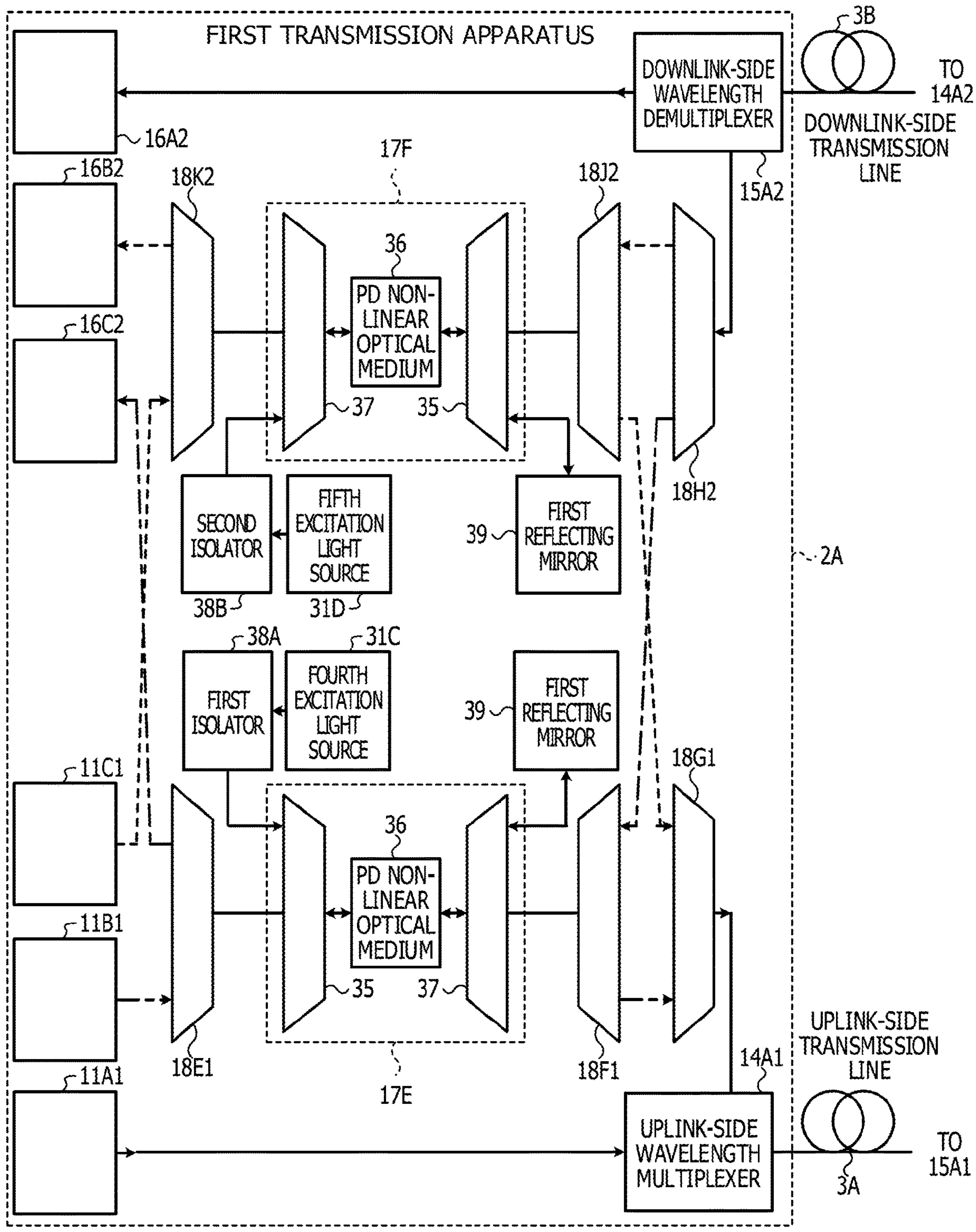
FIGS. 13A and 13B are explanatory diagrams illustrating an example of a transmission system of an example 9.
Figure 13B:
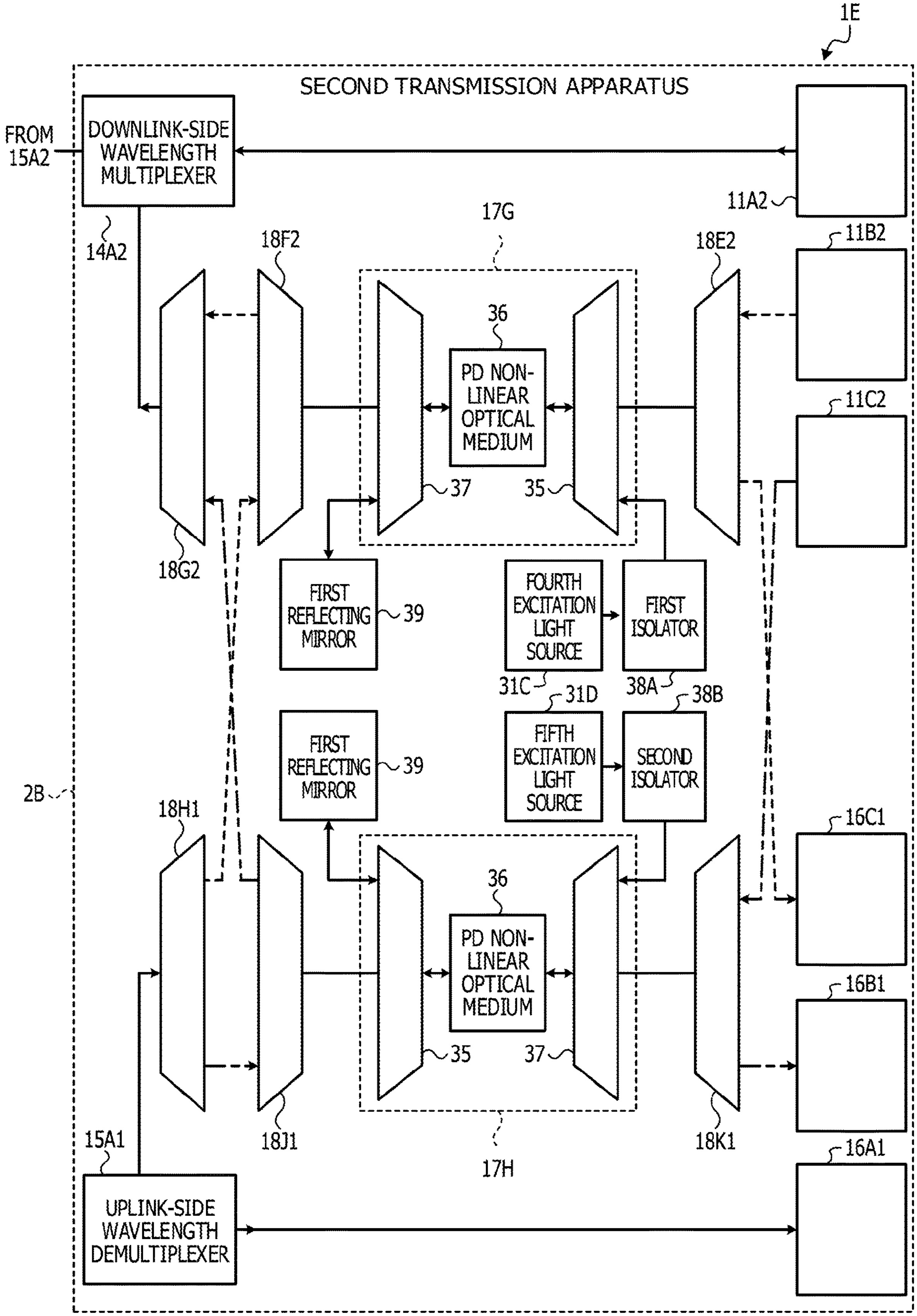

FIG. 13 is an explanatory diagram illustrating an example of the transmission system 1E of the example 9. The identical symbols are assigned to a configuration identical to the transmission system 1D in the example 8, and thus description of the overlapping configurations and operations is omitted.

The fifteenth wavelength converter 17E includes the first isolator 38A, the fourth excitation light source 31C, and a first reflecting mirror 39, in addition to the third WDM coupler 35, the PD nonlinear optical medium 36, and the fourth WDM coupler 37. The third WDM coupler 35 in the fifteenth wavelength converter 17E connects to the first isolator 38A and inputs the excitation light from the fourth excitation light source 31C by way of the first isolator 38A.

The third WDM coupler 35 in the fifteenth wavelength converter 17E outputs to the PD nonlinear optical medium 36 the excitation light and the uplink-side second multiplex light of the C band of the even-numbered channels from the uplink-side fifteenth interleaver 18E1. Using the excitation light, the PD nonlinear optical medium 36 wavelength-converts the uplink-side second multiplexed light of the C band of the even-numbered channels into the uplink-side second multiplex light of the L band of the even-numbered channels and outputs to the fourth WDM coupler 37.

Furthermore, the fourth WDM coupler 37 in the fifteenth wavelength converter 17E outputs to the first reflecting mirror 39 remaining excitation light that passes through the PD nonlinear optical medium 36. Then, the fourth WDM coupler 37 outputs to the PD nonlinear optical medium 36 the remaining excitation light that reflects off the first reflecting mirror 39 and the downlink-side third multiplex light of the L band of the odd-numbered channels inputted from the uplink-side sixteenth interleaver 18F1. Then, using the remaining excitation light, the PD nonlinear optical medium 36 wavelength-converts the downlink-side third multiplex light of the L band of the odd-numbered channels into the downlink-side third multiplex light of the C band of the odd-numbered channels and outputs to the third WDM coupler 35. The first isolator 38A blocks back-flow of the remaining excitation light from the third WDM coupler 35 to the fourth excitation light source 31C by way of the first reflecting mirror 39.

The sixteenth wavelength converter 17F includes the second isolator 38B, the fifth excitation light source 31D, and the first reflecting mirror 39, in addition to the third WDM coupler 35, the PD nonlinear optical medium 36, and the fourth WDM coupler 37.

The fourth WDM coupler 37 in the sixteenth wavelength converter 17F connects to the second isolator 38B and inputs the excitation light from the fifth excitation light source 31D by way of the second isolator 38B. The fourth WDM coupler 37 in the sixteenth wavelength converter 17F outputs to the PD nonlinear optical medium 36 the excitation light from the fifth excitation light source 31D and the uplink-side third multiplex light of the C band of the odd-numbered channels from the downlink-side twentieth interleaver 18K2. Using the excitation light, the PD nonlinear optical medium 36 wavelength-converts the uplink-side third multiplex light of the C band of the odd-numbered channels into the uplink-side third multiplex light of the L band of the odd-numbered channels and outputs to the third WDM coupler 35.

Furthermore, the third WDM coupler 35 in the sixteenth wavelength converter 17F outputs to the first reflecting mirror 39 the remaining excitation light that passes through the PD nonlinear optical medium 36. The third WDM coupler 35 outputs to the PD nonlinear optical medium 36 the remaining excitation light reflected of the first reflecting mirror 39 and the downlink-side second multiplex light of the L band of the even-numbered channels inputted from the downlink-side nineteenth interleaver 18J2. Then, using the remaining excitation light, the PD nonlinear optical medium 36 wavelength-converts the downlink-side second multiplex light of the L band of the even-numbered channels into the downlink-side second multiplex light of the C band of the even-numbered channels and outputs to the fourth WDM coupler 37. The second isolator 38B blocks the back-flow of the remaining excitation light from the fourth WDM coupler 37 to the fifth excitation light source 31D by way of the first reflecting mirror 39.

the seventeenth wavelength converter 17G includes the first isolator 38A, the fourth excitation light source 31C, and the first reflecting mirror 39, in addition to the third WDM coupler 35, the PD nonlinear optical medium 36, and the fourth WDM coupler 37. The third WDM coupler 35 in the seventeenth wavelength converter 17G connects to the first isolator 38A and inputs the excitation light from the fourth excitation light source 31C by way of the first isolator 38A. The third WDM coupler 35 in the seventeenth wavelength converter 17G outputs to the PD nonlinear optical medium 36 the excitation light from the fourth excitation light source 31C and the downlink-side second multiplex light of the C band of the even-numbered channels from the downlink-side fifteenth interleaver 18E2. Using the excitation light, the PD nonlinear optical medium 36 wavelength-converts the downlink-side second multiplex light of the C band of the even-numbered channels into the downlink-side second multiplex light of the L band of the even-numbered channels and outputs to the fourth WDM coupler 37.

Furthermore, the fourth WDM coupler 37 in the seventeenth wavelength converter 17G outputs to the first reflecting mirror 39 the remaining excitation light that passes through the PD nonlinear optical medium 36. The fourth WDM coupler 37 outputs to the PD nonlinear optical medium 36 the remaining excitation light reflected off the first reflecting mirror 39 and the uplink-side third multiplex light of the L band of the odd-numbered channels inputted from the downlink-side sixteenth interleaver 18F2. Then, using the remaining excitation light, the PD nonlinear optical medium 36 wavelength-converts the uplink-side third multiplex light of the L band of the odd-numbered channels into the uplink-side third multiplex light of the C band of the odd-numbered channels and outputs to the third WDM coupler 35. The first isolator 38A blocks the back-flow of the remaining excitation light from the third WDM coupler 35 to the fourth excitation light source 31C by way of the first reflecting mirror 39.

The eighteenth wavelength converter 17H includes the second isolator 38B, the fifth excitation light source 31D, and the first reflecting mirror 39, in addition to the third WDM coupler 35, the PD nonlinear optical medium 36, and the fourth WDM coupler 37. The fourth WDM coupler 37 in the eighteenth wavelength converter 17H connects to the second isolator 38B and inputs the excitation light from the fifth excitation light source 31D by way of the second isolator 38B. The fourth WDM coupler 37 in the eighteenth wavelength converter 17H outputs to the PD nonlinear optical medium 36 the excitation light from the fifth excitation light source 31D and the downlink-side third multiplex light of the C band of the odd-numbered channels from the uplink-side twentieth interleaver 18K1. Using the excitation light, the PD nonlinear optical medium 36 wavelength-converts the downlink-side third multiplexed light of the C band of the odd-numbered channels into the downlink-side third multiplex light of the L band of the odd-numbered channels and outputs to the third WDM coupler 35.

Furthermore, the third WDM coupler 35 in the eighteenth wavelength converter 17H outputs to the first reflecting mirror 39 the remaining excitation light that passes through the PD nonlinear optical medium 36. The third WDM coupler 35 outputs to the PD nonlinear optical medium 36 the remaining excitation light reflected off the first reflecting mirror 39 and the uplink-side third multiplex light of the L band of the even-numbered channels inputted from the uplink-side nineteenth interleaver 18J1. Then, using the remaining excitation light, the PD nonlinear optical medium 36 wavelength-converts the uplink-side second multiplex light of the L band of the even-numbered channels into the uplink-side second multiplex light of the C band of the even-numbered channels and outputs to the fourth WDM coupler 37. The second isolator 38B blocks the back-flow of the remaining excitation light from the fourth WDM coupler 37 to the fifth excitation light source 31D by way of the first reflecting mirror 39.

Using the excitation light of the fourth excitation light source 31C, the fifteenth wavelength converter 17E of the example 9 wavelength-converts the uplink-side second multiplex light of the C band of the even-numbered channels into the uplink-side second multiplex light of the L band of the even-numbered channels. Furthermore, using the remaining excitation light from the first reflecting mirror 39, the fifteenth wavelength converter 17E wavelength-converts the downlink-side third multiplex light of the L band of the odd-numbered channels into the downlink-side third multiplex light of the C band of the odd-numbered channels. As a result, the fifteenth wavelength converter 17E may wavelength-convert the uplink-side second multiplex light and the downlink-side third multiplex light using the single fourth excitation light source 31C, and thus may reduce the number of the excitation light sources, as compared to the example 8.

The sixteenth wavelength converter 17F wavelength-converts the uplink-side third multiplex light of the C band of the odd-numbered channels into the uplink-side third multiplex light of the L band of the odd-numbered channels, using the excitation light of the fifth excitation light source 31D. Furthermore, the sixteenth wavelength converter 17F wavelength-converts the downlink-side second multiplex light of the L band of the even-numbered channels into the downlink-side second multiplex light of the C band of the even-numbered channels, using the remaining excitation light from the first reflecting mirror 39. As a result, the sixteenth wavelength converter 17F may wavelength-convert the uplink-side third multiplex light and the downlink-side second multiplex light using the single fifth excitation light source 31D, and thus may reduce the number of the excitation light sources, as compared to the example 8.

Using the excitation light of the fourth excitation light source 31C, the seventeenth wavelength converter 17G wavelength-converts the downlink-side second multiplex light of the C band of the even-numbered channels into the downlink-side second multiplex light of the L band of the even-numbered channels, using the excitation light of the fourth excitation light source. Furthermore, the seventeenth wavelength converter 17G wavelength-converts the uplink-side third multiplex light of the L band of the odd-numbered channels into the uplink-side third multiplex light of the C band of the odd-numbered channels, using the remaining excitation light from the first reflecting mirror 39. As a result, the seventeenth wavelength converter 17G may wavelength-convert the uplink-side third multiplex light and the downlink-side second multiplex light, using the single fourth excitation light source 31C, and thus may reduce the number of the excitation light sources, as compared to the example 8.

The eighteenth wavelength converter 17H wavelength-converts the downlink-side third wavelength light of the C band of the odd-numbered channels into the downlink-side third multiplex light of the L band of the odd-numbered channels, using the excitation light of the fifth excitation light source 31D. Furthermore, the eighteenth wavelength converter 17H wavelength-converts the uplink-side second multiplex light of the L band of the even-numbered channels into the uplink-side second multiplex light of the C band of the even-numbered channels, using the remaining excitation light from the first reflecting mirror 39. As a result, using one fifth excitation light source 31D, the eighteenth wavelength converter 17H may wavelength-convert the uplink-side second multiplex light and the downlink-side third multiplex light, and thus may reduce the number of the excitation light sources, as compared to the example 8.

The wavelength converter of the foregoing example 9 inputs the excitation light of the fourth excitation light source 31C to the third WDM coupler 35, and inputs the remaining excitation light of the excitation light reflected off the first reflecting mirror 39 to the fourth WDM coupler 37 by way of the PD nonlinear optical medium 36 and the fourth WDM coupler 37. However, the wavelength converter is not limited to this, an embodiment of which is described below as an example 10.

Example 10

Figure 14A:
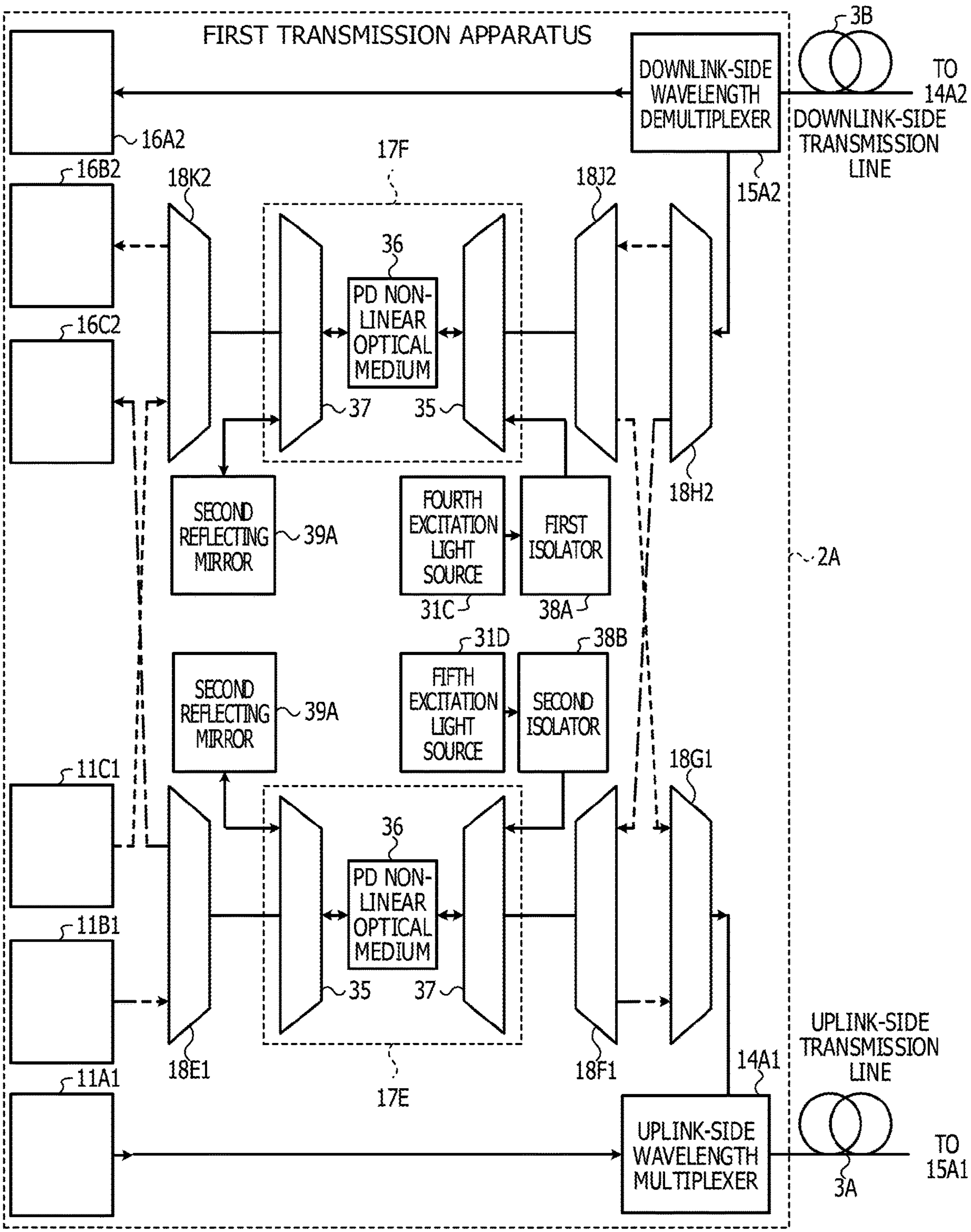
FIGS. 14A and 14B are explanatory diagrams illustrating an example of a transmission system of an example 10.
Figure 14B:
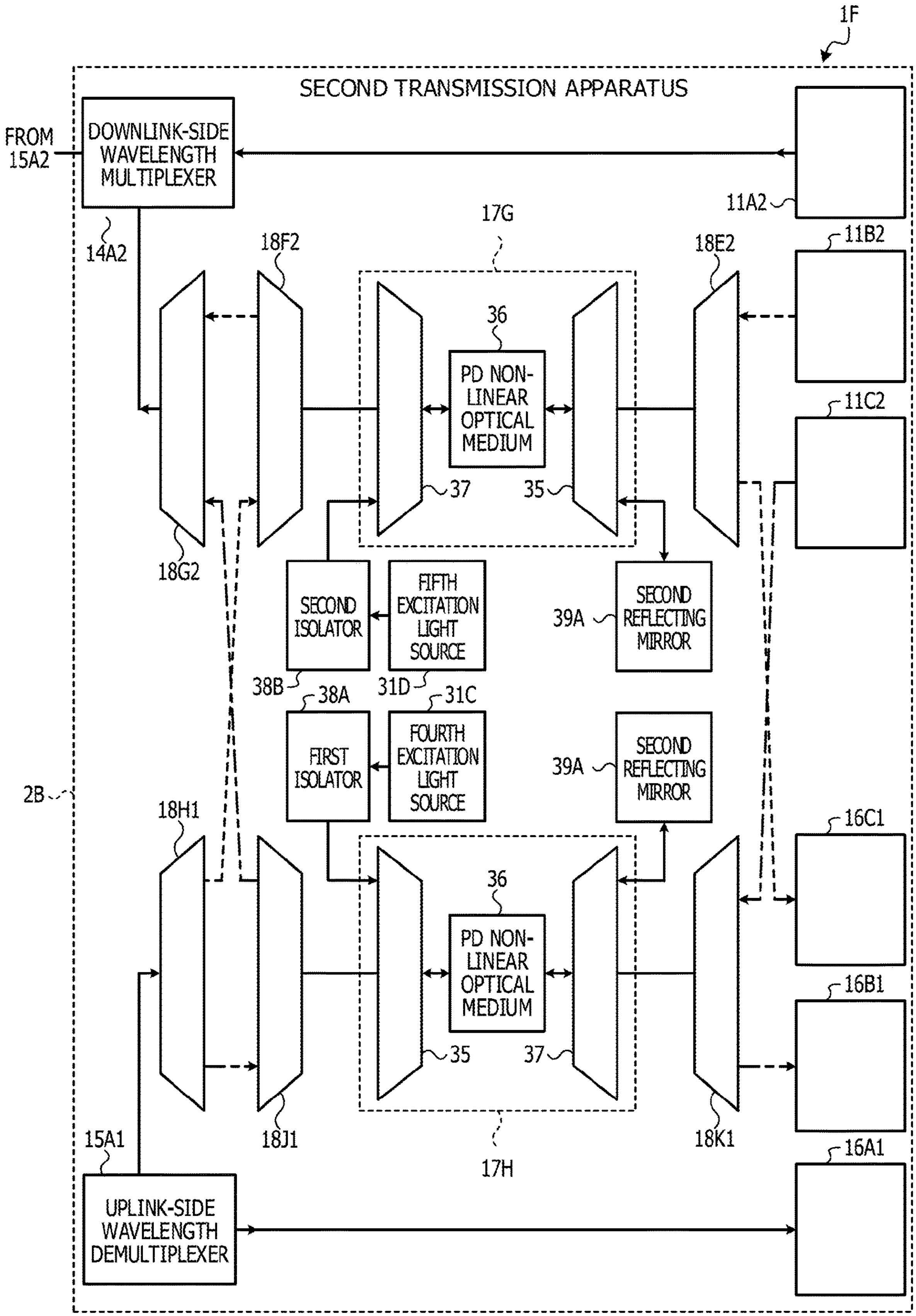

FIG. 14 is an explanatory diagram illustrating an example of the transmission system 1F of the example 10. The identical symbols are assigned to a configuration identical to the transmission system 1D in the example 8, and thus description of the overlapping configurations and operations is omitted.

The fifteenth wavelength converter 17E includes the second isolator 38B, the fifth excitation light source 31D, and a second reflecting mirror 39A, in addition to the third WDM coupler 35, the PD nonlinear optical medium 36, and the fourth WDM coupler 37. The fourth WDM coupler 37 in the fifteenth wavelength converter 17E connects to the second isolator 38B and inputs the excitation light from the fifth excitation light source 31D by way of the second isolator 38B. The fourth WDM coupler 37 in the fifteenth wavelength converter 17E outputs to the PD nonlinear optical medium 36 the excitation light and the downlink-side third multiplex light of the L band of the odd-numbered channels from the uplink-side sixteenth interleaver 18F1. Using the excitation light, the PD nonlinear optical medium 36 wavelength-converts the downlink-side third multiplex light of the L band of the odd-numbered channels into the downlink-side third multiplex light of the C band of the odd-numbered channels and outputs to the third WDM coupler 35.

Furthermore, the third WDM coupler 35 in the fifteenth wavelength converter 17E outputs to the second reflecting mirror 39A the remaining excitation light that passes through the PD nonlinear optical medium 36. The third WDM coupler 35 outputs to the PD nonlinear optical medium 36 the remaining excitation light reflected off the second reflecting mirror 39A and the uplink-side second multiplex light of the C band of the even-numbered channels inputted from the uplink-side fifteenth interleaver 18E1. Then, using the remaining excitation light, the PD nonlinear optical medium 36 wavelength-converts the uplink-side second multiplex light of the C band of the even-numbered channels into the uplink-side second multiplex light of the L band of the even-numbered channels and outputs to the fourth WDM coupler 37. The second isolator 38B blocks the back-flow of the remaining excitation light from the fourth WDM coupler 37 to the fifth excitation light source 31D by way of the second reflecting mirror 39A.

The sixteenth wavelength converter 17F includes the first isolator 38A, the fourth excitation light source 31C, and the second reflecting mirror 39A, in addition to the third WDM coupler 35, the PD nonlinear optical medium 36, and the fourth WDM coupler 37. The third WDM coupler 35 in the sixteenth wavelength converter 17F connects to the first isolator 38A and inputs the excitation light from the fourth excitation light source 31C by way of the first isolator 38A. The third WDM coupler 35 in the sixteenth wavelength converter 17F outputs to the PD nonlinear optical medium 36 the excitation light and the downlink-side second multiplex light of the L band of the even-numbered channels from the downlink-side nineteenth interleaver 18J2. Using the excitation light, the PD nonlinear optical medium 36 wavelength-converts the downlink-side third multiplex light of the L band of the even-numbered channels into the downlink-side second multiplex light of the C band of the even-numbered channels and outputs to the fourth WDM coupler 37.

Furthermore, the fourth WDM coupler 37 in the sixteenth wavelength converter 17F outputs to the second reflecting mirror 39A the remaining excitation light that passes through the PD nonlinear optical medium 36. The fourth WDM coupler 37 outputs to the PD nonlinear optical medium 36 the remaining excitation light reflected off the second reflecting mirror 39A and the uplink-side third multiplex light of the C band of the odd-numbered channels inputted from the downlink-side twentieth interleaver 18K2. Then, using the remaining excitation light, the PD nonlinear optical medium 36 wavelength-converts the uplink-side third multiplex light of the C band of the odd-numbered channels into the uplink-side third multiplex light of the L band of the odd-numbered channels and outputs to the third WDM coupler 35. The first isolator 38A blocks the back-flow of the remaining excitation light from the third WDM coupler 35 to the fourth excitation light source 31C by way of the second reflecting mirror 39A.

The seventeenth wavelength converter 17G includes the second isolator 38B, the fifth excitation light source 31D, and the second reflecting mirror 39A, in addition to the third WDM coupler 35, the PD nonlinear optical medium 36, and the fourth WDM coupler 37. The fourth WDM coupler 37 n the seventeenth wavelength converter 17G connects to the second isolator 38B and inputs the excitation light from the fifth excitation light source 31D by way of the second isolator 38B. The fourth WDM coupler 37 in the seventeenth wavelength converter 17G outputs to the PD nonlinear optical medium 36 the excitation light and the uplink-side third multiplex light of the L band of the odd-numbered channels from the uplink-side eighteenth interleaver 18H1. Using the excitation light, the PD nonlinear optical medium 36 wavelength-converts the uplink-side third multiplex light of the L band of the odd-numbered channels into the uplink-side second multiplex light of the C band of the odd-numbered channels and outputs to the third WDM coupler 35.

Furthermore, the third WDM coupler 35 in the seventeenth wavelength converter 17G outputs to the second reflecting mirror 39A the remaining excitation light that passes through the PD nonlinear optical medium 36. The third WDM coupler 35 outputs to the PD nonlinear optical medium 36 the remaining excitation light reflected off the second reflecting mirror 39A and the downlink-side second multiplex light of the C band of the even-numbered channels inputted from the downlink-side fifteenth interleaver 18E2. Then, using the remaining excitation light, the PD nonlinear optical medium 36 wavelength-converts the downlink-side second multiplex light of the C band of the even-numbered channels into the downlink-side second multiplex light of the L band of the even-numbered channels and outputs to the fourth WDM coupler 37. The second isolator 38B blocks the back-flow of the remaining excitation light from the fourth WDM coupler 37 to the fifth excitation light source 31D by way of the second reflecting mirror 39A.

The eighteenth wavelength converter 17H includes the first isolator 38A, the fourth excitation light source 31C, and the second reflecting mirror 39A, in addition to the third WDM coupler 35, the PD nonlinear optical medium 36, and the fourth WDM coupler 37. The third WDM coupler 35 in the eighteenth wavelength converter 17H connects to the first isolator 38A and inputs the excitation light from the fourth excitation light source 31C by way of the first isolator 38A. The third WDM coupler 35 in the eighteenth wavelength converter 17H outputs to the PD nonlinear optical medium 36 the excitation light and the uplink-side second multiplex light of the L band of the even-numbered channels from the uplink-side nineteenth interleaver 18J1. Using the excitation light, the PD nonlinear optical medium 36 wavelength-converts the uplink-side second multiplex light of the L band of the even-numbered channels into the uplink-side second multiplex light of the C band of the even-numbered channels and outputs to the fourth WDM coupler 37.

Furthermore, the fourth WDM coupler 37 in the eighteenth wavelength converter 17H outputs to the second reflecting mirror 39A the remaining excitation light that passes through the PD nonlinear optical medium 36. The fourth WDM coupler 37 outputs to the PD nonlinear optical medium 36 the remaining excitation light reflected off the second reflecting mirror 39A and the downlink-side third multiplex light of the C band of the odd-numbered channels inputted from the uplink-side twentieth interleaver 18K1. Then, using the remaining excitation light, the PD nonlinear optical medium 36 wavelength-converts the downlink-side third multiplex light of the C band of the odd-numbered channels into the downlink-side third multiplex light of the L band of the odd-numbered channels and outputs to the third WDM coupler 35. The first isolator 38A blocks the back-flow of the remaining excitation light from the third WDM coupler 35 to the fourth excitation light source 31C by way of the second reflecting mirror 39A.

The fifteenth wavelength converter 17E of the example 10 wavelength-converts the downlink-side third multiplex light of the L band of the odd-numbered channels into the downlink-side third multiplex light of the C band of the odd-numbered channels, using the excitation light of the fifth excitation light source 31D. Furthermore, the fifteenth wavelength converter 17E wavelength-converts the uplink-side second multiplex light of the C band of the even-numbered channels into the uplink-side second multiplex light of the L band of the even-numbered channels, using the remaining excitation light from the second reflecting mirror 39A. As a result, using the single fifth excitation light source 31D, the fifteenth wavelength converter 17E may wavelength-convert the uplink-side second multiplex light and the downlink-side third multiplex light, and thus may reduce the number of the excitation light sources, as compared to the example 8.

The sixteenth wavelength converter 17F wavelength-converts the downlink-side second multiplex light of the L band of the even-numbered channels into the downlink-side second multiplex light of the C band of the even-numbered channels, using the excitation light of the fourth excitation light source 31C. Furthermore, the sixteenth wavelength converter 17F wavelength-converts the uplink-side third multiplex light of the C band of the odd-numbered channels into the uplink-side third multiplex light of the L band of the odd-numbered channels, using the remaining excitation light from the second reflecting mirror 39A. As a result, using the single fourth excitation light source 31C, the sixteenth wavelength converter 17F may wavelength-convert the uplink-side third multiplex light and the downlink-side second multiplex light, and thus may reduce the number of the excitation light sources, as compared to the example 8.

The seventeenth wavelength converter 17G wavelength-converts the uplink-side third multiplex light of the L band of the odd-numbered channels into the uplink-side third multiplex light of the C band of the odd-numbered channels, using the excitation light of the fifth excitation light source 31D. Furthermore, the seventeenth wavelength converter 17G wavelength-converts the downlink-side second multiplex light of the C band of the even-numbered channels into the downlink-side second multiplex light of the L band of the even-numbered channels, using the remaining excitation light from the second reflecting mirror 39A. As a result, using the single fifth excitation light source 31D, the seventeenth wavelength converter 17G may wavelength-convert the uplink-side third multiplex light and the downlink-side second multiplex light, and thus may reduce the number of the excitation light sources, as compared to the example 8.

The eighteenth wavelength converter 17H wavelength-converts the uplink-side second multiplex light of the L band of the even-numbered channels into the uplink-side second multiplex light of the C band of the even-numbered channels, using the excitation light of the fourth excitation light source 31C. Furthermore, the eighteenth wavelength converter 17H wavelength-converts the downlink-side third multiplex light of the C band of the odd-numbered channels into the downlink-side third multiplex light of the L band of the odd-numbered channels, using the remaining excitation light from the second reflecting mirror 39A. As a result, using the single fourth excitation light source 31C, the eighteenth wavelength converter 17H may wavelength-convert the uplink-side second multiplex light and the downlink-side third multiplex light, and thus may reduce the number of the excitation light sources, as compared to the example 8.

The wavelength converter of the example 10 inputs the excitation light from the fifth excitation light source 31D to the fourth WDM coupler 37 and outputs to the third WDM coupler 35 the remaining excitation light of the excitation light reflected off the second reflecting mirror 39A by way of the PD nonlinear optical medium 36 and the third WDM coupler 35. However, the wavelength converter is not limited to these. For example, the excitation light sources of the two wavelength converters 17E and 17F in the first transmission apparatus 2A may be combined into a single wavelength converter, and an embodiment in that case is described below as an example 11.

Example 11

Figure 15A:
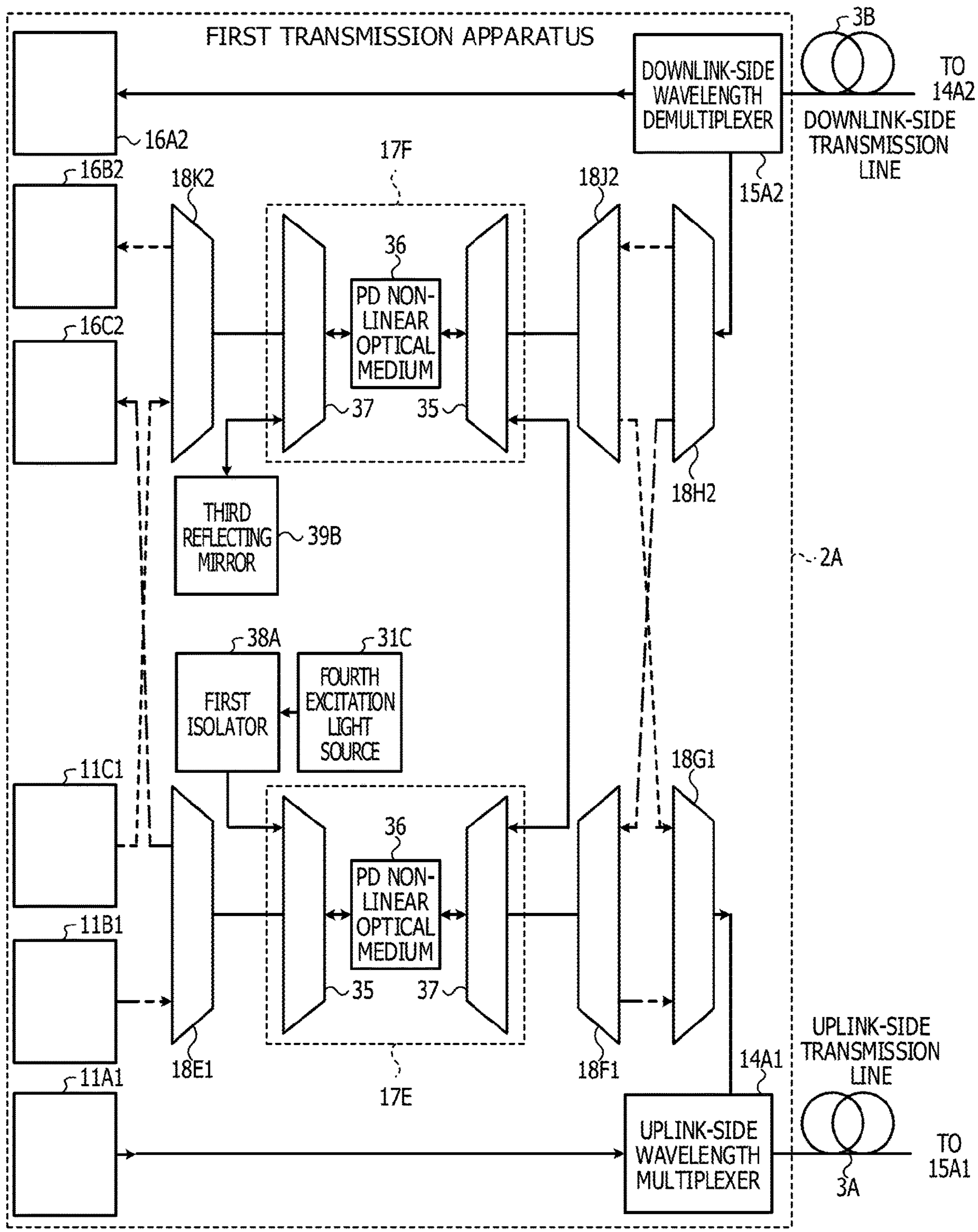
FIGS. 15A and 15B are explanatory diagrams illustrating an example of a transmission system of an example 11.
Figure 15B:
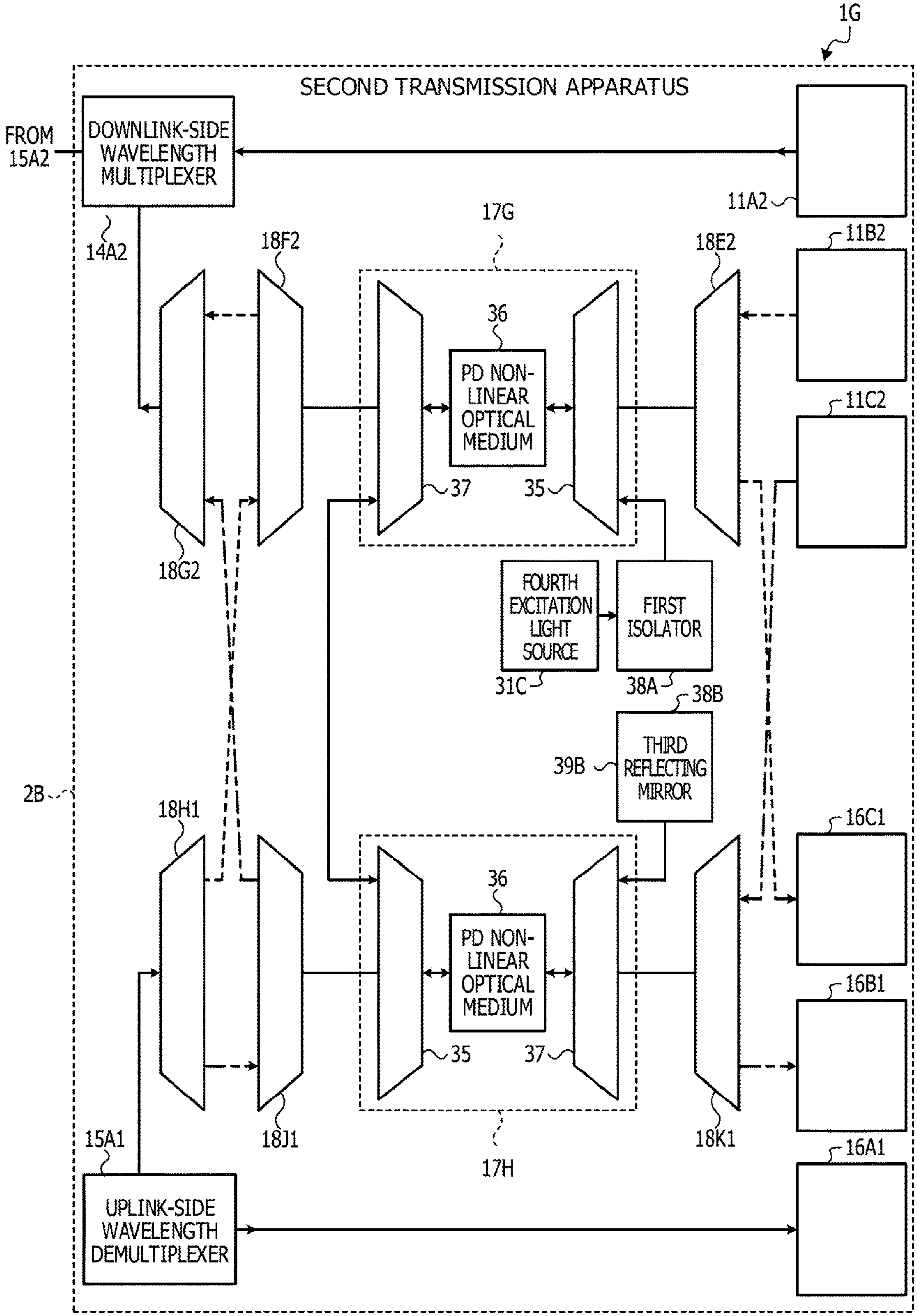

FIG. 15 is an explanatory diagram illustrating an example of a transmission system 1G of the example 11. The identical symbols are assigned to a configuration identical to the transmission system 1D in the example 8, and thus description of the overlapping configurations and operations is omitted.

The first transmission apparatus 2A includes the fifteenth wavelength converter 17E and the sixteenth wavelength converter 17F. The fifteenth wavelength converter 17E includes the first isolator 38A and the fourth excitation light source 31C, in addition to the third WDM coupler 35, the PD nonlinear optical medium 36, and the fourth WDM coupler 37. The sixteenth wavelength converter 17F also includes a third reflecting mirror 39B, in addition to the third WDM coupler 35, the PD nonlinear optical medium 36, and the fourth WDM coupler 37.

The third WDM coupler 35 in the fifteenth wavelength converter 17E connects to the first isolator 38A and inputs the excitation light from the fourth excitation light source 31C by way of the first isolator 38A. The third WDM coupler 35 in the fifteenth wavelength converter 17E outputs to the PD nonlinear optical medium 36 the excitation light and the uplink-side second multiplex light of the C band of the even-numbered channels from the uplink-side fifteenth interleaver 18E1. Then, using the excitation light, the PD nonlinear optical medium 36 wavelength-converts the uplink-side second multiplex light of the C band of the even-numbered channels into the uplink-side second multiplex light of the L band of the even-numbered channels and outputs to the fourth WDM coupler 37.

Furthermore, the fourth WDM coupler 37 in the fifteenth wavelength converter 17E outputs to the third WDM coupler 35 in the sixteenth wavelength converter 17F the excitation light that passes through the PD nonlinear optical medium 36. The sixteenth wavelength converter 17F outputs the remaining excitation light of the fifteenth wavelength converter 17E to the third reflecting mirror 39B by way of the third WDM coupler 35, the PD nonlinear optical medium 36, and the fourth WDM coupler 37. The third reflecting mirror 39B outputs the reflected remaining excitation light to the fourth WDM coupler 37 in the sixteenth wavelength converter 17F. The fourth WDM coupler 37 outputs the remaining excitation light through the PD nonlinear optical medium 36 and the third WDM coupler 35 and through the fourth WDM coupler 37, the PD nonlinear optical medium 36, and the third WDM coupler 35 in the fifteenth wavelength converter 17E. The first isolator 38A in the fifteenth wavelength converter 17E blocks the back-flow to the fourth excitation light source 31C of the remaining excitation light received by the third WDM coupler 35 in the fifteenth wavelength converter 17E.

Furthermore, the fourth WDM coupler 37 in the fifteenth wavelength converter 17E outputs to the PD nonlinear optical medium 36 the remaining excitation light and the downlink-side third multiplex light of the L band of the odd-numbered channels inputted from the uplink-side sixteenth interleaver 18F1. Then, using the remaining excitation light, the PD nonlinear optical medium 36 wavelength-converts the downlink-side third multiplex light of the L band of the odd-numbered channels into the downlink-side third multiplex light of the C band of the odd-numbered channels and outputs to the third WDM coupler 35.

The third WDM coupler 35 in the sixteenth wavelength converter 17F outputs to the PD nonlinear optical medium 36 the remaining excitation light of the fifteenth wavelength converter 17E and the downlink-side second multiplex light of the L band of the even-numbered channels inputted from the downlink-side nineteenth interleaver 18J2. Then, using the remaining excitation light, the PD nonlinear optical medium 36 wavelength-converts the downlink-side second multiplex light of the L band of the even-numbered channels into the downlink-side second multiplex light of the C band of the even-numbered channels and outputs to the fourth WDM coupler 37.

Furthermore, the fourth WDM coupler 37 in the sixteenth wavelength converter 17F outputs to the PD nonlinear optical medium 36 the remaining excitation light from the third reflecting mirror 39B and the uplink-side third multiplex light of the C band of the odd-numbered channels inputted from the downlink-side twentieth interleaver 18K2. Then, using the remaining excitation light, the PD nonlinear optical medium 36 wavelength-converts the uplink-side third multiplex light of the C band of the odd-numbered channels into the uplink-side third multiplex light of the L band of the odd-numbered channels and outputs to the third WDM coupler 35.

The third WDM coupler 35 in the seventeenth wavelength converter 17G connects to the first isolator 38A and inputs the excitation light from the fourth excitation light source 31C by way of the first isolator 38A. The third WDM coupler 35 in the seventeenth wavelength converter 17G outputs to the PD nonlinear optical medium 36 the excitation light from the fourth excitation light source 31C and the downlink-side second multiplex light of the C band of the even-numbered channels from the downlink-side fifteenth interleaver 18E2. Then, using the excitation light, the PD nonlinear optical medium 36 wavelength-converts the downlink-side second multiplex light of the C band of the even-numbered channels into the downlink-side second multiplex light of the L band of the even-numbered channels and outputs to the fourth WDM coupler 37.

Furthermore, the fourth WDM coupler 37 n the seventeenth wavelength converter 17G outputs to the third WDM coupler 35 in the eighteenth wavelength converter 17H the remaining excitation light that passes through the PD nonlinear optical medium 36. The eighteenth wavelength converter 17H outputs the remaining excitation light to the third reflecting mirror 39B by way of the third WDM coupler 35, the PD nonlinear optical medium 36, and the fourth WDM coupler 37. The third reflecting mirror 39B outputs the reflected remaining excitation light to the fourth WDM coupler 37 in the seventeenth wavelength converter 17G by way of the fourth WDM coupler 37 in the eighteenth wavelength converter 17H, the PD nonlinear optical medium 36, and the third WDM coupler 35. The fourth WDM coupler 37 in the seventeenth wavelength converter 17G outputs the remaining excitation light to the third WDM coupler 35 by way of the PD nonlinear optical medium 36. The first isolator 38A in the seventeenth wavelength converter 17G blocks the back-flow to the fourth excitation light source 31C of the remaining excitation light received by the third WDM coupler 35 in the seventeenth wavelength converter 17G.

Furthermore, the third WDM coupler 35 in the seventeenth wavelength converter 17G outputs to the PD nonlinear optical medium 36 the excitation light from the fourth excitation light source 31C and the downlink-side second multiplex light of the C band of the even-numbered channels inputted from the downlink-side fifteenth interleaver 18E2. Then, using the excitation light, the PD nonlinear optical medium 36 wavelength-converts the downlink-side second multiplex light of the C band of the even-numbered channels into the downlink-side second multiplex light of the C band of the even-numbered channels and outputs to the fourth WDM coupler 37.

The fourth WDM coupler 37 in the seventeenth wavelength converter 17G outputs to the PD nonlinear optical medium 36 the remaining excitation light and the uplink-side third multiplex light of the L band of the odd-numbered channels inputted from the downlink-side sixteenth interleaver 18F2. Then, the remaining excitation light, the PD nonlinear optical medium 36 wavelength-converts the uplink-side third multiplex light of the L band of the odd-numbered channels into the uplink-side third multiplex light of the C band of the odd-numbered channels and outputs to the third WDM coupler 35.

The third WDM coupler 35 in the eighteenth wavelength converter 17H outputs to the PD nonlinear optical medium 36 the remaining excitation light and the uplink-side second multiplex light of the L band of the even-numbered channels inputted from the uplink-side nineteenth interleaver 18J1. Then, using the remaining excitation light, the PD nonlinear optical medium 36 wavelength-converts the uplink-side second multiplex light of the L band of the even-numbered channels into the uplink-side second multiplex light of the C band of the even-numbered channels and outputs to the fourth WDM coupler 37.

Furthermore, the fourth WDM coupler 37 in the eighteenth wavelength converter 17H outputs to the PD nonlinear optical medium 36 the remaining excitation light from the third reflecting mirror 39B and the downlink-side third multiplex light of the C band of the odd-numbered channels inputted from the uplink-side twentieth interleaver 18K1. Then, using the remaining excitation light, the PD nonlinear optical medium 36 wavelength-converts the downlink-side third multiplex light of the C band of the odd-numbered channels into the downlink-side third multiplex light of the L band of the odd-numbered channels and outputs to the third WDM coupler 35.

The first transmission apparatus 2A of the example 11 uses the excitation light from the fourth excitation light source 31C and the remaining excitation light from the third reflecting mirror 39B for the fifteenth wavelength converter 17E and the sixteenth wavelength converter 17F. As a result, the first transmission apparatus 2A may reduce the number of the excitation light sources, as compared to the example 8.

The second transmission apparatus 2B uses the excitation light from the fourth excitation light source 31C and the remaining excitation light from the third reflecting mirror 39B for the seventeenth wavelength converter 17G and the eighteenth wavelength converter 17H. As a result, the second transmission apparatus 2B may reduce the number of the excitation light sources, as compared to the example 8.

The wavelength converters of the foregoing examples 9 to 11 illustratively illustrate the bidirectional PD nonlinear optical medium 36. However, there are various types of the PD nonlinear optical medium 36, an embodiment of which is described below as an example 12.

Example 12

Figure 16:
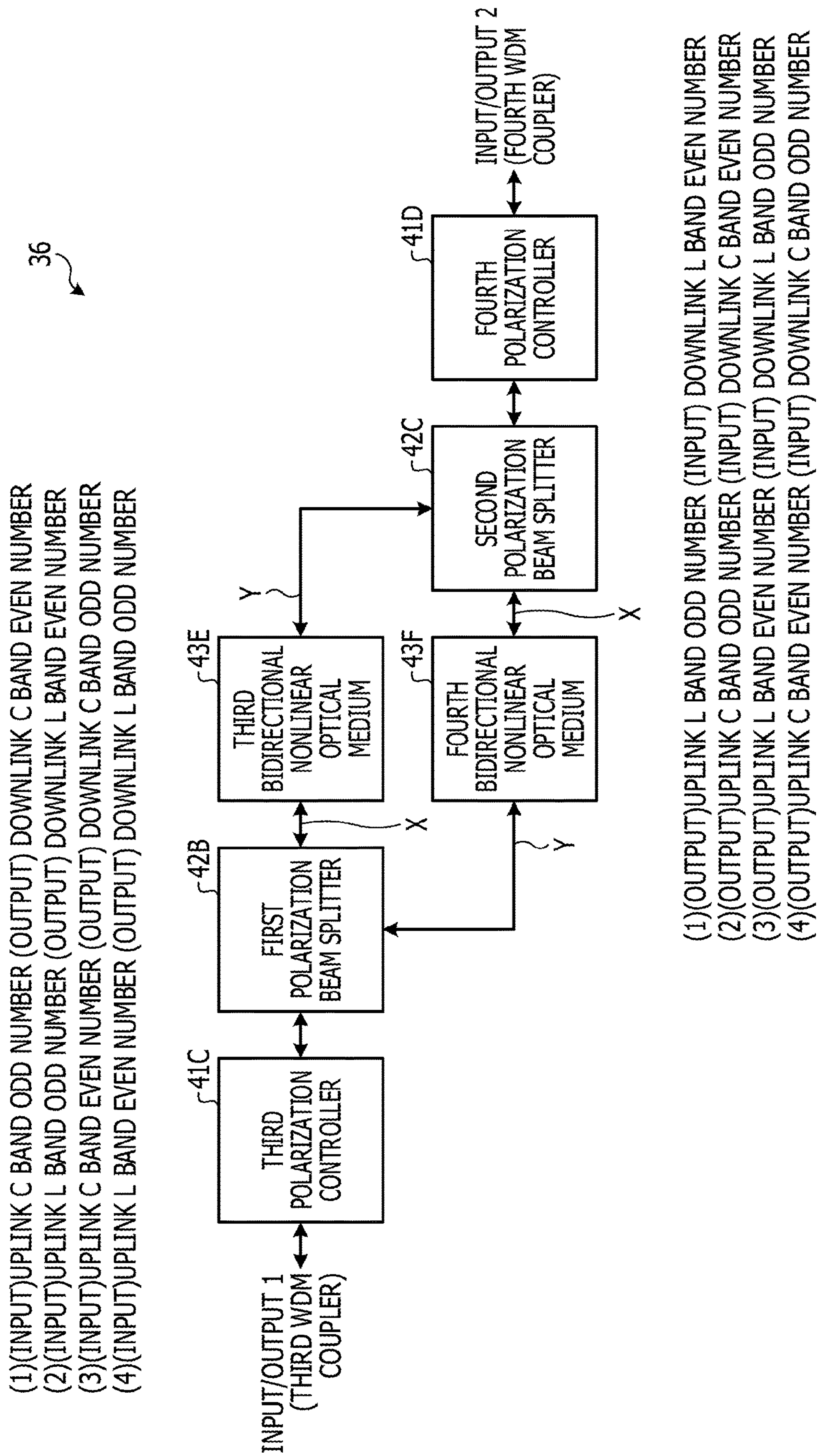
FIG. 16 is an explanatory diagram illustrating an example of a PD nonlinear optical medium of an example 12.

FIG. 16 is an explanatory diagram illustrating an example of the PD nonlinear optical medium 36 of the example 12. The PD nonlinear optical medium 36 illustrated in FIG. 16 includes a third polarization controller 41C, a first polarization beam splitter 42B, and a third bidirectional nonlinear optical medium 43E. Furthermore, the PD nonlinear optical medium 36 includes a fourth bidirectional nonlinear optical medium 43F, a second polarization beam splitter 42C, and a fourth polarization controller 41D.

The third polarization controller 41C connects to the third WDM coupler 35, inputs the excitation light and the second and third multiplex light from the third WDM coupler 35, for example, and polarization-controls the excitation light and the second and third multiplex light. That is, the third polarization controller 41C outputs to the first polarization beam splitter 42B the second and third multiplex light and the excitation light of the vertical polarization and the horizontal polarization after the polarization control. The first polarization beam splitter 42B outputs the second and third multiplex light of the vertical polarization and the excitation light of the vertical polarization to the forward port X of the third bidirectional nonlinear optical medium 43E. The first polarization beam splitter 42B outputs the second and third multiplex light of the horizontal polarization and the excitation light of the horizontal polarization to the backward port Y of the fourth bidirectional nonlinear optical medium 43F. Then, using the excitation light, the third bidirectional nonlinear optical medium 43E wavelength-converts the second and third multiplex light of the vertical polarization inputted from the forward port X and outputs to the second polarization beam splitter 42C the second and third multiplex light of the vertical polarization after the wavelength conversion. Using the excitation light, the fourth bidirectional nonlinear optical medium 43F wavelength-converts the second and third multiplex light inputted from the backward port Y and outputs to the second polarization beam splitter 42C the second and third multiplex light of the horizontal polarization after the wavelength conversion. The second polarization beam splitter 42C outputs to the fourth polarization controller 41D the second and third multiplex light of the vertical polarization from the third bidirectional nonlinear optical medium 43E and the second and third multiplex light of the horizontal polarization from the fourth bidirectional nonlinear optical medium 43F. The fourth polarization controller 41D polarization-controls the second and third multiplex light of the vertical polarization and the horizontal polarization and outputs to the fourth WDM coupler 37 the second and third multiplex light after the polarization control.

The fourth polarization controller 41D inputs the excitation light and the second and third multiplex light from the fourth WDM coupler 37 and polarization-controls the excitation light and the second and third multiplex light. The fourth polarization controller 41D outputs to the second polarization beam splitter 42C the second and third multiplex light and the excitation light of the vertical polarization and the horizontal polarization after the polarization control. The second polarization beam splitter 42C outputs the second and third multiplex light and the excitation light of the vertical polarization from the fourth polarization controller 41D to the backward port Y of the third bidirectional nonlinear optical medium 43E. The second polarization beam splitter 42C outputs the second and third multiplex light and the excitation light of the horizontal polarization to the forward port X of the fourth bidirectional nonlinear optical medium 43F. Then, using the excitation light, the third bidirectional nonlinear optical medium 43E wavelength-converts the second and third multiplex light of the vertical polarization inputted from the backward port Y and outputs to the first polarization beam splitter 42B the second and third multiplex light of the vertical polarization after the wavelength conversion. Using the excitation light, the fourth bidirectional nonlinear optical medium 43F wavelength-converts the second and third multiplex light of the horizontal polarization inputted from the forward port X and outputs to the first polarization beam splitter 42B the second and third multiplex light of the horizontal polarization after the wavelength conversion. The first polarization beam splitter 42B outputs to the third polarization controller 41C the second and third multiplex light of the vertical polarization from the third bidirectional nonlinear optical medium 43E and the second and third multiplex light of the horizontal polarization from the fourth bidirectional nonlinear optical medium 43F. The third polarization controller 41C polarization-controls the second and third multiplex light of the vertical polarization and the horizontal polarization and outputs to the third WDM coupler 35 the second and third multiplex light after the polarization control.

For example, using the excitation light, the PD nonlinear optical medium 36 in the fifteenth wavelength converter 17E wavelength-converts the uplink-side second multiplex light of the C band of the even-numbered channels of the vertical polarization and horizontal polarization into the uplink-side second multiplex light of the L band of the even-numbered channels of the vertical polarization and the horizontal polarization. A transmission path of the wavelength conversion is from the third WDM coupler 35 and by way of the third polarization controller 41C the first polarization beam splitter 42B the third bidirectional nonlinear optical medium 43E and the fourth bidirectional nonlinear optical medium 43F the second polarization beam splitter 42C the fourth polarization controller 41D. Using the excitation light, the PD nonlinear optical medium 36 in the fifteenth wavelength converter 17E wavelength-converts the downlink-side third multiplex light of the L band of the odd-numbered channels of the vertical polarization and the horizontal polarization into the downlink-side third multiplex light of the C band of the odd-numbered channels of the vertical polarization and the horizontal polarization. The transmission path of the wavelength conversion is from the fourth WDM coupler 37 and by way of the fourth polarization controller 41D the second polarization beam splitter 42C the fourth bidirectional nonlinear optical medium 43F and the third bidirectional nonlinear optical medium 43E the first polarization beam splitter 42B the third polarization controller 41C. As a result, the fifteenth wavelength converter 17E may wavelength-convert the uplink-side second multiplex light and the downlink-side third multiplex light from both directions of the third WDM coupler 35 and the fourth WDM coupler 37.

Using the excitation light, the PD nonlinear optical medium 36 in the sixteenth wavelength converter 17F wavelength-converts the downlink-side second multiplex light of the L band of the even-numbered channels of the vertical polarization and the horizontal polarization into the downlink-side second multiplex light of the C band of the even-numbered channels of the vertical polarization and the horizontal polarization. The transmission path of the wavelength conversion is from the third WDM coupler 35 and by way of the third polarization controller 41C the first polarization beam splitter 42B the third bidirectional nonlinear optical medium 43E and the fourth bidirectional nonlinear optical medium 43F the second polarization beam splitter 42C the fourth polarization controller 41D. Using the excitation light, the PD nonlinear optical medium 36 in the sixteenth wavelength converter 17F wavelength-converts the uplink-side third multiplex light of the C band of the odd-numbered channels of the vertical polarization and the horizontal polarization into the uplink-side third multiplex light of the L band of the odd-numbered channels of the vertical polarization and the horizontal polarization. The transmission path of the wavelength conversion is from the fourth WDM coupler 37 and by way of the fourth polarization controller 41D the second polarization beam splitter 42C the third bidirectional nonlinear optical medium 43E and the fourth bidirectional nonlinear optical medium 43F the first polarization beam splitter 42B the third polarization controller 41C. As a result, the sixteenth wavelength converter 17F may wavelength-convert the uplink-side third multiplex light and the downlink-side second multiplex light from both directions of the third WDM coupler 35 and the fourth WDM coupler 37.

Using the excitation light, the PD nonlinear optical medium 36 in the seventeenth wavelength converter 17G wavelength-converts the downlink-side second multiplex light of the C band of the even-numbered channels of the vertical polarization and the horizontal polarization into the downlink-side second multiplex light of the L band of the even-numbered channels. The transmission path of the wavelength conversion is from the third WDM coupler 35 and by way of the third polarization controller 41C the first polarization beam splitter 42B the third bidirectional nonlinear optical medium 43E and the fourth bidirectional nonlinear optical medium 43F the second polarization beam splitter 42C the fourth polarization controller 41D. Using the excitation light, the PD nonlinear optical medium 36 in the seventeenth wavelength converter 17G wavelength-converts the uplink-side third multiplex light of the L band of the odd-numbered channels of the vertical polarization and the horizontal polarization into the uplink-side third multiplex light of the C band of the odd-numbered channels of the vertical polarization and the horizontal polarization. The transmission path of the wavelength conversion is from the fourth WDM coupler 37 and by way of the fourth polarization controller 41D the second polarization beam splitter 42C the third bidirectional nonlinear optical medium 43E and the fourth bidirectional nonlinear optical medium 43F the first polarization beam splitter 42B the third polarization controller 41C. As a result, the seventeenth wavelength converter 17G may wavelength-convert the uplink-side third multiplex light and the downlink-side second multiplex light from both directions of the third WDM coupler 35 and the fourth WDM coupler 37.

Using the excitation light, the PD nonlinear optical medium 36 in the eighteenth wavelength converter 17H wavelength-converts the uplink-side second multiplex light of the L band of the even-numbered channels of the vertical polarization and the horizontal polarization into the uplink-side second multiplex light of the C band of the even-numbered channels. The transmission path of the wavelength conversion is from the third WDM coupler 35 and by way of the third polarization controller 41C the first polarization beam splitter 42B the third bidirectional nonlinear optical medium 43E and the fourth bidirectional nonlinear optical medium 43F the second polarization beam splitter 42C the fourth polarization controller 41D. Using the excitation light, the PD nonlinear optical medium 36 in the eighteenth wavelength converter 17H wavelength-converts the downlink-side third multiplex light of the C band of the odd-numbered channels of the vertical polarization and the horizontal polarization into the downlink-side third multiplex light of the L band of the odd-numbered channels of the vertical polarization and the horizontal polarization. The transmission path of the wavelength conversion is from the fourth WDM coupler 37 and by way of the fourth polarization controller 41D the second polarization beam splitter 42C the third bidirectional nonlinear optical medium 43E and the fourth bidirectional nonlinear optical medium 43F the first polarization beam splitter 42B the third polarization controller 41C. As a result, the eighteenth wavelength converter 17H may wavelength-convert the uplink-side second multiplex light and the downlink-side third multiplex light from both direction of the third WDM coupler 35 and the fourth WDM coupler 37.

Example 13

FIG. 17 is an explanatory diagram illustrating an example of the PD nonlinear optical medium 36 of an example 13. The PD nonlinear optical medium 36 illustrated in FIG. 17 includes a fifth polarization controller 41E, a polarization beam splitter 42D, a bidirectional nonlinear optical medium 43G, and a sixth polarization controller 41F.

The fifth polarization controller 41E inputs the excitation light and the second multiplex light from the third WDM coupler 35 and polarization-controls the second and third multiplex light and the excitation light. That is, the fifth polarization controller 41E outputs to the polarization beam splitter 42D the second and third multiplex light and the excitation light of the horizontal polarization and the vertical polarization after the polarization control. The polarization beam splitter 42D outputs the second multiplex light and the excitation light of the horizontal polarization to the backward port Y of the bidirectional nonlinear optical medium 43G. The polarization beam splitter 42D outputs the second and third multiplex light and the excitation light to the forward port X of the bidirectional nonlinear optical medium 43G. Using the excitation light, the bidirectional nonlinear optical medium 43G wavelength-converts the second and third multiplex light of the horizontal polarization inputted from the backward port Y and outputs to the polarization beam splitter 42D the second and third multiplex light of the horizontal polarization after the wavelength conversion. Using the excitation light, the bidirectional nonlinear optical medium 43G wavelength-converts the second and third multiplex light of the vertical polarization inputted from the forward port X and outputs to the polarization beam splitter 42D the second and third multiplex light of the vertical polarization after the wavelength conversion. Then, the polarization beam splitter 42D outputs to the sixth polarization controller 41F the second and third multiplex light of the horizontal polarization and the vertical polarization after the wavelength conversion from the bidirectional nonlinear optical medium 43G. The sixth polarization controller 41F polarization-controls the second and third multiplex light of the horizontal polarization and the vertical polarization after the wavelength conversion, and outputs to the fourth WDM coupler 37 the second and third multiplex light of the horizontal polarization and the vertical polarization.

The sixth polarization controller 41F inputs the excitation and the second and third multiplex light from the fourth WDM coupler 37 and polarization-controls the second and third multiplex light and the excitation light. That is, the sixth polarization controller 41F outputs to the polarization beam splitter 42D the second and third multiplex light and the excitation light of the horizontal polarization and the vertical polarization after the polarization control. The polarization beam splitter 42D outputs the second and third multiplex light and the excitation light of the horizontal polarization to the forward port X of the bidirectional nonlinear optical medium 43G. The polarization beam splitter 42D outputs the second and third multiplex light and the excitation light of the vertical polarization to the backward port Y of the bidirectional nonlinear optical medium 43G. Using the excitation light, the bidirectional nonlinear optical medium 43G wavelength-converts the second and third multiplex light of the vertical polarization inputted from the forward port X and outputs the second and third multiplex light after the wavelength conversion to the polarization beam splitter 42D. Using the excitation light, the bidirectional nonlinear optical medium 43G wavelength-converts the second and third multiplex light of the horizontal polarization inputted from the backward port Y and outputs to the polarization beam splitter 42D the second and third multiplex light of the horizontal polarization after the wavelength conversion. Then, the polarization beam splitter 42D outputs the second and third multiplex light of the horizontal polarization and the vertical polarization after the wavelength conversion from the bidirectional nonlinear optical medium 43G to the fifth polarization controller 41E. The fifth polarization controller 41E polarization-controls the second and third multiplex light of the horizontal polarization and the vertical polarization after the wavelength conversion, and outputs the second and third multiplex light of the horizontal polarization and the vertical polarization to the third WDM coupler 35.

For example, using the excitation light, the PD nonlinear optical medium 36 in the fifteenth wavelength converter 17E wavelength-converts the uplink-side second multiplex light of the C band of the even-numbered channels of the vertical polarization and the horizontal polarization into the uplink-side second multiplex light of the L band of the even-numbered channels of the vertical polarization and the horizontal polarization. The transmission path of the wavelength conversion is from the third WDM coupler 35 and by way of the fifth polarization controller 41E the polarization beam splitter 42D the bidirectional nonlinear optical medium 43G the polarization beam splitter 42D the sixth polarization controller 41F. Using the excitation light, the PD nonlinear optical medium 36 in the fifteenth wavelength converter 17E wavelength-converts the downlink-side third multiplex light of the L band of the odd-numbered channels of the vertical polarization and the horizontal polarization into the downlink-side third multiplex light of the C band of the odd-numbered channels of the vertical polarization and the horizontal polarization. The transmission path of the wavelength conversion is from the fourth WDM coupler 37 and by way of the sixth polarization controller 41F the polarization beam splitter 42D the bidirectional nonlinear optical medium 43G the polarization beam splitter 42D the fifth polarization controller 41E. As a result, the fifteenth wavelength converter 17E may wavelength-convert the uplink-side second multiplex light and the downlink-side third multiplex light from both directions of the third WDM coupler 35 and the fourth WDM coupler 37.

Using the excitation light, the PD nonlinear optical medium 36 in the sixteenth wavelength converter 17F wavelength-converts the downlink-side second multiplex light of the L band of the even-numbered channels of the vertical polarization and the horizontal polarization into the downlink-side second multiplex light of the C band of the even-numbered channels of the vertical polarization and the horizontal polarization. The transmission path of the wavelength conversion is from the third WDM coupler 35 and by way of the fifth polarization controller 41E the polarization beam splitter 42D the bidirectional nonlinear optical medium 43G the polarization beam splitter 42D the sixth polarization controller 41F. Using the excitation light, the PD nonlinear optical medium 36 in the sixteenth wavelength converter 17F wavelength-converts the uplink-side third multiplex light of the C band of the odd-numbered channels of the vertical polarization and the horizontal polarization into the uplink-side third multiplex light of the L band of the odd-numbered channels of the vertical polarization and the horizontal polarization. The transmission path of the wavelength conversion is from the fourth WDM coupler 37 and by way of the sixth polarization controller 41F the polarization beam splitter 42D the bidirectional nonlinear optical medium 43G the polarization beam splitter 42D the fifth polarization controller 41E. As a result, the sixteenth wavelength converter 17F may wavelength-convert the uplink-side third multiplex light and the downlink-side second multiplex light from both direction of the third WDM coupler 35 and the fourth WDM coupler 37.

Using the excitation light, the PD nonlinear optical medium 36 in the seventeenth wavelength converter 17G wavelength-converts the downlink-side second multiplex light of the C band of the even-numbered channels of the vertical polarization and the horizontal polarization into the downlink-side second multiplex light of the L band of the even-numbered channels of the vertical polarization and the horizontal polarization. The transmission path of the wavelength conversion is from the third WDM coupler 35 and by way of the fifth polarization controller 41E the polarization beam splitter 42D the bidirectional nonlinear optical medium 43G the polarization beam splitter 42D the sixth polarization controller 41F. Using the excitation light, the PD nonlinear optical medium 36 in the seventeenth wavelength converter 17G wavelength-converts the uplink-side third multiplex light of the L band of the odd-numbered channels of the vertical polarization and the horizontal polarization into the uplink-side third multiplex light of the C band of the odd-numbered channels of the vertical polarization and the horizontal polarization. The transmission path of the wavelength conversion is from the fourth WDM coupler 37 and by way of the sixth polarization controller 41F the polarization beam splitter 42D the bidirectional nonlinear optical medium 43G the polarization beam splitter 42D the fifth polarization controller 41E. As a result, the seventeenth wavelength converter 17G may wavelength-convert the uplink-side third multiplex light and the downlink-side second multiplex light from both directions of the third WDM coupler 35 and the fourth WDM coupler 37.

Using the excitation light, the PD nonlinear optical medium 36 in the eighteenth wavelength converter 17H wavelength-converts the uplink-side second multiplex light of the L band of the even-numbered channels of the vertical polarization and the horizontal polarization into the uplink-side second multiplex light of the C band of the even-numbered channels of the vertical polarization and the horizontal polarization. The transmission path of the wavelength conversion is from the third WDM coupler 35 and by way of the fifth polarization controller 41E the polarization beam splitter 42D the bidirectional nonlinear optical medium 43G the polarization beam splitter 42D the sixth polarization controller 41F. Using the excitation light, the PD nonlinear optical medium 36 of the eighteenth wavelength converter 17H wavelength-converts the downlink-side third multiplex light of the C band of the odd-numbered channels of the vertical polarization and the horizontal polarization into the downlink-side third multiplex light of the L band of the odd-numbered channels of the vertical polarization and the horizontal polarization. The transmission path of the wavelength conversion is from the fourth WDM coupler 37 and by way of the sixth polarization controller 41F the polarization beam splitter 42D the bidirectional nonlinear optical medium 43G the polarization beam splitter 42D the fifth polarization controller 41E. As a result, the eighteenth wavelength converter 17H may wavelength-convert the uplink-side second multiplex light and the downlink-side third multiplex light from both directions of the third WDM coupler 35 and the fourth WDM coupler 37.

In the fifteenth to eighteenth wavelength converters 17E to 17H illustrated in FIG. 11, a case is illustrated in which the third WDM coupler 35 and the fourth WDM coupler 37 are connected to the PD nonlinear optical medium 36 in both directions. However, the wavelength converters are not limited to this and may be the wavelength converter in which a single fifth WDM coupler 51 is connected to a PD nonlinear optical medium 52, and an embodiment in that case is described below as an example 14.

Example 14

Figure 18A:
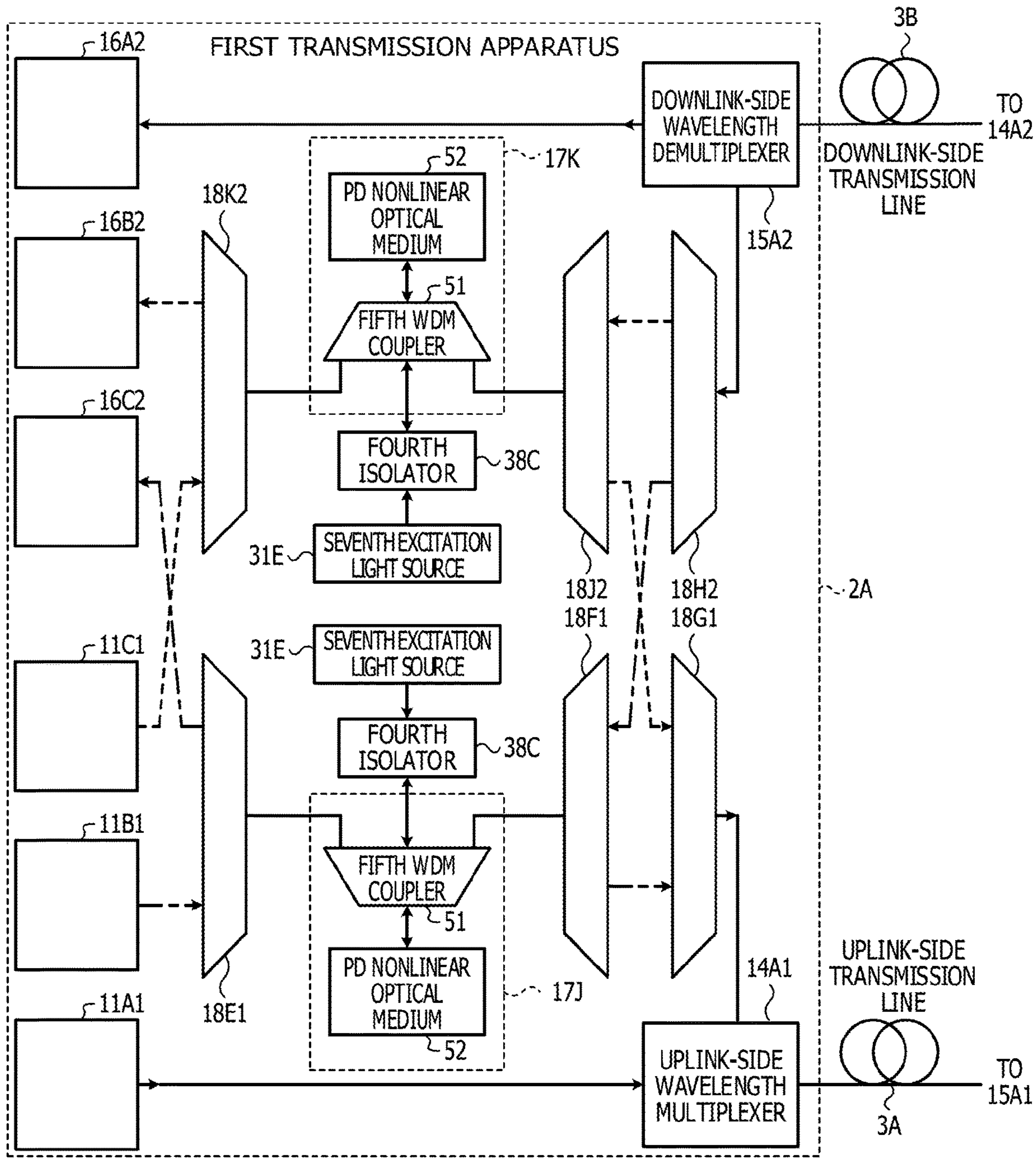
FIGS. 18A and 18B are explanatory diagrams illustrating an example of a transmission system of an example 14.
Figure 18B:
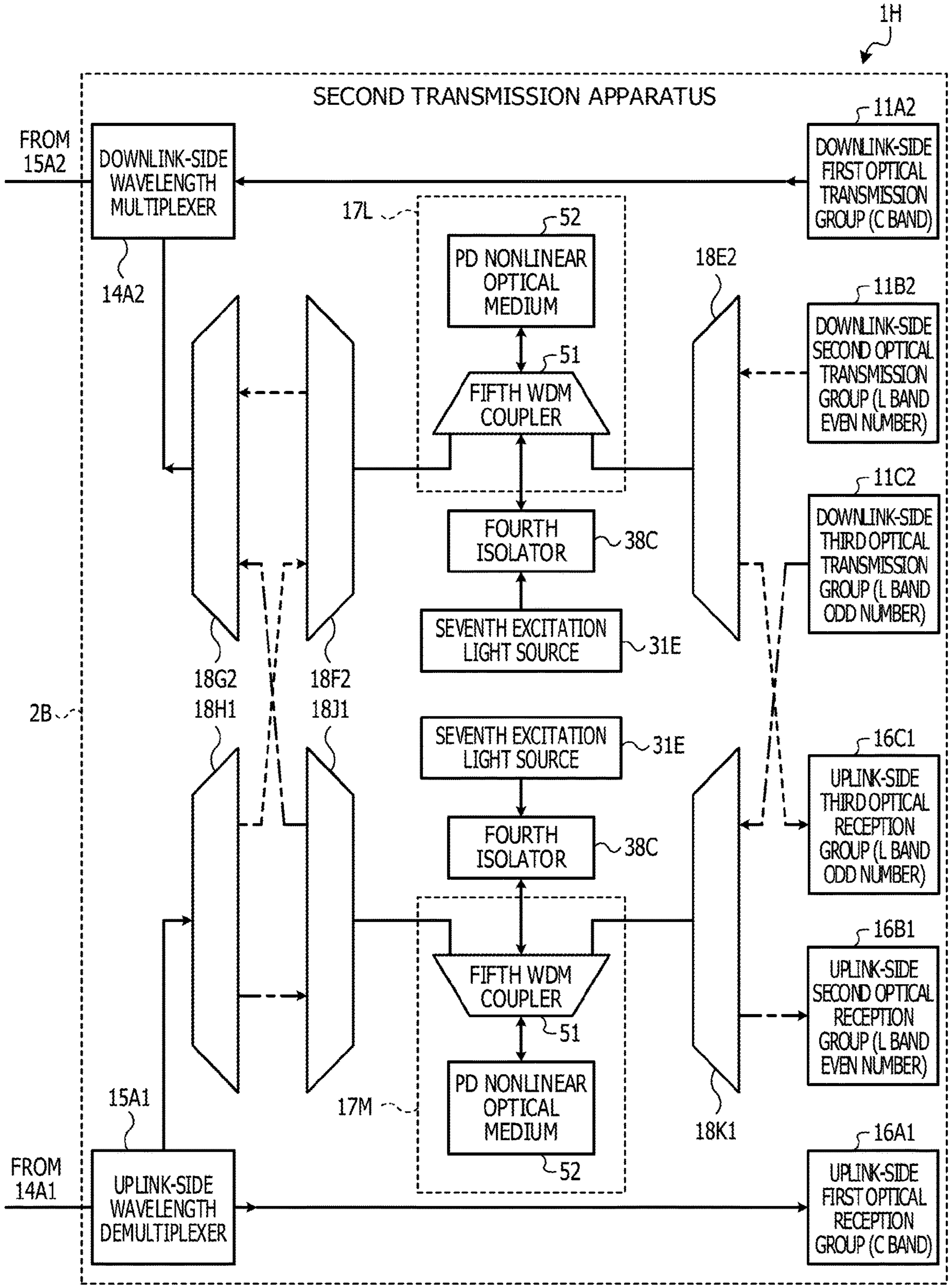

FIG. 18 is an explanatory diagram illustrating an example of a transmission system 1H of the example 14. The identical symbols are assigned to a configuration identical to the transmission system 1D, and thus description of the overlapping configurations and operations is omitted.

In the first transmission apparatus 2A are disposed a nineteenth wavelength converter 17J in place of the fifteenth wavelength converter 17E and a twentieth wavelength converter 17K in place of the sixteenth wavelength converter 17F. In the second transmission apparatus 2B are disposed a twenty-first wavelength converter 17L in place of the seventeenth wavelength converter 17G and a twenty-second wavelength converter 17M in place of the eighteenth wavelength converter 17H.

The nineteenth wavelength converter 17J includes the PD nonlinear optical medium 52, the fifth WDM coupler 51, a fourth isolator 38C, and a seventh excitation light source 31E. The fifth WDM coupler 51 connects to the PD nonlinear optical medium 52, connects to the uplink-side fifteenth interleaver 18E1, and connects to the uplink-side sixteenth interleaver 18F1.

The twentieth wavelength converter 17K includes the PD nonlinear optical medium 52, the fifth WDM coupler 51, the fourth isolator 38C, and the seventh excitation light source 31E. The fifth WDM coupler 51 connects to the PD nonlinear optical medium 52, connects to the downlink-side twentieth interleaver 18K2, and connects to the downlink-side nineteenth interleaver 18J2.

The twenty-first wavelength converter 17L includes the PD nonlinear optical medium 52, the fifth WDM coupler 51, the fourth isolator 38C, and the seventh excitation light source 31E. The fifth WDM coupler 51 connects to the PD nonlinear optical medium 52, connects to the downlink-side fifteenth interleaver 18E2, and connects to the downlink-side sixteenth interleaver 18F2.

The twenty-second wavelength converter 17M includes the PD nonlinear optical medium 52, the fifth WDM coupler 51, the fourth isolator 38C, and the seventh excitation light source 31E. The fifth WDM coupler 51 connects to the PD nonlinear optical medium 52, connects to the uplink-side nineteenth interleaver 18J1, and connects to the uplink-side twentieth interleaver 18K1.

The fifth WDM coupler 51 in the nineteenth wavelength converter 17J connects to the fourth isolator 38C and outputs the excitation light from the seventh excitation light source 31E to the PD nonlinear optical medium 52 by way of the fourth isolator 38C. The fifth WDM coupler 51 in the nineteenth wavelength converter 17J outputs to the PD nonlinear optical medium 52 the uplink-side second multiplex light of the C band of the even-numbered channels from the uplink-side fifteenth interleaver 18E1. Using the excitation light, the PD nonlinear optical medium 52 wavelength-converts the uplink-side second multiplex light of the C band of the even-numbered channels into the uplink-side second multiplex light of the L band of the even-numbered channels and outputs to the fifth WDM coupler 51. Then, the fifth WDM coupler 51 outputs the uplink-side second multiplex light of the L band of the even-numbered channels to the uplink-side seventeenth interleaver 18G1 by way of the uplink-side sixteenth interleaver 18F1.

Furthermore, the fifth WDM coupler 51 in the nineteenth wavelength converter 17J outputs to the PD nonlinear optical medium 52 the downlink-side third multiplex light of the L band of the odd-numbered channels inputted from the uplink-side sixteenth interleaver 18F1. Using the excitation light, the PD nonlinear optical medium 52 wavelength-converts the downlink-side third multiplex light of the L band of the odd-numbered channels into the downlink-side third multiplex light of the C band of the odd-numbered channels and outputs to the fifth WDM coupler 51. The fifth WDM coupler 51 outputs the downlink-side third multiplex light of the C band of the odd-numbered channels to the downlink-side third optical reception group 16C2 by way of the uplink-side fifteenth interleaver 18E1.

The fifth WDM coupler 51 in the twentieth wavelength converter 17K connects to the fourth isolator 38C and outputs the excitation light from the seventh excitation light source 31E to the PD nonlinear optical medium 52 by way of the fourth isolator 38C. The fifth WDM coupler 51 in the twentieth wavelength converter 17K outputs the uplink-side third multiplex light of the C band of the odd-numbered channels from the downlink-side twentieth interleaver 18K2 to the PD nonlinear optical medium 52. Using the excitation light, the PD nonlinear optical medium 52 wavelength-converts the uplink-side third multiplex light of the C band of the odd-numbered channels into the uplink-side third multiplex light of the L band of the odd-numbered channels and outputs to the fifth WDM coupler 51. The fifth WDM coupler 51 outputs the uplink-side third multiplex light of the L band of the odd-numbered channels to the uplink-side seventeenth interleaver 18G1 by way of the downlink-side nineteenth interleaver 18J2.

Furthermore, the fifth WDM coupler 51 in the twentieth wavelength converter 17K outputs to the PD nonlinear optical medium 52 the downlink-side second multiplex light of the L band of the even-numbered channels inputted from the downlink-side nineteenth interleaver 18J2. Using the excitation light, the PD nonlinear optical medium 52 wavelength-converts the downlink-side second multiplex light of the L band of the even-numbered channels into the downlink-side second multiplex light of the C band of the even-numbered channels and outputs to the fifth WDM coupler 51. The fifth WDM coupler 51 outputs the downlink-side second multiplex light of the C band of the even-numbered channels to the downlink-side second optical reception group 16B2 by way of the downlink-side twentieth interleaver 18K2.

The fifth WDM coupler 51 in the twenty-first wavelength converter 17L connects to the fourth isolator 38C and outputs the excitation light from the seventh excitation light source 31E to the PD nonlinear optical medium 52 by way of the fourth isolator 38C. The fifth WDM coupler 51 in the twenty-first wavelength converter 17L outputs the downlink-side second multiplex light of the C band of the even-numbered channels from the downlink-side fifteenth interleaver 18E2 to the PD nonlinear optical medium 52. Using the excitation light, the PD nonlinear optical medium 52 wavelength-converts the downlink-side second multiplex light of the C band of the even-numbered channels into the downlink-side second multiplex light of the L band of the even-numbered channels and outputs to the fifth WDM coupler 51. The fifth WDM coupler 51 outputs the downlink-side second multiplex light of the L band of the even-numbered channels to the downlink-side seventeenth interleaver 18G2 by way of the downlink-side sixteenth interleaver 18F2.

Furthermore, the fifth WDM coupler 51 in the twenty-first wavelength converter 17L outputs to the PD nonlinear optical medium 52 the uplink-side third multiplex light of the L band of the odd-numbered channels inputted from the downlink-side sixteenth interleaver 18F2. Then, using the excitation light, the PD nonlinear optical medium 52 wavelength-converts the uplink-side third multiplex light of the L band of the odd-numbered channels into the uplink-side third multiplex light of the C band of the odd-numbered channels and outputs to the fifth WDM coupler 51. The fifth WDM coupler 51 outputs the uplink-side third multiplex light of the C band of the odd-numbered channels to the uplink-side third optical reception group 16C1 by way of the downlink-side fifteenth interleaver 18E2.

The fifth WDM coupler 51 in the twenty-second wavelength converter 17M connects to the fourth isolator 38C and outputs the excitation light from the seventh excitation light source 31E to the PD nonlinear optical medium 52 by way of the fourth isolator 38C. The fifth WDM coupler 51 in the twenty-second wavelength converter 17M outputs the downlink-side third multiplex light of the C band of the odd-numbered channels from the uplink-side twentieth interleaver 18K1 to the PD nonlinear optical medium 52. Using the excitation light, the PD nonlinear optical medium 52 wavelength-converts the downlink-side third multiplex light of the C band of the odd-numbered channels into the downlink-side third multiplex light of the L band of the odd-numbered channels and outputs to the fifth WDM coupler 51. The fifth WDM coupler 51 outputs the downlink-side third multiplex light of the L band of the odd-numbered channels to the downlink-side seventeenth interleaver 18G2 by way of the uplink-side nineteenth interleaver 18J1.

Furthermore, the fifth WDM coupler 51 in the twenty-second wavelength converter 17M outputs to the PD nonlinear optical medium 52 the uplink-side second multiplex light of the L band of the even-numbered channels inputted from the uplink-side nineteenth interleaver 18J1. Using the excitation light, the PD nonlinear optical medium 52 wavelength-converts the uplink-side second multiplex light of the L band of the even-numbered channels into the uplink-side second multiplex light of the C band of the even-numbered channels and outputs to the fifth WDM coupler 51. The fifth WDM coupler 51 outputs the uplink-side second multiplex light of the C band of the even-numbered channels to the uplink-side second optical reception group 16B1 by way of the uplink-side twentieth interleaver 18K1.

In the example 14, the input optical power of the WDM signal that is inputted to the wavelength converter in the identical direction is made smaller. That is, the number of wavelengths to be inputted to the identical direction, which is converted by one wavelength converter, is decreased to reduce the nonlinear optical distortion. As a result, it is possible to expand the dynamic range while reducing the deterioration of the signal quality.

The nineteenth wavelength converter 17J of the example 14 may wavelength-convert the uplink and downlink second multiplex light, using the PD nonlinear optical medium 52 connected to the single fifth WDM coupler 51. The twentieth wavelength converter 17K, the twenty-first wavelength converter 17L, and the twenty-second wavelength converter 17M may also wavelength-convert the uplink and downlink second multiplex light, using the PD nonlinear optical medium 52 connected to the single fifth WDM coupler 51.

The seventh excitation light source 31E is disposed in each of the nineteenth to twenty-second wavelength converters 17J to 17M illustrated in FIG. 18. However, a single excitation light source may be used in the nineteenth wavelength converter 173 and the twentieth wavelength converter 17K in the first transmission apparatus 2A, for example, an embodiment of which is described below as an example 15.

Example 15

Figure 19A:
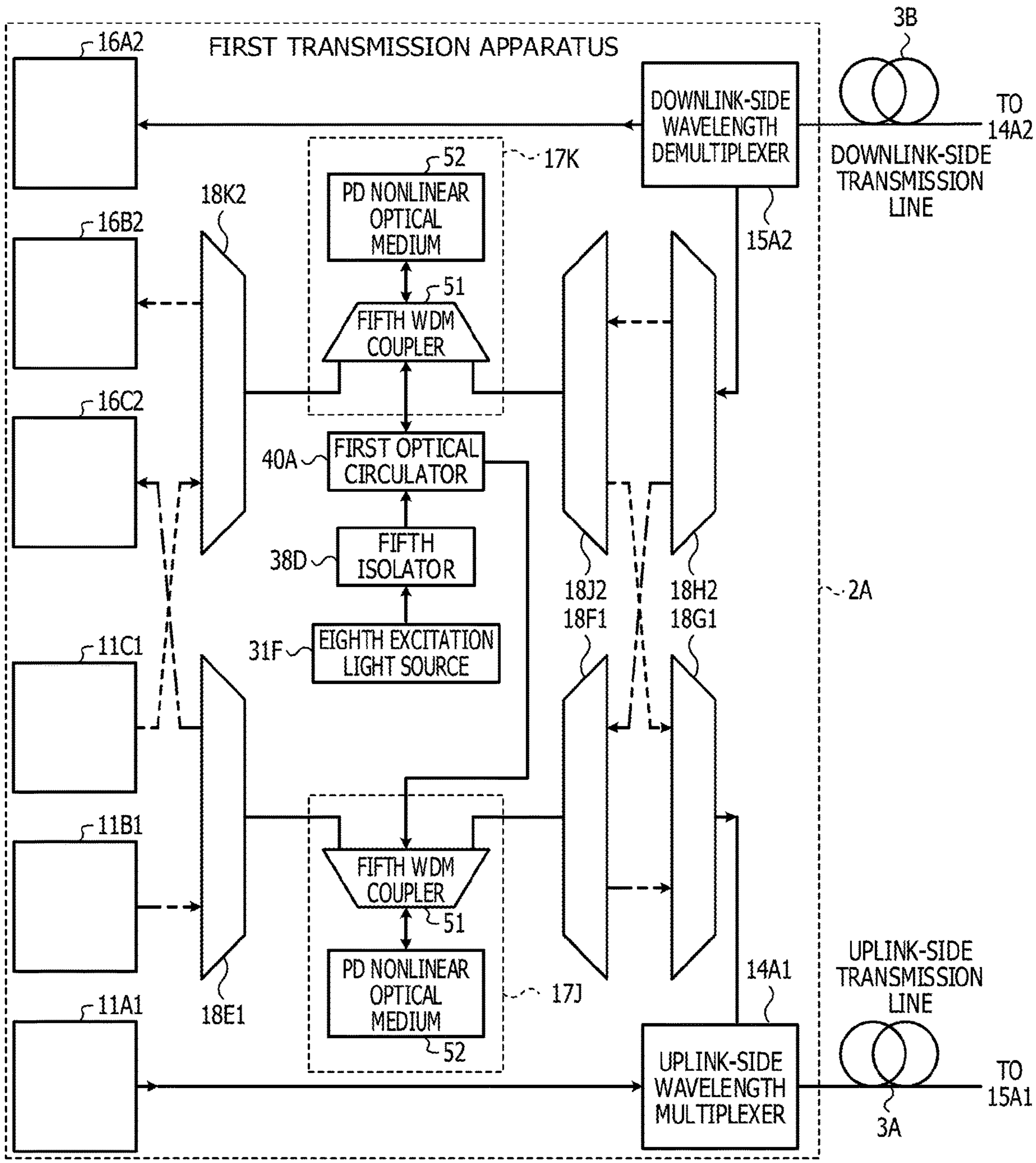
FIGS. 19A and 19B are explanatory diagrams illustrating an example of a transmission system of an example 15.
Figure 19B:
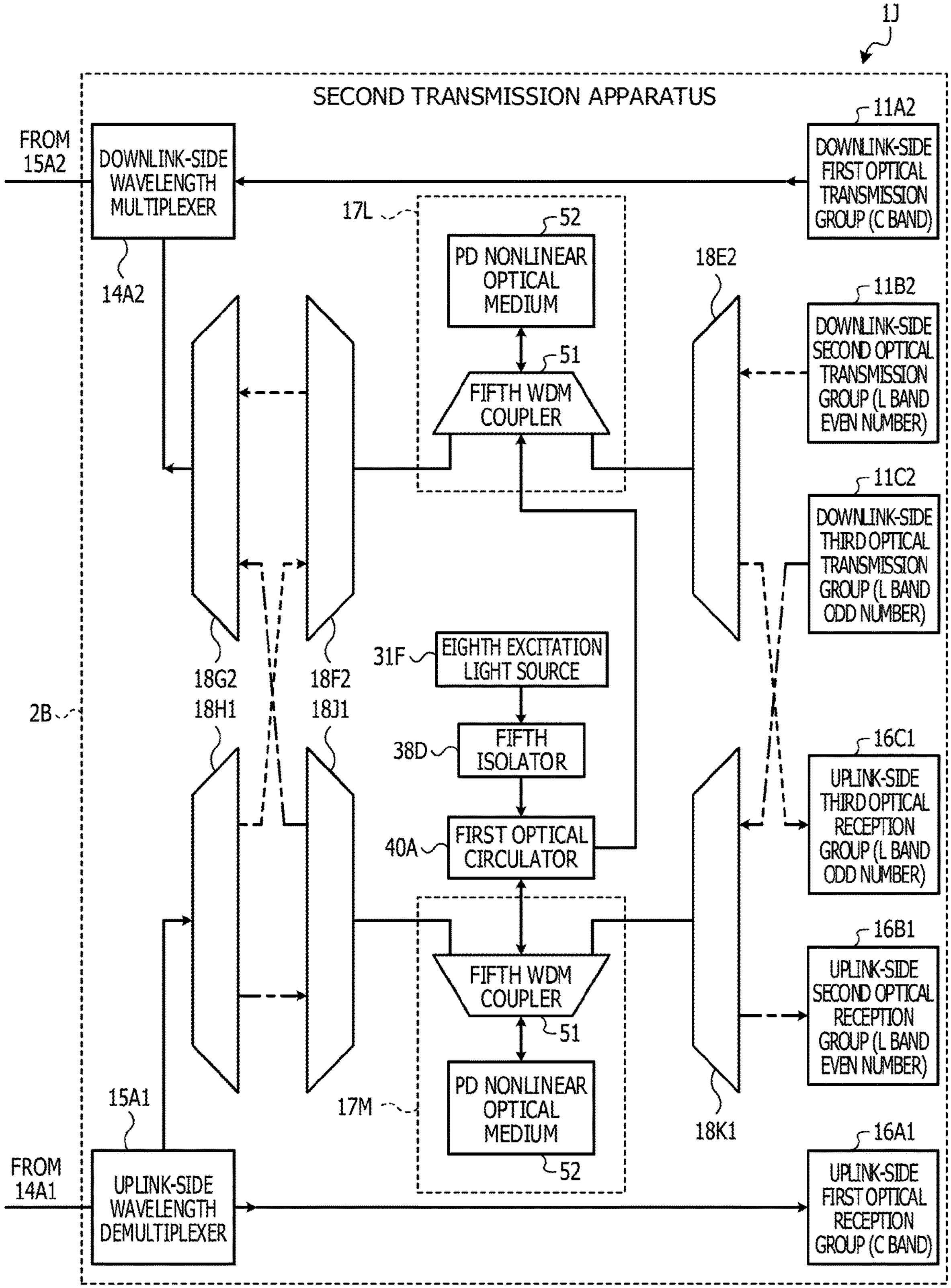

FIG. 19 is an explanatory diagram illustrating an example of a transmission system 13 of the example 15. The identical symbols are assigned to a configuration identical to the transmission system 1H of the example 14, and thus description of the overlapping configurations and operations is omitted.

The twentieth wavelength converter 17K includes the PD nonlinear optical medium 52, the fifth WDM coupler 51, a first optical circulator 40A, a fifth isolator 38D, and an eighth excitation light source 31F. The fifth WDM coupler 51 connects to the PD nonlinear optical medium 52, connects to the downlink-side twentieth interleaver 18K2, and connects to the downlink-side nineteenth interleaver 18J2.

The nineteenth wavelength converter 173 includes the PD nonlinear optical medium 52 and the fifth WDM coupler 51. The fifth WDM coupler 51 connects to the PD nonlinear optical medium 52, connects to the uplink-side fifteenth interleaver 18E1, and connects to the uplink-side sixteenth interleaver 18F1.

The fifth WDM coupler 51 in the twentieth wavelength converter 17K connects to the first optical circulator 40A, connects the fifth isolator 38D to the first optical circulator 40A, and connects the fifth isolator 38D to the eighth excitation light source 31F. The fifth WDM coupler 51 in the nineteenth wavelength converter 173 connects to the first optical circulator 40A. The eighth excitation light source 31F supplies the excitation light to the fifth WDM coupler 51 in the twentieth wavelength converter 17K by way of the first optical circulator 40A. Furthermore, the first optical circulator 40A supplies the remaining excitation light used in the PD nonlinear optical medium 52 in the twentieth wavelength converter 17K and the fifth WDM coupler 51 to the fifth WDM coupler 51 in the nineteenth wavelength converter 17J.

the twenty-second wavelength converter 17M includes the PD nonlinear optical medium 52, the fifth WDM coupler 51, the first optical circulator 40A, the fifth isolator 38D, and the eighth excitation light source 31F. The fifth WDM coupler 51 connects to the PD nonlinear optical medium 52, connects to the uplink-side nineteenth interleaver 18J1, and the uplink-side twentieth interleaver 18K1.

The twenty-first wavelength converter 17L includes the PD nonlinear optical medium 52 and the fifth WDM coupler 51. The fifth WDM coupler 51 connects to the PD nonlinear optical medium 52, connects to the downlink-side fifteenth interleaver 18E2, and connects to the downlink-side sixteenth interleaver 18F2.

The fifth WDM coupler 51 in the twenty-second wavelength converter 17M connects to the first optical circulator 40A, the connects the fifth isolator 38D to the first optical circulator 40A, and connects the eighth excitation light source 31F to the fifth isolator 38D. The fifth WDM coupler 51 in the twenty-first wavelength converter 17L connects to the first optical circulator 40A. The eighth excitation light source 31F supplies the excitation light to the fifth WDM coupler 51 in the twenty-first wavelength converter 17L by way of the first optical circulator 40A. Furthermore, the first optical circulator 40A supplies to the fifth WDM coupler 51 in the twenty-first wavelength converter 17L the remaining excitation light supplied at the PD nonlinear optical medium 52 and the fifth WDM coupler 51 in the twenty-second wavelength converter 17M.

The fifth WDM coupler 51 in the twentieth wavelength converter 17K outputs the excitation light from the eighth excitation light source 31F to the PD nonlinear optical medium 52 by way of the first optical circulator 40A and the fifth isolator 38D. The fifth WDM coupler 51 in the twentieth wavelength converter 17K outputs the uplink-side third multiplex light of the C band of the odd-numbered channels from the downlink-side twentieth interleaver 18K2 to the PD nonlinear optical medium 52. Using the excitation light from the eighth excitation light source 31F, the PD nonlinear optical medium 52 wavelength-converts the uplink-side third multiplex light of the C band of the odd-numbered channels into the uplink-side third multiplex light of the L band of the odd-numbered channels and outputs to the fifth WDM coupler 51. The fifth WDM coupler 51 outputs the uplink-side third multiplex light of the C band of the odd-numbered channels to the uplink-side seventeenth interleaver 18G1 by way of the downlink-side nineteenth interleaver 18J2.

Furthermore, the fifth WDM coupler 51 in the twentieth wavelength converter 17K outputs to the PD nonlinear optical medium 52 the downlink-side second multiplex light of the L band of the even-numbered channels inputted from the downlink-side nineteenth interleaver 18J2. Using the excitation light from the eighth excitation light source 31F, the PD nonlinear optical medium 52 wavelength-converts the downlink-side second multiplex light of the L band of the even-numbered channels into the downlink-side second multiplex light of the C band of the even-numbered channels and outputs to the fifth WDM coupler 51. The fifth WDM coupler 51 outputs the downlink-side second multiplex light of the C band of the even-numbered channels to the downlink-side second optical reception group 16B2 by way of the downlink-side twentieth interleaver 18K2.

The fifth WDM coupler 51 in the nineteenth wavelength converter 17J outputs to the PD nonlinear optical medium 52 the remaining excitation light of the twentieth wavelength converter 17K by way of the first optical circulator 40A in the twentieth wavelength converter 17K. The fifth WDM coupler 51 in the nineteenth wavelength converter 17J outputs the uplink-side second multiplex light of the C band of the even-numbered channels from the uplink-side fifteenth interleaver 18E1 to the PD nonlinear optical medium 52. Using the remaining excitation light, the PD nonlinear optical medium 52 wavelength-converts the uplink-side second multiplex light of the C band of the even-numbered channels into the uplink-side second multiplex light of the L band of the even-numbered channels and outputs to the fifth WDM coupler 51. The fifth WDM coupler 51 outputs the uplink-side second multiplex light of the L band of the even-numbered channels to the uplink-side seventeenth interleaver 18G1 by way of the uplink-side sixteenth interleaver 18F1.

Furthermore, the fifth WDM coupler 51 in the nineteenth wavelength converter 173 outputs to the PD nonlinear optical medium 52 the downlink-side third multiplex light of the L band of the odd-numbered channels inputted from the uplink-side sixteenth interleaver 18F1. Using the remaining excitation light from the first optical circulator 40A, the PD nonlinear optical medium 52 wavelength-converts the downlink-side third multiplex light of the L band of the odd-numbered channels into the downlink-side third multiplex light of the C band of the odd-numbered channels and outputs to the fifth WDM coupler 51. The fifth WDM coupler 51 outputs the downlink-side third multiplex light of the C band of the odd-numbered channels to the downlink-side third optical reception group 16C2 by way of the uplink-side fifteenth interleaver 18E1.

The fifth WDM coupler 51 in the twenty-second wavelength converter 17M outputs the excitation light from the eighth excitation light source 31F to the PD nonlinear optical medium 52 by way of the first optical circulator 40A and the fifth isolator 38D. The fifth WDM coupler 51 in the twenty-second wavelength converter 17M outputs to the PD nonlinear optical medium 52 the uplink-side second multiplex light of the L band of the even-numbered channels from the uplink-side nineteenth interleaver 18J1. Using the excitation light from the eighth excitation light source 31F, the PD nonlinear optical medium 52 wavelength-converts the uplink-side second multiplex light of the L band of the even-numbered channels into the uplink-side second multiplex light of the C band of the even-numbered channels and outputs to the fifth WDM coupler 51. The fifth WDM coupler 51 outputs the uplink-side second multiplex light of the L band of the even-numbered channels to the uplink-side second optical reception group 16B1 by way of the uplink-side twentieth interleaver 18K1.

Furthermore, the fifth WDM coupler 51 in the twenty-second wavelength converter 17M outputs to the PD non-linear optical medium 52 the downlink-side third multiplex light of the C band of the odd-numbered channels inputted from the uplink-side twentieth interleaver 18K1. Then, using the excitation light from the eighth excitation light source 31F, the PD nonlinear optical medium 52 wavelength-converts the downlink-side third multiplex light of the C band of the odd-numbered channels into the downlink-side third multiplex light of the L band of the odd-numbered channels and outputs to the fifth WDM coupler 51. The fifth WDM coupler 51 outputs the downlink-side third multiplex light of the L band of the odd-numbered channels to the downlink-side seventeenth interleaver 18G2 by way of the uplink-side nineteenth interleaver 1831.

The fifth WDM coupler 51 in the twenty-first wavelength converter 17L outputs to the PD nonlinear optical medium 52 the remaining excitation light used in the twenty-second wavelength converter 17M by way of the first optical circulator 40A in the twenty-second wavelength converter 17M. The fifth WDM coupler 51 in the twenty-first wavelength converter 17L outputs the downlink-side second multiplex light of the C band of the even-numbered channels from the downlink-side fifteenth interleaver 18E2 to the PD nonlinear optical medium 52. Using the remaining excitation light from the first optical circulator 40A, the PD nonlinear optical medium 52 wavelength-converts the downlink-side second multiplex light of the C band of the even-numbered channels into the downlink-side second multiplex light of the L band of the even-numbered channels and outputs to the fifth WDM coupler 51. The fifth WDM coupler 51 outputs the downlink-side second multiplex light of the L band of the even-numbered channels to the downlink-side seventeenth interleaver 18G2 by way of the downlink-side sixteenth interleaver 18F2.

Furthermore, the fifth WDM coupler 51 in the twenty-first wavelength converter 17L outputs to the PD nonlinear optical medium 52 the uplink-side third multiplex light of the L band of the odd-numbered channels inputted from the downlink-side sixteenth interleaver 18F2. Using the remaining excitation light from the first optical circulator 40A, the PD nonlinear optical medium 52 wavelength-converts the uplink-side third multiplex light of the L band of the odd-numbered channels into the uplink-side third multiplex light of the C band of the odd-numbered channels and outputs to the fifth WDM coupler 51. The fifth WDM coupler 51 outputs the uplink-side third multiplex light of the C band of the odd-numbered channels to the uplink-side third optical reception group 16C1 by way of the downlink-side fifteenth interleaver 18E2.

The nineteenth wavelength converter 17J in the first transmission apparatus 2A of the example 15 wavelength-converts the uplink-side second multiplex light and the downlink-side third multiplex light, using the remaining excitation light of the twentieth wavelength converter 17K by way of the first optical circulator 40A. As a result, the first transmission apparatus 2A combines the excitation light sources into one, and thus may reduce the number of the excitation light sources.

The twenty-first wavelength converter 17L in the second transmission apparatus 2B wavelength-converts the uplink-side third multiplex light and the downlink-side second multiplex light, using the remaining excitation light of the twenty-second wavelength converter 17M by way of the first optical circulator 40A. As a result, the second transmission apparatus 2B may combine the excitation light sources into one, and thus may reduce the number of the excitation light sources.

In the first transmission apparatus 2A in the transmission system 1J illustrated in FIG. 19, the eighth excitation light source 31F in the twentieth wavelength converter 17K is shared by the nineteenth wavelength converter 17J and the twentieth wavelength converter 17K. However, the transmission apparatus is not limited to this, an embodiment of which is described below as an example 16.

Example 16

Figure 20A:
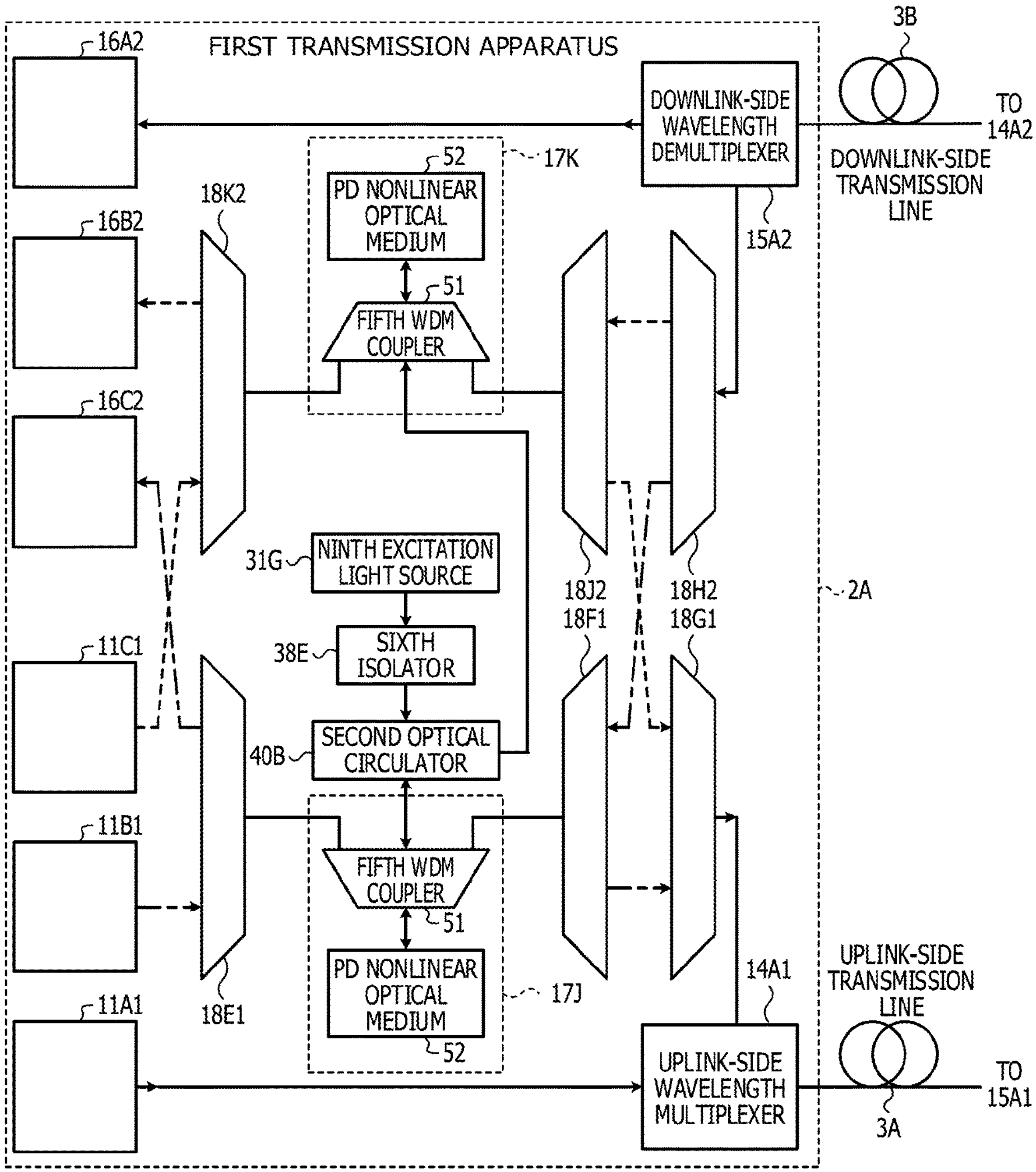
FIGS. 20A and 20B are explanatory diagrams illustrating an example of a transmission system of an example 16.
Figure 20B:
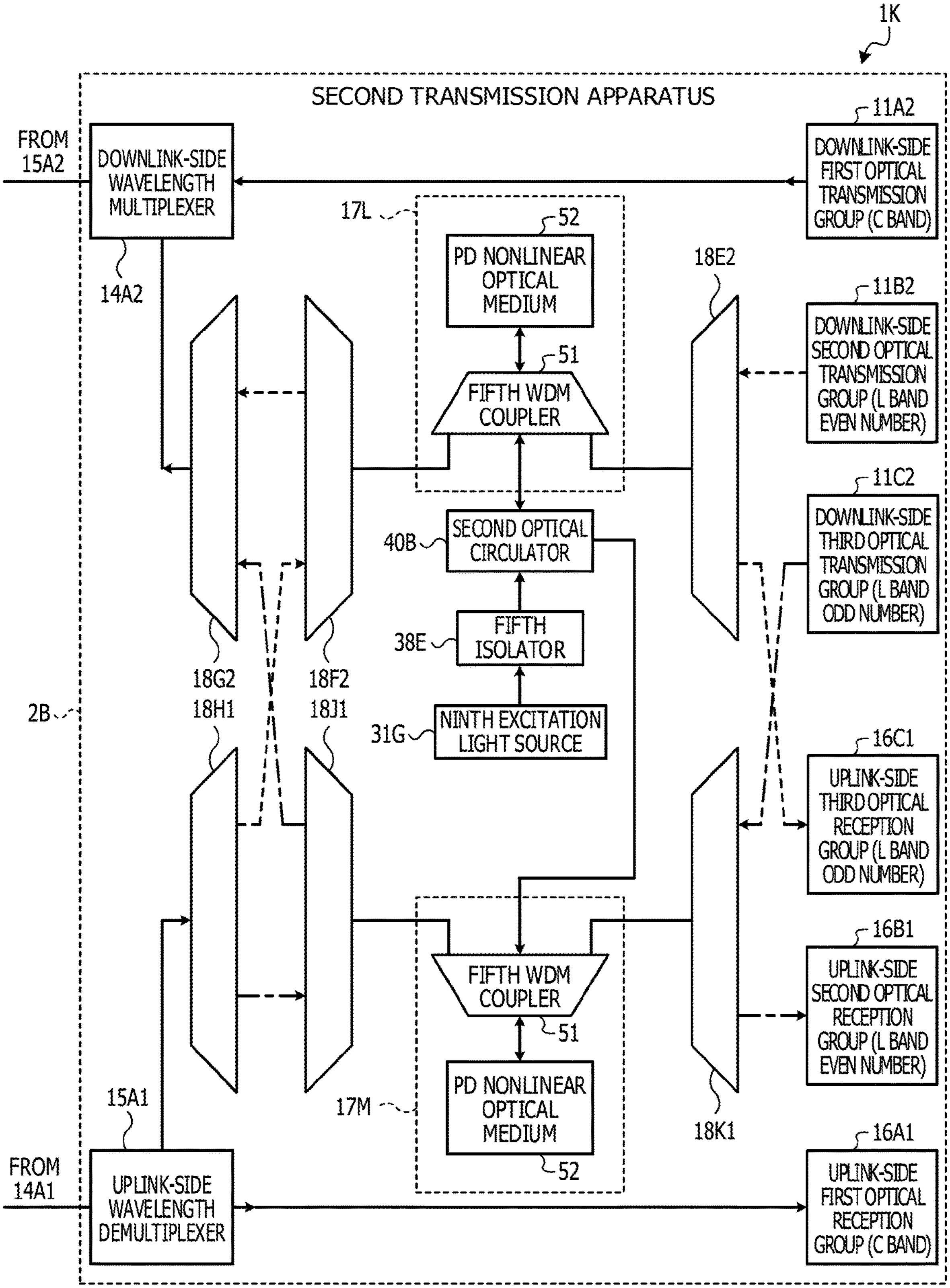

FIG. 20 is an explanatory diagram illustrating an example of a transmission system 1K of the example 16. The identical symbols are assigned to a configuration identical to the transmission system 1H illustrated in FIG. 18, and thus description of the overlapping configurations and operations is omitted.

The nineteenth wavelength converter 17J in the first transmission apparatus 2A includes the PD nonlinear optical medium 52, the fifth WDM coupler 51, a second optical circulator 40B, a sixth isolator 38E, and a ninth excitation light source 31G. The fifth WDM coupler 51 connects to the PD nonlinear optical medium 52, connects to the uplink-side fifteenth interleaver 18E1, and connects to the uplink-side sixteenth interleaver 18F1.

The twentieth wavelength converter 17K in the first transmission apparatus 2A includes the PD nonlinear optical medium 52 and the fifth WDM coupler 51. The fifth WDM coupler 51 connects to the PD nonlinear optical medium 52, connects to the downlink-side nineteenth interleaver 18J2, and connects to the downlink-side twentieth interleaver 18K2.

The first transmission apparatus 2A connects the second optical circulator 40B to the fifth WDM coupler 51 in the nineteenth wavelength converter 17J, connects the sixth isolator 38E to the second optical circulator 40B, and connects the ninth excitation light source 31G to the sixth isolator 38E. The first transmission apparatus 2A connects the second optical circulator 40B to the fifth WDM coupler 51 in the twentieth wavelength converter 17K. The ninth excitation light source 31G supplies the excitation light to the fifth WDM coupler 51 in the nineteenth wavelength converter 17J by way of the second optical circulator 40B. Furthermore, the second optical circulator 40B supplies the remaining excitation light used in the PD nonlinear optical medium 52 in the nineteenth wavelength converter 17J and the fifth WDM coupler 51 to the fifth WDM coupler 51 in the twentieth wavelength converter 17K.

The twenty-first wavelength converter 17L in the second transmission apparatus 2B includes the PD nonlinear optical medium 52, the fifth WDM coupler 51, the second optical circulator 40B, the sixth isolator 38E, and the ninth excitation light source 31G. The fifth WDM coupler 51 connects to the PD nonlinear optical medium 52, connects to the downlink-side fifteenth interleaver 18E2, and connects to the downlink-side sixteenth interleaver 18F2.

The twenty-second wavelength converter 17M in the second transmission apparatus 2B includes the PD nonlinear optical medium 52 and the fifth WDM coupler 51. The fifth WDM coupler 51 connects to the PD nonlinear optical medium 52, connects to the uplink-side nineteenth interleaver 18J1, and connects to the uplink-side twentieth interleaver 18K1.

The second transmission apparatus 2B connects the second optical circulator 40B to the fifth WDM coupler 51 in the twenty-first wavelength converter 17L, connects the sixth isolator 38E to the second optical circulator 40B, and connects the ninth excitation light source 31G to the sixth isolator 38E. The second transmission apparatus 2B connects the second optical circulator 40B to the fifth WDM coupler 51 in the twenty-second wavelength converter 17M. The ninth excitation light source 31G supplies the excitation light to the fifth WDM coupler 51 in the twenty-first wavelength converter 17L by way of the second optical circulator 40B. Furthermore, the second optical circulator 40B supplies the remaining excitation light used in the PD nonlinear optical medium 52 in the twenty-first wavelength converter 17L and the fifth WDM coupler 51 to the fifth WDM coupler 51 in the twenty-second wavelength converter 17M.

The fifth WDM coupler 51 in the nineteenth wavelength converter 17J inputs the excitation light from the ninth excitation light source 31G by way of the second optical circulator 40B and the sixth isolator 38E. The fifth WDM coupler 51 in the twentieth wavelength converter 17K connects the to the second optical circulator 40B in the nineteenth wavelength converter 17J and inputs the excitation light from the ninth excitation light source 31G by way of the second optical circulator 40B.

The fifth WDM coupler 51 in the nineteenth wavelength converter 17J outputs to the PD nonlinear optical medium 52 the excitation light and the uplink-side second multiplex light of the C band of the even-numbered channels from the uplink-side fifteenth interleaver 18E1. Using the excitation light from the ninth excitation light source 31G, the PD nonlinear optical medium 52 wavelength-converts the uplink-side second multiplex light of the C band of the even-numbered channels into the uplink-side second multiplex light of the L band of the even-numbered channels and outputs to the fifth WDM coupler 51. The fifth WDM coupler 51 outputs the uplink-side second multiplex light of the L band of the even-numbered channels to the uplink-side seventeenth interleaver 18G1 by way of the uplink-side sixteenth interleaver 18F1.

Furthermore the fifth WDM coupler 51 in the nineteenth wavelength converter 17J outputs to the PD nonlinear optical medium 52 the excitation light and the downlink-side third multiplex light of the L band of the odd-numbered channels inputted from the uplink-side sixteenth interleaver 18F1. Using the excitation light from the ninth excitation light source 31G, the PD nonlinear optical medium 52 wavelength-converts the downlink-side third multiplex light of the L band of the odd-numbered channels into the downlink-side third multiplex light of the C band of the odd-numbered channels and outputs to the fifth WDM coupler 51. The fifth WDM coupler 51 outputs the downlink-side third multiplex light of the C band of the odd-numbered channels to the downlink-side third optical reception group 16C2 by way of the uplink-side fifteenth interleaver 18E1.

The fifth WDM coupler 51 in the twentieth wavelength converter 17K outputs to the PD nonlinear optical medium 52 the remaining excitation light from the second optical circulator 40B and the uplink-side third multiplex light of the C band of the odd-numbered channels from the downlink-side twentieth interleaver 18K2. Using the remaining excitation light from the second optical circulator 40B, the PD nonlinear optical medium 52 wavelength-converts uplink-side third multiplex light of the C band of the odd-numbered channels into the uplink-side third multiplex light of the L band of the odd-numbered channels and outputs to the fifth WDM coupler 51. The fifth WDM coupler 51 outputs the uplink-side third multiplex light of the L band of the odd-numbered channels to the uplink-side seventeenth interleaver 18G1 by way of the downlink-side nineteenth interleaver 18J2.

Furthermore, the fifth WDM coupler 51 in the twentieth wavelength converter 17K outputs to the PD nonlinear optical medium 52 the remaining excitation light from the second optical circulator 40B and the downlink-side second multiplex light of the L band of the even-numbered channels inputted from the downlink-side nineteenth interleaver 18J2. Then, Using the remaining excitation light from the second optical circulator 40B, the PD nonlinear optical medium 52 wavelength-converts the downlink-side second multiplex light of the L band of the even-numbered channels into the downlink-side second multiplex light of the C band of the even-numbered channels and outputs to the fifth WDM coupler 51. The fifth WDM coupler 51 outputs the downlink-side second multiplex light of the C band of the even-numbered channels to the downlink-side second optical reception group 16B2 by way of the downlink-side twentieth interleaver 18K2.

The fifth WDM coupler 51 in the twenty-first wavelength converter 17L inputs the excitation light from the ninth excitation light source 31G by way of the second optical circulator 40B and the sixth isolator 38E. The fifth WDM coupler 51 in the twenty-first wavelength converter 17L outputs to the PD nonlinear optical medium 52 the excitation light and the downlink-side second multiplex light of the C band of the even-numbered channels from the downlink-side fifteenth interleaver 18E2. Using the excitation light from the ninth excitation light source 31G, the PD nonlinear optical medium 52 wavelength-converts the downlink-side second multiplex light of the C band of the even-numbered channels into the downlink-side second multiplex light of the L band of the even-numbered channels and outputs to the fifth WDM coupler 51. The fifth WDM coupler 51 outputs the downlink-side second multiplex light of the L band of the even-numbered channels to the downlink-side seventeenth interleaver 18G2 by way of the downlink-side sixteenth interleaver 18F2.

Furthermore, the fifth WDM coupler 51 in the twenty-first wavelength converter 17L outputs to the PD nonlinear optical medium 52 the excitation light and the uplink-side third multiplex light of the L band of the odd-numbered channels from the downlink-side sixteenth interleaver 18F2. Then, using the excitation light from the ninth excitation light source 31G, the PD nonlinear optical medium 52 wavelength-converts the uplink-side third multiplex light of the L band of the odd-numbered channels into the uplink-side third multiplex light of the C band of the odd-numbered channels and outputs to the fifth WDM coupler 51. The fifth WDM coupler 51 outputs the uplink-side third multiplex light of the C band of the odd-numbered channels to the uplink-side third optical reception group 16C1 by way of the downlink-side fifteenth interleaver 18E2.

The fifth WDM coupler 51 in the twenty-second wavelength converter 17M connects to the second optical circulator 40B in the twenty-first wavelength converter 17L and inputs the remaining excitation light from the second optical circulator 40B. The fifth WDM coupler 51 in the twenty-second wavelength converter 17M outputs to the PD nonlinear optical medium 52 the remaining excitation light used in the twenty-first wavelength converter 17L and the downlink-side third multiplex light of the C band of the odd-numbered channels from the uplink-side twentieth interleaver 18K1. Using the remaining excitation light from the second optical circulator 40B, the PD nonlinear optical medium 52 wavelength-converts the downlink-side third multiplex light of the C band of the odd-numbered channels into the downlink-side third multiplex light of the L band of the odd-numbered channels and outputs to the fifth WDM coupler 51. The fifth WDM coupler 51 outputs the downlink-side third multiplex light of the L band of the odd-numbered channels to the downlink-side seventeenth interleaver 18G2 by way of the uplink-side nineteenth interleaver 1831.

Furthermore, the fifth WDM coupler 51 in the twenty-second wavelength converter 17M outputs to the PD nonlinear optical medium 52 the remaining excitation light used in the twenty-first wavelength converter 17L and the uplink-side second multiplex light of the L band of the even-numbered channels inputted from the uplink-side nineteenth interleaver 18J1. Then, using the remaining excitation light from the second optical circulator 40B, the PD nonlinear optical medium 52 wavelength-converts the uplink-side second multiplex light of the L band of the even-numbered channels into the uplink-side second multiplex light of the C band of the even-numbered channels and outputs to the fifth WDM coupler 51. The fifth WDM coupler 51 outputs the uplink-side second multiplex light of the C band of the even-numbered channels to the uplink-side second optical reception group 16B1 by way of the uplink-side twentieth interleaver 18K1.

The twentieth wavelength converter 17K in the first transmission apparatus 2A of the example 16 wavelength-converts the uplink-side third multiplex light and the downlink-side second multiplex light, using the remaining excitation light of the nineteenth wavelength converter 17J by way of the second optical circulator 40B. As a result, it is possible to combine the excitation light sources in the first transmission apparatus 2A into one and to reduce the number of the excitation light sources.

The twenty-second wavelength converter 17M in the second transmission apparatus 2B wavelength-converts the uplink-side second multiplex light and the downlink-side third multiplex light, using the remaining excitation light of the twenty-first wavelength converter 17L by way of the second optical circulator 40B. As a result, it is possible to combine the excitation light sources in the second transmission apparatus 2B into one and to reduce the number of the excitation light sources.

Example 17

Next, an embodiment of an example of the PD nonlinear optical medium 52 in the wavelength converter 17 illustrated in FIGS. 18 to 20 is described below as an example 17. FIG. 21 is an explanatory diagram illustrating an example of the PD nonlinear optical medium 52 of the example 17. The identical symbols are assigned to a configuration identical to the transmission system 1H illustrated in FIG. 18, and thus description of the overlapping configurations and operations is omitted.

The PD nonlinear optical medium 52 illustrated in FIG. 21 connects to the fifth WDM coupler 51 and includes a seventh polarization controller 41G, a polarization beam splitter 42E, an eighth polarization controller 41H, and a bidirectional nonlinear optical medium 43H.

The seventh polarization controller 41G inputs the excitation light and the second multiplex light from the fifth WDM coupler 51 and polarization-controls the second and third multiplex light and the excitation light. That is, the seventh polarization controller 41G outputs to the polarization beam splitter 42E the second and third multiplex light and the excitation light of the horizontal polarization and the vertical polarization after the polarization control. The polarization beam splitter 42E outputs the second and third multiplex light and the excitation light of the horizontal polarization to the eighth polarization controller 41H. The eighth polarization controller 41H polarization-controls the second and third multiplex light and the excitation light of the horizontal polarization to the second and third multiplex light and the excitation light of the vertical polarization and outputs the second and third multiplex light and the excitation light of the vertical polarization to the forward port X of the bidirectional nonlinear optical medium 43H. The polarization beam splitter 42E outputs the second and third multiplex light and the excitation light of the vertical polarization from the seventh polarization controller 41G to the backward port Y of the bidirectional nonlinear optical medium 43H.

Using the excitation light, the bidirectional nonlinear optical medium 43H wavelength-converts the second and third multiplex light of the vertical polarization inputted from the forward port X and outputs to a polarization beam splitter 42E the second and third multiplex light of the vertical polarization after the wavelength conversion. Using the excitation light, the bidirectional nonlinear optical medium 43H wavelength-converts the second and third multiplex light of the vertical polarization inputted from the backward port Y and outputs to the eighth polarization controller 41H the second and third multiplex light of the vertical polarization after the wavelength conversion. Then, the eighth polarization controller 41H polarization-controls the second and third multiplex light of the vertical polarization from the bidirectional nonlinear optical medium 43H to the second and third multiplex light of the horizontal polarization and outputs to the polarization beam splitter 42E the second and third multiplex light of the horizontal polarization after the polarization control.

The polarization beam splitter 42E combines the second and third multiplex light of the horizontal polarization from the eighth polarization controller 41H with the second and third multiplex light of the vertical polarization from the bidirectional nonlinear optical medium 43H to output the second and third multiplex light to the fifth WDM coupler 51.

Using the excitation light, the PD nonlinear optical medium 52 of the nineteenth wavelength converter 17J wavelength-converts the uplink-side second multiplex light of the C band of the even-numbered channels into the uplink-side second multiplex light of the L band of the even-numbered channels. Then, the nineteenth wavelength converter 17J outputs to the fifth WDM coupler 51 the uplink-side second multiplex light of the L band of the even-numbered channels after the wavelength conversion. Using the excitation light, the PD nonlinear optical medium 52 in the nineteenth wavelength converter 17J wavelength-converts the downlink-side third multiplex light of the L band of the odd-numbered channel into the downlink-side third multiplex light of the C band of the odd-numbered channels. The nineteenth wavelength converter 17J outputs to the fifth WDM coupler 51 the downlink-side third multiplex light of the C band of the odd-numbered channels after the wavelength conversion.

For the purpose of illustration, although the PD nonlinear optical medium 52 of the nineteenth wavelength converter 17J is illustratively described, the twentieth wavelength converter 17K, the twenty-first wavelength converter 17L, and the twenty-second wavelength converter 17M are also similar.

Using the excitation light, the PD nonlinear optical medium 52 of the twentieth wavelength converter 17K wavelength-converts the downlink-side second multiplex light of the L band of the even-numbered channels into the downlink-side second multiplex light of the C band of the even-numbered channels. The twentieth wavelength converter 17K outputs to the fifth WDM coupler 51 the downlink-side second multiplex light of the C band of the even-numbered channels after the wavelength conversion. Using the excitation light, the PD nonlinear optical medium 52 of the twentieth wavelength converter 17K wavelength-converts the uplink-side third multiplex light of the C band of the odd-numbered channels into the uplink-side third multiplex light of the L band of the odd-numbered channels. Then, the twentieth wavelength converter 17K outputs to the fifth WDM coupler 51 the uplink-side third multiplex light of the L band of the odd-numbered channels after the wavelength conversion.

Using the excitation light, the PD nonlinear optical medium 52 of the twenty-first wavelength converter 17L wavelength-converts the uplink-side third multiplex light of the L band of the odd-numbered channels into the uplink-side third multiplex light of the C band of the odd-numbered channels. Then, the twenty-first wavelength converter 17L outputs to the fifth WDM coupler 51 the uplink-side third multiplex light of the C band of the odd-numbered channels after wavelength conversion. Using the excitation light, the PD nonlinear optical medium 52 of the twenty-first wavelength converter 17L wavelength-converts the downlink-side second multiplex light of the C band of the even-numbered channels into the downlink-side second multiplex light of the L band of the even-numbered channels. Then, twenty-first wavelength converter 17L outputs to the fifth WDM coupler 51 the downlink-side second multiplex light of the L band of the even-numbered channels after the wavelength conversion.

Using the excitation light, the PD nonlinear optical medium 52 of the twenty-second wavelength converter 17M wavelength-converts the uplink-side second multiplex light of the L band of the even-numbered channels into the uplink-side second multiplex light of the C band of the even-numbered channels. Then, the twenty-second wavelength converter 17M outputs to the fifth WDM coupler 51 the uplink-side second multiplex light of the C band of the even-numbered channels after the wavelength conversion. Using the excitation light, the PD nonlinear optical medium 52 of the twenty-second wavelength converter 17M wavelength-converts the downlink-side third multiplex light of the C band of the odd-numbered channels into the downlink-side third multiplex light of the L band of the odd-numbered channels. Then, the twenty-second wavelength converter 17M outputs to the fifth WDM coupler 51 the downlink-side third multiplex light of the L band of the odd-numbered channels after the wavelength conversion.

The nineteenth wavelength converter 17J and the twentieth wavelength converter 17K of the first transmission apparatus 2A of the example 17 may wavelength-convert the uplink and downlink second and third multiplex light, using the fifth WDM coupler 51. The twenty-first wavelength converter 17L and the twenty-second wavelength converter 17M in the second transmission apparatus 2B may wavelength-convert the uplink and downlink second and third multiplex light, using the fifth WDM coupler 51.

Example 18

Figure 22A:
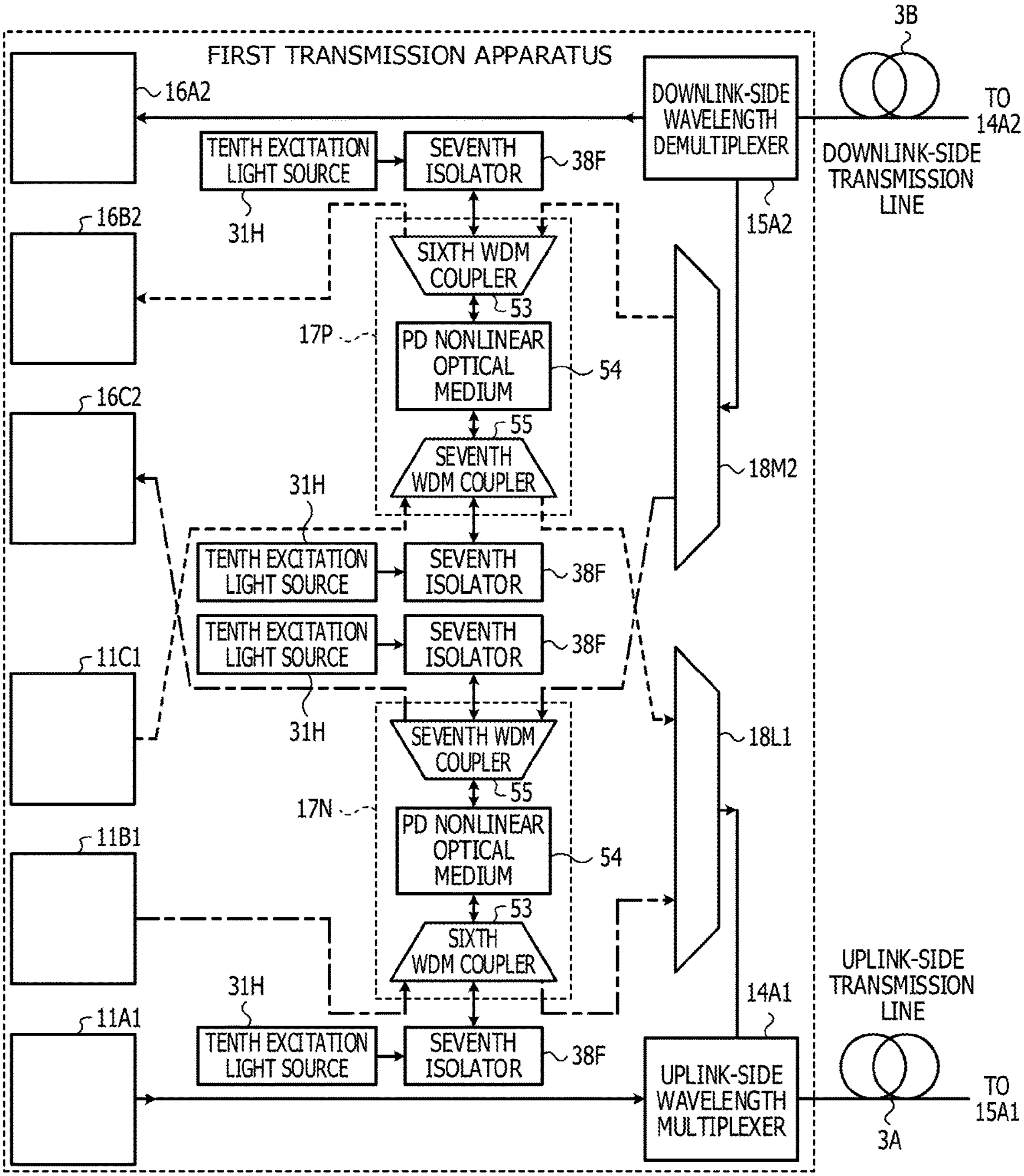
FIGS. 22A and 22B are explanatory diagrams illustrating an example of a transmission system of an example 18.
Figure 22B:
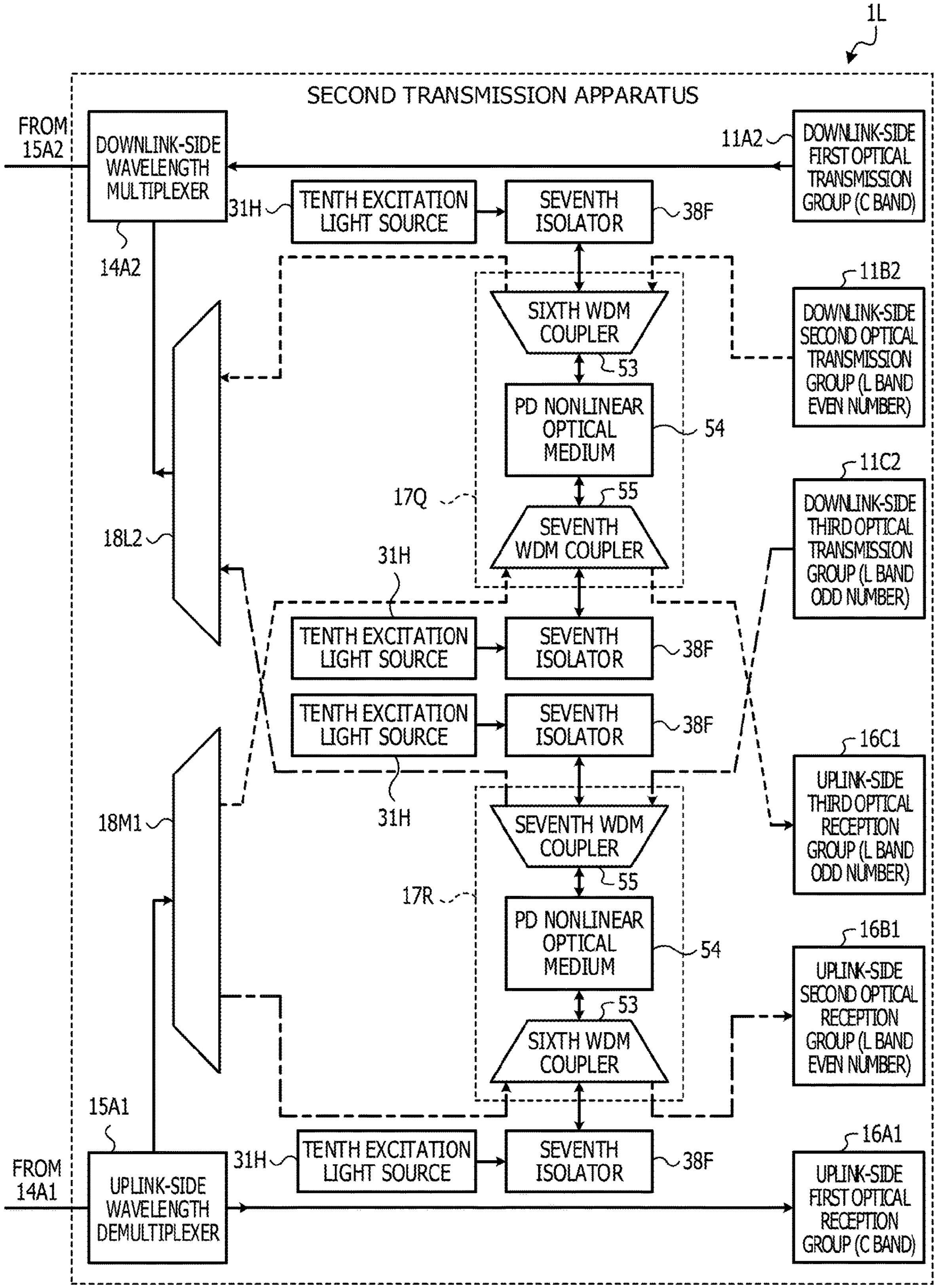

FIG. 22 is an explanatory diagram illustrating an example of a transmission system 1L of an example 18. The identical symbols are assigned to a configuration identical to the transmission system 1H illustrated in FIG. 18, and thus description of the overlapping configurations and operations is omitted.

The first transmission apparatus 2A illustrated in FIG. 22 includes the uplink-side third optical transmission group 11C1, the uplink-side second optical transmission group 11B1, the uplink-side first optical transmission group 11A1, the downlink-side third optical reception group 16C2, the downlink-side second optical reception group 16B2, and the downlink-side first optical reception group 16A2. Furthermore, the first transmission apparatus 2A includes the uplink-side wavelength multiplexer 14A1 and the downlink-side wavelength demultiplexer 15A2. Furthermore, the first transmission apparatus 2A includes a twenty-third wavelength converter 17N, a twenty-fourth wavelength converter 17P, an uplink-side twenty-first interleaver 18L1, and the downlink-side twenty-second interleaver 18M2.

The uplink-side twenty-first interleaver 18L1 connects to a sixth WDM coupler 53 in the twenty-third wavelength converter 17N, connects to a seventh WDM coupler 55 in the twenty-fourth wavelength converter 17P, and connects to the uplink-side wavelength multiplexer 14A1. The downlink-side twenty-second interleaver 18M2 connects to the downlink-side wavelength demultiplexer 15A2, connects to the sixth WDM coupler 53 in the twenty-fourth wavelength converter 17P, and connects to the seventh WDM coupler 55 in the twenty-third wavelength converter 17N.

The twenty-third wavelength converter 17N includes two tenth excitation light sources 31H, two seventh isolator 38F, the sixth WDM coupler 53, a PD nonlinear optical medium 54, and the seventh WDM coupler 55. The twenty-third wavelength converter 17N is a reflection-type wavelength converter including two input and output ends. One of the tenth excitation light source 31H supplies the excitation light to the sixth WDM coupler 53 by way of the seventh isolator 38F. The other tenth excitation light source 31H supplies the excitation light to the seventh WDM coupler 55 by way of the seventh isolator 38F.

The twenty-fourth wavelength converter 17P also includes the two tenth excitation light sources 31H, the two seventh isolators 38F, the sixth WDM coupler 53, the PD nonlinear optical medium 54, the seventh isolator 38F, and the seventh WDM coupler 55. The twenty-fourth wavelength converter 17P is the reflection-type wavelength converter including the two input and output ends. The one of the tenth excitation light source 31H supplies the excitation light to the sixth WDM coupler 53 by way of the seventh isolator 38F. The other tenth excitation light source 31H supplies the excitation light to the seventh WDM coupler 55 by way of the seventh isolator 38F.

The second transmission apparatus 2B includes the uplink-side third optical reception group 16C1, the uplink-side second optical reception group 1661, the uplink-side first optical reception group 16A1, the downlink-side third optical transmission group 11C2, the downlink-side second optical transmission group 1162, and the downlink-side first optical transmission group 11A2. Furthermore, the second transmission apparatus 2B includes the downlink-side wavelength multiplexer 14A2 and the uplink-side wavelength demultiplexer 15A1. Furthermore, the second transmission apparatus 2B includes a twenty-fifth wavelength converter 17Q, a twenty-sixth wavelength converter 17R, an uplink-side twenty-second interleaver 18M1, and a downlink-side twenty-first interleaver 18L2.

The uplink-side twenty-second interleaver 18M1 connects to the uplink-side wavelength demultiplexer 15A1, connects to the seventh WDM coupler 55 in the twenty-fifth wavelength converter 17Q, and connects to the sixth WDM coupler 53 in the twenty-sixth wavelength converter 17R. The downlink-side twenty-first interleaver 18L2 connects to the sixth WDM coupler 53 in the twenty-fifth wavelength converter 17Q, connects to the seventh WDM coupler 55 in the twenty-sixth wavelength converter 17R, and connects to the downlink-side wavelength multiplexer 14A2.

The twenty-fifth wavelength converter 17Q includes the two tenth excitation light sources 31H, the two seventh isolators 38F, the sixth WDM coupler 53, the PD nonlinear optical medium 54, and the seventh WDM coupler 55. The twenty-fifth wavelength converter 17Q is the reflection-type wavelength converter having the two input and output ends. The one of the tenth excitation light source 31H supplies the excitation light to the sixth WDM coupler 53 by way of the seventh isolator 38F. The other tenth excitation light source 31H supplies the excitation light to the seventh WDM coupler 55 by way of the seventh isolator 38F.

The twenty-sixth wavelength converter 17R also includes the two tenth excitation light sources 31H, the two seventh isolators 38F, the sixth WDM coupler 53, the PD nonlinear optical medium 54, and the seventh WDM coupler 55. The twenty-sixth wavelength converter 17R is the reflection-type wavelength converter having the two input and output ends. The one of the tenth excitation light source 31H supplies the excitation light to the sixth WDM coupler 53 by way of the seventh isolator 38F. The other tenth excitation light source 31H supplies the excitation light to the seventh WDM coupler 55 by way of the seventh isolator 38F.

The sixth WDM coupler 53 in the twenty-third wavelength converter 17N outputs to the PD nonlinear optical medium 54 the uplink-side second multiplex light of the C band of the even-numbered channels from the uplink-side second optical transmission group 11B1 and the excitation light from the tenth excitation light source 31H. Using the excitation light, the PD nonlinear optical medium 54 wavelength-converts the uplink-side second multiplex light of the C band of the even-numbered channels into the uplink-side second multiplex light of the L band of the even-numbered channels and outputs the uplink-side second multiplex light of the L band of the even-numbered channels to the uplink-side twenty-first interleaver 18L1.

The seventh WDM coupler 55 in the twenty-third wavelength converter 17N outputs to the PD nonlinear optical medium 54 the downlink-side third multiplex light of the L band of the odd-numbered channels from the downlink-side twenty-second interleaver 18M2 and the excitation light from the tenth excitation light source 31H. Using the excitation light, the PD nonlinear optical medium 54 wavelength-converts the downlink-side third multiplex light of the L band of the odd-numbered channels into the downlink-side third multiplex light of the C band of the odd-numbered channels and outputs the downlink-side third multiplex light of the C band of the odd-numbered channels to the downlink-side third optical reception group 16C2.

The sixth WDM coupler 53 in the twenty-fourth wavelength converter 17P outputs to the PD nonlinear optical medium 54 the downlink-side second multiplex light of the L band of the even-numbered channels from the downlink-side twenty-second interleaver 18M2 and the excitation light from the tenth excitation light source 31H. Using the excitation light, the PD nonlinear optical medium 54 wavelength-converts the downlink-side second multiplex light of the L band of the even-numbered channels into the downlink-side second multiplex light of the C band of the even-numbered channels and outputs the downlink-side second multiplex light of the C band of the even-numbered channels to the downlink-side second optical reception group 16B2.

The seventh WDM coupler 55 in the twenty-fourth wavelength converter 17P outputs to the PD nonlinear optical medium 54 the uplink-side third multiplex light of the C band of the odd-numbered channels from the uplink-side third optical transmission group 11C1 and the excitation light of the tenth excitation light source 31H. Using the excitation light, the PD nonlinear optical medium 54 wavelength-converts the uplink-side third multiplex light of the C band of the odd-numbered channels into the uplink-side third multiplex light of the L band of the odd-numbered channels and outputs the uplink-side third multiplex light of the L band of the odd-numbered channels to the uplink-side twenty-first interleaver 18L1.

The sixth WDM coupler 53 in the twenty-sixth wavelength converter 17R outputs to the PD nonlinear optical medium 54 the uplink-side second multiplex light of the L band of the even-numbered channels from the uplink-side twenty-second interleaver 18M1 and the excitation light from the tenth excitation light source 31H. Using the excitation light, the PD nonlinear optical medium 54 wavelength-converts the uplink-side second multiplex light of the L band of the even-numbered channels into the uplink-side second multiplex light of the C band of the even-numbered channels and outputs the uplink-side second multiplex light of the C band of the even-numbered channels to the uplink-side second optical reception group 16B1.

The seventh WDM coupler 55 in the twenty-sixth wavelength converter 17R outputs to the PD nonlinear optical medium 54 the downlink-side third multiplex light of the C band of the odd-numbered channels from the downlink-side third optical transmission group 11C2 and the excitation light from the tenth excitation light source 31H. Using the excitation light, the PD nonlinear optical medium 54 wavelength-converts the downlink-side third multiplex light of the C band of the odd-numbered channels into the downlink-side third multiplex light of the L band of the odd-numbered channels and outputs the downlink-side third multiplex light of the L band of the odd-numbered channels to the downlink-side twenty-first interleaver 18L2.

The sixth WDM coupler 53 in the twenty-fifth wavelength converter 17Q outputs to the PD nonlinear optical medium 54 the downlink-side second multiplex light of the C band of the even-numbered channels from the downlink-side second optical transmission group 11B2 and the excitation light from the tenth excitation light source 31H. Using the excitation light, the PD nonlinear optical medium 54 wavelength-converts the downlink-side second multiplex light of the C band of the even-numbered channels into the downlink-side second multiplex light of the L band of the even-numbered channels and outputs the downlink-side second multiplex light of the L band of the even-numbered channels to the downlink-side twenty-first interleaver 18L2.

The seventh WDM coupler 55 in the twenty-fifth wavelength converter 17Q outputs to the PD nonlinear optical medium 54 the uplink-side third multiplex light of the L band of the odd-numbered channels from the uplink-side twenty-second interleaver 18M1 and the excitation light from the tenth excitation light source 31H. Using the excitation light, the PD nonlinear optical medium 54 wavelength-converts the uplink-side third multiplex light of the L band of the odd-numbered channels into the uplink-side third multiplex light of the C band of the odd-numbered channels and outputs the uplink-side third multiplex light of the C band of the odd-numbered channels to the uplink-side third optical reception group 16C1.

In the example 18, the input optical power of the WDM signal that is inputted to the wavelength converter in the identical direction is made smaller. That is, the number of wavelengths to be inputted to the identical direction, which is converted by one wavelength converter, is decreased, thereby reducing the nonlinear optical distortions. As a result, it is possible to expand the dynamic range while reducing the deterioration of the signal quality.

The twenty-third wavelength converter 17N in the first transmission apparatus 2A of the example 18 wavelength-converts the uplink-side second multiplex light of the C band of the even-numbered channels into the uplink-side second multiplex light of the L band of the even-numbered channels by way of the sixth WDM coupler 53 the PD nonlinear optical medium 54 the sixth WDM coupler 53. The twenty-third wavelength converter 17N wavelength-converts the downlink-side third multiplex light of the L band of the odd-numbered channels into the uplink-side third multiplex light of the C band of the odd-numbered channels by way of the seventh WDM coupler 55 the PD nonlinear optical medium 54 the seventh WDM coupler 55. Furthermore, the twenty-fourth wavelength converter 17P in the first transmission apparatus 2A wavelength-converts the uplink-side third multiplex light of the C band of the odd-numbered channels into the uplink-side third multiplex light of the L band of the odd-numbered channels by way of the seventh WDM coupler 55 the PD nonlinear optical medium 54 the seventh WDM coupler 55. The twenty-fourth wavelength converter 17P wavelength-converts downlink-side second multiplex light of the L band of the even-numbered channels into the downlink-side second multiplex light of the L band of the even-numbered channels by way of the sixth WDM coupler 53 the PD nonlinear optical medium 54 the sixth WDM coupler 53. As a result, the first transmission apparatus 2A may reduce the number of interleavers as compared to the first transmission apparatus 2A illustrated in FIG. 18. In addition, the twenty-third wavelength converters 17N and the twenty-fourth wavelength converter 17P have different ports for the uplink signal and the downlink signal, thus making it possible to alleviate wavelength cross talk requirement performance of the WDM couplers, as compared with the wavelength converters illustrated in FIG. 6 or FIG. 11. That is, even if the wavelength cross talk of the WDM coupler is large, the signal deterioration is not generated easily.

The twenty-fifth wavelength converter 17Q in the second transmission apparatus 2B wavelength-converts the downlink-side second multiplex light of the C band of the even-numbered channels into the downlink-side second multiplex light of the L band of the even-numbered channels by way of the sixth WDM coupler 53 the PD nonlinear optical medium 54 the sixth WDM coupler 53. The twenty-fifth wavelength converter 17Q wavelength-converts the uplink-side third multiplex light of the L band of the odd-numbered channels into the uplink-side third multiplex light of the C band of the odd-numbered channels by way of the seventh WDM coupler 55 the PD nonlinear optical medium 54 the seventh WDM coupler 55. Furthermore, the twenty-sixth wavelength converter 17R in the second transmission apparatus 2B wavelength-converts the downlink-side third multiplex light of the C band of the odd-numbered channels into the downlink-side third multiplex light of the L band of the odd-numbered channels by way of the seventh WDM coupler 55 the PD nonlinear optical medium 54 the seventh WDM coupler 55. The twenty-sixth wavelength converter 17R wavelength-converts the uplink-side second multiplex light of the L band of the even-numbered channels into the uplink-side second multiplex light of the C band of the even-numbered channels by way of the sixth WDM coupler 53 the PD nonlinear optical medium 54 the sixth WDM coupler 53. As a result, the second transmission apparatus 2B may reduce the number of interleavers, as compared to the second transmission apparatus 2B illustrated in FIG. 18. In addition, the twenty-fifth wavelength converter 17Q and the twenty-sixth wavelength converter 17R have the different ports for the uplink signal and the downlink signal, thus making it possible to alleviate the wavelength cross talk requirement performance of the WDM couplers, as compared with the wavelength converters illustrated in FIG. 6 or FIG. 11. That is, even if the wavelength cross talk of the WDM coupler is large, the signal deterioration is not generated easily.

In the twenty-third to twenty-sixth wavelength converters 17N to 17R illustrated in FIG. 22 are individually disposed the tenth excitation light source 31H for each of the sixth and seventh WDM couplers 53 and 55 in the wavelength converter 17. However, the tenth excitation light source 31H shared by the sixth WDM coupler 53 and the seventh WDM coupler 55 may also be disposed, an embodiment of which is described below as an example 19.

Example 19

Figure 23A:
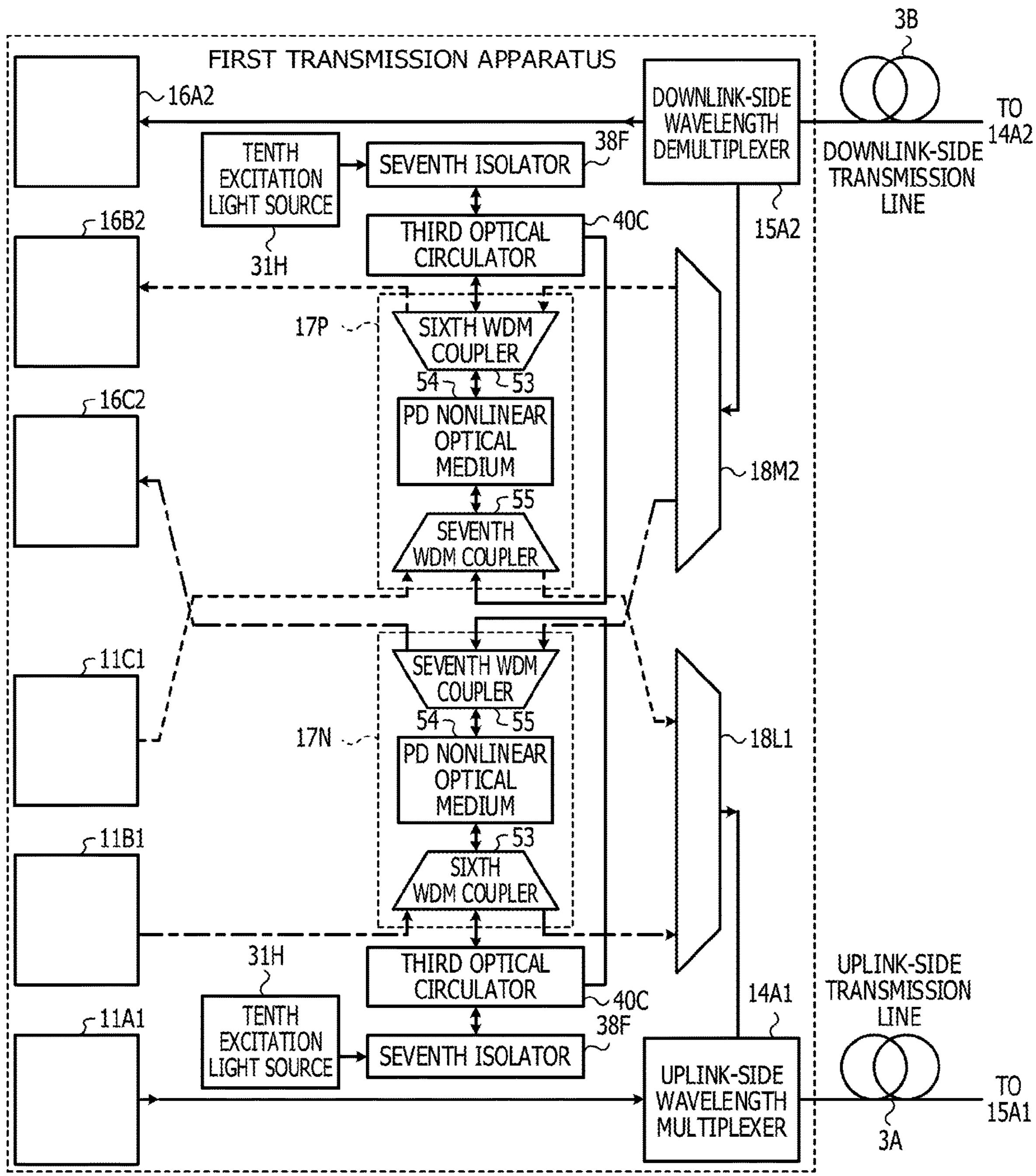
FIGS. 23A and 23B are explanatory diagrams illustrating an example of a transmission system of an example 19.
Figure 23B:
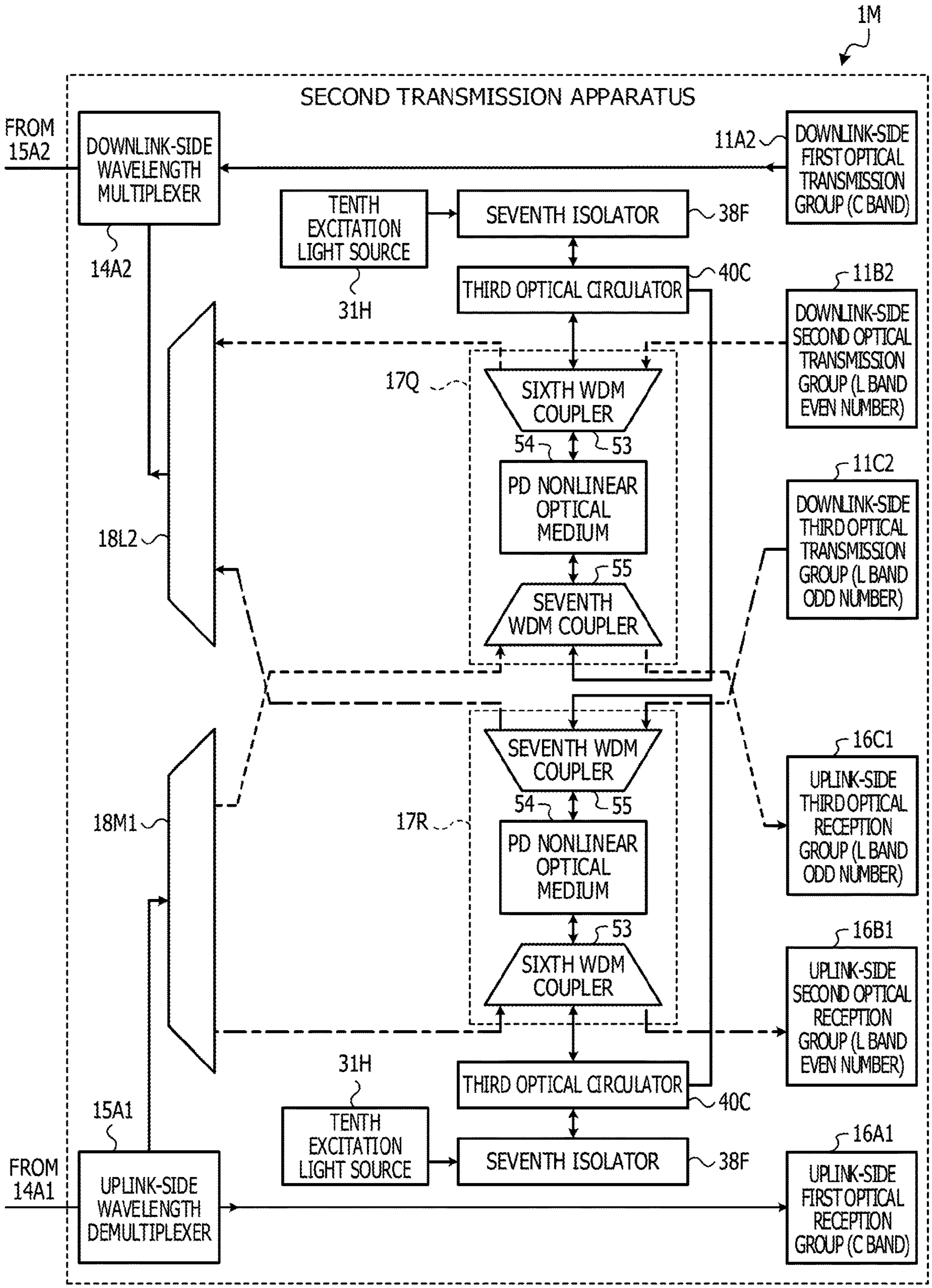

FIG. 23 is an explanatory diagram illustrating an example of a transmission system 1M of the example 19. The identical symbols are assigned to a configuration identical to the transmission system 1L illustrated in FIG. 22, and thus description of the overlapping configurations and operations is omitted.

The twenty-third wavelength converter 17N includes the tenth excitation light source 31H, the seventh isolator 38F, and a third optical circulator 40C, in addition to the sixth WDM coupler 53, the PD nonlinear optical medium 54, and the seventh WDM coupler 55. The tenth excitation light source 31H supplies the excitation light to the third optical circulator 40C by way of the seventh isolator 38F. Furthermore, the third optical circulator 40C connects to the sixth WDM coupler 53 and the seventh WDM coupler 55. The third optical circulator 40C connects to the sixth WDM coupler 53 and supplies to the seventh WDM coupler 55 the remaining excitation light flowing from the sixth WDM coupler 53 the PD nonlinear optical medium 54 the sixth WDM coupler 53. Then, the seventh WDM coupler 55 supplies the remaining excitation light from the third optical circulator 40C to the PD nonlinear optical medium 54.

The sixth WDM coupler 53 in the twenty-third wavelength converter 17N outputs to the PD nonlinear optical medium 54 the uplink-side second multiplex light of the C band of the even-numbered channels from the uplink-side second optical transmission group 11B1 and the excitation light from the tenth excitation light source 31H. Using the excitation light from the tenth excitation light source 31H, the PD nonlinear optical medium 54 wavelength-converts the uplink-side second multiplex light of the C band of the even-numbered channels into the uplink-side second multiplex light of the L band of the even-numbered channels. The PD nonlinear optical medium 54 outputs the uplink-side second multiplex light of the L band of the even-numbered channels to the uplink-side twenty-first interleaver 18L1 by way of the sixth WDM coupler 53.

The seventh WDM coupler 55 in the twenty-third wavelength converter 17N outputs to the PD nonlinear optical medium 54 the downlink-side third multiplexed light of the L band of the odd-numbered channels from the downlink-side twenty-second interleaver 18M2 and the remaining excitation light from the third optical circulator 40C. Using the remaining excitation light from the third optical circulator 40C, the PD nonlinear optical medium 54 wavelength-converts the downlink-side third multiplex light of the L band of the odd-numbered channels into the downlink-side third multiplex light of the C band of the odd-numbered channels. The PD nonlinear optical medium 54 outputs the downlink-side third multiplex light of the C band of the odd-numbered channels to the downlink-side third optical reception group 16C2 by way of the seventh WDM coupler 55.

The twenty-fourth wavelength converter 17P includes the tenth excitation light source 31H, the seventh isolator 38F, and the third optical circulator 40C, in addition to the sixth WDM coupler 53, the PD nonlinear optical medium 54, and the seventh WDM coupler 55. The tenth excitation light source 31H in the twenty-fourth wavelength converter 17P supplies the excitation light to the third optical circulator 40C by way of the seventh isolator 38F. Furthermore, the third optical circulator 40C connects to the sixth WDM coupler 53 and the seventh WDM coupler 55. The third optical circulator 40C connects to the sixth WDM coupler 53 and supplies to the seventh WDM coupler 55 the remaining excitation light flowing from the sixth WDM coupler 53 the PD nonlinear optical medium 54 the sixth WDM coupler 53. Then, the seventh WDM coupler 55 supplies the remaining excitation light from the third optical circulator 40C to the PD nonlinear optical medium 54.

The sixth WDM coupler 53 in the twenty-fourth wavelength converter 17P outputs to the PD nonlinear optical medium 54 the downlink-side second multiplex light of the L band of the even-numbered channels from the downlink-side twenty-second interleaver 18M2 and the excitation light from the tenth excitation light source 31H. Using the excitation light of the tenth excitation light source 31H, the PD nonlinear optical medium 54 wavelength-converts the downlink-side second multiplex light of the L band of the even-numbered channels into the downlink-side second multiplex light of the C band of the even-numbered channels. The PD nonlinear optical medium 54 outputs the downlink-side second multiplex light of the C band of the even-numbered channels to the downlink-side second optical reception group 16B2.

The seventh WDM coupler 55 in the twenty-fourth wavelength converter 17P outputs to the PD nonlinear optical medium 54 the uplink-side third multiplex light of the C band of the odd-numbered channels from the uplink-side third optical transmission group 11C1 and the remaining excitation light from the third optical circulator 40C. Using the remaining excitation light from the third optical circulator 40C, the PD nonlinear optical medium 54 wavelength-converts the uplink-side third multiplex light of the C band of the odd-numbered channels into the uplink-side third multiplex light of the L band of the odd-numbered channels. The PD nonlinear optical medium 54 outputs the uplink-side third multiplex light of the L band of the odd-numbered channels to the uplink-side twenty-first interleaver 18L1.

The twenty-sixth wavelength converter 17R includes the tenth excitation light source 31H, the seventh isolator 38F, and the third optical circulator 40C, in addition to the sixth WDM coupler 53, the PD nonlinear optical medium 54, and the seventh WDM coupler 55. The tenth excitation light source 31H in the twenty-sixth wavelength converter 17R supplies the excitation light to the third optical circulator 40C by way of the seventh isolator 38F. Furthermore, the third optical circulator 40C connects to the sixth WDM coupler 53 and the seventh WDM coupler 55. The third optical circulator 40C connects to the sixth WDM coupler 53 and supplies to the seventh WDM coupler 55 the remaining excitation light flowing from the sixth WDM coupler 53 the PD nonlinear optical medium 54 the sixth WDM coupler 53. Then, the seventh WDM coupler 55 supplies the remaining excitation light from the third optical circulator 40C to the PD nonlinear optical medium 54.

The sixth WDM coupler 53 in the twenty-sixth wavelength converter 17R outputs to the PD nonlinear optical medium 54 the uplink-side second multiplex light of the L band of the even-numbered channels from the uplink-side twenty-second interleaver 18M1 and the excitation light from the tenth excitation light source 31H. Using the excitation light from the tenth excitation light source 31H, the PD nonlinear optical medium 54 wavelength-converts the uplink-side second multiplex light of the L band of the even-numbered channels into the uplink-side second multiplex light of the C band of the even-numbered channels. The PD nonlinear optical medium 54 outputs the uplink-side second multiplex light of the C band of the even-numbered channels to the uplink-side second optical reception group 16B1.

The seventh WDM coupler 55 in the twenty-sixth wavelength converter 17R outputs to the PD nonlinear optical medium 54 the downlink-side third multiplex light of the C band of the odd-numbered channels from the downlink-side third optical transmission group 11C2 and the remaining excitation light from the third optical circulator 40C. Using the remaining excitation light from the third optical circulator 40C, the PD nonlinear optical medium 54 wavelength-converts the downlink-side third multiplex light of the C band of the odd-numbered channels into the downlink-side third multiplex light of the L band of the odd-numbered channels. The PD nonlinear optical medium 54 outputs the downlink-side third multiplex light of the L band of the odd-numbered channels to the downlink-side twenty-first interleaver 18L2.

The twenty-fifth wavelength converter 17Q includes the tenth excitation light source 31H, the seventh isolator 38F, and the third optical circulator 40C, in addition to the sixth WDM coupler 53, the PD nonlinear optical medium 54, and the seventh WDM coupler 55. The tenth excitation light source 31H in the twenty-fifth wavelength converter 17Q supplies the excitation light to the third optical circulator 40C by way of the seventh isolator 38F. Furthermore, the third optical circulator 40C connects to the sixth WDM coupler 53 and the seventh WDM coupler 55. The third optical circulator 40C connects to the sixth WDM coupler 53 and supplies to the seventh WDM coupler 55 the remaining excitation light flowing from the sixth WDM coupler 53 the PD nonlinear optical medium 54 the sixth WDM coupler 53. Then, the seventh WDM coupler 55 supplies the remaining excitation light from the third optical circulator 40C to the PD nonlinear optical medium 54.

The sixth WDM coupler 53 in the twenty-fifth wavelength converter 17Q outputs to the PD nonlinear optical medium 54 the downlink-side second multiplex light of the C band of the even-numbered channels from the downlink-side second optical transmission group 11J2 and the excitation light from the tenth excitation light source 31H. Using the excitation light from the tenth excitation light source 31H, the PD nonlinear optical medium 54 wavelength-converts the downlink-side second multiplex light of the C band of the even-numbered channels into the downlink-side second multiplex light of the L band of the even-numbered channels. The PD nonlinear optical medium 54 outputs the downlink-side second multiplex light of the L band of the even-numbered channels to the downlink-side twenty-first interleaver 18L2.

The seventh WDM coupler 55 in the twenty-fifth wavelength converter 17Q outputs to the PD nonlinear optical medium 54 the uplink-side third multiplex light of the L band of the odd-numbered channels from the uplink-side twenty-second interleaver 18M1 and the remaining excitation light from the third optical circulator 40C. Using the remaining excitation light from the third optical circulator 40C, the PD nonlinear optical medium 54 wavelength-converts the uplink-side third multiplex light of the L band of the odd-numbered channels into the uplink-side third multiplex light of the C band of the odd-numbered channels. The PD nonlinear optical medium 54 outputs the uplink-side third multiplex light of the C band of the odd-numbered channels to the uplink-side third optical reception group 16C1.

In the twenty-third wavelength converter 17N of the first transmission apparatus 2A of the example 19, the downlink-side third multiplex light is wavelength-converted using the third optical circulator 40C and using the remaining excitation light from the tenth excitation light source 31H. As a result, the twenty-third wavelength converter 17N may reduce the number of the excitation light sources, as compared to the twenty-third wavelength converter 17N illustrated in FIG. 22.

In the twenty-fourth wavelength converter 17P of the first transmission apparatus 2A, the downlink-side third multiplex light is wavelength-converted using the third optical circulator 40C and using the remaining excitation light from the tenth excitation light source 31H. As a result, the twenty-fourth wavelength converter 17P may reduce the number of the excitation light sources, as compared to the twenty-fourth wavelength converter 17P illustrated in FIG. 22.

In the twenty-fifth wavelength converter 17Q of the second transmission apparatus 2B, the uplink-side third multiplex light is wavelength-converted using the third optical circulator 40C and using the remaining excitation light from the tenth excitation light source 31H. As a result, the twenty-fifth wavelength converter 17Q may reduce the number of the excitation light sources, as compared to the twenty-fifth wavelength converter 17Q illustrated in FIG. 22.

In the twenty-sixth wavelength converter 17R of the second transmission apparatus 2B, the downlink-side third multiplex light is wavelength-converted using the third optical circulator 40C and using the remaining excitation light from the tenth excitation light source 31H. As a result, the twenty-sixth wavelength converter 17R may reduce the number of the excitation light sources, as compared to the twenty-sixth wavelength converter 17R illustrated in FIG. 22.

In the twenty-third to twenty-sixth wavelength converters 17N to 17R illustrated in FIG. 23, the excitation light inputted from the sixth WDM coupler 53 passes through the sixth WDM coupler 53, and then the remaining excitation light is supplied to the seventh WDM coupler 55. However, the excitation light inputted from the seventh WDM coupler 55 may pass through the seventh WDM coupler 55 and then the remaining excitation light may be supplied to the sixth WDM coupler 53, an embodiment of which is described below as an example 20.

Example 20

Figure 24A:
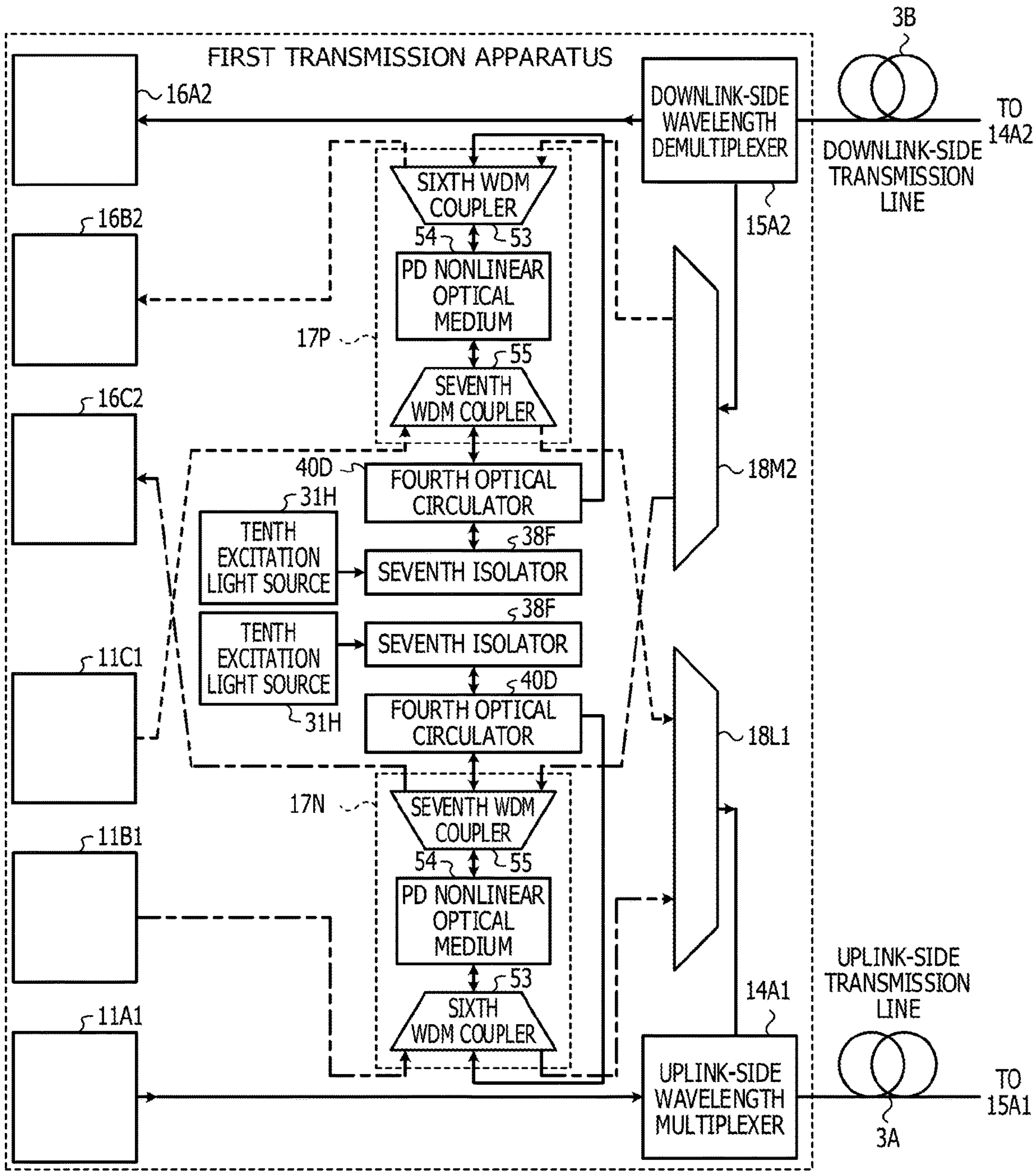
FIGS. 24A and 24B are explanatory diagrams illustrating an example of a transmission system of an example 20.
Figure 24B:
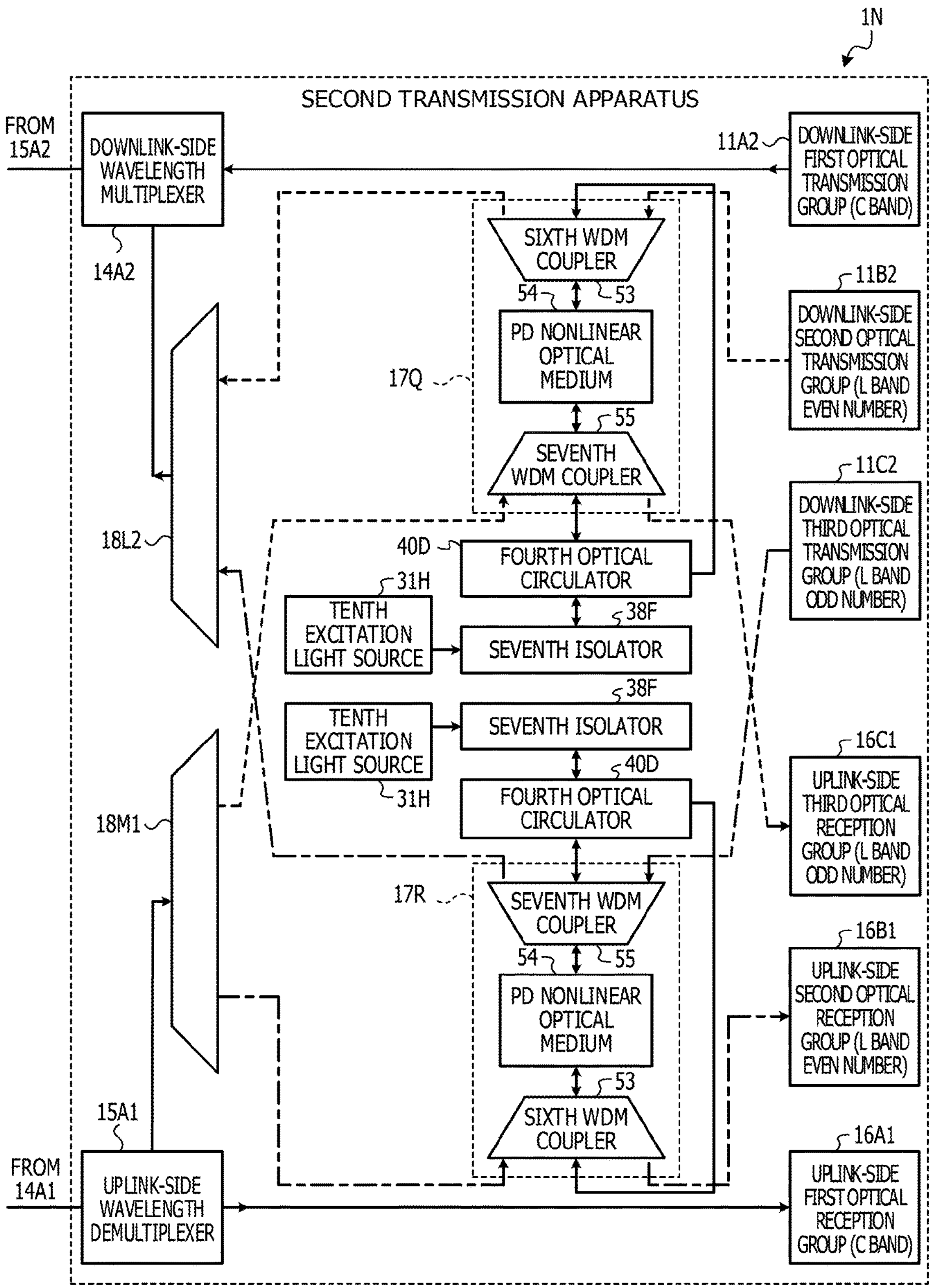

FIG. 24 is an explanatory diagram illustrating an example of a transmission system 1N of the example 20. The identical symbols are assigned to a configuration identical to the transmission system 1M illustrated in FIG. 23, and thus description of the overlapping configurations and operations is omitted.

The twenty-third wavelength converter 17N includes the tenth excitation light source 31H, the seventh isolator 38F, and a fourth optical circulator 40D, in addition to the sixth WDM coupler 53, the PD nonlinear optical medium 54, and the seventh WDM coupler 55. The tenth excitation light source 31H supplies the excitation light to the fourth optical circulator 40D by way of the seventh isolator 38F. Furthermore, the fourth optical circulator 40D connects to the sixth WDM coupler 53 and the seventh WDM coupler 55. The fourth optical circulator 40D connects to the seventh WDM coupler 55 and supplies to the sixth WDM coupler 53 the remaining excitation light flowing from the seventh WDM coupler 55 the PD nonlinear optical medium 54 the seventh WDM coupler 55.

The sixth WDM coupler 53 in the twenty-third wavelength converter 17N outputs to the PD nonlinear optical medium 54 the uplink-side second multiplex light of the C band of the even-numbered channels from the uplink-side second optical transmission group 11B1 and the remaining excitation light from the fourth optical circulator 40D. Using the remaining excitation light from the fourth optical circulator 40D, the PD nonlinear optical medium 54 wavelength-converts the uplink-side second multiplex light of the C band of the even-numbered channels into the uplink-side second multiplex light of the L band of the even-numbered channels. Then, the PD nonlinear optical medium 54 outputs the uplink-side second multiplex light of the L band of the even-numbered channels to the uplink-side twenty-first interleaver 18L1 by way of the sixth WDM coupler 53.

The seventh WDM coupler 55 in the twenty-third wavelength converter 17N outputs to the PD nonlinear optical medium 54 the downlink-side third multiplex light of the L band of the odd-numbered channels from the downlink-side twenty-second interleaver 18M2 and the excitation light from the tenth excitation light source 31H. Using the excitation light from the tenth excitation light source 31H, the PD nonlinear optical medium 54 wavelength-converts the downlink-side third multiplex light of the L band of the odd-numbered channels into the downlink-side third multiplex light of the C band of the odd-numbered channels. Then, the PD nonlinear optical medium 54 outputs the downlink-side third multiplex light of the C band of the odd-numbered channels to the downlink-side third optical reception group 16C2 by way of the seventh WDM coupler 55.

The twenty-fourth wavelength converter 17P includes the tenth excitation light source 31H, the seventh isolator 38F, and the fourth optical circulator 40D, in addition to the sixth WDM coupler 53, the PD nonlinear optical medium 54, and the seventh WDM coupler 55. The tenth excitation light source 31H in the twenty-fourth wavelength converter 17P supplies the excitation light to the fourth optical circulator 40D by way of the seventh isolator 38F. Furthermore, the fourth optical circulator 40D connects to the sixth WDM coupler 53 and the seventh WDM coupler 55. The fourth optical circulator 40D connects to the seventh WDM coupler 55 and supplies to the sixth WDM coupler 53 the remaining excitation light flowing from the seventh WDM coupler 55 the PD nonlinear optical medium 54 the seventh WDM coupler 55.

The sixth WDM coupler 53 in the twenty-fourth wavelength converter 17P outputs to the PD nonlinear optical medium 54 the downlink-side second multiplex light of the L band of the even-numbered channels from the downlink-side twenty-second interleaver 18M2 and the remaining excitation light from the fourth optical circulator 40D. Using the remaining excitation light from the fourth optical circulator 40D, the PD nonlinear optical medium 54 wavelength-converts the downlink-side second multiplex light of the L band of the even-numbered channels into the downlink-side second multiplex light of the C band of the even-numbered channels. Then, the PD nonlinear optical medium 54 outputs the downlink-side second multiplex light of the C band of the even-numbered channels to the downlink-side second optical reception group 16B2.

The seventh WDM coupler 55 in the twenty-fourth wavelength converter 17P outputs to the PD nonlinear optical medium 54 the uplink-side third multiplex light of the C band of the odd-numbered channels from the uplink-side third optical transmission group 11C1 and the excitation light from the tenth excitation light source 31H. Using the excitation light from the tenth excitation light source 31H, the PD nonlinear optical medium 54 wavelength-converts the uplink-side third multiplex light of the C band of the odd-numbered channels into the uplink-side third multiplex light of the L band of the odd-numbered channels. Then, the PD nonlinear optical medium 54 outputs the uplink-side third multiplex light of the L band of the odd-numbered channels to the uplink-side twenty-first interleaver 18L1.

The twenty-sixth wavelength converter 17R includes the tenth excitation light source 31H, the seventh isolator 38F, and the fourth optical circulator 40D, in addition to the sixth WDM coupler 53, the PD nonlinear optical medium 54, and the seventh WDM coupler 55. The tenth excitation light source 31H in the twenty-sixth wavelength converter 17R supplies the excitation light to the fourth optical circulator 40D by way of the seventh isolator 38F. Furthermore, the fourth optical circulator 40D connects to the sixth WDM coupler 53 and the seventh WDM coupler 55. The fourth optical circulator 40D connects to the seventh WDM coupler 55 and supplies to the sixth WDM coupler 53 the remaining excitation light flowing from the seventh WDM coupler 55 the PD nonlinear optical medium 54 the seventh WDM coupler 55.

The sixth WDM coupler 53 in the twenty-sixth wavelength converter 17R outputs to the PD nonlinear optical medium 54 the uplink-side second multiplex light of the L band of the even-numbered channels from the uplink-side twenty-second interleaver 18M1 and the remaining excitation light from the fourth optical circulator 40D. Using the remaining excitation light from the fourth optical circulator 40D, the PD nonlinear optical medium 54 wavelength-converts the uplink-side second multiplex light of the L band of the even-numbered channels into the uplink-side second multiplex light of the C band of the even-numbered channels. Then, the PD nonlinear optical medium 54 outputs the uplink-side second multiplex light of the C band of the even-numbered channels to the uplink-side second optical reception group 16B1.

The seventh WDM coupler 55 in the twenty-sixth wavelength converter 17R outputs to the PD nonlinear optical medium 54 the downlink-side third multiplex light of the C band of the odd-numbered channels from the downlink-side third optical transmission group 11C2 and the excitation light from the tenth excitation light source 31H. Using the excitation light from the tenth excitation light source 31H, the PD nonlinear optical medium 54 wavelength-converts the downlink-side third multiplex light of the C band of the odd-numbered channels into the downlink-side third multiplex light of the L band of the odd-numbered channels. Then, the PD nonlinear optical medium 54 outputs the downlink-side third multiplex light of the L band of the odd-numbered channels to the downlink-side twenty-first interleaver 18L2.

The twenty-fifth wavelength converter 17Q includes the tenth excitation light source 31H, the seventh isolator 38F, and the fourth optical circulator 40D, in addition to the sixth WDM coupler 53, the PD nonlinear optical medium 54, and the seventh WDM coupler 55. The tenth excitation light source 31H in the twenty-fifth wavelength converter 17Q supplies the excitation light to the fourth optical circulator 40D by way of the seventh isolator 38F. Furthermore, the fourth optical circulator 40D connects to the sixth WDM coupler 53 and the seventh WDM coupler 55. The fourth optical circulator 40D connects to the seventh WDM coupler 55 and supplies to the sixth WDM coupler 53 the remaining excitation light flowing from the seventh WDM coupler 55 the PD nonlinear optical medium 54 the seventh WDM coupler 55.

The sixth WDM coupler 53 in the twenty-fifth wavelength converter 17Q outputs to the PD nonlinear optical medium 54 the downlink-side second multiplex light of the C band of the even-numbered channels from the downlink-side second optical transmission group 11B2 and the remaining excitation light from the fourth optical circulator 40D. Using the remaining excitation light from the fourth optical circulator 40D, the PD nonlinear optical medium 54 wavelength-converts the downlink-side second multiplex light of the C band of the even-numbered channels into the downlink-side second multiplex light of the C band of the even-numbered channels. Then, the PD nonlinear optical medium 54 outputs the downlink-side second multiplex light of the C band of the even-numbered channels to the downlink-side twenty-first interleaver 18L2.

The seventh WDM coupler 55 in the twenty-fifth wavelength converter 17Q outputs to the PD nonlinear optical medium 54 the uplink-side third multiplex light of the L band of the odd-numbered channels from the uplink-side twenty-second interleaver 18M1 and the excitation light from the tenth excitation light source 31H. Using the excitation light from the tenth excitation light source 31H, the PD nonlinear optical medium 54 wavelength-converts the uplink-side third multiplex light of the L band of the odd-numbered channels into the uplink-side third multiplex light of the C band of the odd-numbered channels. Then, the PD nonlinear optical medium 54 outputs the uplink-side third multiplex light of the C band of the odd-numbered channels to the uplink-side third optical reception group 16C1.

In the twenty-third wavelength converter 17N in the first transmission apparatus 2A of the example 20, the uplink-side second multiplex light is wavelength-converted using the fourth optical circulator 40D and using the remaining excitation light from the tenth excitation light source 31H. As a result, the twenty-third wavelength converter 17N may reduce the number of the excitation light sources, as compared to the twenty-third wavelength converter 17N illustrated in FIG. 22.

In the twenty-fourth wavelength converter 17P in the first transmission apparatus 2A, the downlink-side second multiplex light is wavelength-converted using the fourth optical circulator 40D and using the remaining excitation light from the tenth excitation light source 31H. As a result, the twenty-fourth wavelength converter 17P may reduce the number of the excitation light sources, as compared to the twenty-fourth wavelength converter 17P illustrated in FIG. 22.

In the twenty-fifth wavelength converter 17Q in the second transmission apparatus 2B, the downlink-side second multiplex light is wavelength-converted using the fourth optical circulator 40D and using the remaining excitation light from the tenth excitation light source 31H. As a result, the twenty-fifth wavelength converter 17Q may reduce the number of the excitation light sources, as compared to the twenty-fifth wavelength converter 17Q illustrated in FIG. 22.

In the twenty-sixth wavelength converter 17R in the second transmission apparatus 2B, the uplink-side second multiplex light is wavelength-converted using the fourth optical circulator 40D and using the remaining excitation light from the tenth excitation light source 31H. As a result, the twenty-sixth wavelength converter 17R may reduce the number of the excitation light sources, as compared to the twenty-sixth wavelength converter 17R illustrated in FIG. 22.

The tenth excitation light source 31H may be disposed for each of the wavelength converters 17 illustrated in FIG. 24. For example, the single excitation light source 31 may be used in the two wavelength converters 17 in the first transmission apparatus 2A, an embodiment of which is described below as an example 21.

Example 21

Figure 25A:
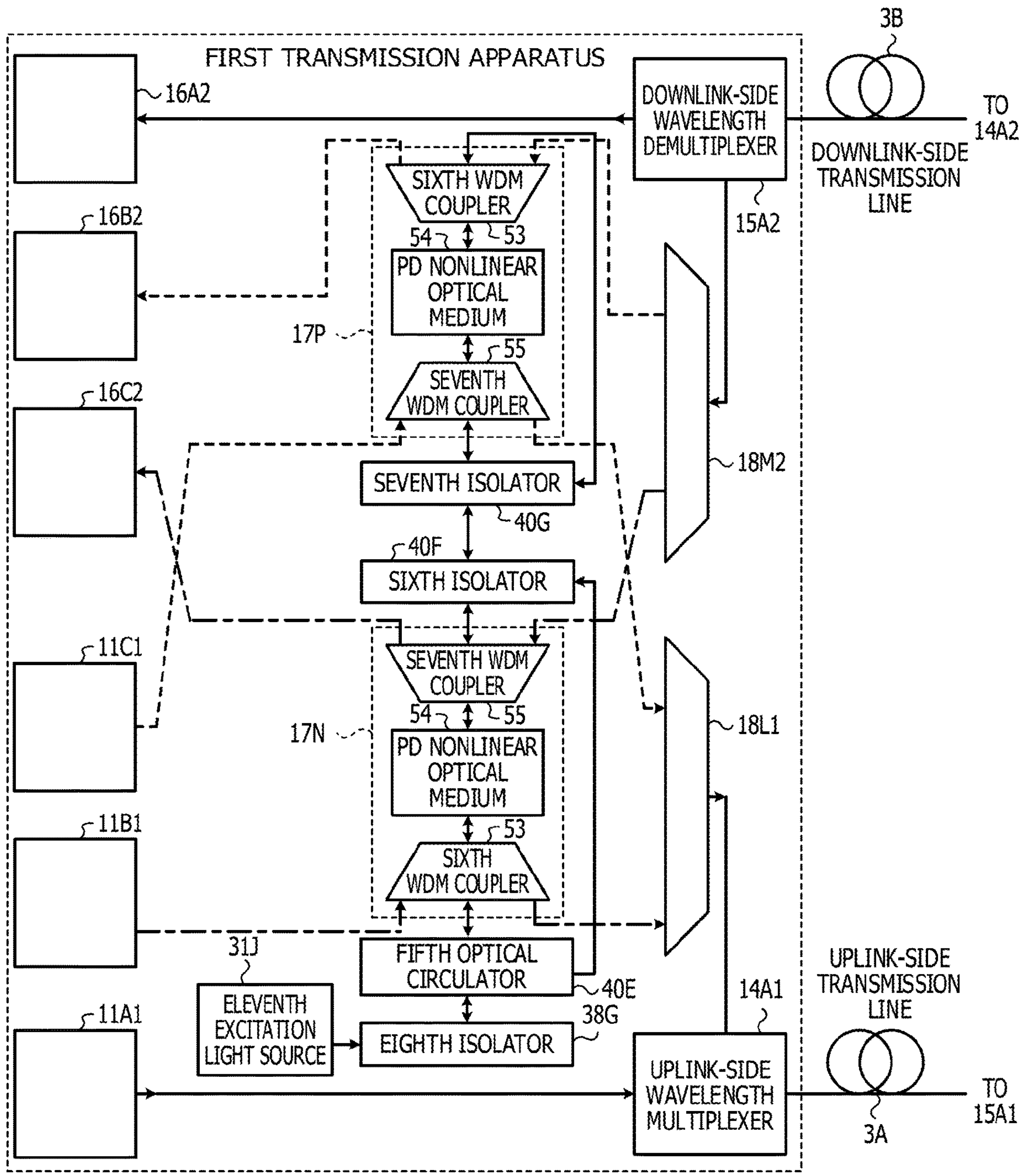
FIGS. 25A and 25B are explanatory diagrams illustrating an example of a transmission system of an example 21.
Figure 25B:
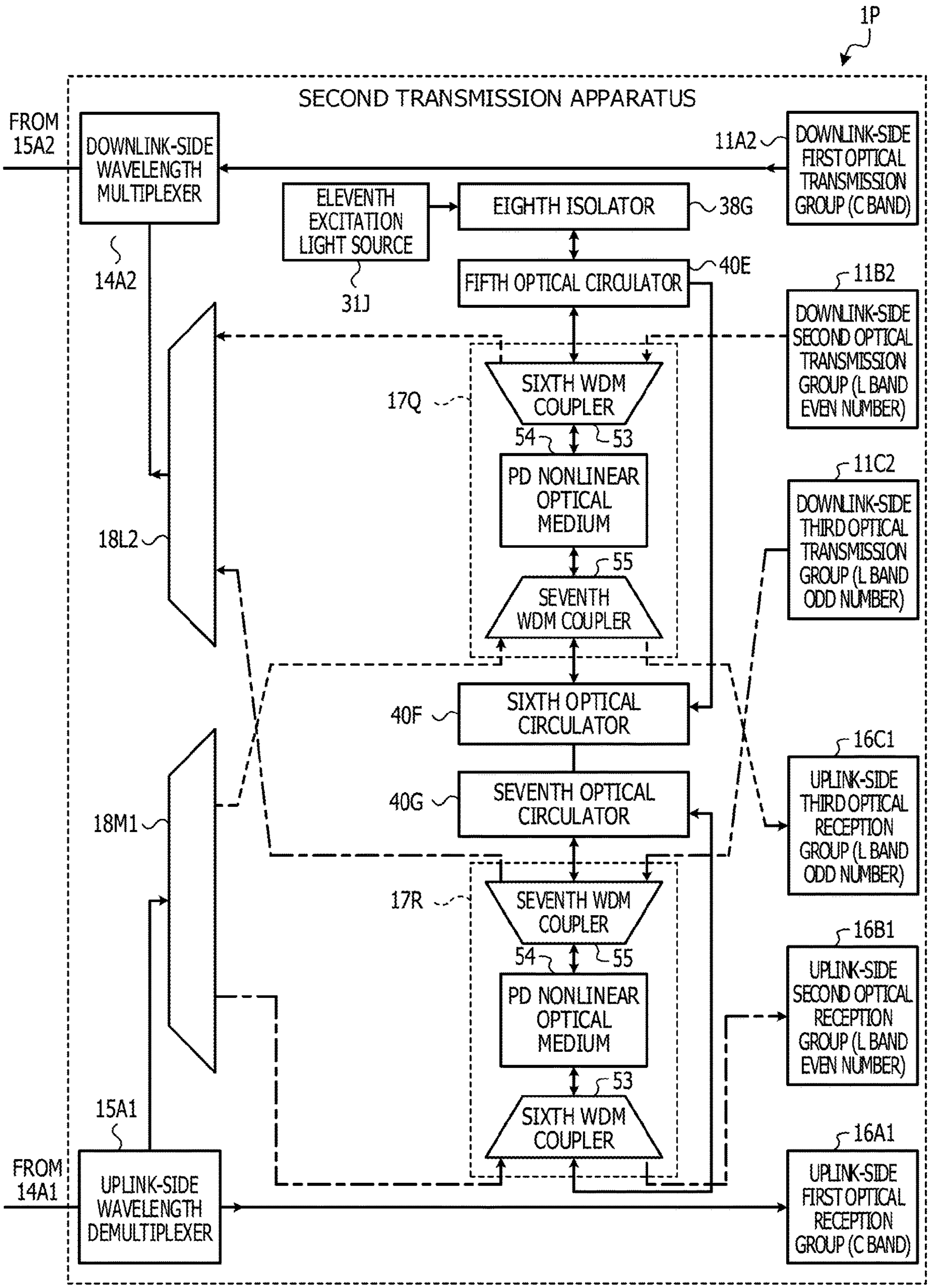

FIG. 25 is an explanatory diagram illustrating an example of a transmission system 1P of the example 21. The identical symbols are assigned to a configuration identical to the transmission system 1N illustrated in FIG. 20, and thus description of the overlapping configurations and operations is omitted.

The twenty-third wavelength converter 17N in the first transmission apparatus 2A illustrated in FIG. 25 includes a fifth optical circulator 40E, in addition to the sixth WDM coupler 53, the PD nonlinear optical medium 54, and the seventh WDM coupler 55. Furthermore, the twenty-third wavelength converter 17N includes an eighth isolator 38G and an eleventh excitation light source 31J connected to the eighth isolator 38G. The fifth optical circulator 40E connects to the sixth WDM coupler 53 and connects to a sixth optical circulator 40F in the twenty-fourth wavelength converter 17P.

Furthermore, the twenty-fourth wavelength converter 17P in the first transmission apparatus 2A includes the sixth optical circulator 40F connected to the sixth WDM coupler 53 and a seventh optical circulator 40G, in addition to the sixth WDM coupler 53, the PD nonlinear optical medium 54, and the seventh WDM coupler 55. The seventh WDM coupler 55 in the twenty-third wavelength converter 17N connects to the sixth optical circulator 40F. The sixth optical circulator 40F connects to the fifth optical circulator 40E and connects to the seventh optical circulator 40G. The seventh optical circulator 40G connects to the seventh WDM coupler 55 and the sixth WDM coupler 53 in the twenty-fourth wavelength converter 17P. The eighth isolator 38G in the twenty-third wavelength converter 17N outputs the excitation light of the eleventh excitation light source 31J to the sixth optical circulator 40F by way of the fifth optical circulator 40E→the sixth WDM coupler 53→the PD nonlinear optical medium 54→the sixth WDM coupler 53→the fifth optical circulator 40E. The sixth optical circulator 40F outputs the remaining excitation light to the sixth optical circulator 40F by way of the seventh WDM coupler 55 in the twenty-third wavelength converter 17N→the PD nonlinear optical medium 54→the seventh WDM coupler 55. Furthermore, the sixth optical circulator 40F outputs the remaining excitation light to the seventh optical circulator 40G by way of the seventh optical circulator 40G→the seventh WDM coupler 55 in the twenty-fourth wavelength converter 17P→the PD nonlinear optical medium 54→the seventh WDM coupler 55. Furthermore, the seventh optical circulator 40G outputs the remaining excitation light to the PD nonlinear optical medium 54 by way of the sixth WDM coupler 53 in the twenty-fourth wavelength converter 17P.

The twenty-fifth wavelength converter 17Q in the second transmission apparatus 2B includes the fifth optical circulator 40E, in addition to the sixth WDM coupler 53, the PD nonlinear optical medium 54, and the seventh WDM coupler 55. The twenty-fifth wavelength converter 17Q includes the eighth isolator 38G and the eleventh excitation light source 31J connected to the eighth isolator 38G. The fifth optical circulator 40E connects to the sixth WDM coupler 53 and connects to the sixth optical circulator 40F in the twenty-sixth wavelength converter 17R.

Furthermore, the twenty-sixth wavelength converter 17R in the second transmission apparatus 2B includes the sixth optical circulator 40F connected to the sixth WDM coupler 53 and the seventh optical circulator 40G, in addition to the sixth WDM coupler 53, the PD nonlinear optical medium 54, and the seventh WDM coupler 55. The seventh WDM coupler 55 in the twenty-sixth wavelength converter 17R connects to the sixth optical circulator 40F. The sixth optical circulator 40F connects to the fifth optical circulator 40E and connects to the seventh optical circulator 40G. The seventh optical circulator 40G connects to the seventh WDM coupler 55 in the twenty-sixth wavelength converter 17R and the sixth WDM coupler 53. The eighth isolator 38G in the twenty-fifth wavelength converter 17Q outputs the excitation light to the fifth optical circulator 40E by way of the fifth optical circulator 40E→the sixth WDM coupler 53→the PD nonlinear optical medium 54→the sixth WDM coupler 53. The fifth optical circulator 40E outputs the remaining excitation light to the sixth optical circulator 40F by way of the sixth optical circulator 40F in the twenty-sixth wavelength converter 17R→the seventh WDM coupler 55 in the twenty-fifth wavelength converter 17Q→PD nonlinear optical medium 54→the seventh WDM coupler 55. The sixth optical circulator 40F outputs the remaining excitation light to the seventh optical circulator 40G by way of the seventh optical circulator 40G→the seventh WDM coupler 55 in the twenty-sixth wavelength converter 17R→the PD nonlinear optical medium 54→the seventh WDM coupler 55. The seventh optical circulator 40G outputs the remaining excitation light to the PD nonlinear optical medium 54 by way of the sixth WDM coupler 53 in the twenty-sixth wavelength converter 17R.

The sixth WDM coupler 53 in the twenty-third wavelength converter 17N outputs to the PD nonlinear optical medium 54 the uplink-side second multiplex light of the C band of the even-numbered channels from the uplink-side second optical transmission group 11B1 and the excitation light from the fifth optical circulator 40E. Using the excitation light, the PD nonlinear optical medium 54 wavelength-converts the uplink-side second multiplexed light of the C band of the even-numbered channels into the uplink-side second multiplex light of the L band of the even-numbered channels. Then, the PD nonlinear optical medium 54 outputs the uplink-side second multiplex light of the L band of the even-numbered channels to the uplink-side twenty-first interleaver 18L1 by way of the sixth WDM coupler 53.

The seventh WDM coupler 55 in the twenty-fourth wavelength converter 17P outputs to the PD nonlinear optical medium 54 the uplink-side third multiplex light of the C band of the odd-numbered channels from the uplink-side third optical transmission group 11C1 and the remaining excitation light from the seventh optical circulator 40G. Using the remaining excitation light, the PD nonlinear optical medium 54 wavelength-converts the uplink-side third multiplex light of the C band of the odd-numbered channels into the uplink-side third multiplex light of the L band of the odd-numbered channels. Then, the PD nonlinear optical medium 54 outputs the uplink-side third multiplex light of the L band of the odd-numbered channels to the uplink-side twenty-first interleaver 18L1.

The sixth WDM coupler 53 in the twenty-fourth wavelength converter 17P outputs to the PD nonlinear optical medium 54 the downlink-side second multiplex light of the L band of the even-numbered channels from the downlink-side twenty-second interleaver 18M2 and the remaining excitation light from the seventh optical circulator 40G. Using the remaining excitation light from the seventh optical circulator 40G, the PD nonlinear optical medium 54 wavelength-converts the downlink-side second multiplex light of the L band of the even-numbered channels into the downlink-side second multiplex light of the C band of the even-numbered channels. Then, the PD nonlinear optical medium 54 outputs the downlink-side second multiplex light of the C band of the even-numbered channels to the downlink-side second optical reception group 16B2.

The seventh WDM coupler 55 in the twenty-third wavelength converter 17N outputs to the PD nonlinear optical medium 54 the downlink-side third multiplex light of the L band of the odd-numbered channels from the downlink-side twenty-second interleaver 18M2 and the remaining excitation light from the fifth optical circulator 40E. Using the remaining excitation light, the PD nonlinear optical medium 54 wavelength-converts the downlink-side third multiplex light of the L band of the odd-numbered channels into the downlink-side third multiplex light of the C band of the odd-numbered channels. Then, the PD nonlinear optical medium 54 outputs the downlink-side third multiplex light of the C band of the odd-numbered channels to the downlink-side third optical reception group 16C2 by way of the seventh WDM coupler 55.

The sixth WDM coupler 53 in the twenty-fifth wavelength converter 17Q outputs to the PD nonlinear optical medium 54 the downlink-side second multiplex light of the C band of the even-numbered channels from the uplink-side second optical transmission group 11B2 and the excitation light from the fifth optical circulator 40E. Using the excitation light of the fifth optical circulator 40E, the PD nonlinear optical medium 54 wavelength-converts the downlink-side second multiplex light of the C band of the even-numbered channels into the downlink-side second multiplex light of the L band of the even-numbered channels. Then, the PD nonlinear optical medium 54 outputs the downlink-side second multiplex light of the L band of the even-numbered channels to the downlink-side twenty-first interleaver 18L2.

The seventh WDM coupler 55 in the twenty-sixth wavelength converter 17R outputs to the PD nonlinear optical medium 54 the downlink-side third multiplex light of the C band of the odd-numbered channels from the downlink-side third optical transmission group 11C2 and the remaining excitation light from the seventh optical circulator 40G. Using the remaining excitation light, the PD nonlinear optical medium 54 wavelength-converts the downlink-side third multiplex light of the C band of the odd-numbered channels into the downlink-side third multiplex light of the L band of the odd-numbered channels. Then, the PD nonlinear optical medium 54 outputs the downlink-side third multiplex light of the L band of the odd-numbered channels to the downlink-side twenty-first interleaver 18L2.

The sixth WDM coupler 53 in the twenty-sixth wavelength converter 17R outputs to the PD nonlinear optical medium 54 the uplink-side second multiplex light of the L band of the even-numbered channels from the uplink-side twenty-second interleaver 18M1 and the remaining excitation light from the seventh optical circulator 40G. Using the remaining excitation light from the seventh optical circulator 40G, the PD nonlinear optical medium 54 wavelength-converts the uplink-side second multiplex light of the L band of the even-numbered channels into the uplink-side second multiplex light of the C band of the even-numbered channels. Then, the PD nonlinear optical medium 54 outputs the uplink-side second multiplex light of the C band of the even-numbered channels to the uplink-side second optical reception group 16B1.

The seventh WDM coupler 55 in the twenty-fifth wavelength converter 17Q outputs to the PD nonlinear optical medium 54 the uplink-side third multiplex light of the L band of the odd-numbered channels from the uplink-side twenty-second interleaver 18M1 and the remaining excitation light from the fifth optical circulator 40E. Using the remaining excitation light, the PD nonlinear optical medium 54 wavelength-converts the uplink-side third multiplex light of the L band of the odd-numbered channels into the uplink-side third multiplex light of the C band of the odd-numbered channels. Then, the PD nonlinear optical medium 54 outputs the uplink third multiplex light of the C band of the odd-numbered channels to the uplink-side third optical reception group 16C1.

The first transmission apparatus 2A of the example 21 performs the wavelength conversion processing of the twenty-third wavelength converter 17N and the twenty-fourth wavelength converter 17P, using the excitation light and the remaining excitation light from the fifth optical circulator 40E, the sixth optical circulator 40F, and the seventh optical circulator 40G. As a result, it is possible to combine the excitation light sources of the first transmission apparatus 2A into one, thereby reducing the number of the excitation light sources.

The second transmission apparatus 2B performs the wavelength conversion processing of the twenty-fifth wavelength converter 17Q and the twenty-sixth wavelength converter 17R, using the excitation light and the remaining excitation light from the fifth optical circulator 40E, the sixth optical circulator 40F, and the seventh optical circulator 40G. As a result, it is possible to combine the excitation light sources of the second transmission apparatus 2B into one, thereby reducing the number of the excitation light sources.

Example 22

Figure 26:
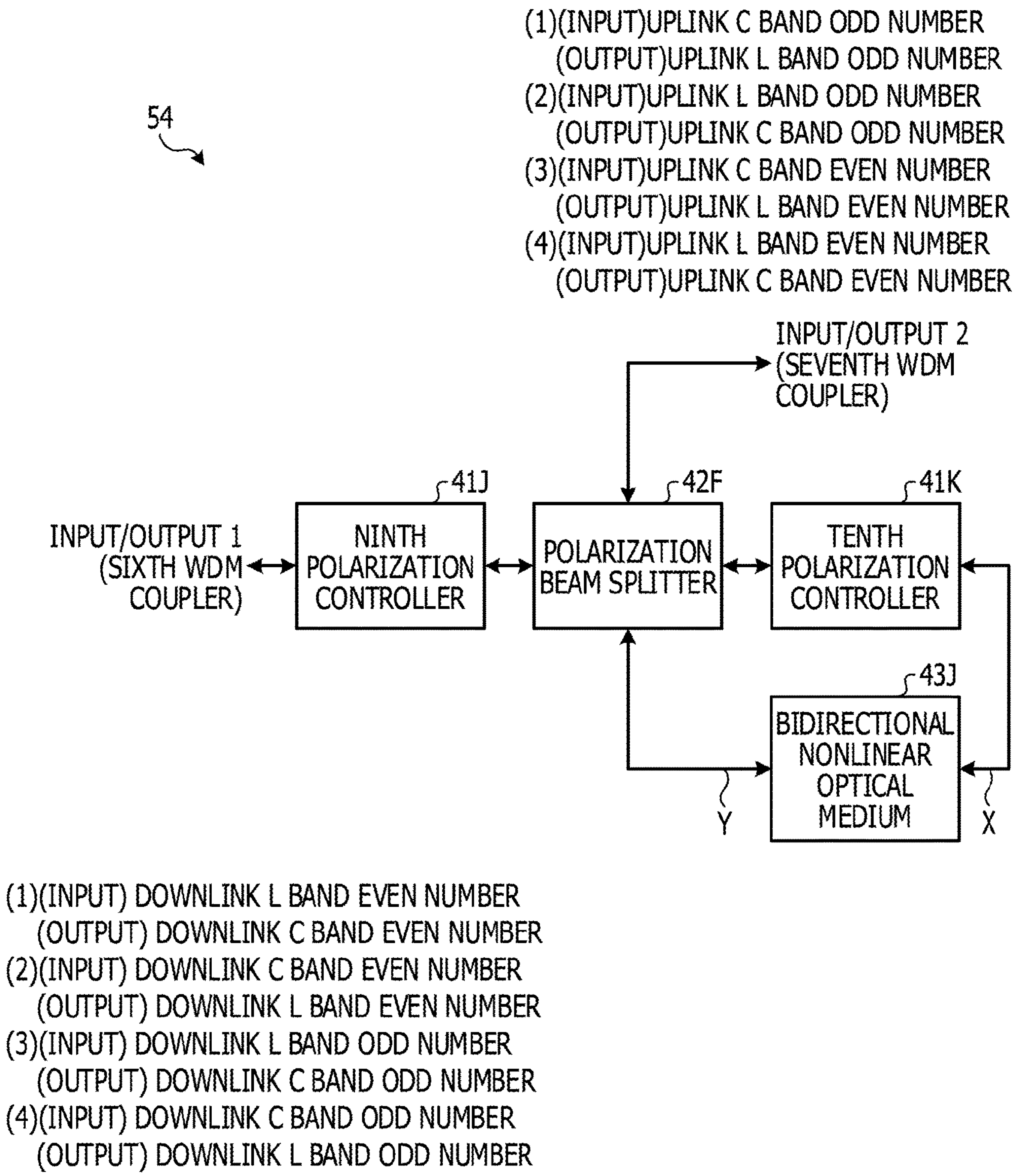
FIG. 26 is an explanatory diagram illustrating an example of a PD nonlinear optical medium of an example 22.

Next, an embodiment of an example of the PD nonlinear optical medium 54 in the twenty-third to twenty-sixth wavelength converters 17N to 17R is described below as an example 22. FIG. 26 is an explanatory diagram illustrating an example of the PD nonlinear optical medium 54 of the example 22. The identical symbols are assigned to a configuration identical to the transmission system 1P illustrated in FIG. 25, and thus description of the overlapping configurations and operations is omitted.

The PD nonlinear optical medium 54 illustrated in FIG. 26 connects to sixth WDM coupler 53, and connects to the seventh WDM coupler 55. The PD nonlinear optical medium 54 has the reflection-type lop processing configuration of two inputs and outputs. The PD nonlinear optical medium 54 includes a ninth polarization controller 41J, a polarization beam splitter 42F, a tenth polarization controller 41K, and a bidirectional nonlinear optical medium 43J.

The ninth polarization controller 41J inputs the second and third multiplex light and the excitation light from the sixth WDM coupler 53 and polarization-controls the second and third multiplex light and the excitation light. That is, the ninth polarization controller 41J outputs to the polarization beam splitter 42F the second and third multiplex light and the excitation light of the vertical polarization and the horizontal polarization after the polarization control. The polarization beam splitter 42F outputs the second and third multiplex light and the excitation light of the horizontal polarization to the backward port Y in the bidirectional nonlinear optical medium 43J. The polarization beam splitter 42F outputs the second and third multiplex light and the excitation light of the vertical polarization to the tenth polarization controller 41K. Then, the tenth polarization controller 41K polarization-controls the second and third multiplex light and the excitation light of the vertical polarization to the second and third multiplex light and the excitation light of the horizontal polarization, and outputs the second and third multiplex light and the excitation light of the horizontal polarization after the polarization control to the forward port X of the bidirectional nonlinear optical medium 43J.

The bidirectional nonlinear optical medium 43J propagates the second and third multiplex light and the excitation light of the horizontal polarization inputted from the backward port Y. Using the excitation light, the bidirectional nonlinear optical medium 43J wavelength-converts the second and third multiplex light of the horizontal polarization and outputs the second and third multiplex light of the horizontal polarization after the wavelength conversion to the tenth polarization controller 41K. The tenth polarization controller 41K polarization-controls the second and third multiplex light of the horizontal polarization to the second and third multiplex light of the vertical polarization, and outputs to the polarization beam splitter 42F the second and third multiplex light of the vertical polarization after the polarization control.

The bidirectional nonlinear optical medium 43J propagates the second and third multiplex light and the excitation light of the horizontal polarization inputted from the forward port X. Using the excitation light, the bidirectional nonlinear optical medium 43J wavelength-converts the second and third multiplex light of the horizontal polarization and outputs to the polarization beam splitter 42F the second and third multiplex light of the horizontal polarization after the wavelength conversion. Then, the polarization beam splitter 42F outputs to the sixth WDM coupler 53 the second and third multiplex light of the horizontal polarization from the bidirectional nonlinear optical medium 43J and the second and third multiplex light of the vertical polarization from the tenth polarization controller 41K. The sixth WDM coupler 53 combines the second and third multiplex light of the horizontal polarization with the second and third multiplex light of the vertical polarization to output the second and third multiplex light.

The polarization beam splitter 42F inputs the second and third multiplex light and the excitation light from the seventh WDM coupler 55 and polarization-controls the second and third multiplex light and the excitation light of the vertical polarization and the horizontal polarization. The polarization beam splitter 42F outputs to the tenth polarization controller 41K the second and third multiplex light and the excitation light of the horizontal polarization. The tenth polarization controller 41K polarization-controls the second and third multiplex light and the excitation light of the horizontal polarization to the second and third multiplex light and the excitation light of the vertical polarization, and outputs to forward port X of the bidirectional nonlinear optical medium 43J the second and third multiplex light and the excitation light of the vertical polarization after the polarization control. The polarization beam splitter 42F outputs the second and third multiplex light and the excitation light of the vertical polarization to the backward port Y of the bidirectional nonlinear optical medium 43J.

The bidirectional nonlinear optical medium 43J propagates the second and third multiplex light and the excitation light of the vertical polarization inputted from the backward port Y. Using the excitation light, the bidirectional nonlinear optical medium 43J wavelength-converts the second and third multiplex light of the vertical polarization, and outputs to the tenth polarization controller 41K the second and third multiplex light of the vertical polarization after the wavelength conversion. The tenth polarization controller 41K polarization-controls the second and third multiplex light of the vertical polarization to the second and third multiplex light, and outputs to the polarization beam splitter 42F the second and third multiplex light of the vertical polarization after the polarization control.

The bidirectional nonlinear optical medium 43J propagates the second and third multiplex light and the excitation light of the vertical polarization inputted from the forward port X. Using the excitation light, the bidirectional nonlinear optical medium 43J wavelength-converts the second and third multiplex light of the vertical polarization, and outputs to the polarization beam splitter 42F the second and third multiplex light of the vertical polarization after the wavelength conversion. Then, the polarization beam splitter 42F outputs to the seventh WDM coupler 55 the second and third multiplex light of the vertical polarization from the bidirectional nonlinear optical medium 43J and the second and third multiplex light of the horizontal polarization from the tenth polarization controller 41K. The seventh WDM coupler 55 combines the second and third multiplex light of the horizontal polarization with the second and third multiplex light of the vertical polarization to output the second and third multiplex light.

For example, using the excitation light, the twenty-third wavelength converter 17N wavelength-converts the uplink-side second multiplex light of the C band of the even-numbered channels inputted from the sixth WDM coupler 53 into the uplink-side second multiplex light of the L band of the even-numbered channels. Then, the twenty-third wavelength converter 17N outputs uplink-side second multiplex light of the L band of the even-numbered channels after the wavelength conversion from the sixth WDM coupler 53. Using the excitation light, the twenty-third wavelength converter 17N wavelength-converts the downlink-side third multiplex light of the L band of the odd-numbered channels inputted from the seventh WDM coupler 55 into the downlink-side third multiplex light of the C band of the odd-numbered channels. Then, the twenty-third wavelength converter 17N outputs the downlink-side third multiplex light of the C band of the odd-numbered channels after the wavelength conversion from the seventh WDM coupler 55.

Using the excitation light, the twenty-fourth wavelength converter 17P wavelength-converts the downlink-side second multiplex light of the L band of the even-numbered channels inputted from the sixth WDM coupler 53 into the downlink-side second multiplex light of the C band of the even-numbered channels. Then, the twenty-fourth wavelength converter 17P outputs the downlink-side second multiplex light of the C band of the even-numbered channels after the wavelength conversion from the sixth WDM coupler 53. Using the excitation light, the twenty-fourth wavelength converter 17P wavelength-converts the uplink-side third multiplex light of the C band of the odd-numbered channels inputted from the seventh WDM coupler 55 into the uplink-side third multiplex light of the L band of the odd-numbered channels. Then, the twenty-fourth wavelength converter 17P outputs the uplink-side third multiplex light of the L band of the odd-numbered channels after the wavelength conversion from the seventh WDM coupler 55.

Using the excitation light, the twenty-fifth wavelength converter 17Q wavelength-converts the downlink-side second multiplex light of the C band of the even-numbered channels inputted from the sixth WDM coupler 53 into the downlink-side second multiplex light of the L band of the even-numbered channels. Then the twenty-fifth wavelength converter 17Q outputs the downlink-side second multiplex light of the L band of the even-numbered channels after the wavelength conversion from the sixth WDM coupler 53. Using the excitation light, the twenty-fifth wavelength converter 17Q wavelength-converts the uplink-side third multiplex light of the L band of the odd-numbered channels inputted from the seventh WDM coupler 55 into the uplink-side third multiplex light of the C band of the odd-numbered channels. Then, the twenty-fifth wavelength converter 17Q outputs the uplink-side third multiplex light of the C band of the odd-numbered channels after the wavelength conversion from the seventh WDM coupler 55.

Using the excitation light, the twenty-sixth wavelength converter 17R wavelength-converts the uplink-side second multiplex light of the L band of the even-numbered channels inputted from the sixth WDM coupler 53 into the uplink-side second multiplex light of the C band of the even-numbered channels. Then, the twenty-sixth wavelength converter 17R outputs the uplink-side second multiplex light of the C band of the even-numbered channels after the wavelength conversion from the sixth WDM coupler 53. Using the excitation light, the twenty-sixth wavelength converter 17R wavelength-converts the downlink-side third multiplex light of the C band of the odd-numbered channels inputted from the seventh WDM coupler 55 into the downlink-side third multiplex light of the L band of the odd-numbered channels. Then, the twenty-sixth wavelength converter 17R outputs the downlink-side third multiplex light of the L band of the odd-numbered channels after the wavelength conversion from the seventh WDM coupler 55.

The case is illustrated in which the second wavelength converter 12B of the foregoing example 1 wavelength-converts the third multiplex light of the C band of the odd-numbered channels into the third multiplex light of the L band of the odd-numbered channels, using one beam of the excitation light, as illustrated in FIG. 2A. Furthermore, a case is illustrated in which the first wavelength converter 12A wavelength-converts the multiplex light of the C band of the even-numbered channels into the third multiplex light of the L band of the even-numbered channels, using the one beam of the excitation light, as illustrated in FIG. 2B. However, the wavelength converter 12 is not limited to the one beam of the excitation light, and the multiplex light may be wavelength-converted to a wavelength interval same as the wavelength interval of the excitation light of the two beams of excitation light.

Figure 27A:
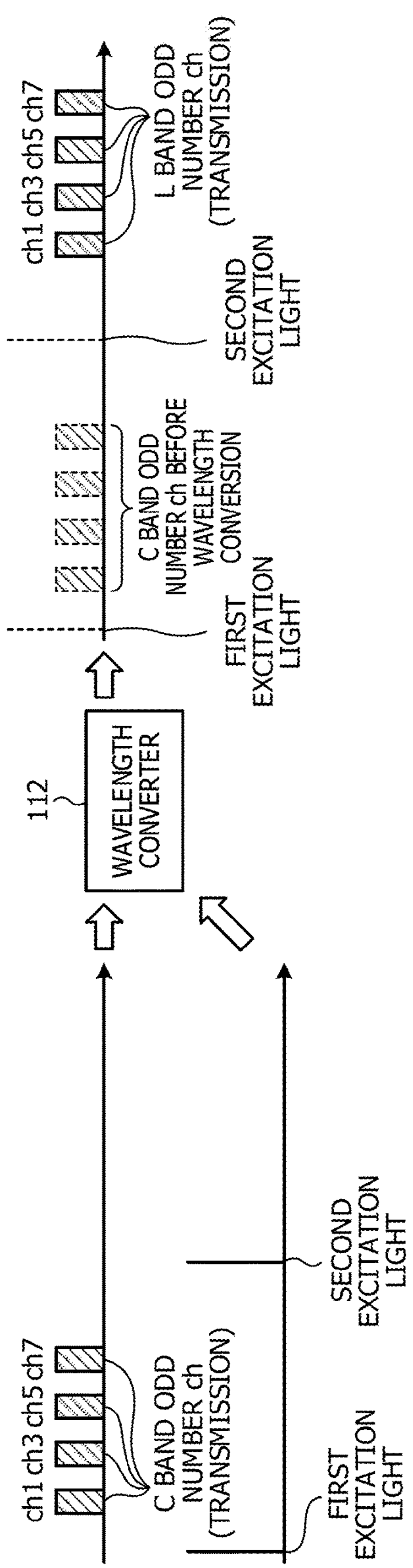
FIG. 27A is an explanatory diagram illustrating an example of a wavelength conversion operation of a wavelength converter.

FIG. 27A is an explanatory diagram illustrating an example of the wavelength conversion operation of a wavelength converter 112. The wavelength converter 112 illustrated in FIG. 27A propagates, for example, the third multiplex light of the C band of the odd-numbered channels, the first excitation light, and the second excitation light in the nonlinear optical medium, which is not illustrated. Using the first and second excitation light, the wavelength converter 112 wavelength-converts the third multiplex light of the C band of the odd-numbered channels into the third multiplex light of the L band of the odd-numbered channels. As a result, the wavelength converter 112 wavelength-converts the third multiplex light of the C band of the odd-numbered channels into the third multiplex light of the L band of the odd-numbered channels, at the same wavelength interval as the wavelength interval between the first excitation light and the second excitation light, and with the optical wavelength of the second excitation light as a center. The wavelength converter 112 filters the first and second excitation light before being wavelength-converted, denoted by the dot lines and the third multiplex light of the C band, from the first and second excitation light, the third multiplex light of the C band, and the third multiplex light of the L band. Then, the wavelength converter 112 outputs the third multiplex light of the L band of the odd-numbered channels only. The wavelength converter 112 may freely convert the multiplex light before being converted into the multiplex light of a different wavelength, by changing frequencies of the first and second excitation light.

Figure 27B:
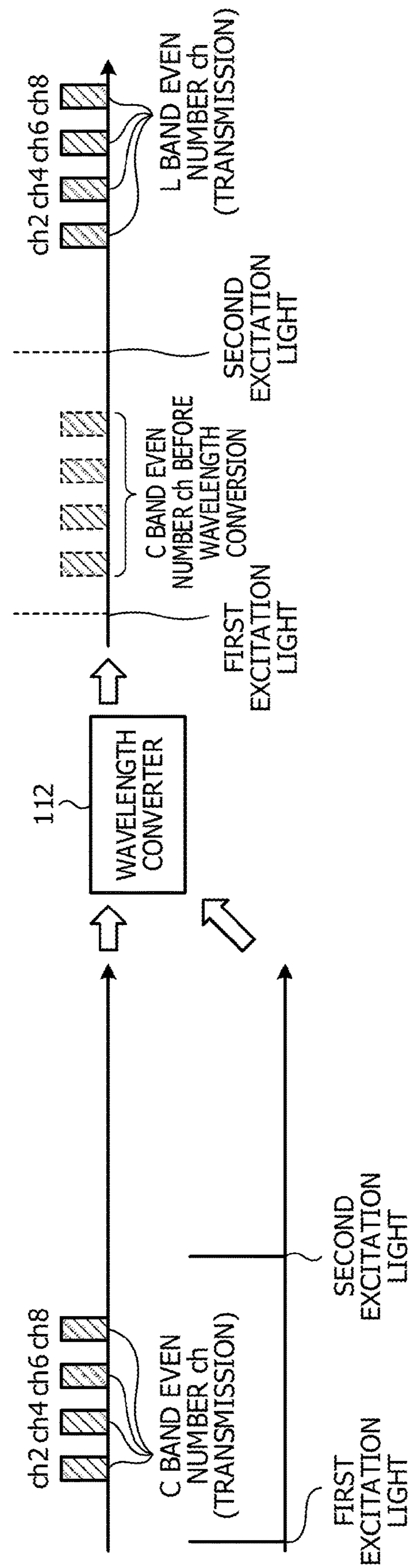
FIG. 27B is an explanatory diagram illustrating an example of the wavelength conversion operation of the wavelength converter.

FIG. 27B is an explanatory diagram illustrating an example of the wavelength conversion operation of the wavelength converter 112. The wavelength converter 112 illustrated in FIG. 27B propagates the second multiplex light of the C band of the even-numbered channels, the first excitation light, and the second excitation light in the nonlinear optical medium, which is not illustrated. Using the first and second excitation light, the wavelength converter 112 wavelength-converts the second multiplex light of the C band of the even-numbered channels into the second multiplex light of the L band of the even-numbered channels. As a result, the wavelength converter 112 wavelength-converts the second multiplex light of the C band of the even-numbered channels into the second multiplex light of the L band of the even-numbered channels, at the same wavelength interval as the wavelength interval between the first excitation light and the second excitation light, and with the optical wavelength of the second excitation light as a center. The wavelength converter 112 filters the first and second excitation light before being wavelength-converted, denoted by the dot lines and the second multiplex light of the C band, from the first and second excitation light, the second multiplex light of the C band, and the second multiplex light of the L band. Then, the wavelength converter 112 outputs the second multiplex light of the L band of the even-numbered channels only.

Then, next, an embodiment of a transmission system 1A1 that uses the wavelength converter 112 using the two beams of excitation light is described below as an example 23. FIG.

28 is an explanatory diagram illustrating an example of the transmission system 1A1 of the example 23. The identical symbols are assigned to the identical configurations of the transmission system 1A illustrated in FIG. 4 and the transmission system 1A1 illustrated in FIG. 28, and thus description of the overlapping configurations and operations is omitted.

Example 23

Figure 28A:
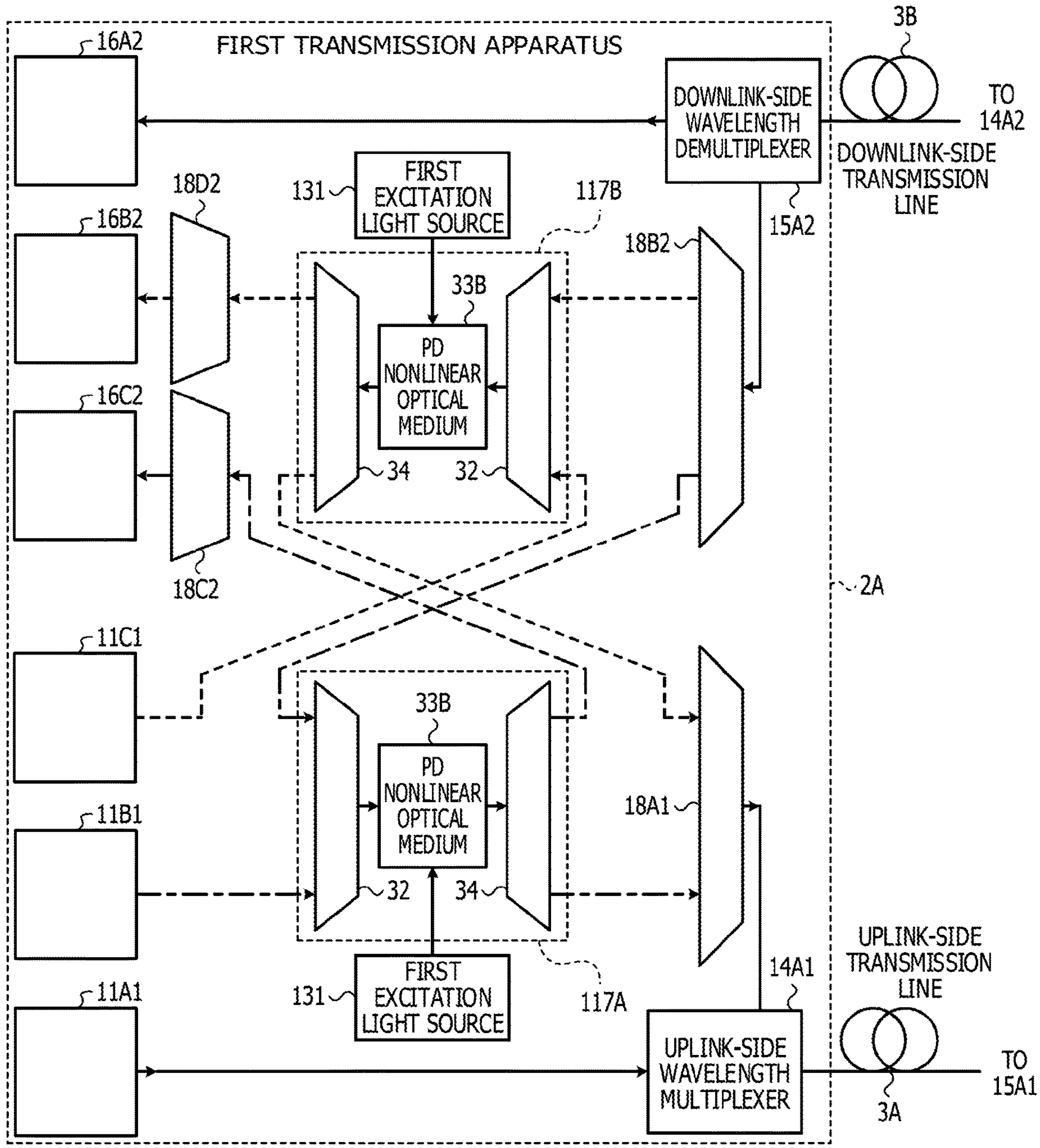
FIGS. 28A and 28B are explanatory diagrams illustrating an example of a transmission system of an example 23.
Figure 28B:
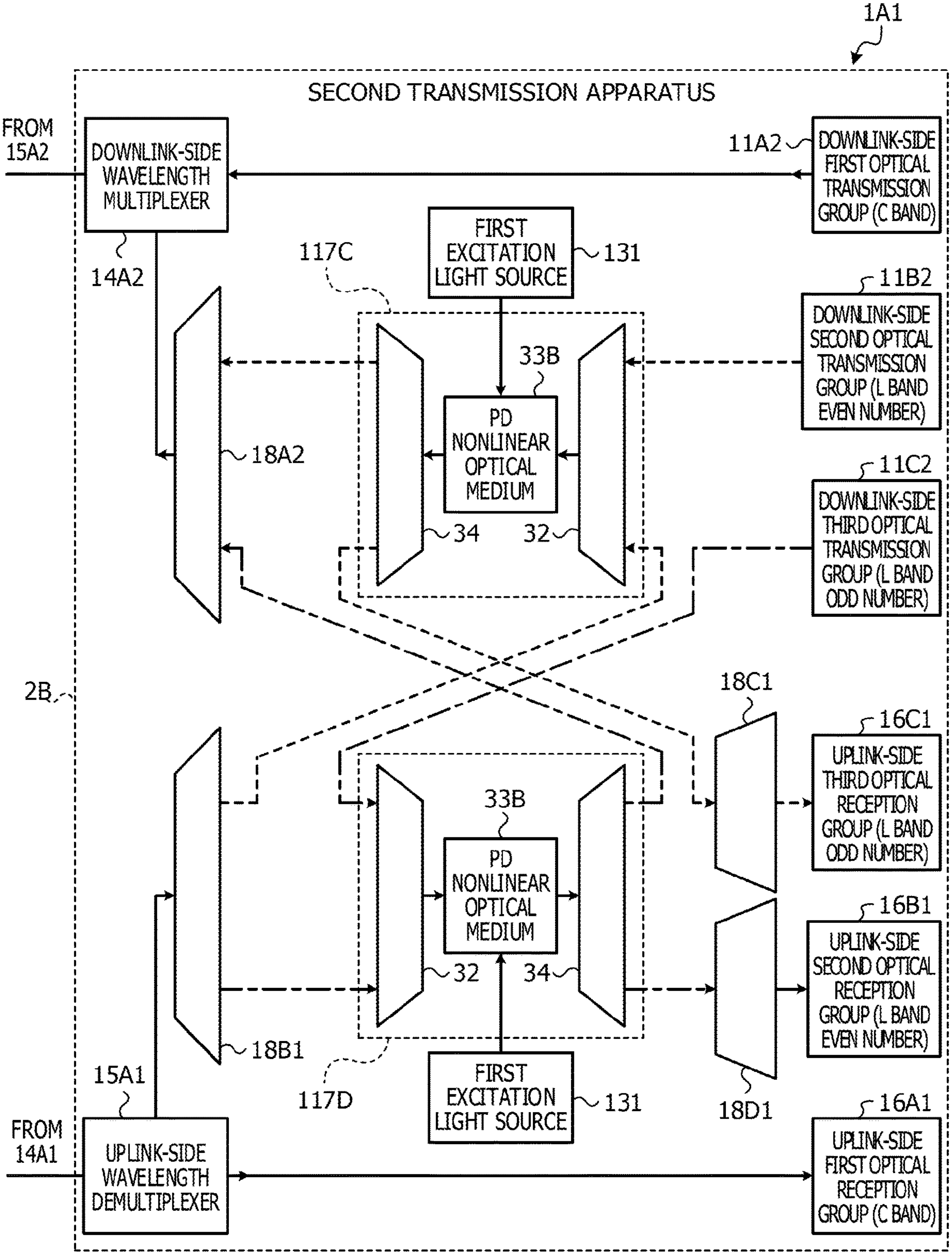

The transmission system 1A illustrated in FIG. 4 is different from the transmission system 1A1 illustrated in FIG. 28 in that the eleventh wavelength converter 17A is changed to an eleventh wavelength converter 117A, and the twelfth wavelength converter 17B is changed to a twelfth wavelength converter 117B. Furthermore, the difference is that the thirteenth wavelength converter 17C is changed to a thirteenth wavelength converter 117C and the fourteenth wavelength converter 17D is changed to a fourteenth wavelength converter 117D. Furthermore, the eleventh wavelength converter 117A directly inputs the first and second excitation light from the first excitation light source 131 into the PD nonlinear optical medium 33B. The twelfth wavelength converter 117B directly inputs the first and second excitation light from the first excitation light source 131 into the PD nonlinear optical medium 33B. The thirteenth wavelength converter 117C directly inputs the first and second excitation light from the first excitation light source 131 into the PD nonlinear optical medium 33B. The fourteenth wavelength converter 117D directly inputs the first and second excitation light from the first excitation light source 131 to the PD nonlinear optical medium 33B.

The first WDM coupler 32 of the eleventh wavelength converter 117A outputs the uplink-side second multiplex light of the C band of the even-numbered channels from the uplink-side second optical transmission group 11B1 to the PD nonlinear optical medium 33B. Furthermore, the first WDM coupler 32 outputs the downlink-side third multiplex light of the L band of the odd-numbered channels from the downlink-side twelfth interleaver 18B2 to the PD nonlinear optical medium 33B. Furthermore, the first excitation light source 131 outputs the first and second excitation light to the PD nonlinear optical medium 33B.

The PD nonlinear optical medium 33B in the eleventh wavelength converter 117A propagates the uplink-side second multiplex light of the C band of the even-numbered channels, the downlink-side third multiplex light of the L band of the odd-numbered channels, and the first and second excitation light. Then, using the first and second excitation light, the PD nonlinear optical medium 33B wavelength-converts the uplink-side second multiplex light of the C band of the even-numbered channels into the uplink-side second multiplex light of the L band of the even-numbered channels. Then, the eleventh wavelength converter 117A outputs to the second WDM coupler 34 the uplink-side second multiplex light of the L band of the even-numbered channels after the wavelength conversion. Furthermore, using the first and second excitation light, the PD nonlinear optical medium 33B wavelength-converts the downlink-side third multiplex light of the L band of the odd-numbered channels into the downlink-side third multiplex light of the C band of the odd-numbered channels. Then, the eleventh wavelength converter 117A outputs to the second WDM coupler 34 the downlink-side third multiplex light of the C band of the odd-numbered channels after the wavelength conversion.

The first WDM coupler 32 in the twelfth wavelength converter 117B outputs the downlink-side second multiplex light of the L band of the even-numbered channels from the downlink-side twelfth interleaver 18B2 to the PD nonlinear optical medium 33B. The first excitation light source 131 outputs the first and second excitation light to the PD nonlinear optical medium 33B. Furthermore, the first WDM coupler 32 outputs the uplink-side third multiplex light of the C band of the odd-numbered channels from the uplink-side third optical transmission group 11C1 to the PD nonlinear optical medium 33B. The PD nonlinear optical medium 33B in the twelfth wavelength converter 17B propagates the downlink-side second multiplex light of the L band of the even-numbered channels, the uplink-side third multiplex light of the C band of the odd-numbered channels, and the first and second excitation light.

Figure 29:
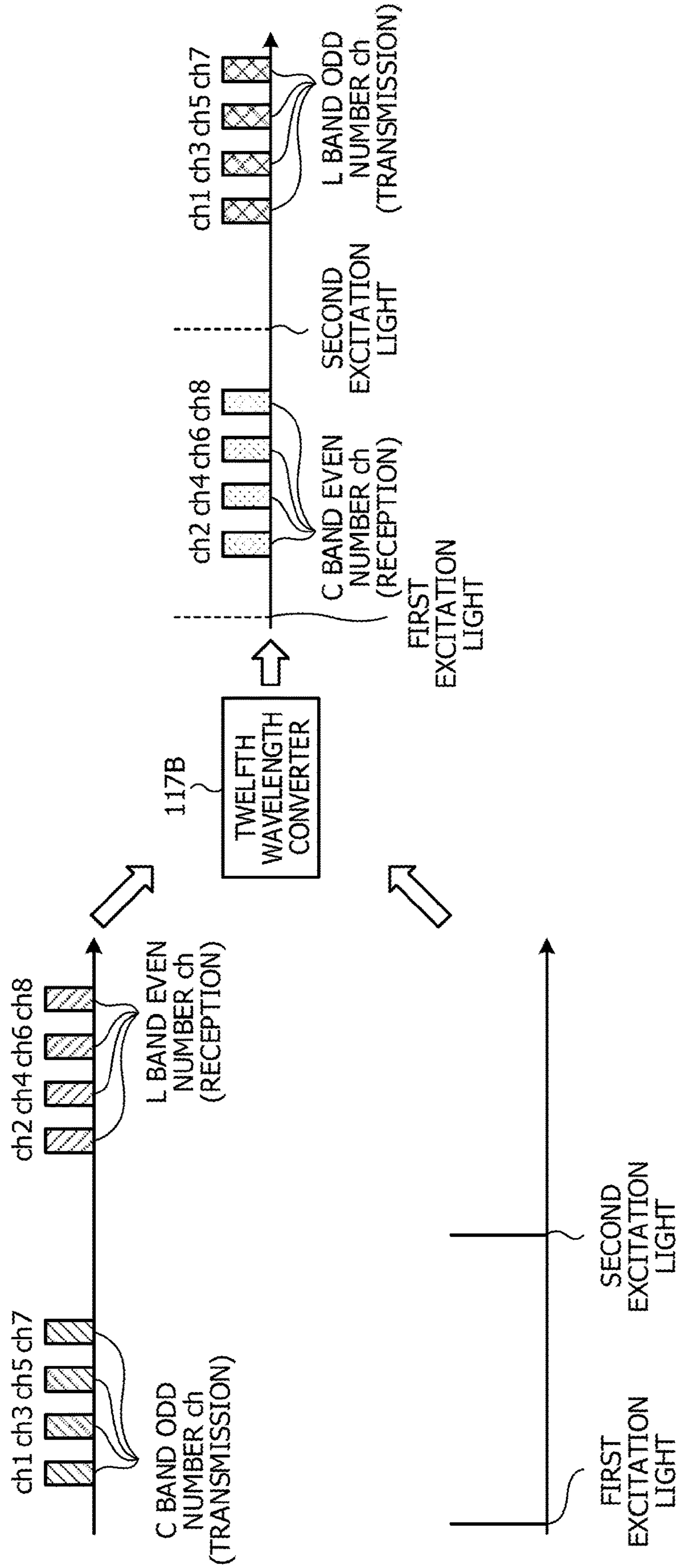
FIG. 29 is an explanatory diagram illustrating an example of the wavelength conversion operation of the twelfth wavelength converter.

FIG. 29 is an explanatory diagram illustrating an example of the wavelength conversion operation of the twelfth wavelength converter 117B. Using the first and second excitation light, the twelfth wavelength converter 117B wavelength-converts the downlink-side second multiplex light of the L band of the even-numbered channels into the downlink-side second multiplex light of the C band of the even-numbered channels, and outputs to the second WDM coupler 34 the downlink-side second multiplex light of the C band of the even-numbered channels after the wavelength conversion. The twelfth wavelength converter 117B filters the downlink-side second multiplex light of the L band and the first and second excitation light before the wavelength conversion from the downlink-side second multiplex light of the L band of the even-numbered channels, the first excitation light, the second excitation light, and the downlink-side second multiplex light of the C band of the even-numbered channels. Then, the twelfth wavelength converter 117B outputs the downlink-side second multiplex light of the C band. Using the first and second excitation light, the twelfth wavelength converter 117B wavelength-converts the uplink-side third multiplex light of the C band of the odd-numbered channels into the uplink-side third multiplex light of the L band of the odd-numbered channels, and outputs to the second WDM coupler 34 the uplink-side third multiplex light of the L band of the odd-numbered channels after the wavelength conversion. The twelfth wavelength converter 117B filters the uplink-side third multiplex light of the C band and the first and second excitation light before the wavelength conversion from the uplink-side third multiplex light of the C band of the odd-numbered channels, the first excitation light, the second excitation light, and the uplink-side third multiplex light of the L band of the odd-numbered channels. Then, the twelfth wavelength converter 117B outputs the uplink-side third multiplex light of the L band.

The first WDM coupler 32 in the fourteenth wavelength converter 117D outputs to the PD nonlinear optical medium 33B the uplink-side second multiplex light of the L band of the even-numbered channels from the uplink-side twelfth interleaver 1861. Furthermore, the first WDM coupler 32 outputs to the PD nonlinear optical medium 33B the downlink-side third multiplex light of the C band of the odd-numbered channels from the downlink-side third optical transmission group 11C2. The first excitation light source 131 outputs the first and second excitation light to the PD nonlinear optical medium 33B. The PD nonlinear optical medium 33B in the fourteenth wavelength converter 117D propagates the uplink-side second multiplex light of the L band of the even-numbered channels, the downlink-side third multiplex light of the C band of the odd-numbered channels, and the first and second excitation light. Then, using the first and second excitation light, the PD nonlinear optical medium 33B wavelength-converts the uplink-side second multiplex light of the L band of the even-numbered channels into the uplink-side second multiplex light of the C band of the even-numbered channels. Then, the fourteenth wavelength converter 117D outputs to the second WDM coupler 34 the uplink-side second multiplex light of the C band of the even-numbered channels after the wavelength conversion. Using the first and second excitation light, the PD nonlinear optical medium 33B wavelength-converts the downlink-side third multiplex light of the C band of the odd-numbered channels into the downlink-side third multiplex light of the L band of the odd-numbered channels, and outputs to the second WDM coupler 34 the downlink-side third multiplex light of the L band of the odd-numbered channels after the wavelength conversion.

The first WDM coupler 32 in the thirteenth wavelength converter 117C outputs to the PD nonlinear optical medium 33B the uplink-side third multiplex light of the L band of the odd-numbered channels from the uplink-side twelfth interleaver 1861. The first excitation light source 131 outputs the first and second excitation light to the PD nonlinear optical medium 33B. The first WDM coupler 32 outputs to the PD nonlinear optical medium 33B the downlink-side second multiplex light of the C band of the even-numbered channels from the downlink-side second optical transmission group 1162. The PD nonlinear optical medium 33B propagates the uplink-side third multiplex light of the L band of the odd-numbered channels, the downlink-side second multiplex light of the C band of the even-numbered channels, and the first and second excitation light. Using the first and second excitation light, the PD nonlinear optical medium 33B wavelength-converts the uplink-side third multiplex light of the L band of the odd-numbered channels into the uplink-side third multiplex light of the C band of the odd-numbered channels, and outputs to the second WDM coupler 34 the uplink-side third multiplex light of the C band of the odd-numbered channels after the wavelength conversion. Using the first and second excitation light, the PD nonlinear optical medium 33B wavelength-converts the downlink-side second multiplex light of the C band of the even-numbered channels into the downlink-side second multiplex light of the L band of the even-numbered channels, and outputs to the second WDM coupler 34 the downlink-side second multiplex light of the L band of the even-numbered channels after the wavelength conversion.

The eleventh wavelength converter 117A to the fourteenth wavelength converter 117D of the example 23 directly input the first and second excitation light from the first excitation light source 131 to the PD nonlinear optical medium 33B, thus making it possible to suppress deterioration of the excitation light, as compared to a case in which the first and second excitation light is inputted by way of the first WDM coupler 32.

In the eleventh and twelfth wavelength converters 117A and 117B in the first transmission apparatus 2A of the foregoing example 23, the first excitation light from the first excitation light source 131 which is provided in each of the eleventh and twelfth wavelength converters 117A and 117B, the second excitation light, and the second multiplex light propagate on the PD nonlinear optical medium 33. However, the eleventh and twelfth wavelength converters 117A and 117B may share a single excitation light source, an embodiment of which is described below as an example 24.

Example 24

Figure 30A:
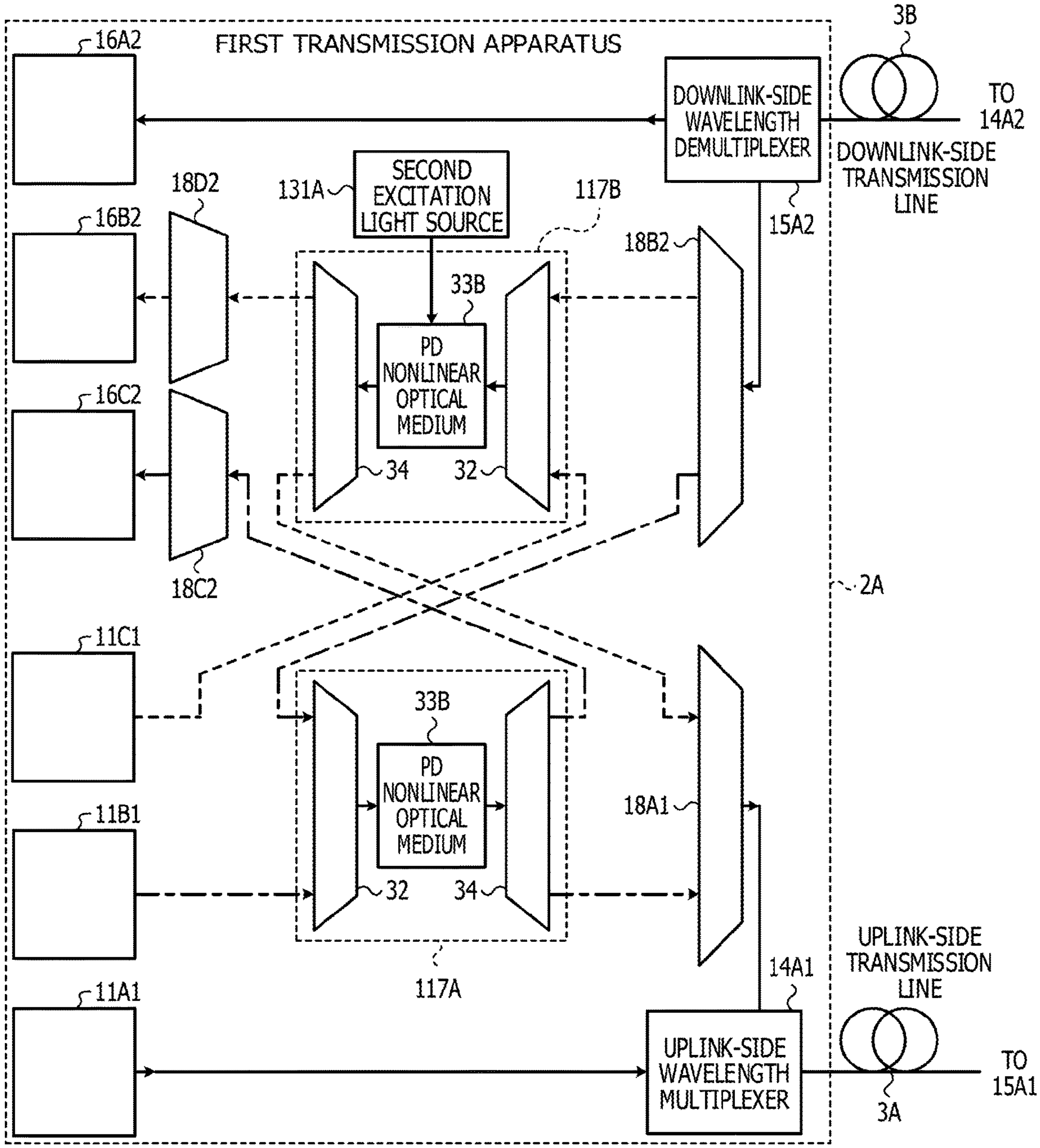
FIGS. 30A and 30B are explanatory diagrams illustrating an example of a transmission system of an example 24.
Figure 30B:
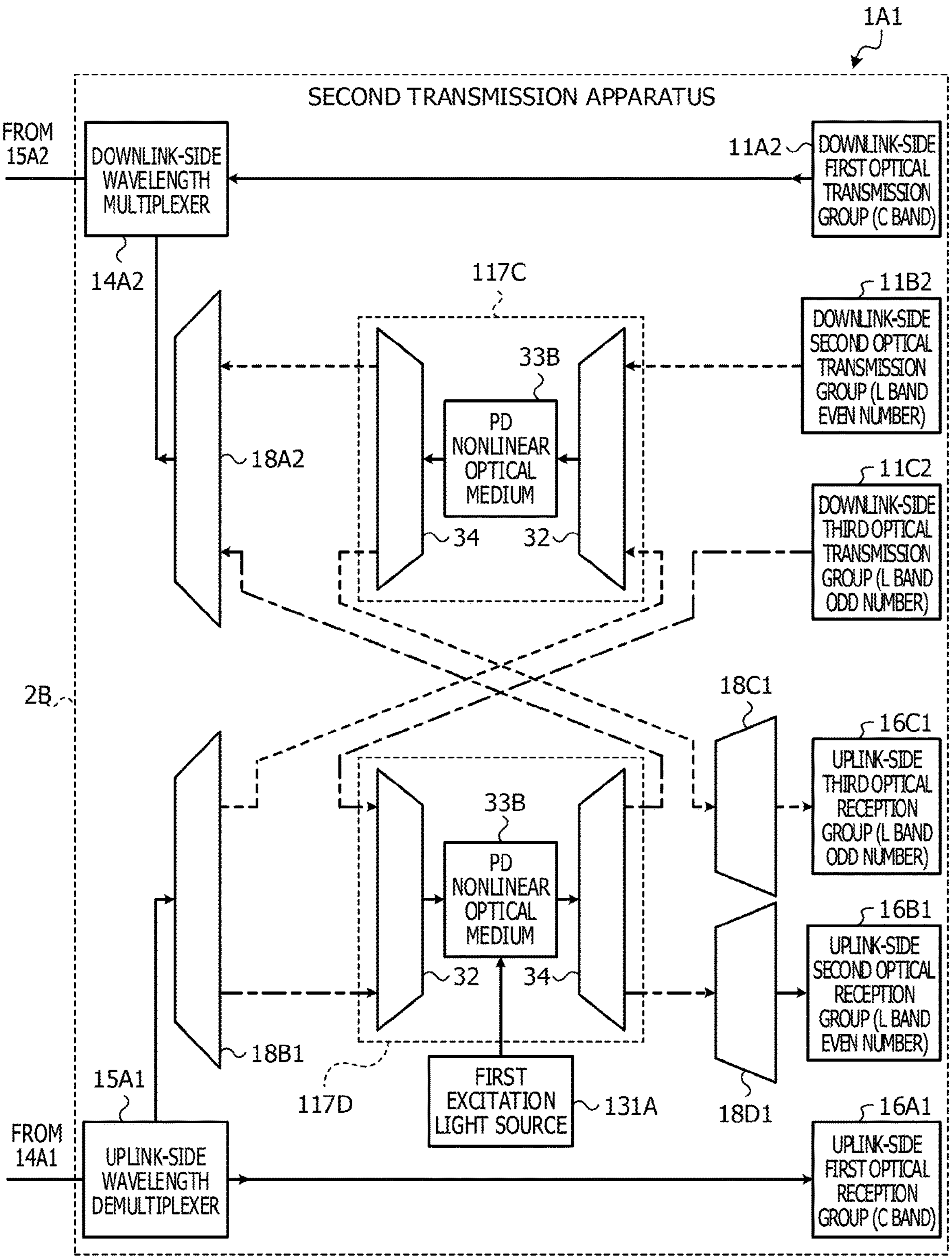

FIG. 30 is an explanatory diagram illustrating an example of a transmission system 1B1 of the example 24. The identical symbols are assigned to the identical configuration of the transmission system 1A1 of the example 23, and thus description of the overlapping configurations and operations is omitted.

The eleventh to fourteenth wavelength converters 117A to 117D illustrated in FIG. 28 convert the wavelengths of the second and third multiplex light by propagating the first excitation light from the first excitation light source 131 equipped in each of the eleventh to fourteenth wavelength converters 117A to 117D, the second excitation light, and the second and third multiplex light over the PD nonlinear optical medium 33B. In contrast to this, the first transmission apparatus 2A illustrated in FIG. 30 includes a second excitation light source 131A in place of the first excitation light source 131, and uses the first and second excitation light from the second excitation light source 131A for the eleventh wavelength converter 117A and the twelfth wavelength converter 117B. The second excitation light source 131A in the twelfth wavelength converter 117B supplies the first and second excitation light to the PD nonlinear optical medium 33B in the twelfth wavelength converter 117B. The twelfth wavelength converter 117B supplies to the PD nonlinear optical medium 33B in the eleventh wavelength converter 117A the remaining excitation light that is the transmitted light utilized in the wavelength conversion. That is, the eleventh wavelength converter 117A uses, for the wavelength conversion, the remaining excitation light utilized in the wavelength conversion from the twelfth wavelength converter 117B.

The second transmission apparatus 2B illustrated in FIG. 30 also includes the second excitation light source 131A in place of the first excitation light source 131, and uses the excitation light from the second excitation light source 131A in the thirteenth wavelength converter 117C and the fourteenth wavelength converter 117D. The second excitation light source 131A in the fourteenth wavelength converter 117D supplies the first and second excitation light to the PD nonlinear optical medium 33B in the fourteenth wavelength converter 117D. The fourteenth wavelength converter 117D supplies to the PD nonlinear optical medium 33B in the thirteenth wavelength converter 117C the remaining excitation light that is the transmitted light utilized in the wavelength conversion. That is, the thirteenth wavelength converter 117C uses, for the wavelength conversion, the remaining excitation light utilized in the wavelength conversion from the fourteenth wavelength converter 117D.

The first transmission apparatus 2A of the example 24 supplies the first and second excitation light from the second excitation light source 131A to the twelfth wavelength converter 117B and reuses the remaining excitation light of the twelfth wavelength converter 117B for the eleventh wavelength converter 117A. As a result, the first transmission apparatus 2A may reduce the second excitation light source 131A utilized for the eleventh wavelength converter 117A. In addition, it is possible to improve the utilization efficiency of the excitation light, reduce the electric energy involved in the reduction of the excitation light sources, downsize the component size, and reduce the part cost.

The second transmission apparatus 2B supplies the first and second excitation light from the second excitation light source 131A to the fourteenth wavelength converter 117D and reuses the remaining excitation light of the fourteenth wavelength converter 117D for the thirteenth wavelength converter 117C. As a result, the second transmission apparatus 2B may reduce the second excitation light source 131A utilized for the thirteenth wavelength converter 117C. In addition, it is possible to improve the utilization efficiency of the excitation light, reduce the electric energy involved in the reduction of the excitation light sources, downsize the component size, and reduce the part cost.

The remaining excitation light of the twelfth wavelength converter 117B in the transmission system 1B1 of the foregoing example 24 is used for the eleventh wavelength converter 117A and the remaining excitation light of the fourteenth wavelength converter 117D is used for the thirteenth wavelength converter 117C. However, use of the excitation light is not limited to these and may be used appropriately, an embodiment of which is described below as an example 25.

Example 25

Figure 31A:
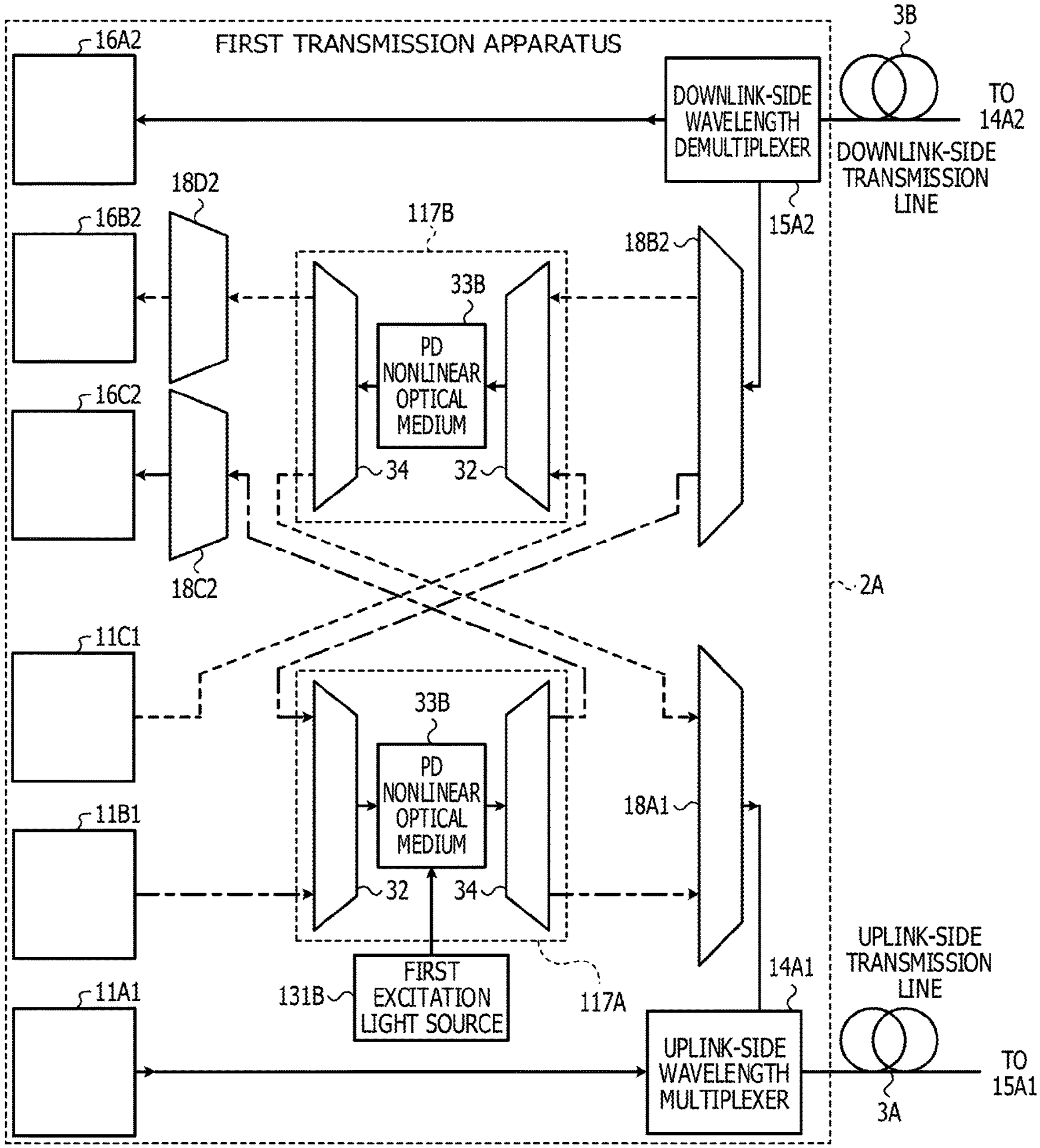
FIGS. 31A and 31B are explanatory diagrams illustrating an example of a transmission system of an example 25.
Figure 31B:
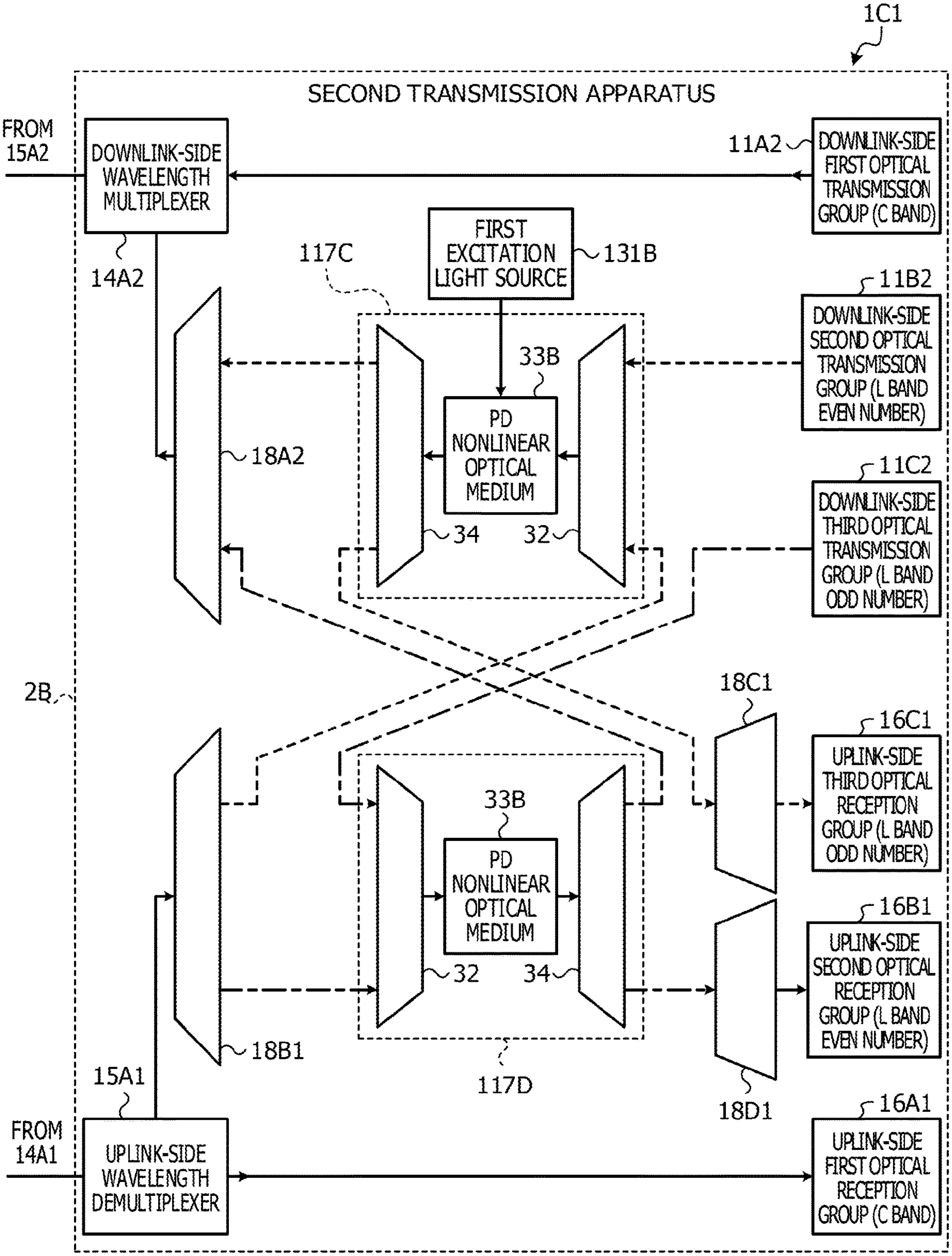

FIG. 31 is an explanatory diagram illustrating an example of a transmission system 1C1 of the example 25. The identical symbols are assigned to the identical configuration of the transmission system 1B1 of the example 24, and thus description of the overlapping configurations and operations is omitted. The first transmission apparatus 2A illustrated in FIG. 30 supplies the first and second excitation light from the second excitation light source 131A to the twelfth wavelength converter 117B and supplies to the eleventh wavelength converter 117A the remaining excitation light that passes through the twelfth wavelength converter 117B. Similarly, the second transmission apparatus 2B supplies the first and second excitation light from the second excitation light source 131A to the fourteenth wavelength converter 117D and supplies to the thirteenth wavelength converter 117C the remaining excitation light that passes through the fourteenth wavelength converter 117D.

In contrast to this, the first transmission apparatus 2A illustrated in FIG. 31 includes a third excitation light source 131B in place of the second excitation light source 131A and supplies the first and second excitation light from the third excitation light source 131B to the eleventh wavelength converter 117A. The first transmission apparatus 2A supplies to the twelfth wavelength converter 117B the remaining excitation light that passes through the eleventh wavelength converter 117A. The second transmission apparatus 2B includes the third excitation light source 131B in place of the second excitation light source 131A and supplies the first and second excitation light from the third excitation light source 131B to the thirteenth wavelength converter 117C. The second transmission apparatus 2B supplies to the fourteenth wavelength converter 117D the remaining excitation light that passes through the thirteenth wavelength converter 117C.

The first transmission apparatus 2A of the example 4 supplies the first and second excitation light from the third excitation light source 131B to the eleventh wavelength converter 117A and reuses the remaining excitation light of the eleventh wavelength converter 117A for the twelfth wavelength converter 117B. As a result, the first transmission apparatus 2A may reduce the second excitation light source 131A utilized for the twelfth wavelength converter 117B.

The second transmission apparatus 2B supplies the first and second excitation light from the third excitation light source 131B to the thirteenth wavelength converter 117C and reuses the remaining excitation light of the thirteenth wavelength converter 117C for the fourteenth wavelength converter 117D. As a result, the second transmission apparatus 2B may reduce the second excitation light source 131A utilized for the fourteenth wavelength converter 117D.

Example 26

Figure 32A:
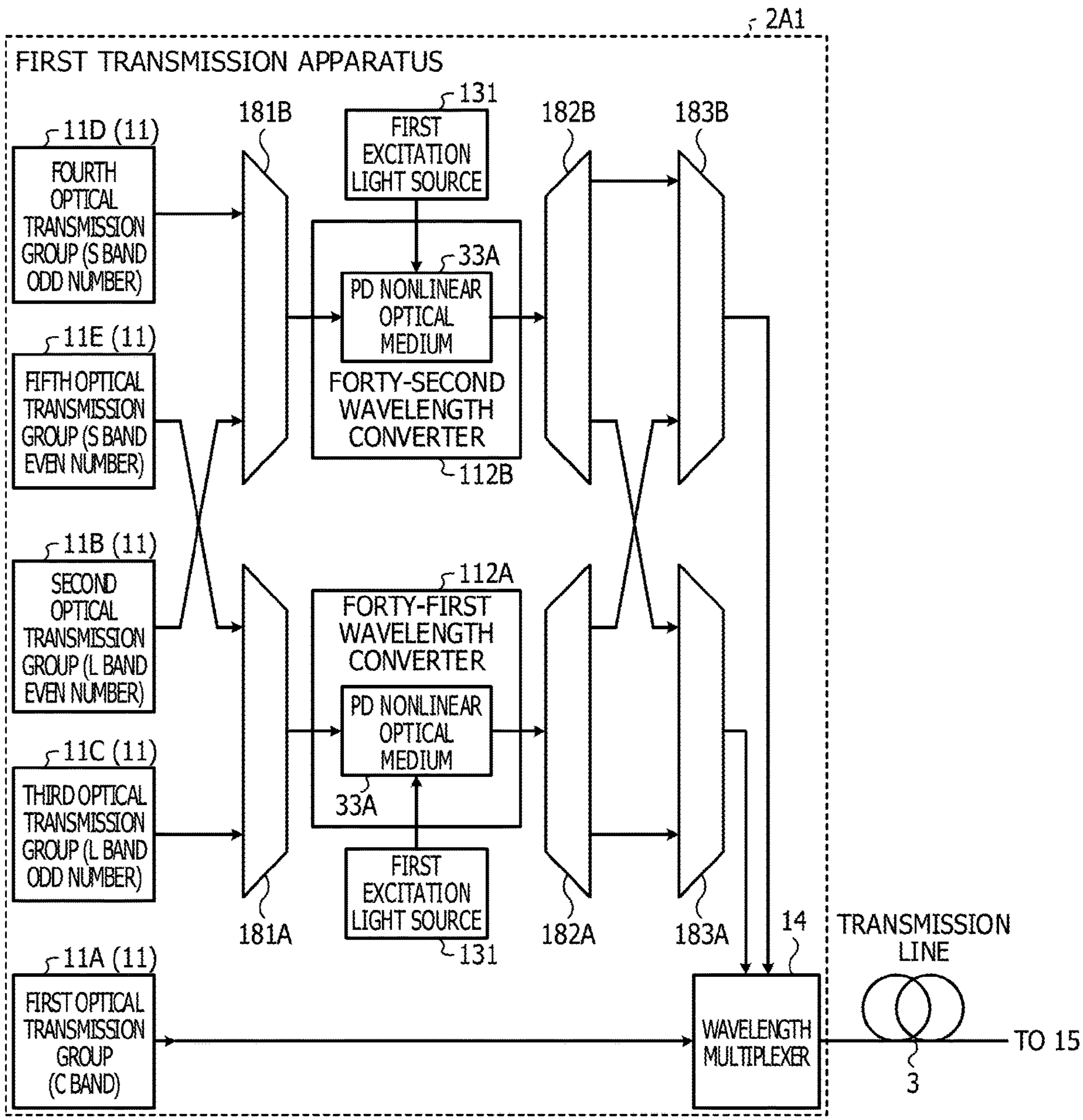
FIGS. 32A and 32B are explanatory diagrams illustrating an example of a transmission system of an example 26.
Figure 32B:
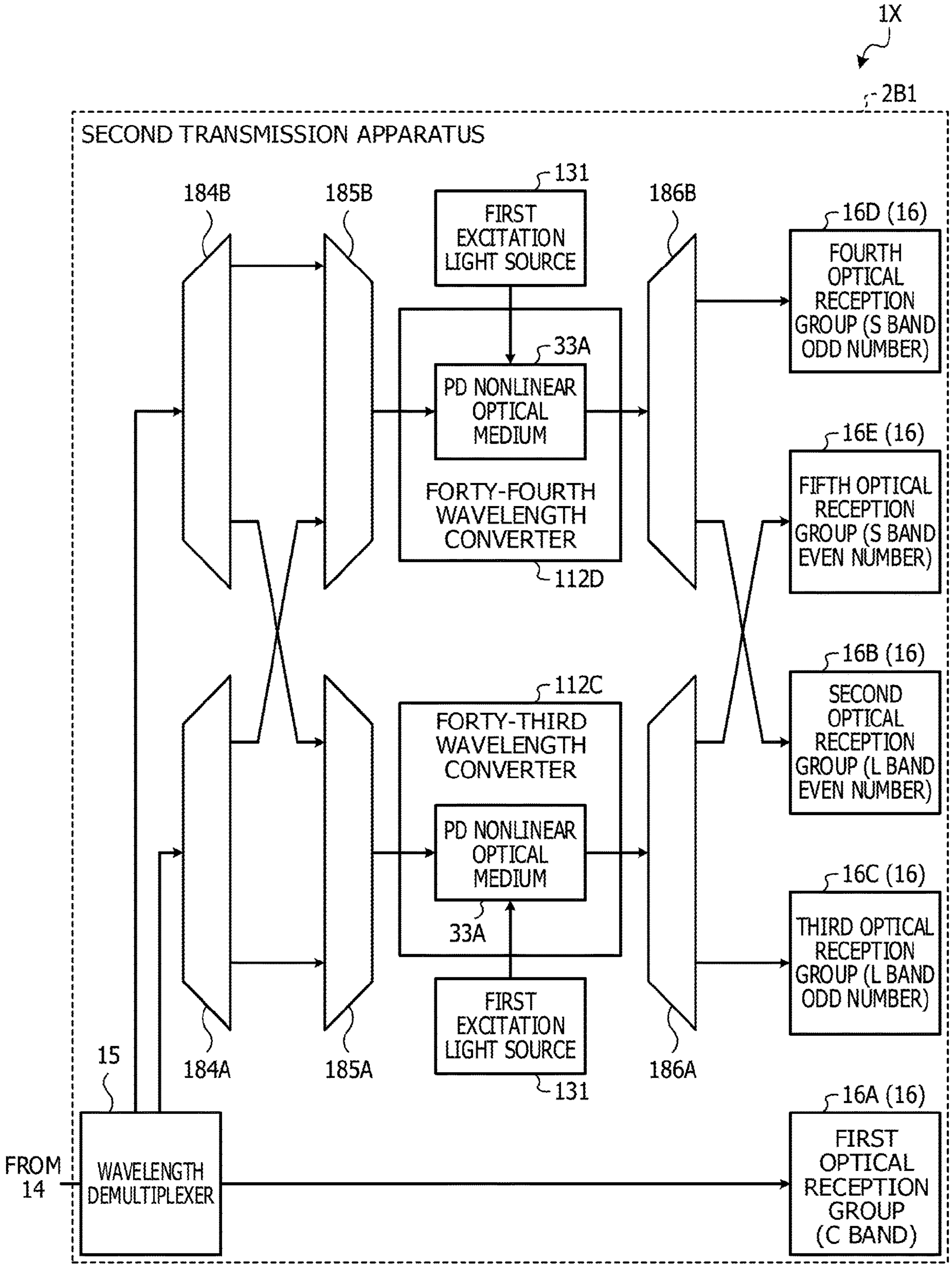

FIG. 32 is an explanatory diagram illustrating an example of a transmission system 1X of the example 26. The transmission system 1X illustrated in FIG. 32 includes a first transmission apparatus 2A1, a second transmission apparatus 2B1, and the transmission line 3, such as optical fibers, that transmits the wavelength multiplex light between the first transmission apparatus 2A1 and the second transmission apparatus 2B1. The first transmission apparatus 2A1 includes the plurality of the optical transmission group 11, thirty-first and thirty-second interleavers 181A and 181B, forty-first and forty-second wavelength converters 112A and 112B, and eighth and ninth WDM couplers 182A and 182B. The first transmission apparatus 2A1 includes thirty-third and thirty-fourth interleavers 183A and 183B, and the wavelength multiplexer 14. The second transmission apparatus 2B1 includes the plurality of optical reception groups 16, thirty-fifth and thirty-sixth interleavers 184A and 184B, forty-third and forty-fourth wavelength converters 112C and 112D, and tenth and eleventh WDM couplers 185A and 185B. The second transmission apparatus 2B1 includes thirty-seventh and thirty-eighth interleavers 186A and 186B, and the wavelength demultiplexer 15.

The first optical transmission group 11A outputs the first multiplex light of the C band to the wavelength multiplexer 14. The second optical transmission group 11B outputs the second multiplex light of the even-numbered channels of the C band to the thirty-second interleaver 181B. The third optical transmission group 11C outputs the third multiplex light of the odd-numbered channels of the C band to the thirty-first interleaver 181A. The fourth optical transmission group 11D outputs the fifth multiplex light of the odd-numbered channels of the C band to the thirty-second interleaver 181B. The fifth optical transmission group 11E outputs the fourth multiplex light of the even-numbered channels of the C band to the thirty-first interleaver 181A.

The thirty-first interleaver 181A multiplexes the third multiplex light of the odd-numbered channels of the C band from the third optical transmission group 11C with the fourth multiplex light of the even-numbered channels of the C band from the fifth optical transmission group 11E to output to the PD nonlinear optical medium 33A in the forty-first wavelength converter 112A. The first excitation light source 131 outputs the first and second excitation light to the PD nonlinear optical medium 33A in the forty-first wavelength converter 112A.

The forty-first wavelength converter 112A propagates the third multiplex light of the odd-numbered channels of the C band, the fourth multiplex light of the even-numbered channels of the C band, and the first and second excitation light over the PD nonlinear optical medium 33A. Using the first and second excitation light, the forty-first wavelength converter 112A wavelength-converts the third multiplex light of the odd-numbered channels of the C band into the third multiplex light of the odd-numbered channels of the L band and wavelength-converts the fourth multiplex light of the even-numbered channels of the C band into the fourth multiplex light of the even-numbered channels of the S band. The forty-first wavelength converter 112A filters the first and second excitation light, the third multiplex light of the odd-numbered channels of the C band, and the fourth multiplex light of the even-numbered channels of the C band before the wavelength conversion. Then, the forty-first wavelength converter 112A outputs the third multiplex light of the odd-numbered channels of the L band and the fourth multiplex light of the even-numbered channels of the S band to the eighth WDM coupler 182A.

The thirty-second interleaver 181B multiplexes the second multiplex light of the even-numbered channels of the C band from the second optical transmission group 11B with the fifth multiplex light of the odd-numbered channels of the C band from the fourth optical transmission group 11D to output to the PD nonlinear optical medium 33A in the forty-second wavelength converter 112B. The first excitation light source 131 outputs the first and second excitation light to the PD nonlinear optical medium 33A in the forty-second wavelength converter 112B.

The forty-second wavelength converter 112B propagates the second multiplex light of the even-numbered channels of the C band, the fifth multiplex light of the odd-numbered channels of the C band, and the first and second excitation light over the PD nonlinear optical medium 33A. Using the first and second excitation light, the forty-second wavelength converter 112B wavelength-converts the second multiplex light of the even-numbered channels of the C band into the second multiplex light of the even-numbered channels of the L band and wavelength-converts the fifth multiplex light of the odd-numbered channels of the C band into the fifth multiplex light of the odd-numbered channels of the S band. The forty-second wavelength converter 112B filters the first and second excitation light, the second multiplex light of the even-numbered channels of the C and, and the fifth multiplex light of the odd-numbered channels of the C band before the wavelength conversion. Then, the forty-second wavelength converter 112B outputs the second multiplex light of the even-numbered channels of the L band and the fifth multiplex light of the odd-numbered channels of the S band to the ninth WDM coupler 182B.

The eighth WDM coupler 182A outputs to the thirty-third interleaver 183A the third multiplex light of the odd-numbered channels of the L band, of the output light of the forty-first wavelength converter 112A and outputs the fourth multiplex light of the even-numbered channels of the S band to the thirty-fourth interleaver 183B. The ninth WDM coupler 182B outputs to the thirty-third interleaver 183A the second multiplex light of the even-numbered channels of the L band, of the output light of the forty-second wavelength converter 112B and outputs the fifth multiplex light of the odd-numbered channels of the S band to the thirty-fourth interleaver 1836.

The thirty-third interleaver 183A multiplexes the third multiplex light of the odd-numbered channels of the L band with the second multiplex light of the even-numbered channels of the L band to output to the wavelength multiplexer 14. The thirty-fourth interleaver 183B multiplexes the fifth multiplex light of the odd-numbered channels of the S band with the fourth multiplex light of the even-numbered channels of the S band to output to the wavelength multiplexer 14. The wavelength multiplexer 14 multiplexes the second multiplex light of the even-numbered channels of the L band, the third multiplex light of the odd-numbered channels of the L band, the fourth multiplex light of the even-numbered channels of the S band, the fifth multiplex light of the odd-numbered channels of the S band, and the first multiplex light of the C band to output to the transmission line 3.

The wavelength demultiplexer 15 in the second transmission apparatus 2B1 outputs the first multiplex light of the C band to the first optical reception group 16A and the second multiplex light and third the multiplex light of the L band to the thirty-fifth interleaver 184A, of the output light from the transmission line 3. Furthermore, the wavelength demultiplexer 15 outputs the fourth multiplex light and the fifth multiplex light of the S band to the thirty-sixth interleaver 184B. The thirty-fifth interleaver 184A outputs the third multiplex light of the odd-numbered channels of the L band to the tenth WDM coupler 185A and outputs the second multiplex light of the even-numbered channels of the L band to the eleventh WDM coupler 185B. The thirty-sixth interleaver 184B outputs the fourth multiplex light of the even-numbered channels of the S band to the tenth WDM coupler 185A and outputs the fifth multiplex light of the odd-numbered channels of the S band to the eleventh WDM coupler 185B.

The tenth WDM coupler 185A outputs the third multiplex light of the odd-numbered channels of the L band and the second multiplex light of the even-numbered channels of the L band to the PD nonlinear optical medium 33A in the forty-third wavelength converter 112C. The first excitation light source 131 outputs the first and second excitation light to the PD nonlinear optical medium 33A in the forty-third wavelength converter 112C.

The forty-third wavelength converter 112C propagates the third multiplex light of the odd-numbered channels of the L band, the fourth multiplex light of the even-numbered channels of the S band, and the first and second excitation light over the PD nonlinear optical medium 33A. Using the first and second excitation light, the forty-third wavelength converter 112C wavelength-converts the third multiplex light of the odd-numbered channels of the L band into the third multiplex light of the odd-numbered channels of the C band and wavelength-converts the fourth multiplex light of the even-numbered channels of the S band into the fourth multiplex light of the even-numbered channels of the C band. The forty-third wavelength converter 112C filters the first and second excitation light, the third multiplex light of the odd-numbered channels of the L band, and the fourth multiplex light of the even-numbered channels of the S band before the wavelength conversion. Then, the forty-third wavelength converter 112C outputs the third multiplex light of the odd-numbered channels of the C band and the fourth multiplex light of the even-numbered channels of the C band to the thirty-seventh interleaver 186A. The thirty-seventh interleaver 186A outputs the third multiplex light of the odd-numbered channels of the C band to the third optical reception group 16C and outputs the fourth multiplex light of the even-numbered channels of the C band to the fifth optical reception group 16E.

The eleventh WDM coupler 185B outputs the fifth multiplex light of the odd-numbered channels of the S band and the second multiplex light of the even-numbered channels of the L band to the PD nonlinear optical medium 33A in the forty-fourth wavelength converter 112D. The first excitation light source 131 outputs the first and second excitation light to the PD nonlinear optical medium 33A in the forty-fourth wavelength converter 112D.

Figure 33:
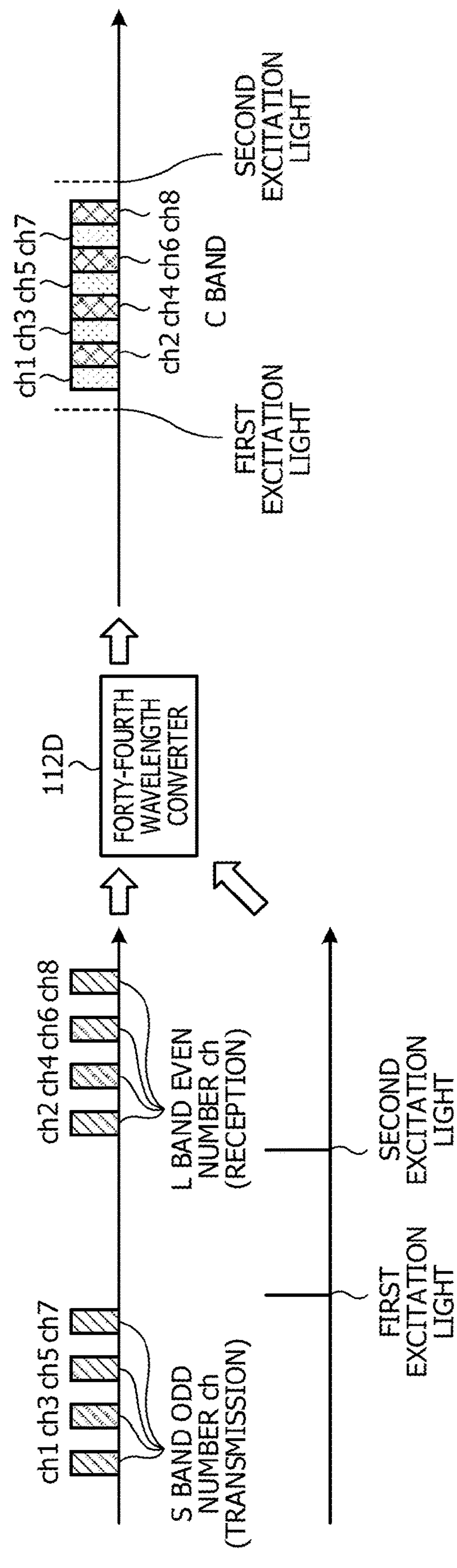
FIG. 33 is an explanatory diagram illustrating an example of a wavelength conversion operation of a forty-third wavelength converter.

FIG. 33 is an explanatory diagram illustrating an example of a processing operation of the forty-fourth wavelength converter 112D. As illustrated in FIG. 33, the forty-fourth wavelength converter 112D propagates the fifth multiplex light of the odd-numbered channels of the S band, the second multiplex light of the even-numbered channels of the L band, the first and second excitation light over the PD nonlinear optical medium 33A. Using the first and second excitation light, the forty-fourth wavelength converter 112D wavelength-converts the fifth multiplex light of the odd-numbered channels of the S band into the fifth multiplex light of the odd-numbered channels of the C band and wavelength-converts the second multiplex light of the even-numbered channels of the L band into the second multiplex light of the even-numbered channels of the C band.

The forty-fourth wavelength converter 112D filters the first and second excitation light, the fifth multiplex light of the odd-numbered channels of the S band, and the second multiplex light of the even-numbered channels of the L band before the wavelength conversion. Then, the forty-fourth wavelength converter 112D outputs the fifth multiplex light of the odd-numbered channels of the C band and the second multiplex light of the even-numbered channels of the C band to the thirty-eighth interleaver 186B. The thirty-eighth interleaver 186B outputs the fifth multiplex light of the odd-numbered channels of the C band to the fourth optical reception group 16D and outputs the second multiplex light of the even-numbered channels of the C band to the third optical reception group 16C.

The first transmission apparatus 2A inputs the third multiplex light of the odd-numbered channels of the C band and the fourth multiplex light of the even-numbered channels of the C band to the forty-first wavelength converter 112A. Then, the forty-first wavelength converter 112A wavelength-converts the third multiplex light of the odd-numbered channels of the C band into the third multiplex light of the odd-numbered channels of the L band and wavelength-converts the fourth multiplex light of the even-numbered channels of the C band into the fourth multiplex light of the even-numbered channels of the S band. As a result, the forty-first wavelength converter 112A may reduce the nonlinear optical distortions, because each wavelength converter is in charge of only either the odd number channels or the even number channels, which are channels not next to each other.

The first transmission apparatus 2A inputs the fifth multiplex light of the odd-numbered channels of the C band and the second multiplex light of the even-numbered channels of the C band to the forty-second wavelength converter 112B. Then, the forty-second wavelength converter 112B wavelength-converts the fifth multiplex light of the odd-numbered channels of the C band into the fifth multiplex light of the odd-numbered channels of the S band and wavelength-converts the second multiplex light of the even-numbered channels of the C band into the second multiplex light of the even-numbered channels of the L band. As a result, the forty-second wavelength converter 112B may reduce the nonlinear optical distortions, because each wavelength converter is in charge of only either the odd number channels or the even number channels, which are channels not next to each other.

There are a variety of kinds of the PD nonlinear optical medium 33A, an embodiment of which is described below as an example 27.

Example 27

Figure 34:
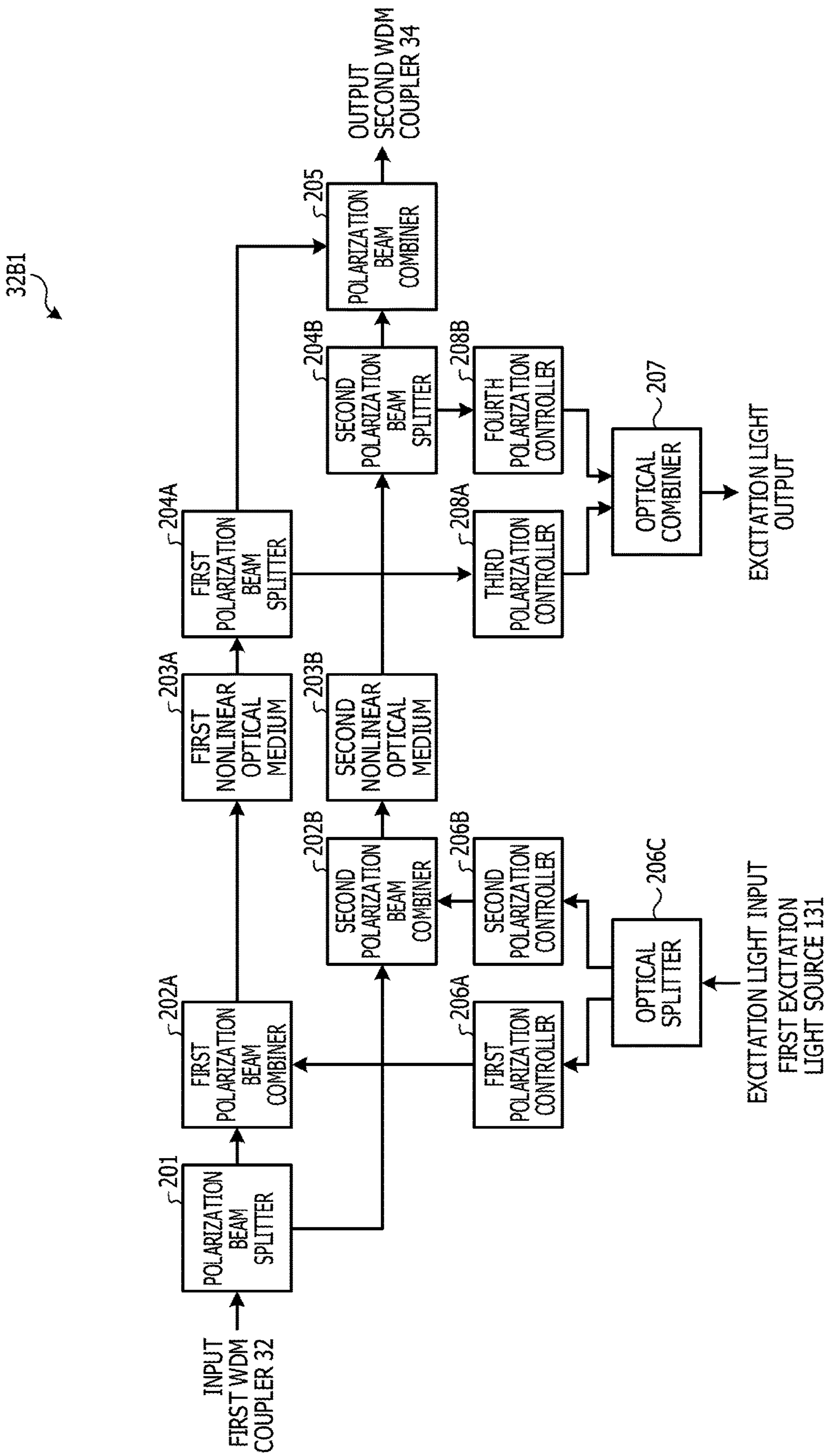
FIG. 34 is an explanatory diagram illustrating an example of a PD nonlinear optical medium of an example 27.

FIG. 34 is an explanatory diagram illustrating an example of a PD nonlinear optical medium 33B1 of the example 27. The PD nonlinear optical medium 33B1 illustrated in FIG. 34 has the branching processing configuration of the single direction input and output. The PD nonlinear optical medium 33B1 includes a polarization beam splitter 201 a first polarization beam combiner 202A, a first nonlinear optical medium 203A a first polarization beam splitter 204A, and a polarization beam combiner 205. Furthermore, the PD nonlinear optical medium 33B1 includes a second polarization beam combiner 202B, a second nonlinear optical medium 203B and a second polarization beam splitter 204B. Furthermore, the PD nonlinear optical medium 33B1 includes an optical splitter 206C, a first polarization controller 206A, and a second polarization controller 206B. Furthermore, the PD nonlinear optical medium 33B1 includes an optical combiner 207, a third polarization controller 208A, and a fourth polarization controller 208B.

The polarization beam splitter 201 separates the second and third multiplex light from the first WDM coupler 32 into the second and third multiplex light of the vertical polarization and the second and third multiplex light of the horizontal polarization. The polarization beam splitter 201 outputs the second and third multiplex light of the vertical polarization to the first polarization beam combiner 202A and outputs the second and third multiplex light of the horizontal polarization to the second polarization beam combiner 202B. The optical splitter 206C distributes the first and second excitation light from the first excitation light source 131 to the first polarization controller 206A and the second polarization controller 206B. The first polarization controller 206A polarization-controls the first and second excitation light so as to be orthogonal to the second and third multiplex light of the vertical polarization, and outputs to the first polarization beam combiner 202A the first and second excitation light after the polarization control.

The first polarization beam combiner 202A outputs to the first nonlinear optical medium 203A the second and third multiplex light of the vertical polarization and the first and second excitation light after the polarization control from the first polarization controller 206A. The first nonlinear optical medium 203A propagates the first and second excitation light and the second and third multiplex light of the vertical polarization. Using the first and second excitation light, the first nonlinear optical medium 203A wavelength-converts the second and third multiplex light of the vertical polarization, and outputs to the first polarization beam splitter 204A the second and third multiplex light of the vertical polarization after the wavelength conversion. The first polarization beam splitter 204A outputs to the polarization beam combiner 205 the second and third multiplex light of the vertical polarization after the wavelength conversion, and outputs the first and second excitation light to the third polarization controller 208A. The third polarization controller 208A outputs the first and second excitation light from the first polarization beam splitter 204A to the optical combiner 207. The second polarization controller 206B polarization-controls the first and second excitation light so as to be orthogonal to the second and third multiplex light of the horizontal polarization, and outputs to the second polarization beam combiner 202B the first and second excitation light after the polarization control.

The second polarization beam combiner 202B outputs to the second nonlinear optical medium 203B the second and third multiplex light of the horizontal polarization and the first and second excitation light after the polarization control from the second polarization controller 206B. The second nonlinear optical medium 203B propagates the first and second excitation light and the second and third multiplex light of the horizontal polarization. Using the first and second excitation light, the second nonlinear optical medium 203B wavelength-converts the second and third multiplex light of the horizontal polarization, and outputs to the second polarization beam splitter 204B the second and third multiplex light of the horizontal polarization after the wavelength conversion. The second polarization beam splitter 204B outputs to the polarization beam combiner 205 the second and third multiplex light of the horizontal polarization after the wavelength conversion, and outputs the first and second excitation light to the fourth polarization controller 208B. The fourth polarization controller 208B outputs the first and second excitation light from the second polarization beam splitter 204B to the optical combiner 207. The optical combiner 207 outputs the first and second excitation light from the third polarization controller 208A and the fourth polarization controller 208B.

The polarization beam combiner 205 multiplexes the second and third multiplex light of the vertical polarization after the wavelength conversion from the first polarization beam splitter 204A with the second and third multiplex light of the horizontal polarization after the wavelength conversion from the second polarization beam splitter 204B. Then, the polarization beam combiner 205 outputs the multiplexed second and third multiplex light to the second WDM coupler 34.

The PD nonlinear optical medium 33B1 of the example 27 has the branching processing configuration of the single direction input and output, and may wavelength-convert the second and third multiplex light even if the first and second excitation light is used. For the purpose of illustration, although a case is illustrated in which the second multiplex light and third multiplex light are wavelength-converted, the wavelength conversion is not limited to this and may be changed appropriately.

Although the PD nonlinear optical medium 33B1 of the foregoing example 27 has the branching processing configuration of the single direction input and output, the PD nonlinear optical medium 33B1 is not limited to this, and an embodiment in that case is described below as an example 28.

Example 28

Figure 35:
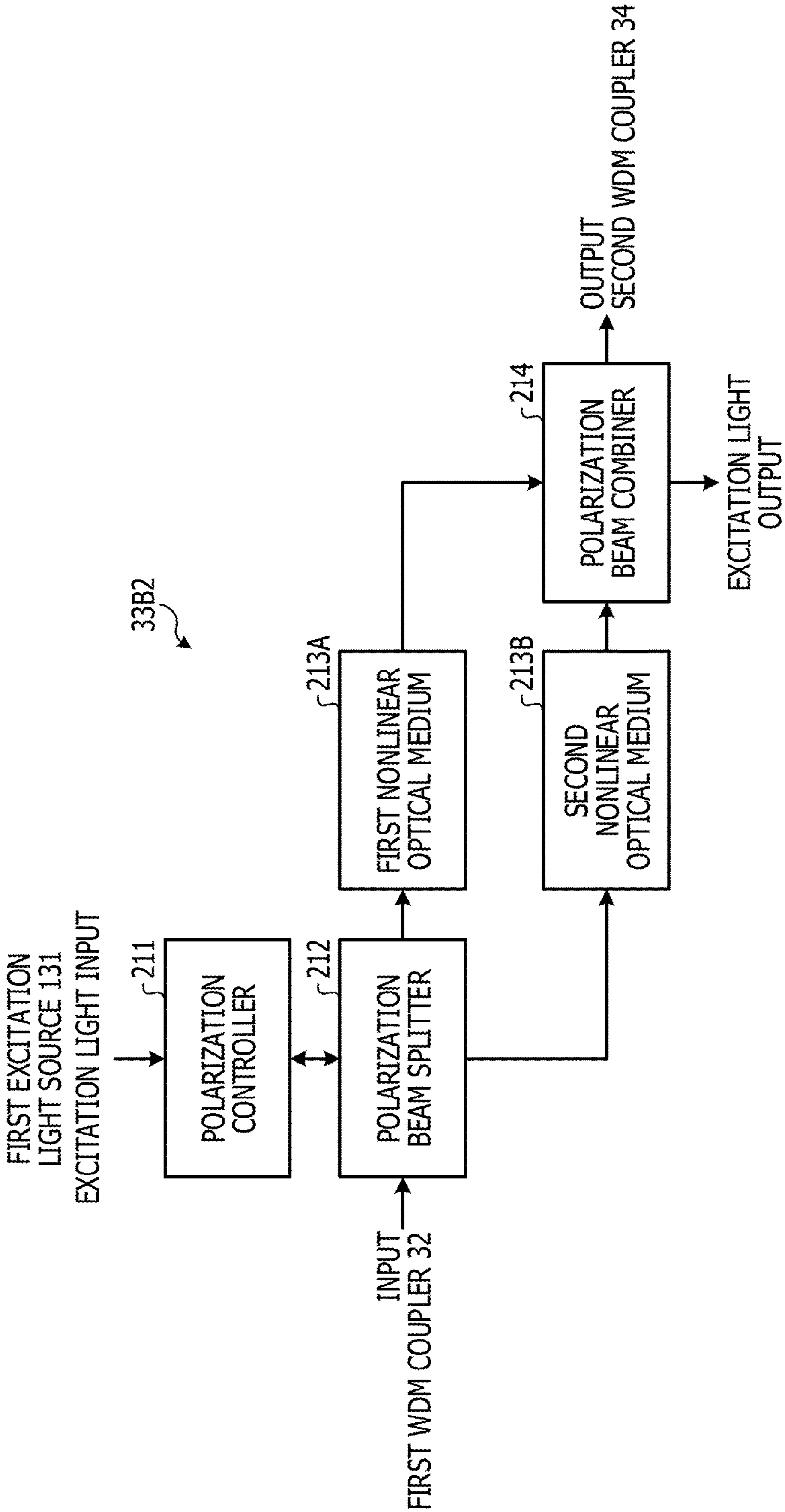
FIG. 35 is an explanatory diagram illustrating an example of a PD nonlinear optical medium of an example 28.

The PD nonlinear optical medium 33B2 illustrated in FIG. 35 includes a polarization controller 211, a polarization beam splitter 212, a first nonlinear optical medium 213A, a second nonlinear optical medium 213B, and a polarization beam combiner 214.

The polarization controller 211 outputs the first and second excitation light from the first excitation light source 131 to the polarization beam splitter 212. The polarization beam splitter 212 inputs the second and third multiplex light from the first WDM coupler 32. The polarization beam splitter 212 outputs to the first nonlinear optical medium 213A the second and third multiplex light and the first and second excitation light of the vertical polarization. Using the first and second excitation light, the first nonlinear optical medium 213A wavelength-converts the second and third multiplex light of the vertical polarization, and outputs to the polarization beam combiner 214 the second and third multiplex light of the vertical polarization after the wavelength conversion.

The polarization beam splitter 212 outputs to the second nonlinear optical medium 213B the second and third multiplex light and the first and second excitation light of the horizontal polarization. Using the first and second excitation light, the second nonlinear optical medium 213B wavelength-converts the second and third multiplex light of the horizontal polarization, and outputs to the polarization beam combiner 214 the second and third multiplex light of the horizontal polarization after the wavelength conversion. The polarization beam combiner 214 outputs to the second WDM coupler 34 the second and third multiplex light of the vertical polarization after the wavelength conversion and the second and third multiplex light of the horizontal polarization after the wavelength conversion, and outputs the remaining excitation light.

The PD nonlinear optical medium 33B2 of the example 28 has the branching processing configuration of the single direction input and output, and may wavelength-convert the second and third multiplex light even if the first and second excitation light is used. For the purpose of illustration, although the case is illustrated in which the second multiplex light and the third multiplex light are wavelength-converted, the wavelength conversion is not limited to this and may be changed appropriately.

Although the PD nonlinear optical medium 33B1 of the foregoing example 27 adopts the branching processing configuration of the single direction input and output, the PD nonlinear optical medium 33B1 may adopt the light-transmissive-type loop processing configuration of the single direction input and output, and an embodiment in that case is described below as an example 29.

Example 29

Figure 36:
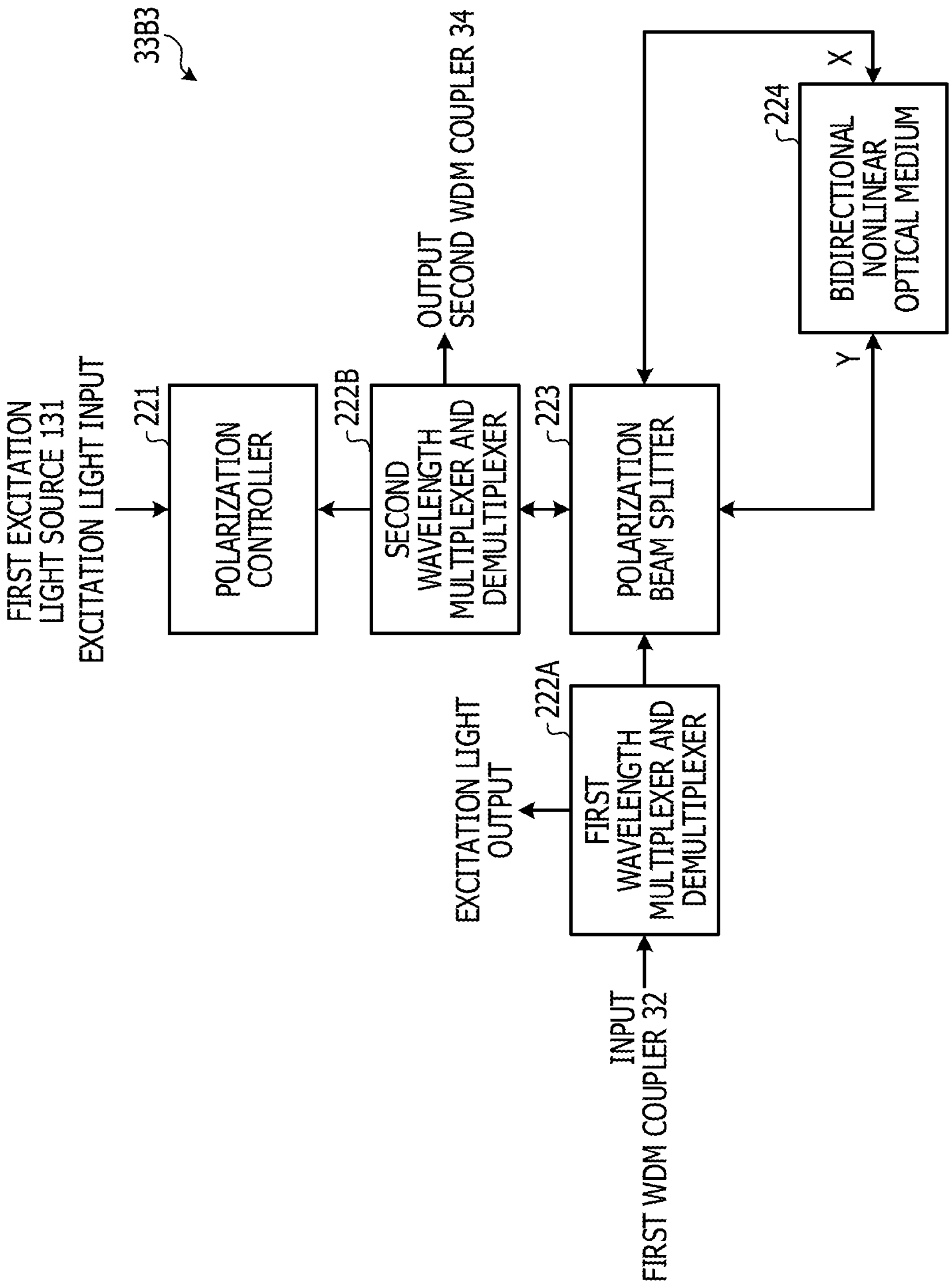
FIG. 36 is an explanatory diagram illustrating an example of a PD nonlinear optical medium of an example 29.

FIG. 36 is an explanatory diagram illustrating an example of a PD nonlinear optical medium 33B3 of the example 29. The PD nonlinear optical medium 33B3 illustrated in FIG. 36 is a nonlinear optical medium of the light-transmissive-type loop processing configuration of the single direction input and output. The PD nonlinear optical medium 33B3 includes a polarization controller 221, a first wavelength multiplexer and demultiplexer 222A, a second wavelength multiplexer and demultiplexer 222B, a polarization beam splitter 223, and a bidirectional nonlinear optical medium 224.

The first wavelength multiplexer and demultiplexer 222A outputs the second and third multiplex light from the first WDM coupler 32 to the polarization beam splitter 222. The polarization controller 221 polarization-controls the first and second excitation light from the first excitation light source 131, and outputs to the second wavelength multiplexer and demultiplexer 222B the first and second excitation light after the polarization control. The second wavelength multiplexer and demultiplexer 222B outputs to the polarization beam splitter 223 the first and second excitation light after the polarization control. The polarization beam splitter 223 outputs the second and third multiplex light and the first and second excitation light of the vertical polarization to the forward port X of the bidirectional nonlinear optical medium 224. Using the first and second excitation light, the bidirectional nonlinear optical medium 224 wavelength-converts the second and third multiplex light of the vertical polarization, and outputs to the polarization beam splitter 223 the second and third multiplex light of the vertical polarization after the wavelength conversion. The polarization beam splitter 223 outputs the second and third multiplex light of the vertical polarization to the second wavelength multiplexer and demultiplexer 222B and outputs the remaining excitation light to the first wavelength multiplexer and demultiplexer 222A.

The polarization beam splitter 223 outputs the second and third multiplex light and the first and second excitation light of the horizontal polarization to the backward port Y of the bidirectional nonlinear optical medium 224. Using the first and second excitation light, the bidirectional nonlinear optical medium 224 wavelength-converts the second and third multiplex light of the horizontal polarization, and outputs to the polarization beam splitter 223 the second and third multiplex light of the horizontal polarization after the wavelength conversion. The polarization beam splitter 223 outputs the second and third multiplex light of the horizontal polarization to the second wavelength multiplexer and demultiplexer 222B and outputs the remaining excitation light to the first wavelength multiplexer and demultiplexer 222A. The first wavelength multiplexer and demultiplexer 222A outputs the remaining excitation light from the polarization beam splitter 223. The second wavelength multiplexer and demultiplexer 222B outputs to the second WDM coupler 34 the second and third multiplex light of the vertical polarization and the second and third multiplex light of the horizontal polarization.

Even if the bidirectional PD nonlinear optical medium 33B3 of the example 29 adopts the light-transmissive-type loop processing configuration of the single direction input and output, the bidirectional PD nonlinear optical medium 33B3 may wavelength-convert the second and third multiplex light using the first and second excitation light. For the purpose of illustration, although the case is illustrated in which the second multiplex light and the third multiplex light are wavelength-converted, the wavelength conversion is not limited to this, and may be changed appropriately.

The PD nonlinear optical medium 33B3 of the foregoing example 29 is not limited to this, an embodiment of which is described below as an example 30.

Example 30

Figure 37:
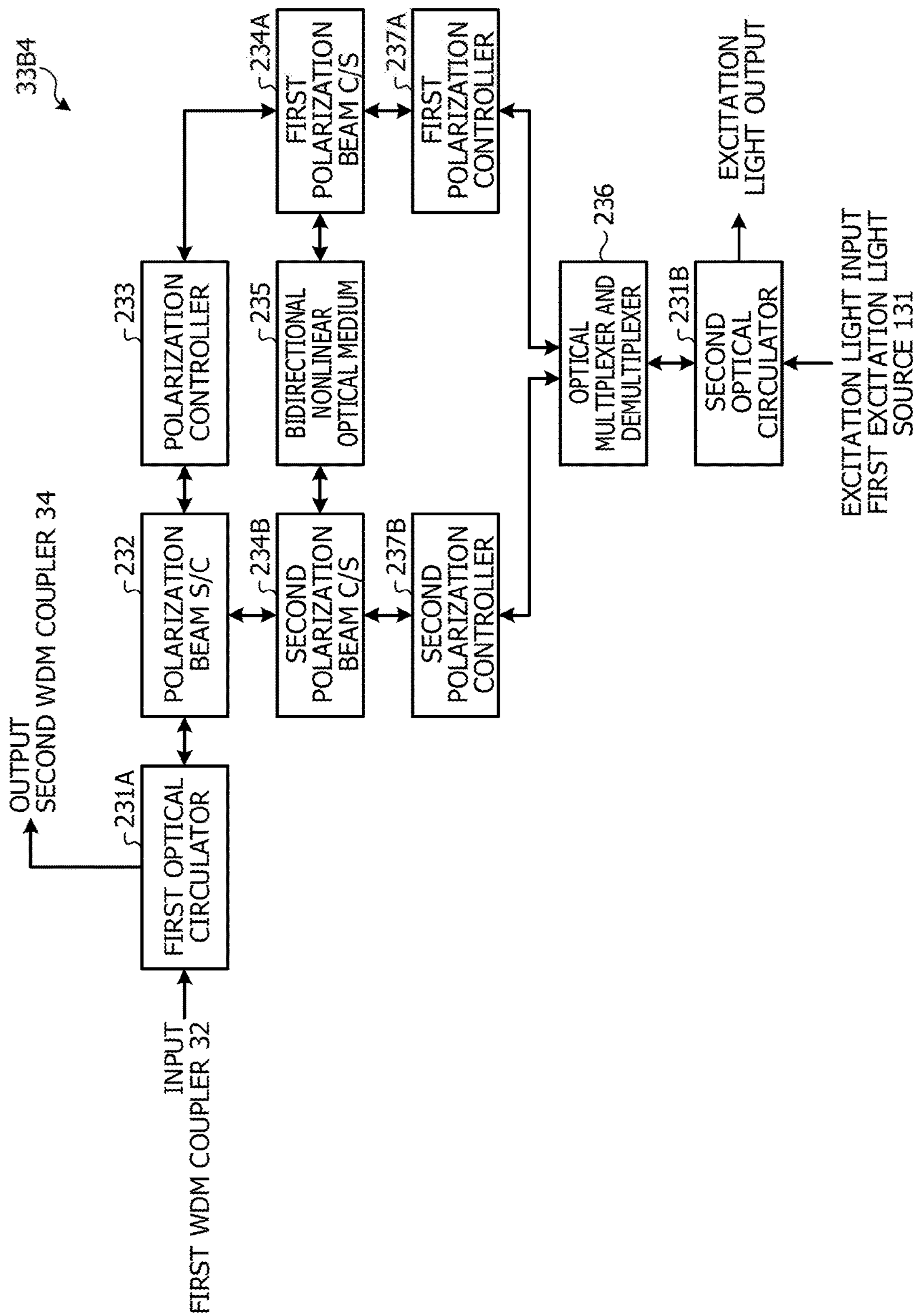
FIG. 37 is an explanatory diagram illustrating an example of a PD nonlinear optical medium of an example 30.

FIG. 37 is an explanatory diagram illustrating an example of a PD nonlinear optical medium 33B4 of the example 30. The PD nonlinear optical medium 33B4 illustrated in FIG. 37 includes a first optical circulator 231A, a polarization beam splitter/combiner (S/C) 232, a polarization controller 233, and a first polarization beam combiner/splitter (C/S) 234A. Furthermore, the PD nonlinear optical medium 33B4 a bidirectional nonlinear optical medium 235 and a second polarization beam C/S 234B. The PD nonlinear optical medium 33B4 includes a second optical circulator 231B, an optical multiplexer and demultiplexer 236, a first polarization controller 237A, and a second polarization controller 2376.

The first optical circulator 231A outputs the second and third multiplex light from the first WDM coupler 32 to the polarization beam S/C 232. The polarization beam S/C 232 outputs the second and third multiplex light of the vertical polarization to the polarization controller 233 and outputs the second and third multiplex light of the horizontal polarization to the second polarization beam C/S 234B. The polarization controller 233 polarization-controls the second and third multiplex light of the vertical polarization to the second and third multiplex light of the horizontal polarization, and outputs the second and third multiplex light of the horizontal polarization to the first polarization beam C/S 234A.

The second optical circulator 231B outputs the first and second excitation light from the first excitation light source 131 to the optical multiplexer and demultiplexer 236. The optical multiplexer and demultiplexer 236 outputs the first and second excitation light to the first polarization controller 237A and the second polarization controller 237B. The first polarization controller 237A polarization-controls the first and second excitation light so as to be orthogonal to the second and third multiplex light of the horizontal polarization, and outputs to the first polarization beam C/S 234A the first and second excitation light after the polarization control. The second polarization controller 237B polarization-controls the first and second excitation light so as to be orthogonal to the second and third multiplex light of the horizontal polarization, and outputs to the second polarization beam C/S 234B the first and second excitation light after the polarization control.

The first polarization beam C/S 234A outputs the second and third multiplex and the first and second excitation light of the horizontal polarization to the forward port X of the bidirectional nonlinear optical medium 235. Using the first and second excitation light, the bidirectional nonlinear optical medium 235 wavelength-converts the second and third multiplex light of the horizontal polarization and outputs to the second polarization beam C/S 234B the second and third multiplex light of the horizontal polarization after the wavelength conversion. The second polarization beam C/S 234B outputs to the polarization beam S/C 232 the second and third multiplex light of the horizontal polarization after the wavelength conversion, and outputs the remaining excitation light to the second polarization controller 237B.

The second polarization beam C/S 234B outputs the second and third multiplex light and the first and second excitation light of the horizontal polarization to the backward port Y of the bidirectional nonlinear optical medium 235. Using the first and second excitation light, the bidirectional nonlinear optical medium 235 wavelength-converts the second and third multiplex light of the horizontal polarization and outputs to the first polarization beam C/S 234A the second and third multiplex light of the horizontal polarization after the wavelength conversion. The first polarization beam C/S 234A outputs to the polarization controller 233 the second and third multiplex light of the horizontal polarization after the wavelength conversion, and outputs the remaining excitation light to the first polarization controller 237A.

The first polarization controller 237A and the second polarization controller 237B outputs the remaining excitation light to the optical multiplexer and demultiplexer 236. The optical multiplexer and demultiplexer 236 outputs the remaining excitation light by way of the second optical circulator 231B. The polarization beam S/C 232 synthesizes the second and third multiplex light of the vertical polarization from the polarization controller 233 with the second and third multiplex light of the horizontal polarization from the second polarization beam C/S 234B, and outputs to the second WDM coupler 34 by way of the first optical circulator 231A.

Although the PD nonlinear optical medium 33B4 of the example 30 has the reflection-type loop processing configuration of the single direction input and output, the PD nonlinear optical medium 33B4 may wavelength-convert the second and third multiplex light using the first and second excitation light. For the purpose of illustration, although the case is illustrated in which the second multiplex light and the third multiplex light are wavelength-converted, the wavelength conversion is not limited to this and may be changed appropriately.

The PD nonlinear optical medium 33B4 of the foregoing example 30 is not limited to this, an embodiment of which is described below as an example 31.

Example 31

Figure 38:
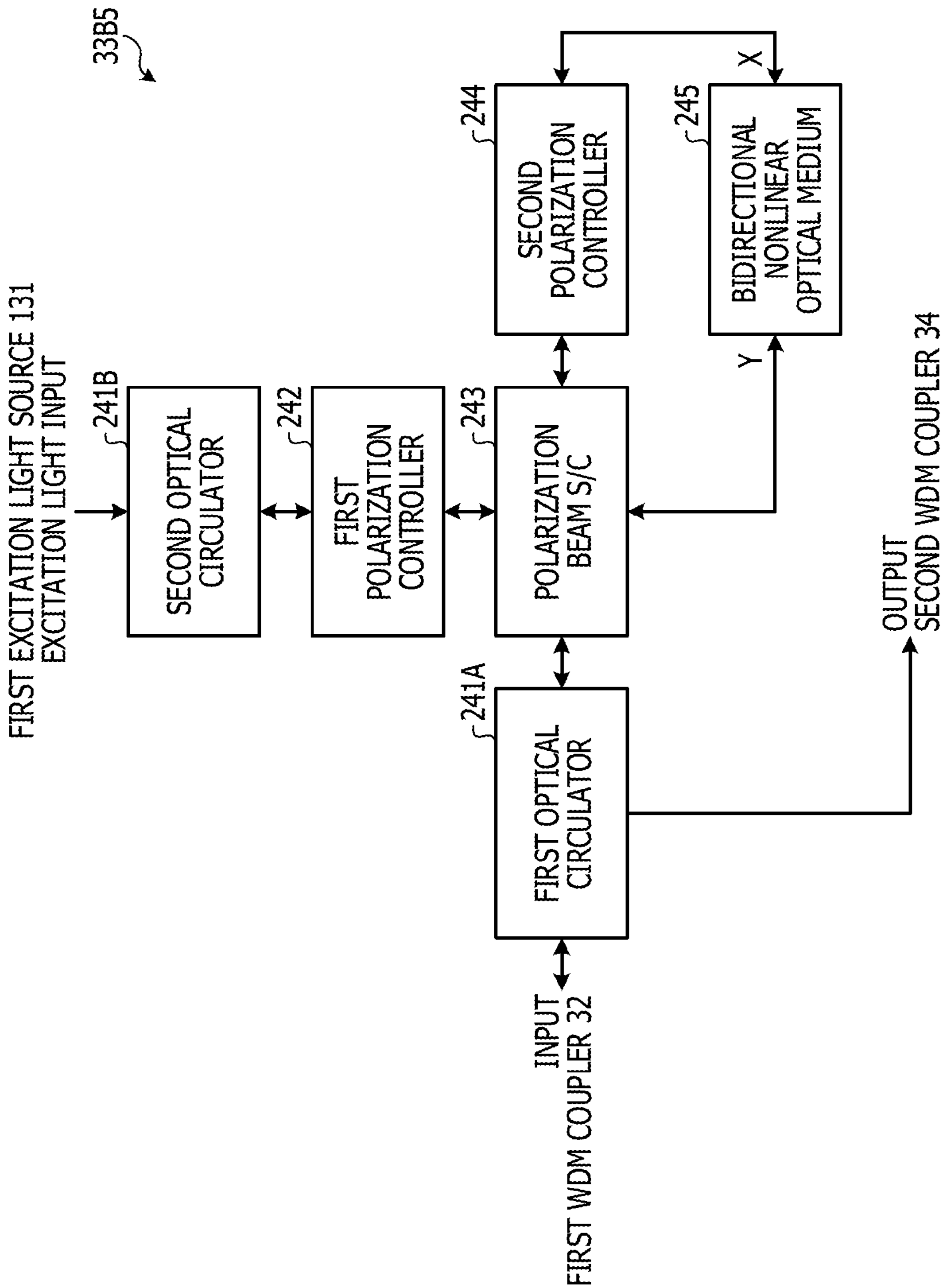
FIG. 38 is an explanatory diagram illustrating an example of a PD nonlinear optical medium of an example 31.

FIG. 38 is an explanatory diagram illustrating an example of a PD nonlinear optical medium 33B5 of an example 31. The PD nonlinear optical medium 33B5 illustrated in FIG. 38 includes a first optical circulator 241A, a second optical circulator 241B, a first polarization controller 242 a polarization beam S/C 243, a second polarization controller 244 and a bidirectional nonlinear optical medium 245.

The first optical circulator 241A outputs the second and third multiplex light from the first WDM coupler 32 to the polarization beam S/C 243. The second optical circulator 241B outputs the first and second excitation light from the first excitation light source 131 to the first polarization controller 242. The first polarization controller 242 outputs to the polarization beam S/C 243 the first and second excitation light after the polarization control. The polarization beam S/C 243 outputs to the second polarization controller 244 the second and third multiplex light of the vertical polarization and the first and second excitation light after the polarization control. Furthermore, the polarization beam S/C 243 outputs the second and third multiplex light of the horizontal polarization and the first and second excitation light after the polarization control to the backward port Y of the bidirectional nonlinear optical medium 245.

The second polarization controller 244 polarization-controls the second and third multiplex light of the vertical polarization to the second and third multiplex light of the horizontal polarization, and outputs the second and third multiplex light of the horizontal polarization after the polarization control and the first and second excitation light after the polarization control to the forward port X of the bidirectional nonlinear optical medium 245. Using the first and second excitation light, the bidirectional nonlinear optical medium 245 wavelength-converts the second and third multiplex light of the horizontal polarization from the forward direction port X into the second and third multiplex light of the vertical polarization. Then, the bidirectional nonlinear optical medium 245 outputs to the polarization beam S/C 243 the second and third multiplex light of the vertical polarization after the wavelength conversion.

Using the first and second excitation light, the bidirectional nonlinear optical medium 245 wavelength-converts the second and third multiplex light of the horizontal polarization from the backward port Y, and outputs to the second polarization controller 244 the second and third multiplex light of the horizontal polarization after the wavelength conversion. The second polarization controller 244 polarization-controls the second and third multiplex light of the horizontal polarization to the second and third multiplex light of the vertical polarization, and outputs to the polarization beam S/C 243 the second and third multiplex light of the vertical polarization after the polarization control.

The polarization beam S/C 243 outputs the second and third multiplex light of the vertical polarization from the second polarization controller 244 and the second and third multiplex light of the horizontal polarization from the bidirectional nonlinear optical medium 245 to the second WDM coupler 34 by way of the first optical circulator 214A. The polarization beam S/C 243 outputs the remaining excitation light to the first polarization controller 242. The first polarization controller 242 outputs the remaining excitation light after the polarization control by way of the second optical circulator 241B.

Even if the PD nonlinear optical medium 33B5 of the example 31 has the reflection-type loop processing configuration of the single input and output, the PD nonlinear optical medium 33B5 may wavelength-convert the second and third multiplex light using the first and second excitation light. For the purpose of illustration, although the case is illustrated in which the second multiplex light and the third multiplex light are wavelength-converted, the wavelength conversion is not limited to this and may be changed appropriately.

The wavelength converter 117 of the foregoing embodiment illustrates the PD nonlinear optical medium 33A of the single direction, the PD nonlinear optical medium 33A is not limited to this, a bidirectional PD nonlinear optical medium 36A may also be adopted, and an embodiment in this case is described below as an example 32.

Example 32

Figure 39A:
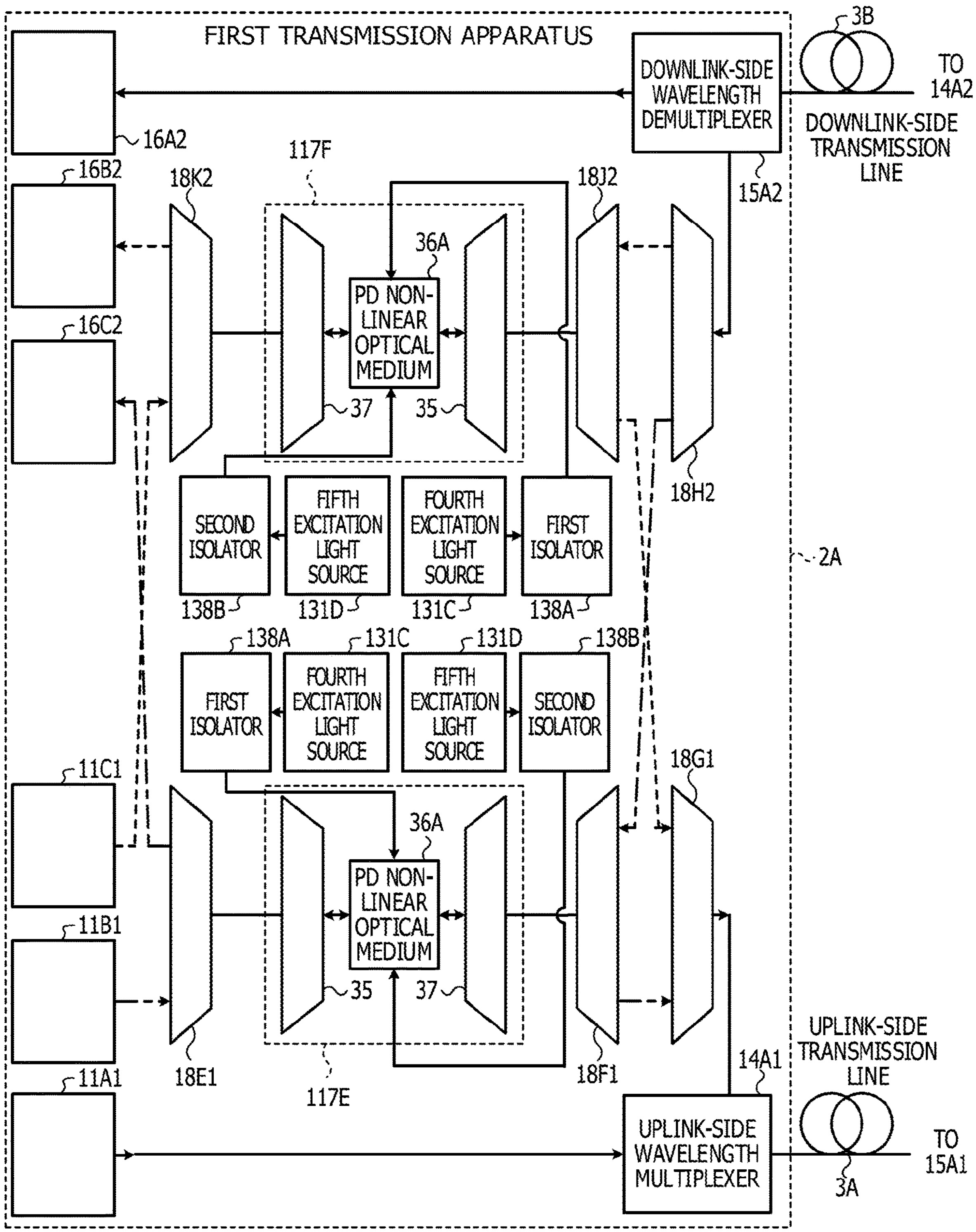
FIGS. 39A and 39B are explanatory diagrams illustrating an example of a transmission system of an example 32.
Figure 39B:
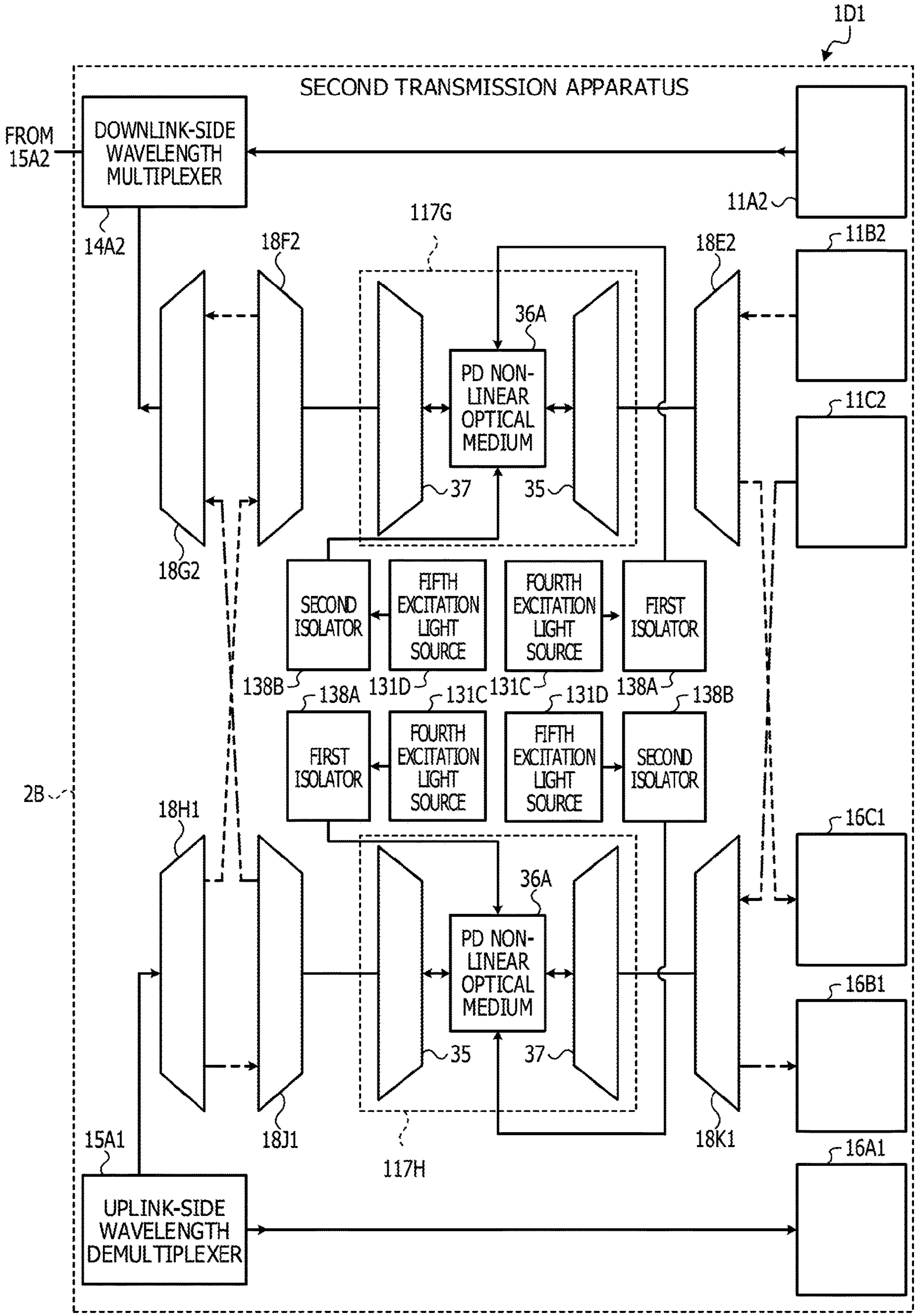

FIG. 39 is an explanatory diagram illustrating an example of the transmission system 1 of the example 32. The identical symbols are assigned to the identical configuration of the transmission system 1D illustrated in FIG. 11 and the transmission system 1D1 illustrated in FIG. 39, and thus description of the overlapping configurations and operations is omitted. The transmission system 1D illustrated in FIG. 11 is different from the transmission system 1D1 illustrated in FIG. 39 in that the fifteenth wavelength converter 17E is changed to a fifteenth wavelength converter 117E, and the sixteenth wavelength converter 17F is changed to a sixteenth wavelength converter 117F. Furthermore, the difference is that the seventeenth wavelength converter 17G is changed to a seventeenth wavelength converter 117G and the eighteenth wavelength converter 17H is changed to an eighteenth wavelength converter 117H.

The fifteenth wavelength converter 117E directly connects to the PD nonlinear optical medium 36A a first isolator 138A connected to a fourth excitation light source 131C, and supplies the first and second excitation light from the fourth excitation light source 131C to the first isolator 138A. Furthermore, the fifteenth wavelength converter 117E directly connects to the PD nonlinear optical medium 36A a second isolator 138B connected to a fifth excitation light source 131D, and outputs the first and second excitation light from the fifth excitation light source 131D to the second isolator 138B.

The sixteenth wavelength converter 117F directly connects to the PD nonlinear optical medium 36A the first isolator 138A connected to the fourth excitation light source 131C, and supplies the first and second excitation light from the fourth excitation light source 131C to the first isolator 138A. Furthermore, the sixteenth wavelength converter 117F directly connects to the PD nonlinear optical medium 36A the second isolator 138BA connected to the fifth excitation light source 131D, and supplies the first and second excitation light from the fifth excitation light source 131D to the second isolator 138B. The seventeenth wavelength converter 117G directly connects to the PD nonlinear optical medium 36A the first isolator 138A connected to the fourth excitation light source 131C, and supplies the first and second excitation light from the fourth excitation light source 131C to the first isolator 138A. Furthermore, the seventeenth wavelength converter 117G directly connects to the PD nonlinear optical medium 36A the second isolator 138BA connected to the fifth excitation light source 131D, and supplies the first and second excitation light from the fifth excitation light source 131D to the second isolator 138B. The eighteenth wavelength converter 117H directly connects to the PD nonlinear optical medium 36A the first isolator 138A connected to the fourth excitation light source 131C, and supplies the first and second excitation light from the fourth excitation light source 131C to the first isolator 138A. Furthermore, the eighteenth wavelength converter 117H directly connects to the PD nonlinear optical medium 36A the second isolator 138BA connected to the fifth excitation light source 131D, and supplies the first and second excitation light from the fifth excitation light source 131D to the second isolator 138B.

The PD nonlinear optical medium 36A in the fifteenth wavelength converter 117E propagates the uplink-side second multiplex light of the C band of the even-numbered channels inputted from the third WDM coupler 35 and the first and second excitation light from the first isolator 138A. Using the first and second excitation light, the PD nonlinear optical medium 36A wavelength-converts the uplink-side second multiplex light of the C band of the even-numbered channels into the uplink-side second multiplex light of the L band of the even-numbered channels, and outputs to the fourth WDM coupler 37. The PD nonlinear optical medium 36A in the fifteenth wavelength converter 117E propagates the downlink-side third multiplex light of the L band of the odd-numbered channels inputted from the fourth WDM coupler 37 and the first and second excitation light from the second isolator 138B. Using the first and second excitation light, the PD nonlinear optical medium 36A wavelength-converts the downlink-side third multiplex light of the L band of the odd-numbered channels into the downlink-side third multiplex light of the C band of the odd-numbered channels, and outputs to the third WDM coupler 35. That is, the fifteenth wavelength converter 17E may achieve at once the processing of the wavelength conversion of the uplink-side second multiplex light of the even-numbered channels and the wavelength conversion of the downlink-side third multiplex light of the odd-numbered channels without interference.

Figures 40A, 40B:
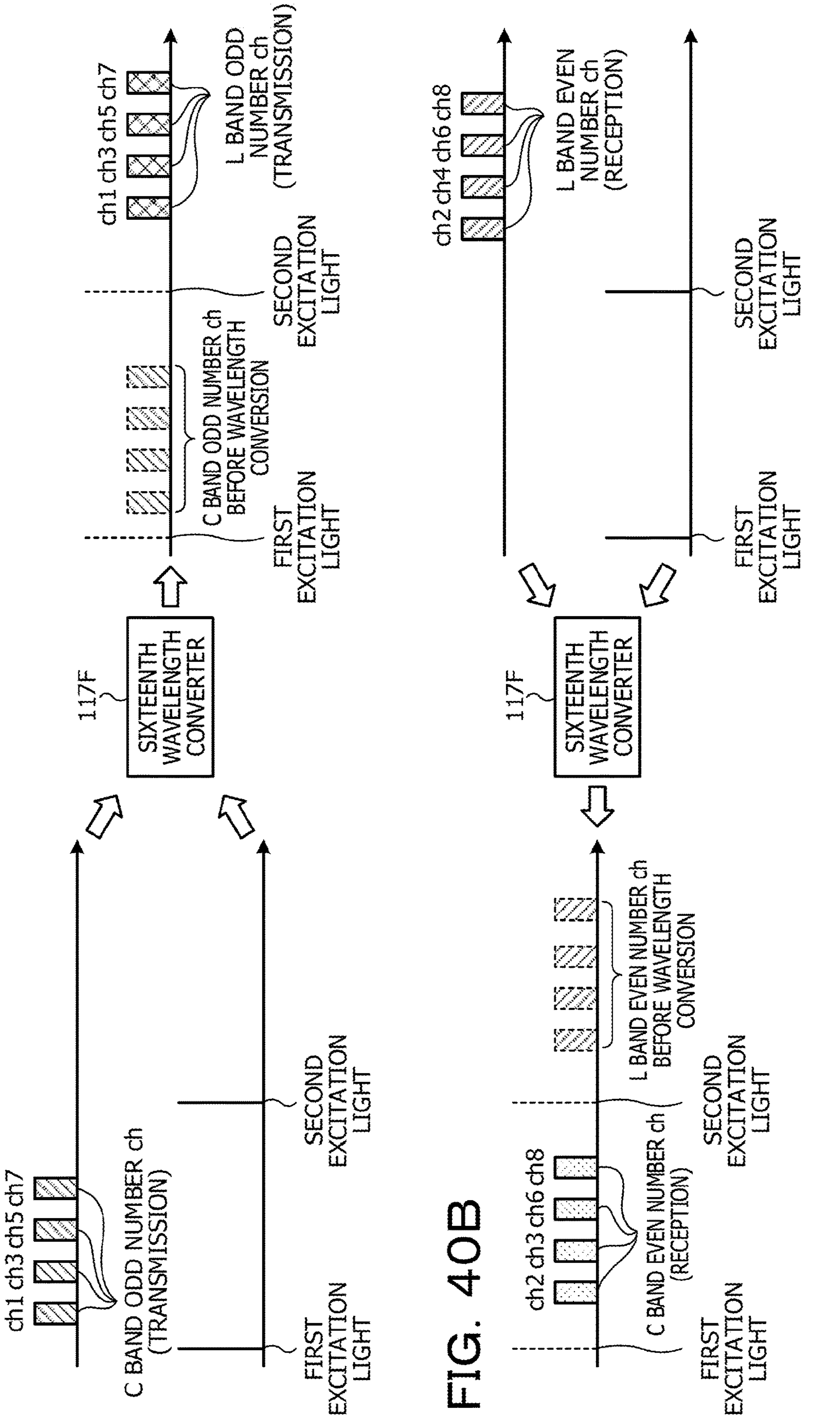
FIG. 40A is an explanatory diagram illustrating an example of the wavelength conversion operation of the sixteenth wavelength converter.
FIG. 40B is an explanatory diagram illustrating an example of the wavelength conversion operation of the sixteenth wavelength converter.

FIG. 40A is an explanatory diagram illustrating an example of the wavelength conversion operation of the sixteenth wavelength converter 117F. The PD nonlinear optical medium 36A in the sixteenth wavelength converter 117F illustrated in FIG. 40A propagates the uplink-side third multiplex light of the C band of the odd-numbered channels inputted from the fourth WDM coupler 37 and the first and second excitation light inputted from the second isolator 138B. Using the first and second excitation light, the PD nonlinear optical medium 36A wavelength-converts the uplink-side third multiplex light of the C band of the odd-numbered channels into the uplink-side third multiplex light of the L band of the odd-numbered channels, and outputs to the third WDM coupler 35. The sixteenth wavelength converter 117F filters the uplink-side third multiplex light of the C band and the first and second excitation light before the wavelength conversion from the uplink-side third multiplex light of the C band of the odd-numbered channels, the first and second excitation light, and the uplink-side third multiplex light of the L band of the odd-numbered channels. Then, the sixteenth wavelength converter 117F outputs the uplink-side third multiplexed light of the L band. FIG. 40B is an explanatory diagram illustrating an example of the wavelength conversion operation of the sixteenth wavelength converter 117F. The PD nonlinear optical medium 36A in the sixteenth wavelength converter 117F illustrated in FIG. 40B propagates the downlink-side second multiplex light of the L band of the even-numbered channels inputted from the third WDM coupler 35 and the first and second excitation light inputted from the first isolator 138A. Using the first and second excitation light, the PD nonlinear optical medium 36A wavelength-converts the downlink-side second multiplex light of the L band of the even-numbered channels into the downlink-side second multiplex light of the C band of the even-numbered channels and outputs to the fourth WDM coupler 37. The sixteenth wavelength converter 117F filters the downlink-side second multiplex light of the C band before the wavelength conversion and the first and second excitation light from the downlink-side second multiplex light of the C band of the even-numbered channels, the first and second excitation light, and the downlink-side second multiplex light of the L band of the even-numbered channels. Then, the sixteenth wavelength converter 117F outputs the downlink-side second multiplex light of the L band. That is the sixteenth wavelength converter 117F may achieve at once the processing of the wavelength conversion of the uplink-side third multiplex light of the odd-numbered channels and the wavelength conversion of the downlink-side second multiplex light of the even-numbered channels without interference.

The PD nonlinear optical medium 36A in the seventeenth wavelength converter 117G propagates the downlink-side second multiplex light of the C band of the even-numbered channels inputted from the third WDM coupler 35 and the first and second excitation light inputted from the first isolator 138A. Using the first and second excitation light, the PD nonlinear optical medium 36A wavelength-converts the downlink-side second multiplex light of the C band of the even-numbered channels into the downlink-side second multiplex light of the L band of the even-numbered channels, and outputs to the fourth WDM coupler 37. The PD nonlinear optical medium 36A in the seventeenth wavelength converter 117G propagates the uplink-side third multiplex light of the L band of the odd-numbered channels inputted from the fourth WDM coupler 37 and the first and second excitation light inputted from the second isolator 138B. Using the first and second excitation light, the PD nonlinear optical medium 36A wavelength-converts the uplink-side third multiplex light of the L band of the odd-numbered channels into the uplink-side third multiplex light of the C band of the odd-numbered channels, and outputs to the third WDM coupler 35. That is, the seventeenth wavelength converter 117G may achieve at once the processing of the wavelength conversion of the uplink-side third multiplex light of the odd-numbered channels and the wavelength conversion of the downlink-side second multiplex light of the even-numbered channels without interference.

The PD nonlinear optical medium 36A in the eighteenth wavelength converter 117H propagates the downlink-side third multiplex light of the C band of the odd-numbered channels inputted from the fourth WDM coupler 37 and the first and second excitation light inputted from the second isolator 138B. Using the first and second excitation light, the PD nonlinear optical medium 36A wavelength-converts the downlink-side third multiplex light of the C band of the odd-numbered channels into the downlink-side third multiplex light of the L band of the odd-numbered channels, and outputs to the third WDM coupler 35. The PD nonlinear optical medium 36A in the eighteenth wavelength converter 117H propagates the uplink-side second multiplex light of the L band of the even-numbered channels inputted from the third WDM coupler 35 and the first and second excitation light inputted from the first isolator 138A. Using the first and second excitation light, the PD nonlinear optical medium 36A wavelength-converts the uplink-side second multiplex light of the L band of the even-numbered channels into the uplink-side second multiplex light of the C band of the even-numbered channels, and outputs to the fourth WDM coupler 37. That is, the eighteenth wavelength converter 117H may achieve at once the processing of the wavelength conversion of the downlink-side third multiplex light of the odd-numbered channels and the wavelength conversion of the uplink-side second multiplex light of the even-numbered channels without interference.

The sixteenth wavelength converter 117F of the example 32 wavelength-converts the uplink-side third multiplex light of the C band of the odd-numbered channels into the uplink-side third multiplex light of the L band, using the PD nonlinear optical medium 36A of the bidirectional input and output. Furthermore, the sixteenth wavelength converter 117F wavelength-converts the downlink-side second multiplex light of the L band of the even-numbered channels into the downlink-side second multiplex light of the C band, using the same PD nonlinear optical medium 36A. As a result, it is possible to reduce the nonlinear optical distortion generated between the adjacent wavelengths by diverting the PD nonlinear optical medium 36A in the uplink signal and the downlink signal and assigning the even-numbered channels to the downlink signal and the odd-numbered channels to the uplink signal.

The fifteenth wavelength converter 117E wavelength-converts the uplink-side second multiplex light of the C band of the even-numbered channels into the uplink-side second multiplex light of the L band, using the PD nonlinear optical medium 36A of the bidirectional input and output. Furthermore, the fifteenth wavelength converter 117E wavelength-converts the downlink-side third multiplex light of the L band of the odd-numbered channels into the downlink-side third multiplex light of the C band, using the same PD nonlinear optical medium 36A. As a result, it is possible to reduce the nonlinear optical distortion generated between the adjacent wavelengths by diverting the PD nonlinear optical medium 36A in the uplink signal and the downlink signal and assigning the odd-numbered channels to the downlink signal and the even-numbered channels to the uplink signal.

The seventeenth wavelength converter 117G wavelength-converts the uplink-side third multiplex light of the L band of the odd-numbered channels into the uplink-side third multiplex light of the C band, using the PD nonlinear optical medium 36A of the bidirectional input and output. Furthermore, the seventeenth wavelength converter 117G wavelength-converts the downlink-side second multiplex light of the C band of the even-numbered channels into the downlink-side second multiplex light of the L band, using the same PD nonlinear optical medium 36A. As a result, it is possible to reduce the nonlinear optical distortion generated between the adjacent wavelengths by diverting the PD nonlinear optical medium 36A in the uplink signal and the downlink signal and assigning the even-numbered channels to the downlink signal and the odd-numbered channels to the uplink signal.

The eighteenth wavelength converter 117H wavelength-converts the uplink-side second multiplex light of the L band of the even-numbered channels into the uplink-side second multiplex light of the C band, using the PD nonlinear optical medium 36A of the bidirectional input and output. Furthermore, the eighteenth wavelength converter 117H wavelength-converts the downlink-side third multiplex light of the C band of the odd-numbered channels into the downlink-side third multiplex light of the L band, using the same PD nonlinear optical medium 36A. As a result, it is possible to reduce the nonlinear optical distortion generated between the adjacent wavelengths by diverting the PD nonlinear optical medium 36A in the uplink signal and the downlink signal and assigning the odd-numbered channels to the downlink signal and the even-numbered channels to the uplink signal.

In the transmission system 1D1 of the example 32, the fourth excitation light source 131C and the fifth excitation light source 131D are disposed for each PD nonlinear optical medium 36A. However, the PD nonlinear optical medium is not limited to this. The PD nonlinear optical medium 36A may share a single excitation light source, and an embodiment in that case is described below as an example 33.

Example 33

Figure 41A:
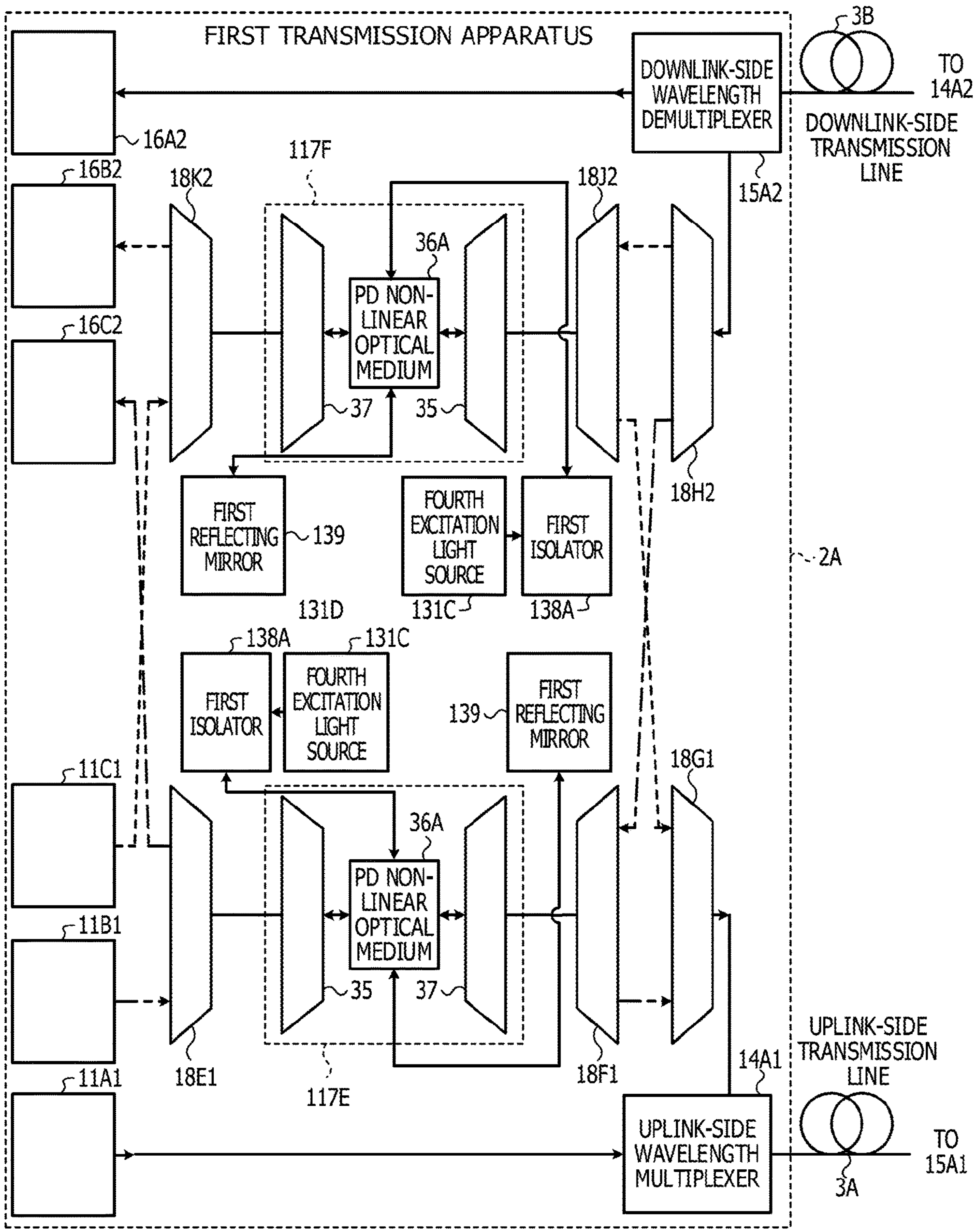
FIGS. 41A and 41B are explanatory diagrams illustrating an example of a transmission system of an example 33.
Figure 41B:
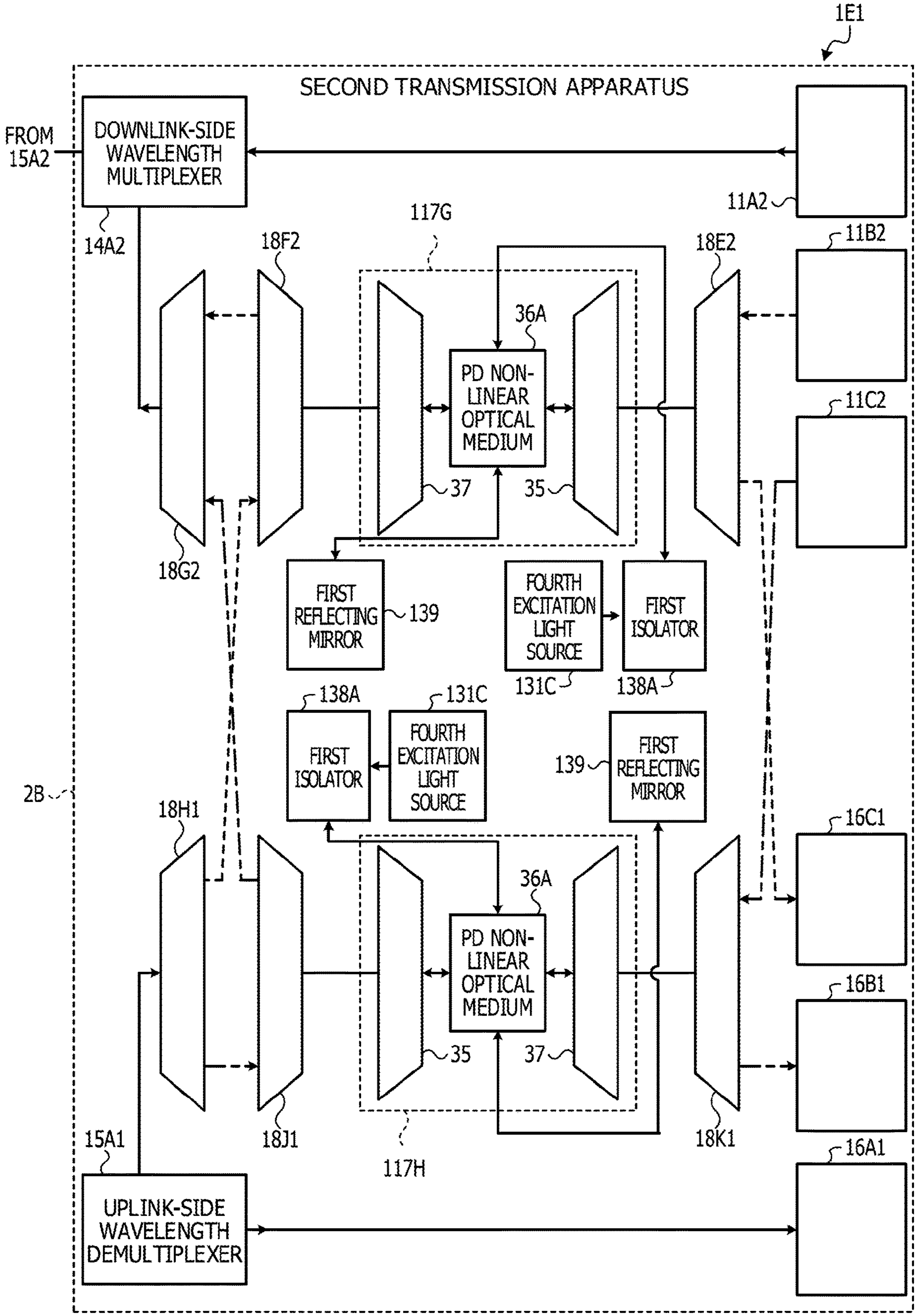

FIG. 41 is an explanatory diagram illustrating an example of a transmission system 1E1 of the example 33. The identical symbols are assigned to the identical configuration of the transmission system 1D1 of the example 32, and thus description of the overlapping configurations and operations is omitted. The fifteenth wavelength converter 117E includes the first isolator 138A, the fourth excitation light source 131C, and a first reflecting mirror 139, in addition to the third WDM coupler 35, the PD nonlinear optical medium 36A, and the fourth WDM coupler 37. The PD nonlinear optical medium 36A in the fifteenth wavelength converter 117E inputs the first and second excitation light from the fourth excitation light source 131C by way of the first isolator 138A. The third WDM coupler 35 in the fifteenth wavelength converter 117E outputs the uplink-side second multiplex light of the C band of the even-numbered channels of the uplink-side fifteenth interleaver 18E1 to the PD nonlinear optical medium 36A. Using the first and second excitation light, the PD nonlinear optical medium 36A wavelength-converts the uplink-side second multiplex light of the C band of the even-numbered channels into the uplink-side second multiplex light of the L band of the even-numbered channels, and outputs to the fourth WDM coupler 37.

Furthermore, the PD nonlinear optical medium 36A in the fifteenth wavelength converter 117E outputs to the first reflecting mirror 139 the remaining excitation light that passes through the PD nonlinear optical medium 36A. The first reflecting mirror 139 outputs the reflected remaining excitation light to the PD nonlinear optical medium 36A. Then, the fourth WDM coupler 37 outputs to the PD nonlinear optical medium 36A the downlink-side third multiplex light of the L band of the odd-numbered channels from the uplink-side sixteenth interleaver 18F1. Then, using the remaining excitation light, the PD nonlinear optical medium 36A wavelength-converts the downlink-side third multiplex light of the L band of the odd-numbered channels into the downlink-side third multiplex light of the C band of the odd-numbered channels, and outputs to the third WDM coupler 35. The first isolator 138A blocks the back-flow of the remaining excitation light to the fourth excitation light source 131C by way of the first reflecting mirror 139.

The sixteenth wavelength converter 117F includes the first isolator 138A, the fourth excitation light source 131C, and the first reflecting mirror 139, in addition to the third WDM coupler 35, the PD nonlinear optical medium 36A, and the fourth WDM coupler 37. The PD nonlinear optical medium 36A in the sixteenth wavelength converter 117F connects to the first isolator 138A, and inputs the first and second excitation light from the fourth excitation light source 131C by way of the first isolator 138A. The fourth WDM coupler 37 in the sixteenth wavelength converter 117F outputs to the PD nonlinear optical medium 36A the uplink third multiplex light of the C band of the odd-numbered channels from the downlink-side twentieth interleaver 18K2. Using the first and second excitation light, the PD nonlinear optical medium 36A wavelength-converts the uplink-side third multiplex light of the C band of the odd-numbered channels into the uplink-side third multiplex light of the L band of the odd-numbered channels, and outputs to the third WDM coupler 35.

Furthermore, the PD nonlinear optical medium 36A in the sixteenth wavelength converter 117F outputs to the first reflecting mirror 139 the remaining excitation light that passes through the PD nonlinear optical medium 36. The first reflecting mirror 139 reflects the remaining excitation light, and outputs the reflected remaining excitation light to the PD nonlinear optical medium 36A. The third WDM coupler 35 outputs to the PD nonlinear optical medium 36A the downlink-side second multiplex light of the L band of the even-numbered channels inputted from the downlink-side nineteenth interleaver 18J2. Then, using the remaining excitation light, the PD nonlinear optical medium 36A wavelength-converts the downlink-side second multiplex light of the L band of the even-numbered channels into the downlink-side second multiplex light of the C band of the even-numbered channels, and outputs to the fourth WDM coupler 37. The first isolator 138A blocks the back-flow of the remaining excitation light to the fourth excitation light source 131C by way of the first reflecting mirror 139.

The seventeenth wavelength converter 117G includes the first isolator 138A, the fourth excitation light source 131C, and the first reflecting mirror 139, in addition to the third WDM coupler 35, the PD nonlinear optical medium 36A, and the fourth WDM coupler 37. The PD nonlinear optical medium 36A in the seventeenth wavelength converter 117G inputs the first and second excitation light from the fourth excitation light source 131C by way of the first isolator 138A. The third WDM coupler 35 in the seventeenth wavelength converter 117G outputs to the PD nonlinear optical medium 36A the downlink-side second multiplexed light of the C band of the even-numbered channels from the downlink-side fifteenth interleaver 18E2. Using the first and second excitation light, the PD nonlinear optical medium 36A wavelength-converts the downlink-side second multiplex light of the C band of the even-numbered channels into the downlink-side second multiplex light of the L band of the even-numbered channels, and outputs to the fourth WDM coupler 37.

Furthermore, the PD nonlinear optical medium 36A in the seventeenth wavelength converter 117G outputs the transmissive remaining excitation light to the first reflecting mirror 139. The first reflecting mirror 139 reflects the remaining excitation light, and outputs the reflected remaining excitation light to the PD nonlinear optical medium 36A. The fourth WDM coupler 37 outputs to the PD nonlinear optical medium 36A the uplink-side third multiplex light of the L band of the odd-numbered channels inputted from the downlink-side sixteenth interleaver 18F2. Then, using the remaining excitation light, the PD nonlinear optical medium 36A wavelength-converts the uplink-side third multiplex light of the L band of the odd-numbered channels into the uplink-side third multiplex light of the C band of the odd-numbered channels, and outputs to the third WDM coupler 35. The first isolator 138A blocks the back-flow of the remaining excitation light to the fourth excitation light source 131C by way of the first reflecting mirror 139.

The eighteenth wavelength converter 117H includes the first isolator 138A, the fourth excitation light source 131C, and the first reflecting mirror 139, in addition to the third WDM coupler 35, the PD nonlinear optical medium 36A, and the fourth WDM coupler 37. The PD nonlinear optical medium 36A in the eighteenth wavelength converter 117H inputs the first and second excitation light from the fourth excitation light source 131C by way of the first isolator 138A. The fourth WDM coupler 37 in the eighteenth wavelength converter 117H outputs to the PD nonlinear optical medium 36A the downlink-side third multiplex light of the C band of the odd-numbered channels from the uplink-side twentieth interleaver 18K1. Using the first and second excitation light, the PD nonlinear optical medium 36A wavelength-converts the downlink-side third multiplex light of the C band of the odd-numbered channels into the downlink-side third multiplex light of the L band of the odd-numbered channels, and outputs to the third WDM coupler 35.

Furthermore, the PD nonlinear optical medium 36A in the eighteenth wavelength converter 117H outputs the transmissive remaining excitation light to the first reflecting mirror 139. The first reflecting mirror 139 reflects the remaining excitation light and outputs the reflected remaining excitation light to the PD nonlinear optical medium 36A. The fourth WDM coupler 37 outputs to the PD nonlinear optical medium 36A the uplink-side second multiplex light of the L band of the even-numbered channels inputted from the uplink-side nineteenth interleaver 18J1. Then, using the remaining excitation light, the PD nonlinear optical medium 36A wavelength-converts the uplink-side second multiplex light of the L band of the even-numbered channels into the uplink-side second multiplex light of the C band of the even-numbered channels, and outputs to the fourth WDM coupler 37. The first isolator 138A blocks the back-flow of the remaining excitation light to the fourth excitation light source 131C by way of the first reflecting mirror 139.

The fifteenth wavelength converter 117E of the example 33 wavelength-converts the uplink-side second multiplex light of the C band of the even-numbered channels into the uplink-side second multiplex light of the L band of the even-numbered channels, using the first and second excitation light of the fourth excitation light source 131C. Furthermore, the fifteenth wavelength converter 117E wavelength-converts the downlink-side third multiplex light of the L band of the odd-numbered channels into the downlink-side third multiplex light of the C band of the odd-numbered channels, using the remaining excitation light from the first reflecting mirror 139. As a result, using the single fourth excitation light source 131C, the fifteenth wavelength converter 117E may wavelength-convert the uplink-side second multiplex light and the downlink-side third multiplex light, and thus may reduce the number of the excitation light sources, as compared to the example 32.

The sixteenth wavelength converter 117F wavelength-converts the uplink-side third multiplex light of the C band of the odd-numbered channels into the uplink-side third multiplex light of the L band of the odd-numbered channels, using the first and second excitation light of the fourth excitation light source 131C. Furthermore, the sixteenth wavelength converter 117F wavelength-converts the downlink-side second multiplex light of the L band of the even-numbered channels into the downlink-side second multiplex light of the C band of the even-numbered channels, using the remaining excitation light from the first reflecting mirror 139. As a result, using the single fourth excitation light source 131C, the sixteenth wavelength converter 117F may wavelength-convert the uplink-side third multiplex light and the downlink-side second multiplex light, and thus may reduce the number of the excitation light sources, as compared to the example 32.

The seventeenth wavelength converter 117G wavelength-converts the downlink-side second multiplex light of the C band of the even-numbered channels into the downlink-side second multiplex light of the L band of the even-numbered channels, using the first and second excitation light of the fourth excitation light source 131C. Furthermore, the seventeenth wavelength converter 117G wavelength-converts the uplink-side third multiplex light of the L band of the odd-numbered channels into the uplink-side third multiplex light of the C band of the odd-numbered channels, using the remaining excitation light from the first reflecting mirror 139. As a result, using the single fourth excitation light source 131C, the seventeenth wavelength converter 117G may wavelength-convert the uplink-side third multiplex light and the downlink-side second multiplex light, and thus may reduce the number of the excitation light sources, as compared with the example 32.

The eighteenth wavelength converter 117H wavelength-converts the downlink-side third multiplex light of the C band of the odd-numbered channels into the downlink-side third multiplex light of the L band of the odd-numbered channels, using the first and second excitation light of the fourth excitation light source 131C. Furthermore, the eighteenth wavelength converter 117H wavelength-converts the uplink-side second multiplex light of the L band of the even-numbered channels into the downlink-side second multiplex light of the C band of the even-numbered channels, using the remaining excitation light from the first reflecting mirror 139. As a result, using the single fourth excitation light source 131C, the eighteenth wavelength converter 117H may wavelength-convert the uplink-side second multiplex light and the downlink-side third multiplex light, and thus may reduce the number of the excitation light sources, as compared to the example 8.

The fifteenth to eighteenth wavelength converters 117E to 117H of the foregoing example 33 input the first and second excitation light from the fourth excitation light source 131C to the PD nonlinear optical medium 36A, and reflection-inputs the remaining excitation light into the PD nonlinear optical medium 36A by the first reflecting mirror 139. However, the first and second excitation light are not limited to this, an embodiment of which is described below as an example 34.

Example 34

Figure 42A:
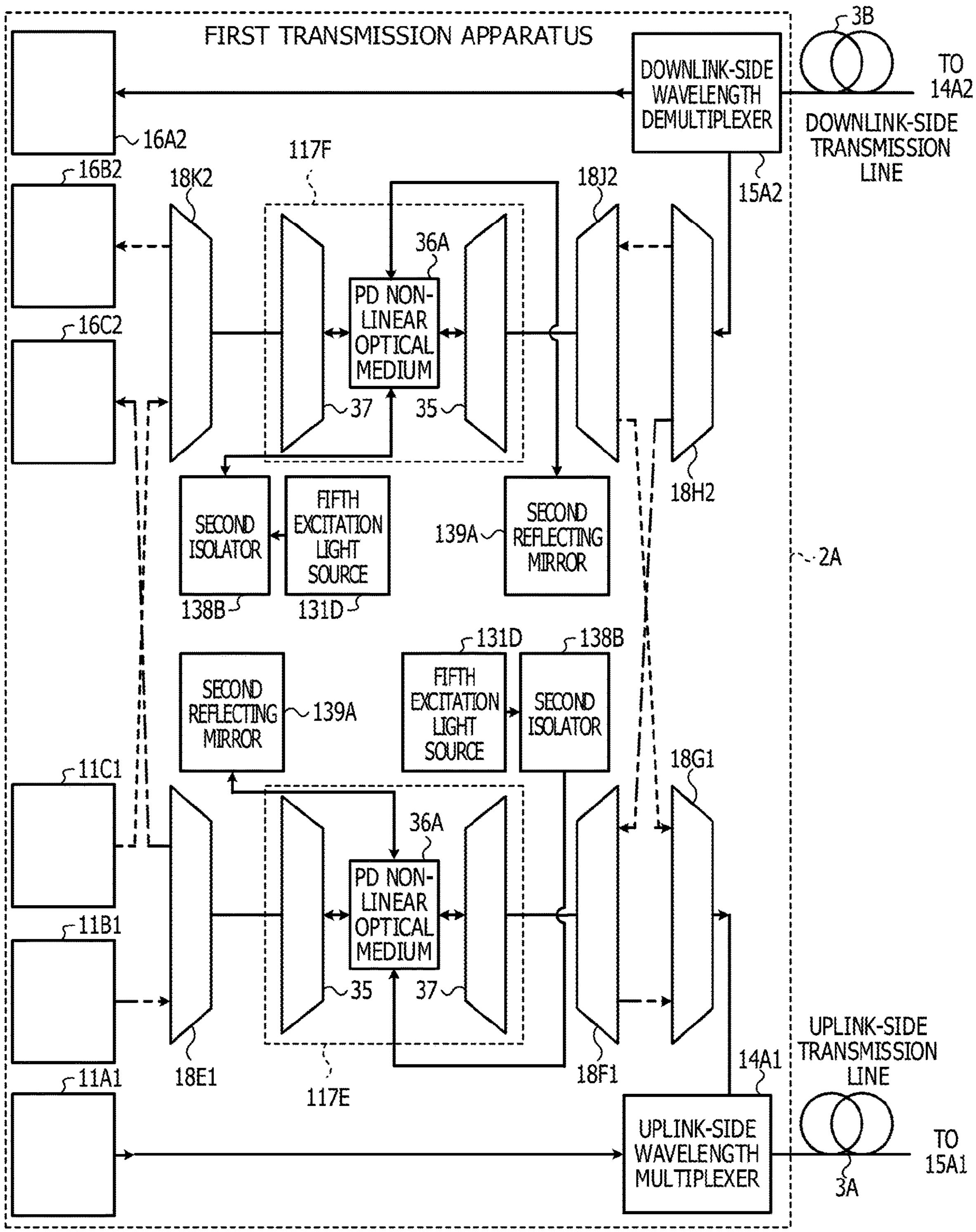
FIGS. 42A and 42B are explanatory diagrams illustrating an example of a transmission system of an example 34.
Figure 42B:
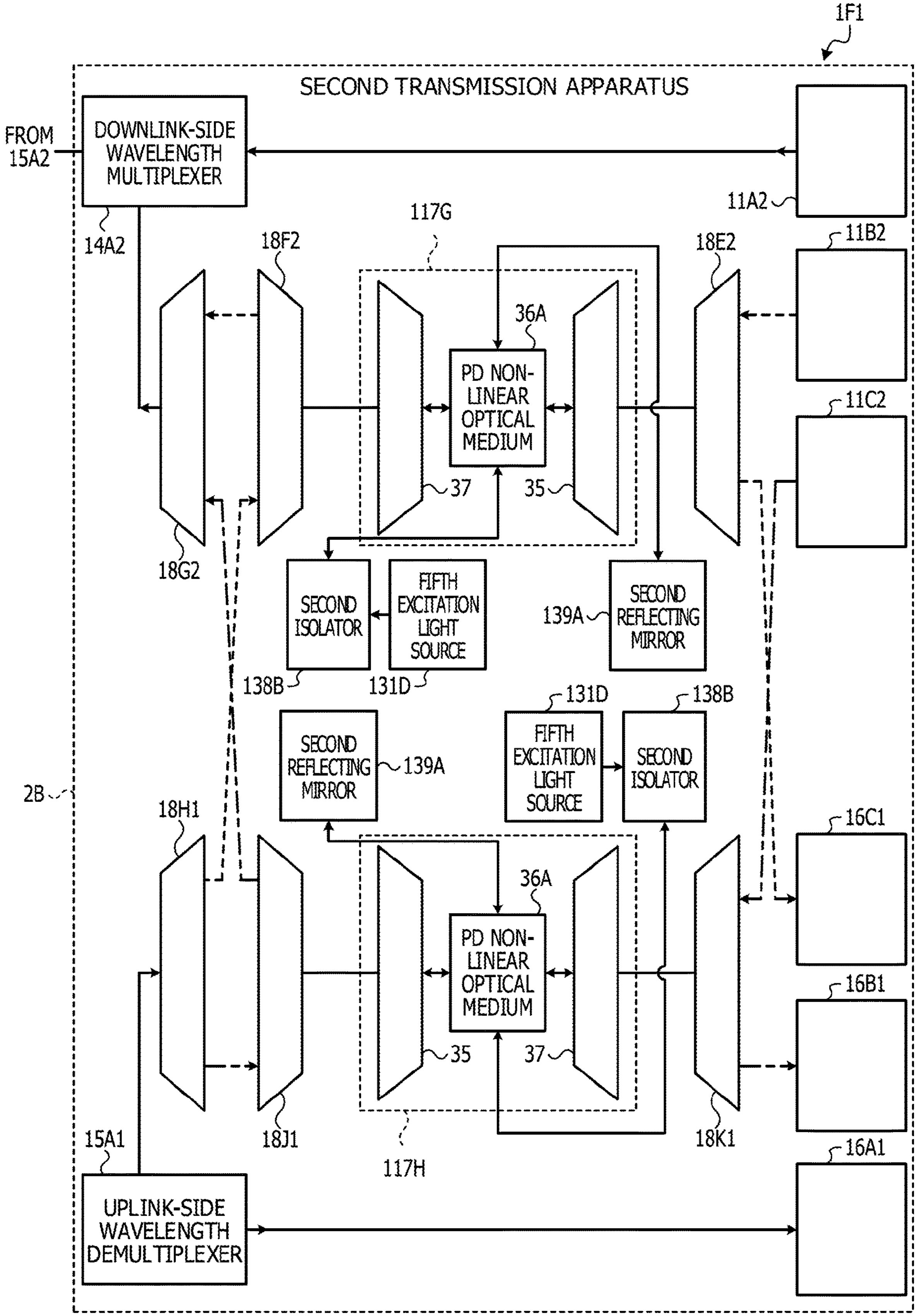

FIG. 42 is an explanatory diagram illustrating an example of a transmission system 1F1 of the example 34. The identical symbols are assigned to the identical configuration of the transmission system 1D1 of the example 32, and thus description of the overlapping configurations and operations is omitted. The fifteenth wavelength converter 117E includes the second isolator 138B, the fifth excitation light source 131D, and a second reflecting mirror 139A, in addition to the third WDM coupler 35, the PD nonlinear optical medium 36A, and the fourth WDM coupler 37. The PD nonlinear optical medium 36A in the fifteenth wavelength converter 117E inputs the first and second excitation light from the fifth excitation light source 131D by way of the second isolator 138B. The fourth WDM coupler 37 in the fifteenth wavelength converter 117E outputs to the PD nonlinear optical medium 36A the downlink-side third multiplex light of the L band of the odd-numbered channels from the uplink-side sixteenth interleaver 18F1. Using the first and second excitation light, the PD nonlinear optical medium 36A wavelength-converts the downlink-side third multiplex light of the L band of the odd-numbered channels into the downlink-side third multiplex light of the C band of the odd-numbered channels, and outputs to the third WDM coupler 35.

Furthermore, the PD nonlinear optical medium 36A in the fifteenth wavelength converter 117E outputs the transmissive remaining excitation light to the second reflecting mirror 139A. The second reflecting mirror 139A outputs the reflected remaining excitation light to the PD nonlinear optical medium 36A. The third WDM coupler 35 outputs to the PD nonlinear optical medium 36A the uplink-side second multiplex light of the C band of the even-numbered channels inputted from the uplink-side fifteenth interleaver 18E1. Then, using the remaining excitation light, the PD nonlinear optical medium 36A wavelength-converts the uplink-side second multiplex light of the C band of the even-numbered channels into the uplink-side second multiplex light of the L band of the even-numbered channels, and outputs to the fourth WDM coupler 37. The second isolator 138B blocks the back-flow of the remaining excitation light to the fifth excitation light source 131D by way of the second reflecting mirror 139A.

The sixteenth wavelength converter 117F includes the second isolator 138B, the fifth excitation light source 131D, and the second reflecting mirror 139A, in addition to the third WDM coupler 35, the PD nonlinear optical medium 36A, and the fourth WDM coupler 37. The PD nonlinear optical medium 36A in the sixteenth wavelength converter 117F inputs the first and second excitation light from the fifth excitation light source 131D by way of the second isolator 138B. The third WDM coupler 35 in the sixteenth wavelength converter 117F outputs to the PD nonlinear optical medium 36A the downlink-side second multiplex light of the L band of the even-numbered channels from the downlink-side nineteenth interleaver 18J2. Using the first and second excitation light, the PD nonlinear optical medium 36A wavelength-converts the downlink-side second multiplex light of the L band of the even-numbered channels into the downlink-side second multiplex light of the C band of the even-numbered channels, and outputs to the fourth WDM coupler 37.

Furthermore, the PD nonlinear optical medium 36A in the sixteenth wavelength converter 117F outputs the transmissive remaining excitation light to the second reflecting mirror 139A. The second reflecting mirror 139A reflects the remaining excitation light, and outputs the reflected remaining excitation light to the PD nonlinear optical medium 36A. The fourth WDM coupler 37 outputs to the PD nonlinear optical medium 36A the uplink-side third multiplex light of the C band of the odd-numbered channels inputted from the downlink-side twentieth interleaver 18K2. Then, using the remaining excitation light, the PD nonlinear optical medium 36A wavelength-converts the uplink-side third multiplex light of the C band of the odd-numbered channels into the uplink-side third multiplex light of the L band of the odd-numbered channels, and outputs to the third WDM coupler 35. The second isolator 138B blocks the back-flow of the remaining excitation light to the fifth excitation light source 31D by way of the second reflecting mirror 139A.

The seventeenth wavelength converter 117G includes the second isolator 138B, the fifth excitation light source 131D, and the second reflecting mirror 139A, in addition to the third WDM coupler 35, the PD nonlinear optical medium 36A, and the fourth WDM coupler 37. The PD nonlinear optical medium 36A in the seventeenth wavelength converter 117G inputs the first and second excitation light from the fifth excitation light source 131D by way of the second isolator 138B. The fourth WDM coupler 37 in the seventeenth wavelength converter 117G outputs to the PD nonlinear optical medium 36A the uplink-side third multiplex light of the L band of the odd-numbered channels from the uplink-side eighteenth interleaver 18H1. Using the first and second excitation light, the PD nonlinear optical medium 36A wavelength-converts the uplink-side third multiplex light of the L band of the odd-numbered channels into the uplink-side second multiplex light of the C band of the odd-numbered channels, and outputs to the third WDM coupler 35.

Furthermore, the PD nonlinear optical medium 36A in the seventeenth wavelength converter 117G outputs to the second reflecting mirror 139A the remaining excitation light that passes through the PD nonlinear optical medium 36A. The second reflecting mirror 139A reflects the remaining excitation light, and outputs the reflected remaining excitation light to the PD nonlinear optical medium 36A. The third WDM coupler 35 outputs to the PD nonlinear optical medium 36A the downlink-side second multiplex light of the C band of the even-numbered channels inputted from the downlink-side fifteenth interleaver 18E2. Then, using the remaining excitation light, the PD nonlinear optical medium 36A wavelength-converts the downlink-side second multiplex light of the C band of the even-numbered channels into the downlink-side second multiplex light of the L band of the even-numbered channels, and outputs to the fourth WDM coupler 37. The second isolator 138B blocks the back-flow of the remaining excitation light to the fifth excitation light source 131D by way of the second reflecting mirror 139A.

The eighteenth wavelength converter 117H includes the second isolator 138B, the fifth excitation light source 131D, and the second reflecting mirror 139A, in addition to the third WDM coupler 35, the PD nonlinear optical medium 36A, and the fourth WDM coupler 37. The PD nonlinear optical medium 36A in the eighteenth wavelength converter 117H inputs the first and second excitation light from the fifth excitation light source 131D by way of the second isolator 138B. The third WDM coupler 35 in the eighteenth wavelength converter 117H outputs to the PD nonlinear optical medium 36A the uplink-side second multiplex light of the L band of the even-numbered channels from the uplink-side nineteenth interleaver 18J1. Using the first and second excitation light, the PD nonlinear optical medium 36A wavelength-converts the uplink-side second multiplex light of the L band of the even-numbered channels into the uplink-side second multiplex light of the C band of the even-numbered channels, and outputs to the fourth WDM coupler 37.

Furthermore the PD nonlinear optical medium 36A in the eighteenth wavelength converter 117H outputs the transmissive remaining excitation light to the second reflecting mirror 139A. The second reflecting mirror 139A reflects the remaining excitation light, and outputs the reflected remaining excitation light to the PD nonlinear optical medium 36A. The fourth WDM coupler 37 outputs to the PD nonlinear optical medium 36A the downlink-side third multiplex light of the C band of the odd-numbered channels inputted from the uplink-side twentieth interleaver 18K1. Then, using the remaining excitation light, the PD nonlinear optical medium 36A wavelength-converts the downlink-side third multiplex light of the C band of the odd-numbered channels into the downlink-side third multiplex light of the L band of the odd-numbered channels, and outputs to the third WDM coupler 35. The second isolator 138B blocks the back-flow of the remaining excitation light to the fifth excitation light source 131D by way of the second reflecting mirror 139A.

The fifteenth wavelength converter 117E of the example 34 wavelength-converts the downlink-side third multiplex light of the L band of the odd-numbered channels into the downlink-side third multiplex light of the C band of the odd-numbered channels, using the first and second excitation light of the fifth excitation light source 131D. Furthermore, the fifteenth wavelength converter 117E wavelength-converts the uplink-side second multiplex light of the C band of the even-numbered channels into the uplink-side second multiplex light of the L band of the even-numbered channels, using the remaining excitation light from the second reflecting mirror 139A. As a result, using the single fifth excitation light source 131D, the fifteenth wavelength converter 117E may wavelength-convert the uplink-side second multiplex light and the downlink-side third multiplex light, and thus may reduce the number of the excitation light sources, as compared to the example 32.

The sixteenth wavelength converter 117F wavelength-converts the downlink-side second multiplex light of the L band of the even-numbered channels into the downlink-side second multiplex light of the C band of the even-numbered channels, using the first and second excitation light of the fifth excitation light source 131D. Furthermore, the sixteenth wavelength converter 117F wavelength-converts the uplink-side third multiplex light of the C band of the odd-numbered channels into the uplink-side third multiplex light of the L band of the odd-numbered channels, using the remaining excitation light from the second reflecting mirror 139A. As a result, using the single fifth excitation light source 131D, the sixteenth wavelength converter 117F may wavelength-convert the uplink-side third multiplex light and the downlink-side second multiplex light, and thus may reduce the number of the excitation light sources, as compared to the example 32.

The seventeenth wavelength converter 117G wavelength-converts the uplink-side third multiplex light of the L band of the odd-numbered channels into the uplink-side third multiplex light of the C band of the odd-numbered channels, using the first and second excitation light of the fifth excitation light source 131D. Furthermore, the seventeenth wavelength converter 117G wavelength-converts the downlink-side second multiplex light of the C band of the even-numbered channels into the downlink-side second multiplex light of the L band of the even-numbered channels, using the remaining excitation light from the second reflecting mirror 139A. As a result, using the single fifth excitation light source 131D, the seventeenth wavelength converter 117G may wavelength-convert the uplink-side third multiplex light and the downlink-side second multiplex light, and thus may reduce the number of the excitation light sources, as compared to the example 32.

The eighteenth wavelength converter 117H wavelength-converts the uplink-side second multiplex light of the L band of the even-numbered channels into the uplink-side second multiplex light of the C band of the even-numbered channels, using the first and second excitation light of the fifth excitation light source 131D. Furthermore, the eighteenth wavelength converter 117H wavelength-converts the downlink-side third multiplex light of the C band of the odd-numbered channels into the downlink-side third multiplex light of the L band of the odd-numbered channels, using the remaining excitation light from the second reflecting mirror 139A. As a result, using the single fifth excitation light source 131D, the eighteenth wavelength converter 117H may wavelength-convert the uplink-side second multiplex light and the downlink-side third multiplex light, and thus may reduce the number of the excitation light sources, as compared to the example 32.

The fifteenth to seventeenth wavelength converters 117E to 117G of the example 34 reuses the remaining excitation light reflected by the second reflecting mirror 139A for the PD nonlinear optical medium 36A. However, the wavelength converters are not limited to these. For example, the excitation light sources of the two wavelength converters 117E and 117F in the first transmission apparatus 2A may be combined into one, and an embodiment in that case is described below as an example 35.

Example 35

Figure 43A:
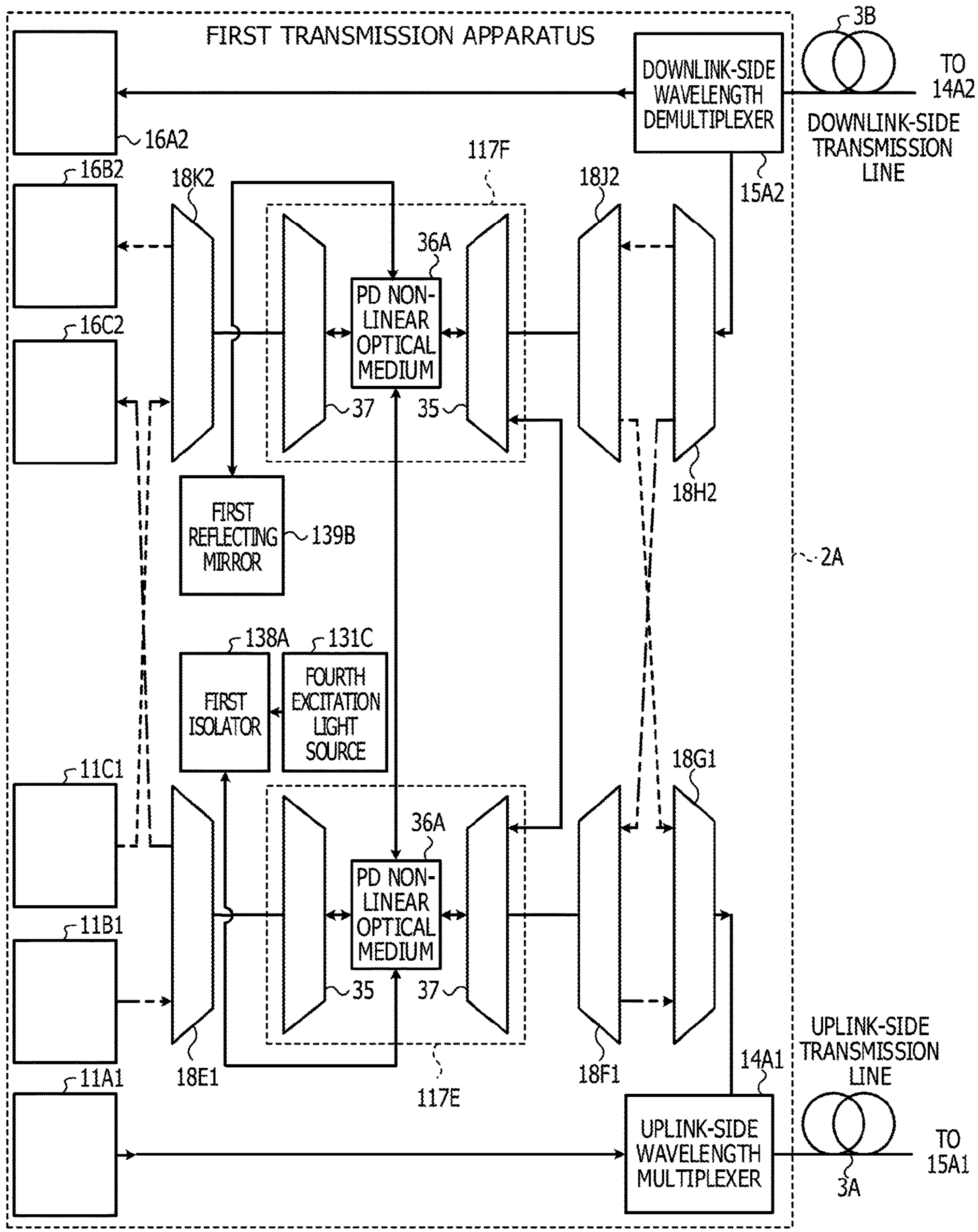
FIGS. 43A and 43B are explanatory diagrams illustrating an example of a transmission system of an example 35.
Figure 43B:
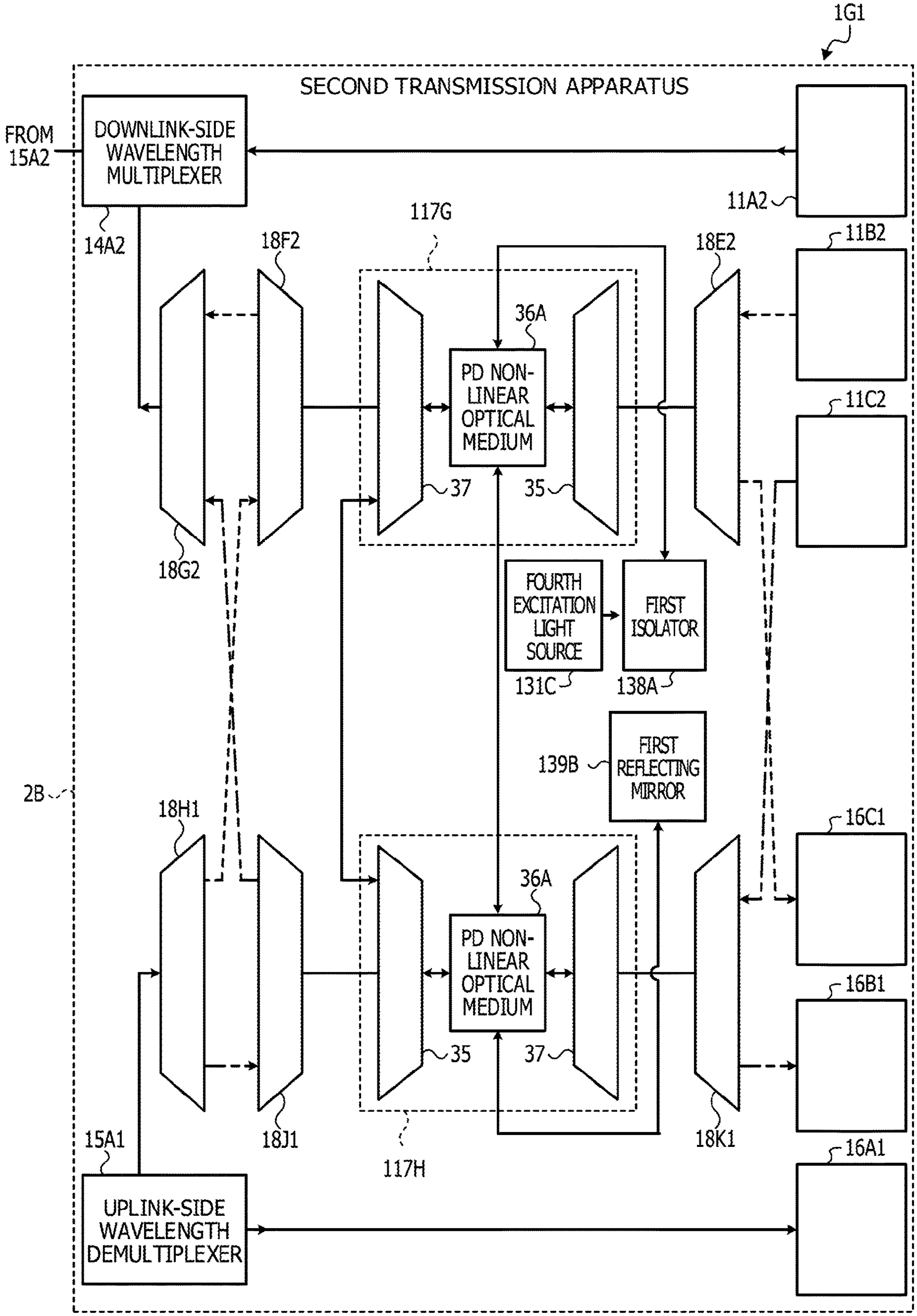

FIG. 43 is an explanatory diagram illustrating an example of a transmission system 1G1 of the example 35. The identical symbols are assigned to the identical configuration of the transmission system 1D1 of the example 32, and thus description of the overlapping configurations and operations is omitted. The first transmission apparatus 2A includes the fifteenth wavelength converter 117E and the sixteenth wavelength converter 117F. The fifteenth wavelength converter 117E includes the first isolator 138A and the fourth excitation light source 131C, in addition to the third WDM coupler 35, the PD nonlinear optical medium 36A, and the fourth WDM coupler 37. The sixteenth wavelength converter 117F also includes a third reflecting mirror 139B, in addition to the third WDM coupler 35, the PD nonlinear optical medium 36A, and the fourth WDM coupler 37.

The PD nonlinear optical medium 36A in the fifteenth wavelength converter 117E inputs the first and second excitation light from the fourth excitation light source 131C by way of the first isolator 138A. The third WDM coupler 35 in the fifteenth wavelength converter 117E outputs to the PD nonlinear optical medium 36A the uplink-side second multiplex light of the C band of the even-numbered channels from the uplink-side fifteenth interleaver 18E1. Then, using the first and second excitation light, the PD nonlinear optical medium 36A wavelength-converts the uplink-side second multiplex light of the C band of the even-numbered channels into the uplink-side second multiplex light of the L band of the even-numbered channels, and outputs to the fourth WDM coupler 37.

Furthermore, the PD nonlinear optical medium 36A in the fifteenth wavelength converter 117E outputs the transmissive first and second excitation light to the PD nonlinear optical medium 36A in the sixteenth wavelength converter 117F. The PD nonlinear optical medium 36A in the sixteenth wavelength converter 117F outputs to the third reflecting mirror 1396 the remaining excitation light from the PD nonlinear optical medium 36A in the fifteenth wavelength converter 117E. The third reflecting mirror 1396 reflects the remaining excitation light, and outputs the reflected remaining excitation light to the PD nonlinear optical medium 36A. The PD nonlinear optical medium 36A in the sixteenth wavelength converter 117F outputs the remaining excitation light to the PD nonlinear optical medium 36A in the fifteenth wavelength converter 117E. The first isolator 138A in the fifteenth wavelength converter 117E blocks the back-flow to the fourth excitation light source 131C of the remaining excitation light received from the fifteenth wavelength converter 117E.

Furthermore, the fourth WDM coupler 37 in the fifteenth wavelength converter 117E outputs to the PD nonlinear optical medium 36A the downlink-side third multiplex light of the L band of the odd-numbered channels inputted from the uplink-side sixteenth interleaver 18F1. Then, using the remaining excitation light, the PD nonlinear optical medium 36A wavelength-converts the downlink-side third multiplex light of the L band of the odd-numbered channels into the downlink-side third multiplex light of the C band of the odd-numbered channels, and outputs to the third WDM coupler 35.

The third WDM coupler 35 in the sixteenth wavelength converter 117F outputs to the PD nonlinear optical medium 36A the downlink-side second multiplex light of the L band of the even-numbered channels inputted from the downlink-side nineteenth interleaver 18J2. Then, using the remaining excitation light, the PD nonlinear optical medium 36A wavelength-converts the downlink-side second multiplex light of the L band of the even-numbered channels into the downlink-side second multiplex light of the C band of the even-numbered channels, and outputs to the fourth WDM coupler 37. Furthermore, the fourth WDM coupler 37 in the sixteenth wavelength converter 117F outputs to the PD nonlinear optical medium 36A the uplink-side third multiplex light of the C band of the odd-numbered channels inputted from the downlink-side twentieth interleaver 18K2. Then, using the remaining excitation light, the PD nonlinear optical medium 36A wavelength-converts the uplink-side third multiplex light of the C band of the odd-numbered channels into the uplink-side third multiplex light of the L band of the odd-numbered channels, and outputs to the third WDM coupler 35.

PD nonlinear optical medium 36A in the seventeenth wavelength converter 117G inputs the first and second excitation light from the fourth excitation light source 131C by way of the first isolator 138A. The third WDM coupler 35 in the seventeenth wavelength converter 117G outputs to the PD nonlinear optical medium 36A the downlink-side second multiplex light of the C band of the even-numbered channels from the downlink-side fifteenth interleaver 18E2. Then, using the first and second excitation light, the PD nonlinear optical medium 36A wavelength-converts the downlink-side second multiplex light of the C band of the even-numbered channels into the downlink-side second multiplex light of the L band of the even-numbered channels, and outputs to the fourth WDM coupler 37.

Furthermore, the PD nonlinear optical medium 36A in the seventeenth wavelength converter 117G outputs the transmissive remaining excitation light to the PD nonlinear optical medium 36A in the eighteenth wavelength converter 117H. The PD nonlinear optical medium 36A in the eighteenth wavelength converter 117H outputs to the third reflecting mirror 139B the remaining excitation light from the PD nonlinear optical medium 36A in the seventeenth wavelength converter 117G. The third reflecting mirror 139B reflects the remaining excitation light, and outputs the reflected remaining excitation light to the PD nonlinear optical medium 36A in the seventeenth wavelength converter 117G by way of the PD nonlinear optical medium 36A in the eighteenth wavelength converter 117H. The first isolator 138A in the seventeenth wavelength converter 117G blocks the back-flow to the fourth excitation light source 131C of the remaining excitation light received by the PD nonlinear optical medium 36A in the seventeenth wavelength converter 117G.

Furthermore, the third WDM coupler 35 in the seventeenth wavelength converter 117G outputs to the PD nonlinear optical medium 36A the downlink-side second multiplex light of the C band of the even-numbered channels inputted from the downlink-side fifteenth interleaver 18E2. Then, using the first and second excitation light, the PD nonlinear optical medium 36A wavelength-converts the downlink-side second multiplex light of the C band of the even-numbered channels into the downlink-side second multiplex light of the C band of the even-numbered channels, and outputs to the fourth WDM coupler 37. The fourth WDM coupler 37 in the seventeenth wavelength converter 117G outputs to the PD nonlinear optical medium 36A the uplink-side third multiplex light of the L band of the odd-numbered channels inputted from the downlink-side sixteenth interleaver 18F2. Then, using the remaining excitation light, the PD nonlinear optical medium 36A wavelength-converts the uplink-side third multiplex light of the L band of the odd-numbered channels into the uplink-side third multiplex light of the C band of the odd-numbered channels, and outputs to the third WDM coupler 35.

The third WDM coupler 35 in the eighteenth wavelength converter 117H outputs to the PD nonlinear optical medium 36A the uplink-side second multiplex light of the L band of the even-numbered channels inputted from the uplink-side nineteenth interleaver 18J1. Then, using the remaining excitation light, PD nonlinear optical medium 36A wavelength-converts the uplink-side second multiplex light of the L band of the even-numbered channels into the uplink-side second multiplex light of the C band of the even-numbered channels, and outputs to the fourth WDM coupler 37. Furthermore, the fourth WDM coupler 37 in the eighteenth wavelength converter 117H outputs to the PD nonlinear optical medium 36A the downlink-side third multiplex light of the C band of the odd-numbered channels inputted from the uplink-side twentieth interleaver 18K1. Then, using the remaining excitation light, the PD nonlinear optical medium 36A wavelength-converts the downlink-side third multiplex light of the C band of the odd-numbered channels into the downlink-side third multiplex light of the L band of the odd-numbered channels, and outputs to the third WDM coupler 35.

The first transmission apparatus 2A of the example 35 uses the excitation light from the fourth excitation light source 131C and the remaining excitation light from the third reflecting mirror 139B for the fifteenth wavelength converter 117E and the sixteenth wavelength converter 117F. As a result, the first transmission apparatus 2A may reduce the number of the excitation light sources, as compared to the example 32.

The second transmission apparatus 2B uses the excitation light from the fourth excitation light source 131C and the remaining excitation light from the third reflecting mirror 139B for the seventeenth wavelength converter 117G and the eighteenth wavelength converter 117H. As a result, the second transmission apparatus 2B may reduce the number of the excitation light sources, as compared to the example 32.

Example 36

Figure 44A:
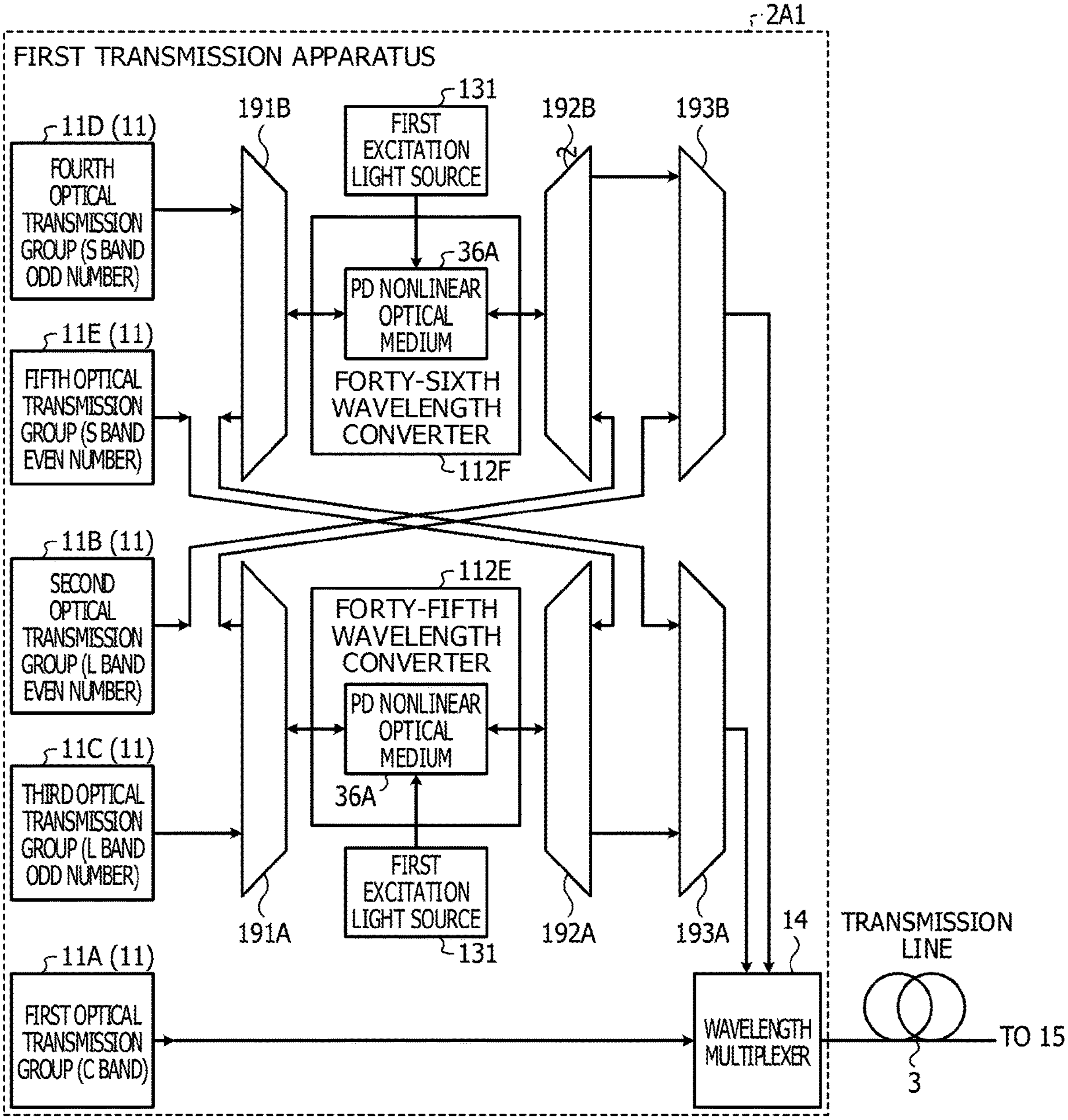
FIGS. 44A and 44B are explanatory diagrams illustrating an example of a transmission system of an example 36.
Figure 44B:
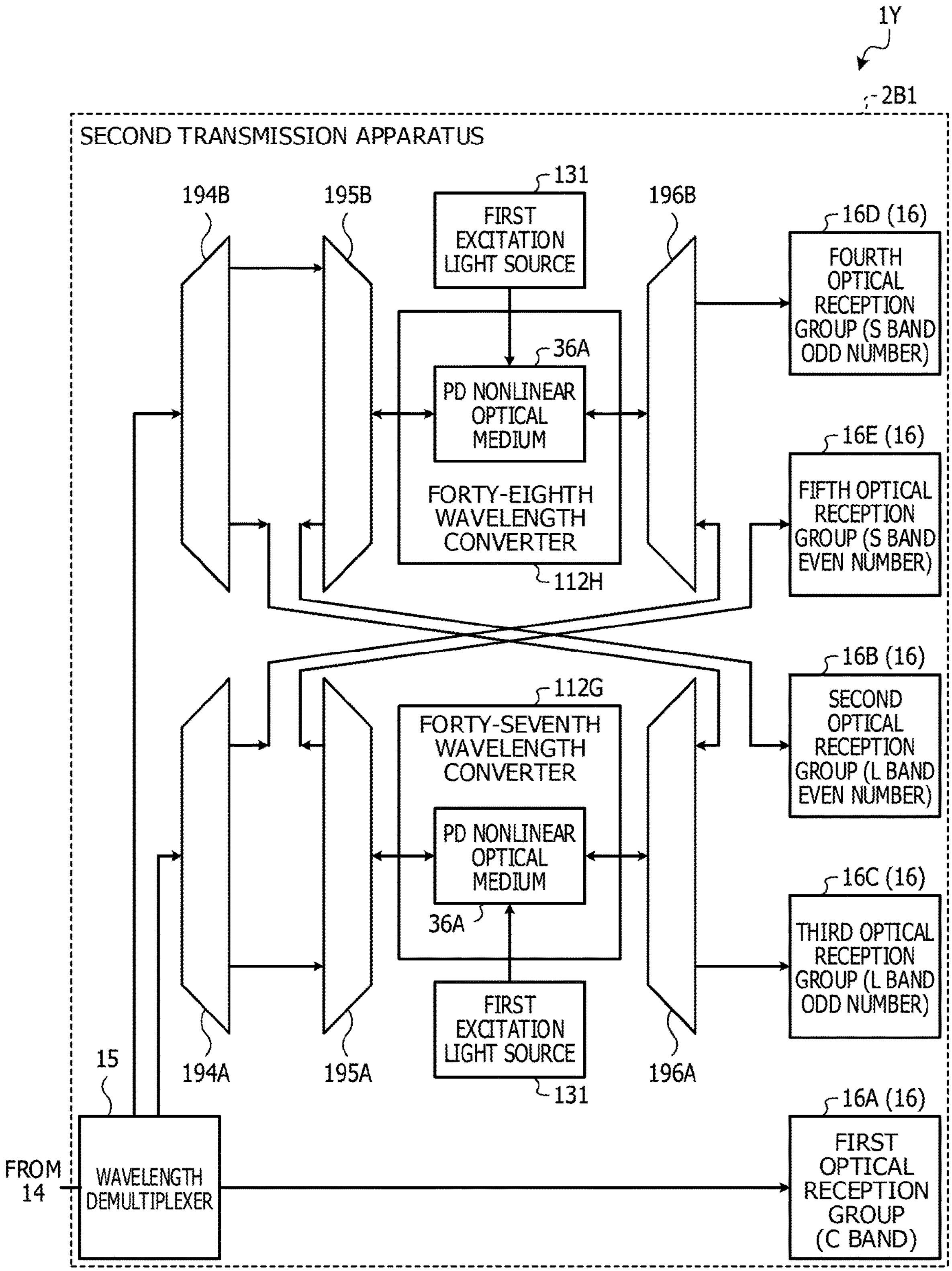

FIG. 44 is an explanatory diagram illustrating an example of a transmission system 1Y of an example 36. The transmission system 1Y illustrated in FIG. 44 includes a first transmission apparatus 2A1, a second transmission apparatus 2B1, and the transmission line 3, such as the optical fiber, that transmits the wavelength multiplex light between the first transmission apparatus 2A1 and the second transmission apparatus 2B1. The first transmission apparatus 2A1 includes the plurality of optical transmission groups 11, twelfth and thirteenth WDM couplers 191A and 191B, forty-fifth and forty-sixth wavelength converters 112E and 112F, and fourteenth and fifteenth WDM couplers 192A and 192B. The first transmission apparatus 2A1 includes thirty-ninth and fortieth interleavers 193A and 193B, and the wavelength multiplexer 14. The second transmission apparatus 2B1 includes the plurality of optical reception groups 16, forty-first and forty-second interleavers 194A and 194B, the forty-seventh and forty-eighth wavelength converters 112G and 112H, and sixteenth and seventeenth WDM couplers 195A and 195B. The second transmission apparatus 2B1 includes eighteenth and nineteenth WDM couplers 196A and 196B, and the wavelength demultiplexer 15.

The first optical transmission group 11A outputs the first multiplex light of the C band to the wavelength multiplexer 14. The second optical transmission group 11B outputs the second multiplex light of the even-numbered channels of the C band to the fifteenth WDM coupler 192B. The third optical transmission group 11C outputs the third multiplex light of the odd-numbered channels of the C band to the twelfth WDM coupler 191A. The fourth optical transmission group 11D outputs the fifth multiplex light of the odd-numbered channels of the C band to the thirteenth WDM coupler 191B. The fifth optical transmission group 11E outputs the fourth multiplex light of the even-numbered channels of the C band to the fourteenth WDM coupler 192A.

The twelfth WDM coupler 191A outputs the third multiplex light of the odd-numbered channels of the C band from the third optical transmission group 11C to the PD nonlinear optical medium 36A in the forty-fifth wavelength converter 112E. The first excitation light source 131 outputs the first and second excitation light to the PD nonlinear optical medium 36A in the forty-fifth wavelength converter 112E. Using the first and second excitation light, the PD nonlinear optical medium 36A in the forty-fifth wavelength converter 112E outputs to the fourteenth WDM coupler 192A the third multiplex light of the odd-numbered channels of the C band and the third multiplex light of the odd-numbered channels of the L band. The fourteenth WDM coupler 192A outputs the third multiplex light of the odd-numbered channels of the L band to the thirty-ninth interleaver 193A. The fourteenth WDM coupler 192A outputs the fourth multiplex light of the even-numbered channels of the C band from the fifth optical transmission group 11E to the PD nonlinear optical medium 36A in the forty-fifth wavelength converter 112E. Using the first and second excitation light, the PD nonlinear optical medium 36A in the forty-fifth wavelength converter 112E outputs the fourth multiplex light of the even-numbered channels of the C band and the fourth multiplex light of the even-numbered channels of the S band to the twelfth WDM coupler 191A. The twelfth WDM coupler 191A outputs the fourth multiplex light of the even-numbered channels of the S band to the fortieth interleaver 193B.

The thirteenth WDM coupler 191B outputs the fifth multiplex light of the odd-numbered channels of the C band from fourth optical transmission group 11D to the PD nonlinear optical medium 36A in the forty-sixth wavelength converter 112F. The first excitation light source 131 outputs the first and second excitation light to the PD nonlinear optical medium 36A in the forty-sixth wavelength converter 112F. Using the first and second excitation light, the PD nonlinear optical medium 36A in the forty-sixth wavelength converter 112F outputs to the fifteenth WDM coupler 192B the fifth multiplex light of the odd-numbered channels of the C band and the fifth multiplex light of the odd-numbered channels of the S band. The fifteenth WDM coupler 192B outputs the fifth multiplex light of the odd-numbered channels of the S band to the fortieth interleaver 193B. The fifteenth WDM coupler 192B outputs the second multiplex light of the even-numbered channels of the C band from the second optical transmission group 11B to the PD nonlinear optical medium 36A in the forty-sixth wavelength converter 112F. Using the first and second excitation light, the PD nonlinear optical medium 36A in the forty-sixth wavelength converter 112F outputs the second multiplex light of the even-numbered channels of the C band and the second multiplex light of the even-numbered channels of the L band to the thirteenth WDM coupler 191B. The thirteenth WDM coupler 191B outputs the second multiplex light of the even-numbered channels of the L band to the thirty-ninth interleaver 193A.

The thirty-ninth interleaver 193A outputs the third multiplex light of the odd-numbered channels of the L band and the second multiplex light of the even-numbered channels of the L band to the wavelength multiplexer 14. The fortieth interleaver 193B outputs the fifth multiplex light of the odd-numbered channels of the S band and the fourth multiplex light of the even-numbered channels of the S band to the wavelength multiplexer 14. The first optical transmission group 11A outputs the first multiplex light of the C band to the wavelength multiplexer 14. Then, the wavelength multiplexer 14 multiplexes and outputs to the transmission line 3 the second multiplex light of the even-numbered channels of the L band, the third multiplex light of the odd-numbered channels of the L band, the fourth multiplex light of the even-numbered channels of the S band, the fifth multiplex light of the odd-numbered channels of the S band, and the first multiplex light of the C band.

The wavelength demultiplexer 15 in the second transmission apparatus 2B1 outputs the first multiplex light of the C band to the first optical reception group 16A and the second multiplex light and the third multiplex light of the L band to the forty-first interleaver 194A, of the light outputted from the transmission line 3. Furthermore, the wavelength demultiplexer 15 outputs the fourth multiplex light and the fifth multiplex light of the S band to the forty-second interleaver 194B. The forty-first interleaver 194A outputs the third multiplex light of the odd-numbered channels of the L band to the sixteenth WDM coupler 195A. The sixteenth WDM coupler 195A outputs the third multiplex light of the odd-numbered channels of the L band to the PD nonlinear optical medium 36A in the forty-seventh wavelength converter 112G. Using the first and second excitation light, the PD nonlinear optical medium 36A in the forty-seventh wavelength converter 112G wavelength-converts the third multiplex light of the odd-numbered channels of the L band into the third multiplex light of the C band of the odd-numbered channels, and outputs to the eighteenth WDM coupler 196A. The eighteenth WDM coupler 196A outputs the third multiplex light of the odd-numbered channels of the L band to the third optical reception group 16C.

The forty-first interleaver 194A outputs the second multiplex light of the even-numbered channels of the L band to the nineteenth WDM coupler 196B. The nineteenth WDM coupler 196B outputs the second multiplex light of the even-numbered channels of the L band to the PD nonlinear optical medium 36A in the forty-eighth wavelength converter 112H. Using the first and second excitation light, the PD nonlinear optical medium 36A in the forty-eighth wavelength converter 112H wavelength-converts the second multiplex light of the even-numbered channels of the L band into the second multiplex light of the even-numbered channels of the C band, and outputs to the seventeenth WDM coupler 195B. The seventeenth WDM coupler 195B outputs the second multiplex light of the even-numbered channels of the L band to the second optical reception group 16B.

The forty-second interleaver 194B outputs the fifth multiplex light of the odd-numbered channels of the S band to the seventeenth WDM coupler 195B. The seventeenth WDM coupler 195B outputs the fifth multiplex light of the odd-numbered channels of the S band to the PD nonlinear optical medium 36A in the forty-eighth wavelength converter 112H. Using the first and second excitation light, the PD nonlinear optical medium 36A in the forty-eighth wavelength converter 112H wavelength-converts the fifth multiplex light of the odd-numbered channels of the S band into the fifth multiplex light of the odd-numbered channels of the C band, and outputs to the nineteenth WDM coupler 196B. The nineteenth WDM coupler 196B outputs the fifth multiplex light of the odd-numbered channels of the C band to the fourth optical reception group 16D.

The forty-second interleaver 194B outputs the fourth multiplex light of the even-numbered channels of the S band to the eighteenth WDM coupler 196A. The eighteenth WDM coupler 196A outputs the fourth multiplex light of the even-numbered channels of the S band to the PD nonlinear optical medium 36A in the forty-seventh wavelength converter 112G. Using the first and second excitation light, the PD nonlinear optical medium 36A in the forty-seventh wavelength converter 112G wavelength-converts the fourth multiplex light of the even-numbered channels of the S band into the fourth multiplex light of the even-numbered channels of the C band, and outputs to the sixteenth WDM coupler 195A. The sixteenth WDM coupler 195A outputs the fourth multiplex light of the even-numbered channels of the S band to the fifth optical reception group 16E.

The first transmission apparatus 2A inputs to the forty-fifth wavelength converter 112E the third multiplex light of the odd-numbered channels of the C band and the fourth multiplex light of the even-numbered channels of the C band. Then, the forty-fifth wavelength converter 112E wavelength-converts the third multiplex light of the odd-numbered channels of the C band into the third multiplex light of the odd-numbered channels of the L band, and wavelength-converts the fourth multiplex light of the even-numbered channels of the C band into the fourth multiplex light of the even-numbered channels of the S band. As a result, the forty-fifth wavelength converter 112E may reduce the nonlinear optical distortions between the signals, because each wavelength converter is in charge of only either the odd number channels or the even number channels, which are channels not next to each other.

The first transmission apparatus 2A inputs to the forty-sixth wavelength converter 112F the fifth multiplex light of the odd-numbered channels of the C band and the second multiplex light of the even-numbered channels of the C band. Then, the forty-sixth wavelength converter 112F wavelength-converts the fifth multiplex light of the odd-numbered channels of the C band into the fifth multiplex light of the odd-numbered channels of the S band, and wavelength-converts the second multiplex light of the even-numbered channels of the C band into the second multiplex light of the even-numbered channels of the L band. As a result, the forty-sixth wavelength converter 112F may reduce the nonlinear optical distortions between the signals, because each wavelength converter is in charge of only either the odd number channels or the even number channels, which are channels not next to each other.

The fifteenth to seventeenth wavelength converters 117E to 117G of the foregoing examples 32 to 36 illustrate the bidirectional PD nonlinear optical medium 36A. However, there are a variety of kinds of the PD nonlinear optical medium 36A, an embodiment of which is described below as an example 37.

Example 37

Figure 45:
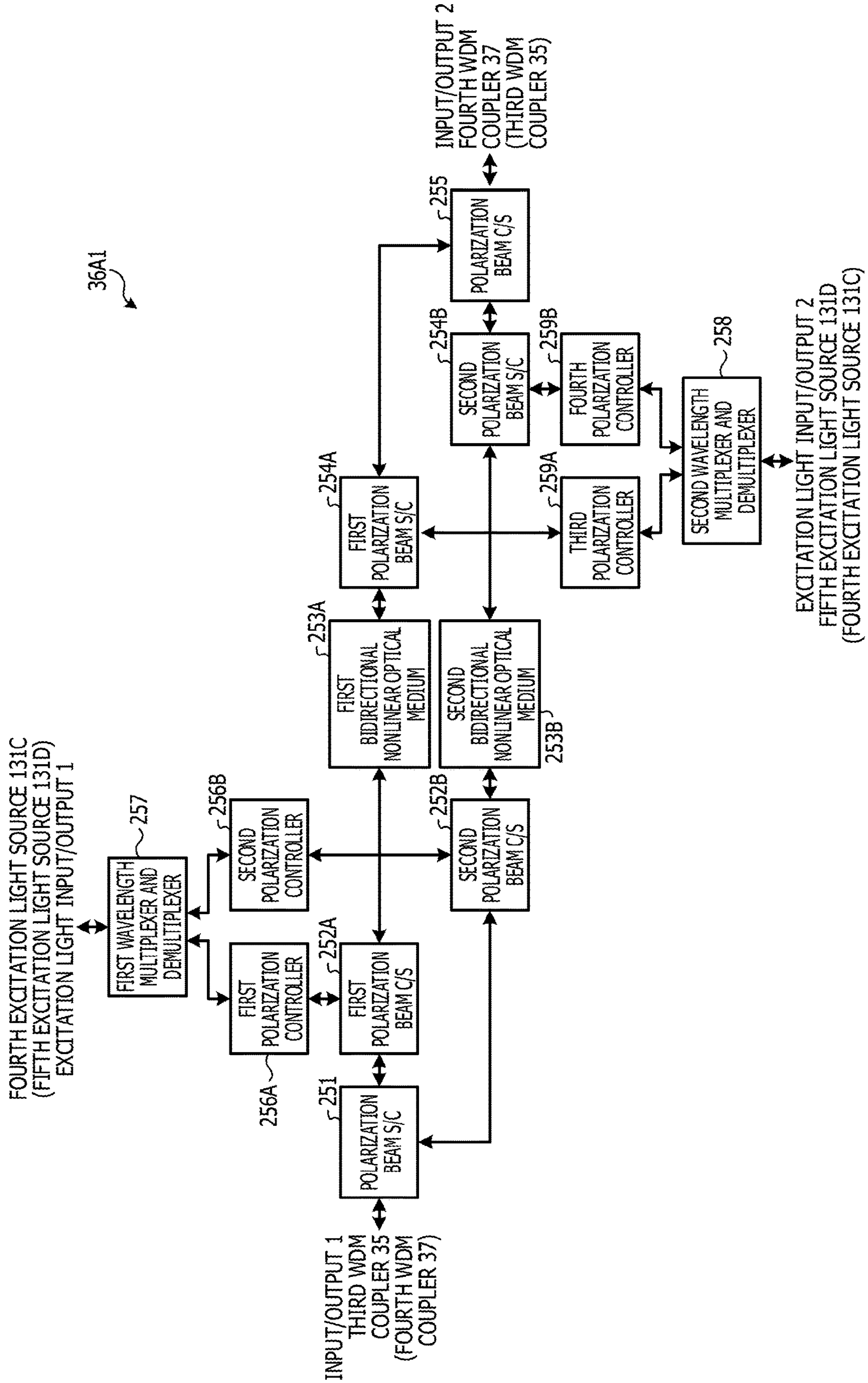
FIG. 45 is an explanatory diagram illustrating an example of a PD nonlinear optical medium of an example 37.

FIG. 45 is an explanatory diagram illustrating an example of a PD nonlinear optical medium 36A1 of the example 37. The PD nonlinear optical medium 36A1 illustrated in FIG.

45 has the branching processing configuration of the bidirectional input and output. The PD nonlinear optical medium 36A1 includes a polarization beam S/C 251, a first polarization beam C/S 252A, a first bidirectional nonlinear optical medium 253A, a first polarization beam S/C 254A, and a polarization beam C/S 255. Furthermore, the PD nonlinear optical medium 36A1 includes a second polarization beam C/S 252B, a second bidirectional nonlinear optical medium 253B, and a second polarization beam S/C 254B. Furthermore, the PD nonlinear optical medium 36A1 includes a first wavelength multiplexer and demultiplexer 257, a first polarization controller 256A, and a second polarization controller 256B. Furthermore, the PD nonlinear optical medium 36A1 includes a second wavelength multiplexer and demultiplexer 258, a third polarization controller 259A, and a fourth polarization controller 259B.

The polarization beam S/C 251 separates the second and third multiplex light from the third WDM coupler 35 into the second and third multiplex light of the vertical polarization and the second and third multiplex light of the horizontal polarization. The polarization beam S/C 251 outputs the second and third multiplex light of the vertical polarization to the first polarization beam C/S 252A and outputs the second and third multiplex light of the horizontal polarization to the second polarization beam C/S 252B. The first wavelength multiplexer and demultiplexer 257 distributes the first and second excitation light from the fourth excitation light source 131C to the first polarization controller 256A and the second polarization controller 256B. The first polarization controller 256A polarization-controls the first and second excitation light so as to be orthogonal to the second and third multiplex light of the vertical polarization, and outputs to the first polarization beam C/S 252A the first and second excitation light after the polarization control.

The first polarization beam C/S 252A outputs to the first bidirectional nonlinear optical medium 253A the second and third multiplex light of the vertical polarization and the first and second excitation light after the polarization control from the first polarization controller 256A. Using the first and second excitation light, the first bidirectional nonlinear optical medium 253A wavelength-converts the second and third multiplex light of the vertical polarization, and outputs to the first polarization beam S/C 254A the second and third multiplex light of the vertical polarization after the wavelength conversion. The first polarization beam S/C 254A outputs to the polarization beam C/S 255 the second and third multiplex light of the vertical polarization after the wavelength conversion, and outputs the first and second excitation light to the third polarization controller 259A. The third polarization controller 259A outputs the first and second excitation light from the first polarization beam S/C 254A to the second wavelength multiplexer and demultiplexer 258. The second polarization controller 256B polarization-controls the first and second excitation light so as to be orthogonal to the second and third multiplex light of the horizontal polarization and outputs to the second polarization beam C/S 252B the first and second excitation light after the polarization control.

The second polarization beam C/S 252B outputs to the second bidirectional nonlinear optical medium 253B the second and third multiplex light of the horizontal polarization and the first and second excitation light after the polarization control from the second polarization controller 256B. The second bidirectional nonlinear optical medium 253B propagates the first and second excitation light and the second and third multiplex light of the horizontal polarization. Using the first and second excitation light, the second bidirectional nonlinear optical medium 253B wavelength-converts the second and third multiplex light of the horizontal polarization, and outputs to the second polarization beam S/C 254B the second and third multiplex light of the horizontal polarization after the wavelength conversion. The second polarization beam S/C 254B outputs to the polarization beam C/S 255 the second and third multiplex light of the horizontal polarization after the wavelength conversion, and outputs the first and second excitation light to the fourth polarization controller 259B. The fourth polarization controller 259B outputs the first and second excitation light from the second polarization beam S/C 254B to the second wavelength multiplexer and demultiplexer 258. The second wavelength multiplexer and demultiplexer 258 outputs the first and second excitation light (remaining excitation light) from the third polarization controller 259A and the fourth polarization controller 259B.

The polarization beam C/S 255 multiplexes the second and third multiplex light of the vertical polarization after the wavelength conversion from the first polarization beam S/C 254A with the second and third multiplex light of the horizontal polarization after the wavelength conversion from the second polarization beam S/C 254B to output to the fourth WDM coupler 37. The polarization beam C/S 255 separates the second and third multiplex light from the fourth WDM coupler 37 to the second and third multiplex light of the vertical polarization and the second and third multiplex light of the horizontal polarization. The polarization beam C/S 255 outputs the second and third multiplex light of the vertical polarization to the first polarization beam S/C 254A and outputs the second and third multiplex light of the horizontal polarization to the second polarization beam S/C 254B.

The second wavelength multiplexer and demultiplexer 258 distributes the first and second excitation light from the fifth excitation light source 131D to the third polarization controller 259A and the fourth polarization controller 259B. The third polarization controller 259A polarization-controls the first and second excitation light so as to be orthogonal to the second and third multiplex light of the vertical polarization, and outputs the first and second excitation light after the polarization control to the first polarization beam S/C 254A. The first polarization beam S/C 254A outputs to the first bidirectional nonlinear optical medium 253A the second and third multiplex light of the vertical polarization and the first and second excitation light after the polarization control from the third polarization controller 259A. Using the first and second excitation light, the first bidirectional nonlinear optical medium 253A wavelength-converts the second and third multiplex light of the vertical polarization, and outputs to the first polarization beam C/S 252A the second and third multiplex light after the wavelength conversion. The first polarization beam C/S 252A outputs to the polarization beam S/C 251 the second and third multiplex light of the vertical polarization after the wavelength conversion, and outputs the first and second excitation light to the first polarization controller 256A. The first polarization controller 256A outputs the first and second excitation light from the first polarization beam C/S 252A to the first wavelength multiplexer and demultiplexer 257. The fourth polarization controller 259B polarization-controls the first and second excitation light so as to be orthogonal to the second and third multiplex light of the horizontal polarization, and outputs to the second polarization beam S/C 254B the first and second excitation light after the polarization control.

The second polarization beam S/C 254B outputs to the second bidirectional nonlinear optical medium 253B the second and third multiplex light of the horizontal polarization and the first and second excitation light after the polarization control from the fourth polarization controller 259B. The second bidirectional nonlinear optical medium 253B propagates the first and second excitation light and the second and third multiplex light of the horizontal polarization. Using the first and second excitation light, the second bidirectional nonlinear optical medium 253B wavelength-converts the second and third multiplex light of the horizontal polarization, and outputs to the second polarization beam C/S 252B the second and third multiplex light of the horizontal polarization after the wavelength conversion. The second polarization beam C/S 252B outputs to the polarization beam S/C 251 the second and third multiplex light of the horizontal polarization after the wavelength conversion, and outputs to the second polarization controller 256B the first and second excitation light. The second polarization controller 256B outputs to the first wavelength multiplexer and demultiplexer 257 the first and second excitation light from the second polarization beam C/S 252B. The first wavelength multiplexer and demultiplexer 257 outputs the first and second excitation light (remaining excitation light) from the first polarization controller 256A and the second polarization controller 256B.

The polarization beam S/C 251 multiplexes the second and third multiplex light of the vertical polarization after the wavelength conversion from the first polarization beam C/S 252A with the second and third multiplex light of the horizontal polarization after the wavelength conversion from the second polarization beam C/S 252B to output to the third WDM coupler 35.

The PD nonlinear optical medium 36A1 of the example 37 has the branching processing configuration of the bidirectional input and output, and may wavelength-convert the second and third multiplex light even using first and second excitation light. For the purpose of illustration, although the case is illustrated in which the second multiplex light and the third multiplex light are wavelength-converted, the wavelength conversion is not limited to this and may be changed appropriately.

Although the PD nonlinear optical medium 36A1 of the foregoing example 37 has the branching processing configuration of the bidirectional input and output, the PD nonlinear optical medium 36A1 is not limited to this, and an embodiment in that case is described below as an example 38.

Example 38

Figure 46:
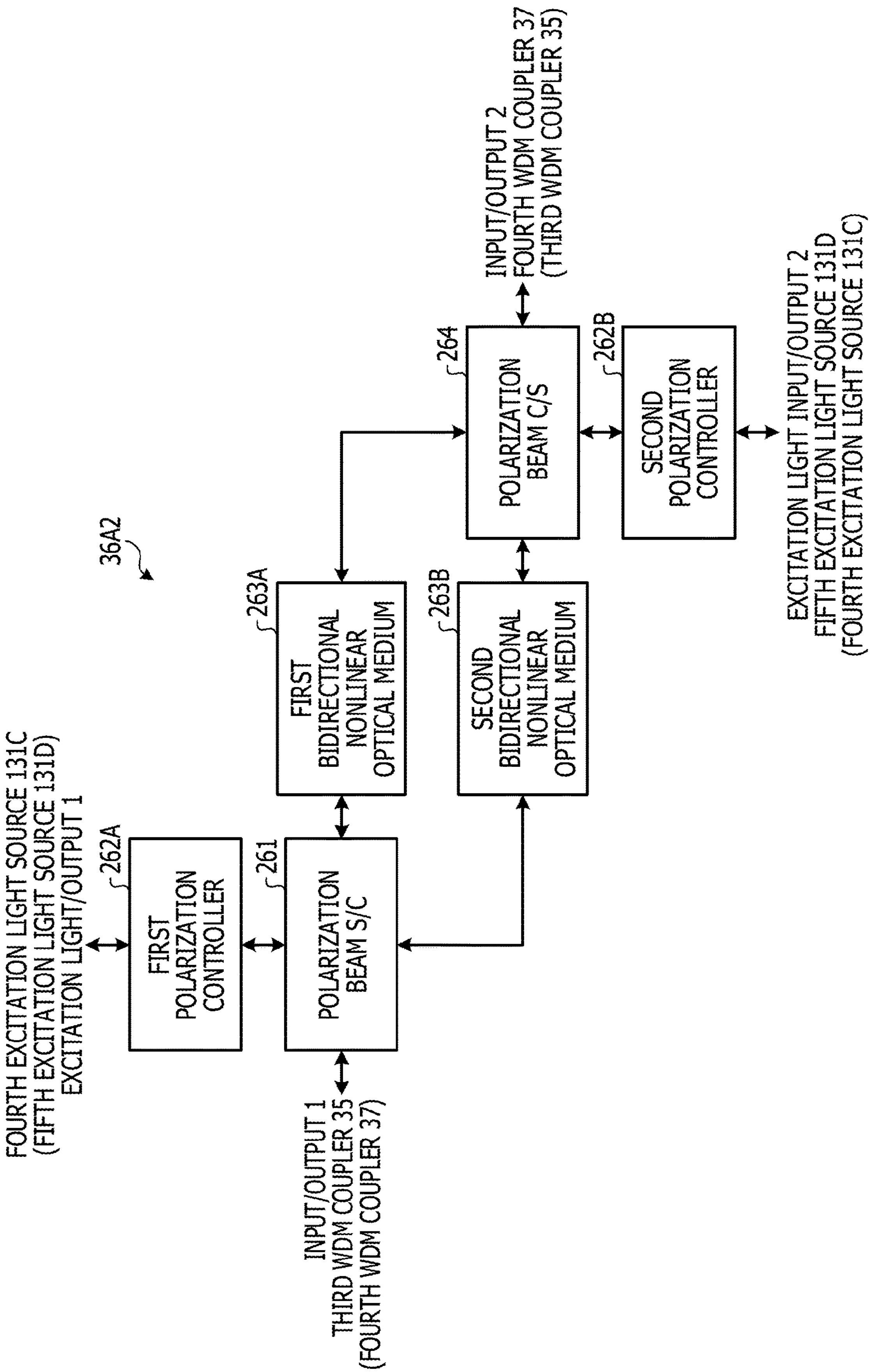
FIG. 46 is an explanatory diagram illustrating an example of a PD nonlinear optical medium of an example 38.

FIG. 46 is an explanatory diagram illustrating an example of a PD nonlinear optical medium 36A2 of the example 38. The PD nonlinear optical medium 36A2 illustrated in FIG. 46 has the branching processing configuration of the bidirectional input and output. The PD nonlinear optical medium 36A2 includes a polarization beam S/C 261, a first polarization controller 262A, a second polarization controller 262B, a first bidirectional nonlinear optical medium 263A, a second bidirectional nonlinear optical medium 263B, and a polarization beam C/S 264.

The first polarization controller 262A outputs the first and second excitation light from the fourth excitation light source 131C to the polarization beam S/C 261. The polarization beam S/C 261 inputs the second and third multiplex light from the third WDM coupler 35. The polarization beam S/C 261 outputs to the first bidirectional nonlinear optical medium 263A the second and third multiplex light and the first and second excitation light of the vertical polarization. Using the first and second excitation light, the first bidirectional nonlinear optical medium 263A wavelength-converts the second and third multiplex light of the vertical polarization, and outputs to the polarization beam C/S 264 the second and third multiplex light of the vertical polarization after the wavelength conversion. The polarization beam S/C 261 outputs to the second bidirectional nonlinear optical medium 263B the second and third multiplex light and the first and second excitation light of the horizontal polarization. Using the first and second excitation light, the second bidirectional nonlinear optical medium 263B wavelength-converts the second and third multiplex light of the horizontal polarization, and outputs to the polarization beam C/S 264 the second and third multiplex light of the horizontal polarization after the wavelength conversion. The polarization beam C/S 264 outputs to the fourth WDM coupler 37 the second and third multiplex light of the vertical polarization after the wavelength conversion and the second and third multiplex light of the horizontal polarization after the wavelength conversion, and outputs the remaining excitation light to the second polarization controller 262B. The second polarization controller 262B the remaining excitation light after the polarization control.

The second polarization controller 262B outputs the first and second excitation light from the fifth excitation light source 131D to the polarization beam C/S 264. The polarization beam C/S 264 inputs the second and third multiplex light from the fourth WDM coupler 37. The polarization beam C/S 264 outputs the second and third multiplex light and the first and second excitation light of the vertical polarization to the first bidirectional nonlinear optical medium 263A. Using the first and second excitation light, the first bidirectional nonlinear optical medium 263A wavelength-converts the second and third multiplex light of the vertical polarization, and outputs to the polarization beam S/C 261 the second and third multiplex light of the vertical polarization after the wavelength conversion.

The polarization beam C/S 264 outputs to the second bidirectional nonlinear optical medium 263B the second and third multiplex light and the first and second excitation light of the horizontal polarization. Using the first and second excitation light, the second bidirectional nonlinear optical medium 263B wavelength-converts the second and third multiplex light of the horizontal polarization, and outputs to the polarization beam S/C 261 the second and third multiplex light of the horizontal polarization after the wavelength conversion. The polarization beam S/C 261 outputs to the third WDM coupler 35 the second and third multiplex light of the vertical polarization after the wavelength conversion and the second and third multiplex light of the horizontal polarization after the wavelength conversion, and outputs the remaining excitation light to the first polarization controller 262A. The first polarization controller 262A outputs the remaining excitation light after the polarization control.

The PD nonlinear optical medium 36A2 of the example 38 has the branching processing configuration of the bidirectional input and output and may wavelength-convert the second and third multiplex light even using the first and second excitation light. For the purpose of illustration, although the case is illustrated in which the second multiplex light and the third multiplex light are wavelength-converted, the wavelength conversion is not limited to this and may be changed appropriately.

Example 39

Figure 47:
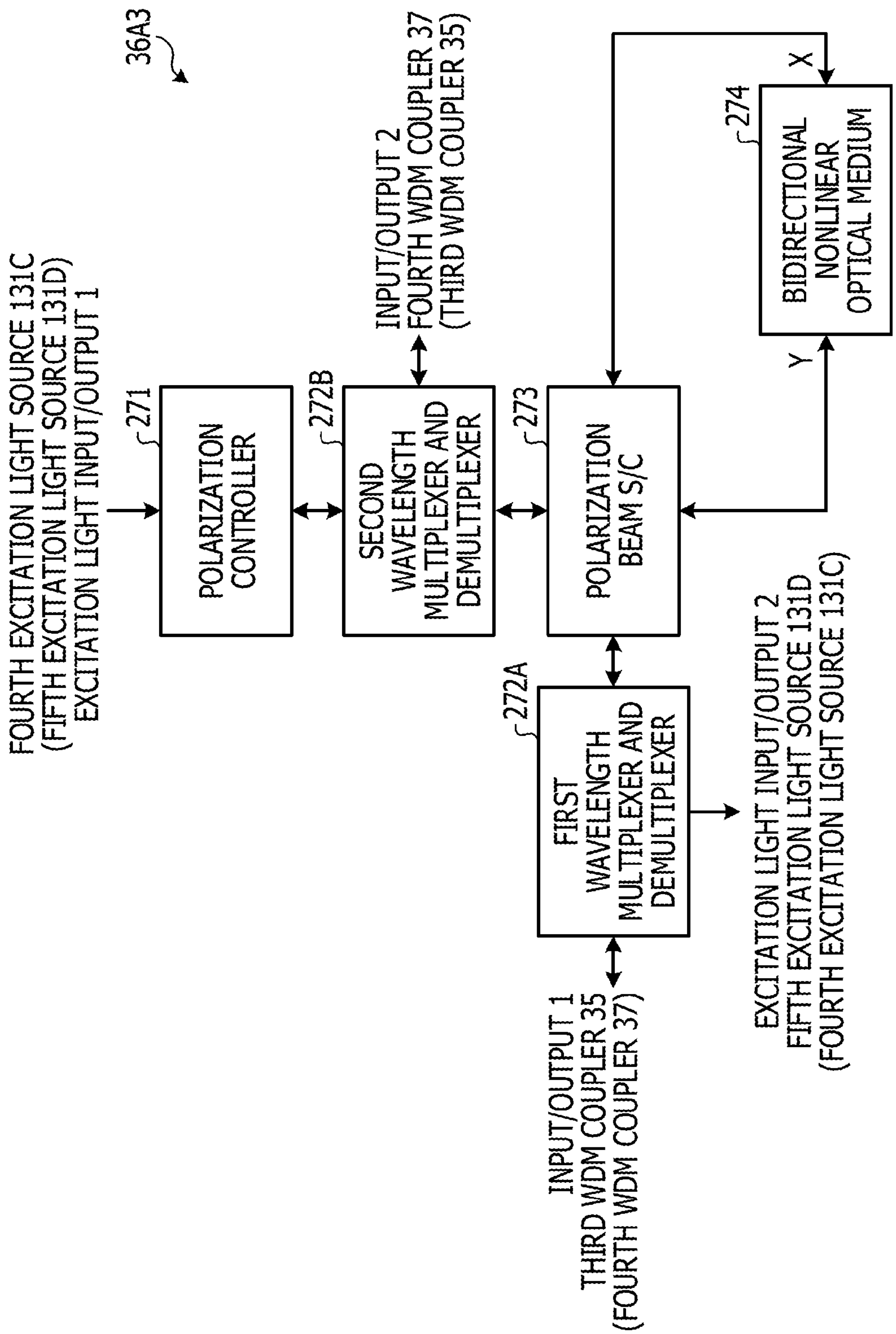
FIG. 47 is an explanatory diagram illustrating an example of a PD nonlinear optical medium of an example 39.

FIG. 47 is an explanatory diagram illustrating an example of a PD nonlinear optical medium 36A3 of an example 39.

The PD nonlinear optical medium 36A3 illustrated in FIG. 47 is a nonlinear optical medium of the light-transmissive-type loop processing configuration of the bidirectional input and output. The PD nonlinear optical medium 36A3 includes a polarization controller 271, a first wavelength multiplexer and demultiplexer 272A, a second wavelength multiplexer and demultiplexer 272B, a polarization beam S/C 273, and a bidirectional nonlinear optical medium 274.

The first wavelength multiplexer and demultiplexer 272A outputs the second and third multiplex light from the third WDM coupler 35 to the polarization beam S/C 273. The polarization controller 271 polarization-controls the first and second excitation light from the fourth excitation light source 131C, and outputs to the second wavelength multiplexer and demultiplexer 272B the first and second excitation light after the polarization control. The second wavelength multiplexer and demultiplexer 272B outputs to the polarization beam S/C 273 the first and second excitation light after the polarization control. The polarization beam S/C 273 outputs the second and third multiplex light and the first and second excitation light of the vertical polarization to the forward port X of the bidirectional nonlinear optical medium 274. Using the first and second excitation light, the bidirectional nonlinear optical medium 274 wavelength-converts the second and third multiplex light of the vertical polarization, and outputs to the polarization beam S/C 273 the second and third multiplex light of the vertical polarization after the wavelength conversion. The polarization beam S/C 273 outputs to the second wavelength multiplexer and demultiplexer 272B the second and third multiplex light of the vertical polarization after the wavelength conversion and the remaining excitation light.

The polarization beam S/C 273 outputs the second and third multiplex light and the first and second excitation light of the horizontal polarization to the backward port Y of the bidirectional nonlinear optical medium 274. Using the first and second excitation light, the bidirectional nonlinear optical medium 274 wavelength-converts the second and third multiplex light of the horizontal polarization, and outputs to the polarization beam S/C 273 the second and third multiplex light of the horizontal polarization after the wavelength conversion. The polarization beam S/C 273 outputs to the second wavelength multiplexer and demultiplexer 272B the second and third multiplex light of the vertical polarization after the wavelength conversion and the remaining excitation light. The second wavelength multiplexer and demultiplexer 272B outputs to the fourth WDM coupler 37 the second and third multiplex light of the horizontal polarization and the vertical polarization, of the second and third multiplex light of the horizontal polarization, the second and third multiplex light of the vertical polarization, and the remaining excitation light, and outputs the remaining excitation light to the polarization controller 271. The polarization controller 271 polarization-controls the remaining excitation light, and outputs the remaining excitation light after the polarization control. The second wavelength multiplexer and demultiplexer 272B outputs the second and third multiplex light of the fourth WDM coupler 37 to the polarization beam S/C 273. The first wavelength multiplexer and demultiplexer 272A outputs the first and second excitation light from the fifth excitation light source 131D to the polarization beam S/C 273.

The polarization beam S/C 273 outputs the second and third multiplex light and the first and second excitation light of the vertical polarization to the forward port X of the bidirectional nonlinear optical medium 274. Using the first and second excitation light, the bidirectional nonlinear optical medium 274 wavelength-converts the second and third multiplex light of the vertical polarization, and outputs to the polarization beam S/C 273 the second and third multiplex light of the vertical polarization after the wavelength conversion. The polarization beam S/C 273 outputs to the first wavelength multiplexer and demultiplexer 272A the second and third multiplex light of the vertical polarization after the wavelength conversion and the remaining excitation light.

The polarization beam S/C 273 outputs the second and third multiplex light and the first and second excitation light of the horizontal polarization to the backward port Y of the bidirectional nonlinear optical medium 274. Using the first and second excitation light, the bidirectional nonlinear optical medium 274 wavelength-converts the second and third multiplex light of the horizontal polarization, and outputs to the polarization beam S/C 273 the second and third multiplex light of the horizontal polarization after the wavelength conversion. The polarization beam S/C 273 outputs to the first wavelength multiplexer and demultiplexer 272A the second and third multiplex light of the vertical polarization after the wavelength conversion and the remaining excitation light. The first wavelength multiplexer and demultiplexer 272A outputs to the third WDM coupler 35 the second and third multiplex light of the horizontal polarization and the vertical polarization, of the second and third multiplex light of the horizontal polarization, the second and third multiplex light of the vertical polarization, and the remaining excitation light, and outputs the remaining excitation light.

The PD nonlinear optical medium 36A3 of the example 39 may wavelength-convert the second and third multiplex light using the first and second excitation light, even if the PD nonlinear optical medium 36A3 adopts the light-transmissive-type loop processing configuration of the bidirectional input and output. For the purpose of illustration, although the case is illustrated in which the second multiplex light and the third multiplex light are wavelength-converted, the wavelength conversion is not limited to this and may be changed appropriately.

The fifteenth to eighteenth wavelength converters 117E to 117H illustrated in FIG. 39 illustrate the case in which the third WDM coupler 35 and the fourth WDM coupler 37 are bidirectionally connected to the PD nonlinear optical medium 36A. However, the fifteenth to eighteenth wavelength converters 117E to 117H are not limited to this, and may be a wavelength converter in which the single fifth WDM coupler 51 is connected to a PD nonlinear optical medium 52A, and an embodiment in that case is described below as an example 40.

Example 40

Figure 48A:
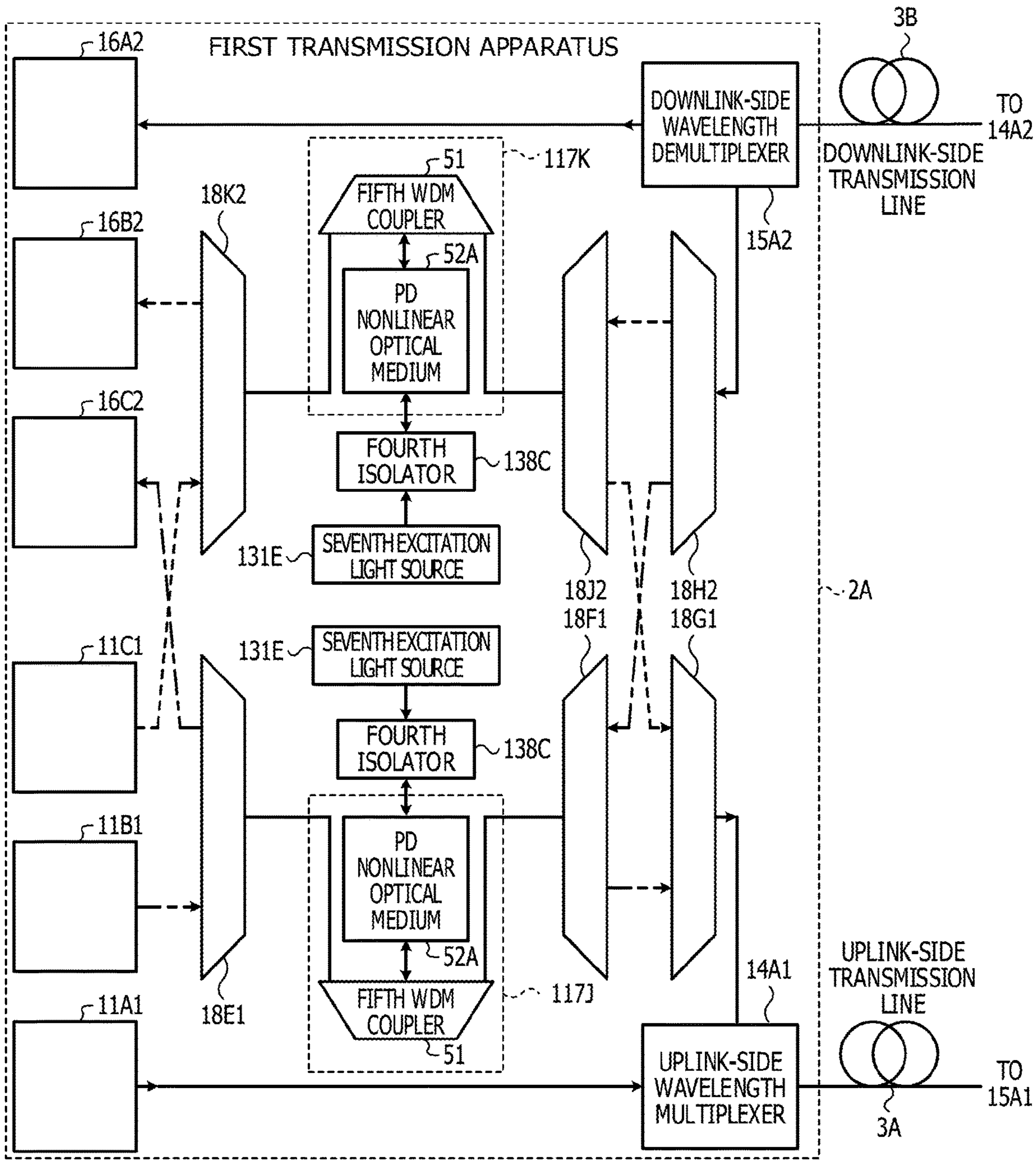
FIGS. 48A and 48B are explanatory diagrams illustrating an example of a transmission system of an example 40.
Figure 48B:
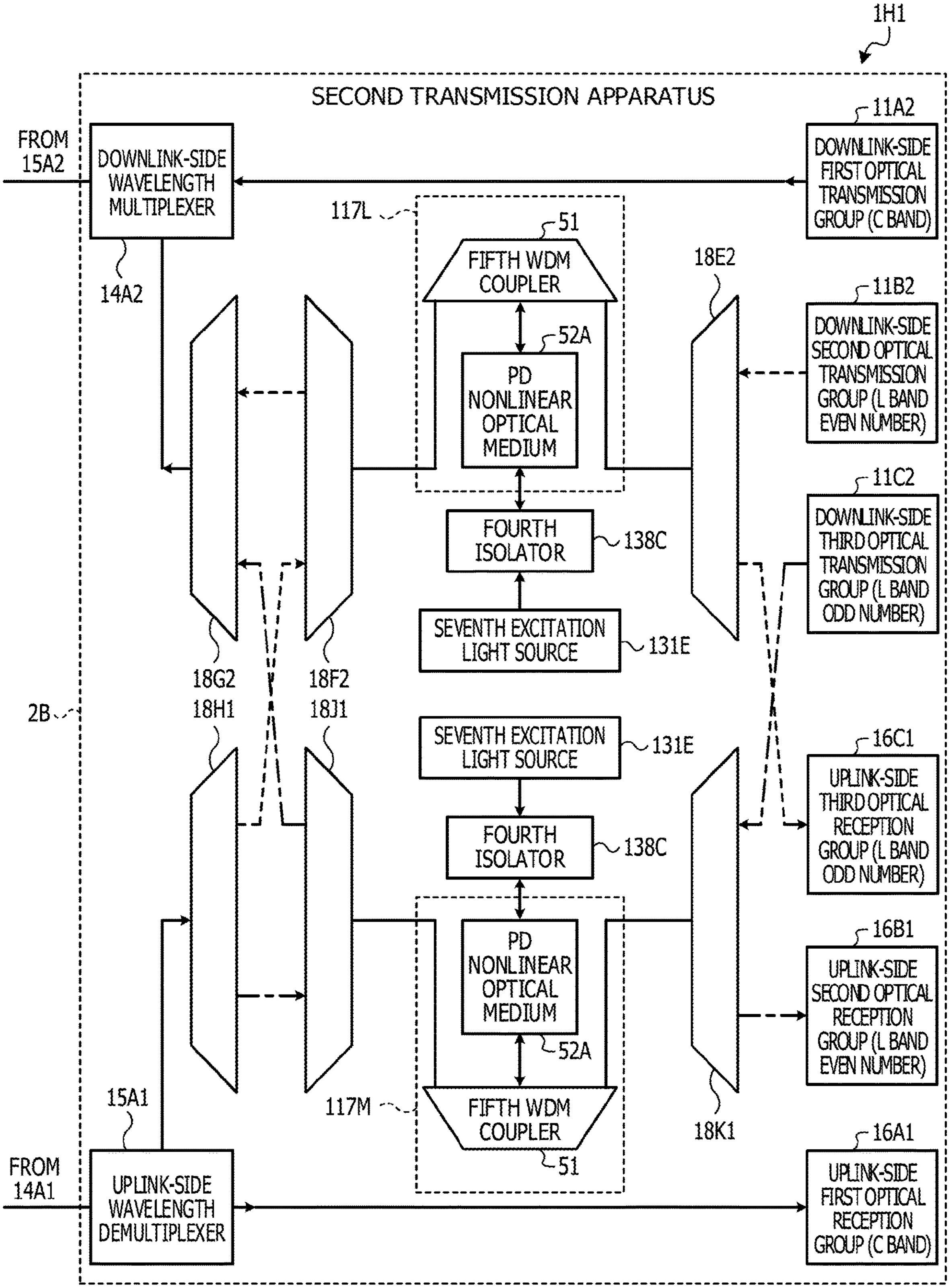

FIG. 48 is an explanatory diagram illustrating an example of a transmission system 1H1 of the example 40. The identical symbols are assigned to the identical configuration of the transmission system 1D1, and thus description of the overlapping configurations and operations is omitted. In the first transmission apparatus 2A are disposed a nineteenth wavelength converter 117J in place of the fifteenth wavelength converter 17E and a twentieth wavelength converter 117K in place of the sixteenth wavelength converter 117F. In the second transmission apparatus 2B are disposed a twenty-first wavelength converter 117L in place of the seventeenth wavelength converter 117G and a twenty-second wavelength converter 117M in place of the eighteenth wavelength converter 117H.

The nineteenth wavelength converter 117J includes the PD nonlinear optical medium 52A, the fifth WDM coupler 51, a fourth isolator 138C, and a seventh excitation light source 131E. The fifth WDM coupler 51 connects to the PD nonlinear optical medium 52A, connects to the uplink-side fifteenth interleaver 18E1, and connects to the uplink-side sixteenth interleaver 18F1. The PD nonlinear optical medium 52A connects to the fourth isolator 138C. The twentieth wavelength converter 117K includes the PD nonlinear optical medium 52A, the fifth WDM coupler 51, the fourth isolator 138C, and the seventh excitation light source 131E. The fifth WDM coupler 51 connects to the PD nonlinear optical medium 52A, connects to the downlink-side twentieth interleaver 18K2, and connects to the downlink-side nineteenth interleaver 18J2. The PD nonlinear optical medium 52A connects to the fourth isolator 138C.

The twenty-first wavelength converter 117L includes the PD nonlinear optical medium 52A, the fifth WDM coupler 51, the fourth isolator 138C, and the seventh excitation light source 131E. The fifth WDM coupler 51 connects to the PD nonlinear optical medium 52A, connects to the downlink-side fifteenth interleaver 18E2, and connects to the downlink-side sixteenth interleaver 18F2. The PD nonlinear optical medium 52A connects to the fourth isolator 138C. The twenty-second wavelength converter 117M includes the PD nonlinear optical medium 52A, the fifth WDM coupler 51, the fourth isolator 138C, and the seventh excitation light source 131E. The fifth WDM coupler 51 connects to the PD nonlinear optical medium 52A, connects to the uplink-side nineteenth interleaver 18J1, and connects to the uplink-side twentieth interleaver 18K1. The PD nonlinear optical medium 52A connects to the fourth isolator 138C.

The PD nonlinear optical medium 52A in the nineteenth wavelength converter 117J inputs the first and second excitation light from the seventh excitation light source 131E by way of the fourth isolator 138C. The fifth WDM coupler 51 in the nineteenth wavelength converter 117J outputs the uplink-side second multiplex light of the C band of the even-numbered channels from the uplink-side fifteenth interleaver 18E1 to the PD nonlinear optical medium 52A. Using the first and second excitation light, the PD nonlinear optical medium 52A wavelength-converts the uplink-side second multiplex light of the C band of the even-numbered channels into the uplink-side second multiplex light of the L band of the even-numbered channels, and outputs to the fifth WDM coupler 51. Then, the fifth WDM coupler 51 outputs the uplink-side second multiplex light of the L band of the even-numbered channels to the uplink-side seventeenth interleaver 18G1 by way of the uplink-side sixteenth interleaver 18F1.

Furthermore, the fifth WDM coupler 51 in the nineteenth wavelength converter 117J outputs to the PD nonlinear optical medium 52A the downlink-side third multiplex light of the L band of the odd-numbered channels inputted from the uplink-side sixteenth interleaver 18F1. Using the first and second excitation light, the PD nonlinear optical medium 52A wavelength-converts the downlink-side third multiplex light of the L band of the odd-numbered channels into the downlink-side third multiplex light of the C band of the odd-numbered channels, and outputs to the fifth WDM coupler 51. The fifth WDM coupler 51 outputs the downlink-side third multiplex light of the C band of the odd-numbered channels to the downlink-side third optical reception group 16C2 by way of the uplink-side fifteenth interleaver 18E1.

The PD nonlinear optical medium 52A in the twentieth wavelength converter 117K inputs the first and second excitation light from the seventh excitation light source 131E by way of the fourth isolator 138C. The fifth WDM coupler 51 in the twentieth wavelength converter 117K outputs to the PD nonlinear optical medium 52A the uplink-side third multiplex light of the C band of the odd-numbered channels from the downlink-side twentieth interleaver 18K2. Using the first and second excitation light, the PD nonlinear optical medium 52A wavelength-converts the uplink-side third multiplex light of the C band of the odd-numbered channels into the uplink-side third multiplex light of the L band of the odd-numbered channels, and outputs to the fifth WDM coupler 51. The fifth WDM coupler 51 outputs the uplink-side third multiplex light of the L band of the odd-numbered channels to the uplink-side seventeenth interleaver 18G1 by way of the downlink-side nineteenth interleaver 18J2.

Furthermore, the fifth WDM coupler 51 in the twentieth wavelength converter 117K outputs to the PD nonlinear optical medium 52A the downlink-side second multiplex light of the L band of the even-numbered channels inputted from the downlink-side nineteenth interleaver 18J2. Using the first and second excitation light, the PD nonlinear optical medium 52A wavelength-converts the downlink-side second multiplex light of the L band of the even-numbered channels into the downlink-side second multiplex light of the C band of the even-numbered channels, and outputs to the fifth WDM coupler 51. The fifth WDM coupler 51 outputs the downlink-side second multiplex light of the C band of the even-numbered channels to the downlink-side second optical reception group 16B2 by way of the downlink-side twentieth interleaver 18K2.

The PD nonlinear optical medium 52A in the twenty-first wavelength converter 117L inputs the first and second excitation light from the seventh excitation light source 131E by way of the fourth isolator 138C. The fifth WDM coupler 51 in the twenty-first wavelength converter 117L outputs the downlink-side second multiplex light of the C band of the even-numbered channels from the downlink-side fifteenth interleaver 18E2 to the PD nonlinear optical medium 52A. Using the first and second excitation light, the PD nonlinear optical medium 52A wavelength-converts the downlink-side second multiplex light of the C band of the even-numbered channels into the downlink-side second multiplex light of the L band of the even-numbered channels, and outputs to the fifth WDM coupler 51. The fifth WDM coupler 51 outputs the downlink-side second multiplex light of the L band of the even-numbered channels to the downlink-side seventeenth interleaver 18G2 by way of the downlink-side sixteenth interleaver 18F2.

Furthermore, the fifth WDM coupler 51 in the twenty-first wavelength converter 117L outputs to the PD nonlinear optical medium 52A the uplink-side third multiplex light of the L band of the odd-numbered channels inputted from the downlink-side sixteenth interleaver 18F2. Then, using the first and second excitation light, the PD nonlinear optical medium 52A wavelength-converts the uplink-side third multiplex light of the L band of the odd-numbered channels into the uplink-side third multiplex light of the C band of the odd-numbered channels, and outputs to the fifth WDM coupler 51. The fifth WDM coupler 51 outputs the uplink-side third multiplex light of the C band of the odd-numbered channels to the uplink-side third optical reception group 16C1 by way of the downlink-side fifteenth interleaver 18E2.

The PD nonlinear optical medium 52A in the twenty-second wavelength converter 117M inputs the excitation light from the seventh excitation light source 131E by way of the fourth isolator 138C. The fifth WDM coupler 51 in the twenty-second wavelength converter 117M outputs to the PD nonlinear optical medium 52A the downlink-side third multiplex light of the C band of the odd-numbered channels from the uplink-side twentieth interleaver 18K1. Using the first and second excitation light, the PD nonlinear optical medium 52A wavelength-converts downlink-side third multiplex light of the C band of the odd-numbered channels into the downlink-side third multiplex light of the L band of the odd-numbered channels, and outputs to the fifth WDM coupler 51. The fifth WDM coupler 51 outputs the downlink-side third multiplex light of the L band of the odd-numbered channels to the downlink-side seventeenth interleaver 18G2 by way of the uplink-side nineteenth interleaver 1831.

Furthermore, the fifth WDM coupler 51 in the twenty-second wavelength converter 117M outputs to the PD nonlinear optical medium 52A the uplink-side second multiplex light of the L band of the even-numbered channels inputted from the uplink-side nineteenth interleaver 18J1. Using the first and second excitation light, the PD nonlinear optical medium 52A wavelength-converts the uplink-side second multiplex light of the L band of the even-numbered channels into the uplink-side second multiplex light of the C band of the even-numbered channels, and outputs to the fifth WDM coupler 51. The fifth WDM coupler 51 outputs the uplink-side second multiplex light of the C band of the even-numbered channels to the uplink-side second optical reception group 16B1 by way of the uplink-side twentieth interleaver 18K1.

The nineteenth wavelength converter 1173 of the example 40 may wavelength-convert the uplink-side second and downlink-side third multiplex light, using the PD nonlinear optical medium 52A connected to the single fifth WDM coupler 51. Even the twentieth wavelength converter 117K, the twenty-first wavelength converter 117L, and the twenty-second wavelength converter 117M may wavelength-convert the uplink and downlink second and third multiplex light, using the PD nonlinear optical medium 52A connected to the single fifth WDM coupler 51.

The seventh excitation light source 131E is disposed in each of the nineteenth to twenty-second wavelength converters 117J to 117M illustrated in FIG. 48. However, for example, the nineteenth wavelength converter 117J and the twentieth wavelength converter 117K in the first transmission apparatus 2A may share a single excitation light source, an embodiment of which is described below as an example 41.

Example 41

Figure 49A:
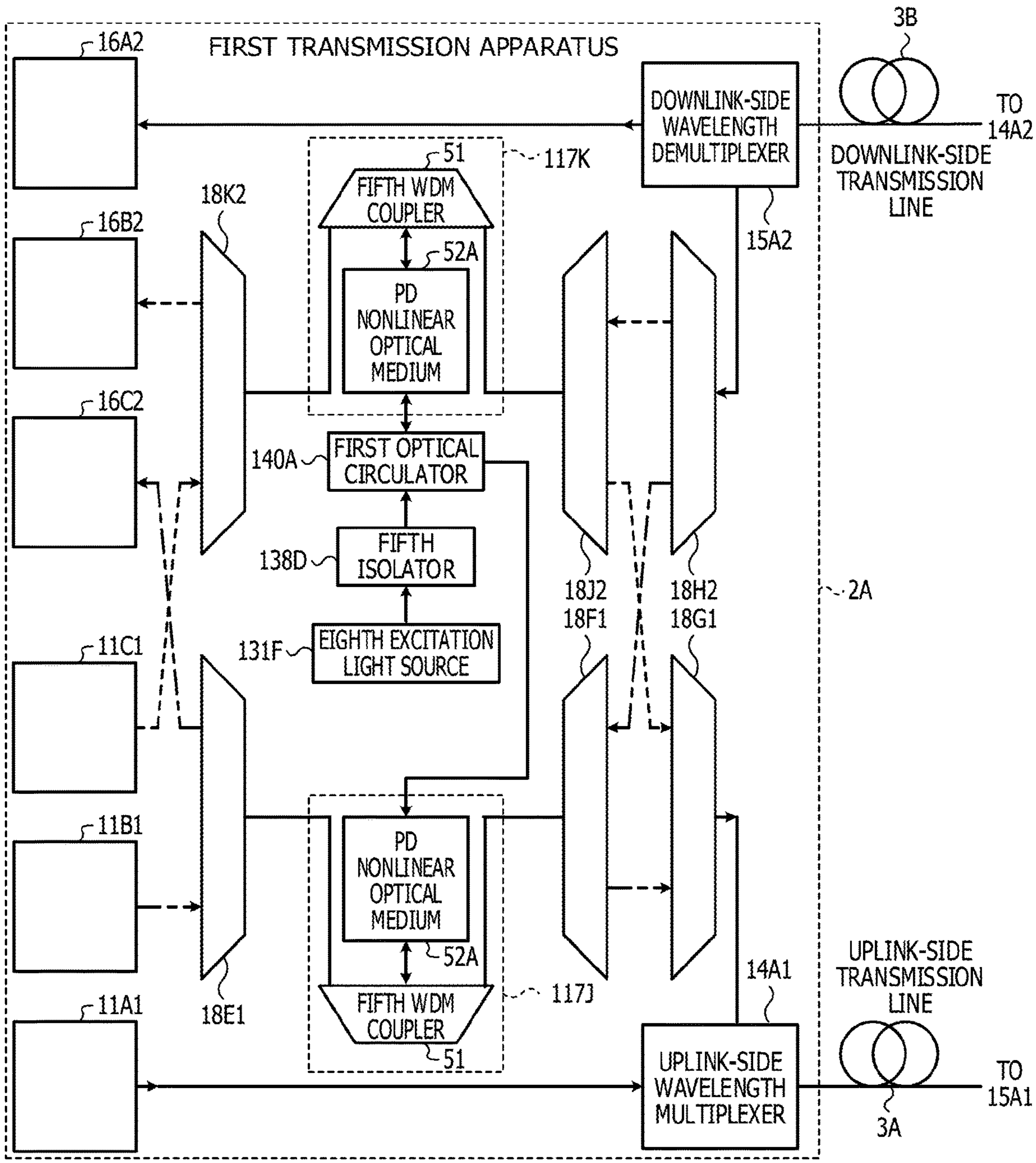
FIGS. 49A and 49B are explanatory diagrams illustrating an example of a transmission system of an example 41.
Figure 49B:
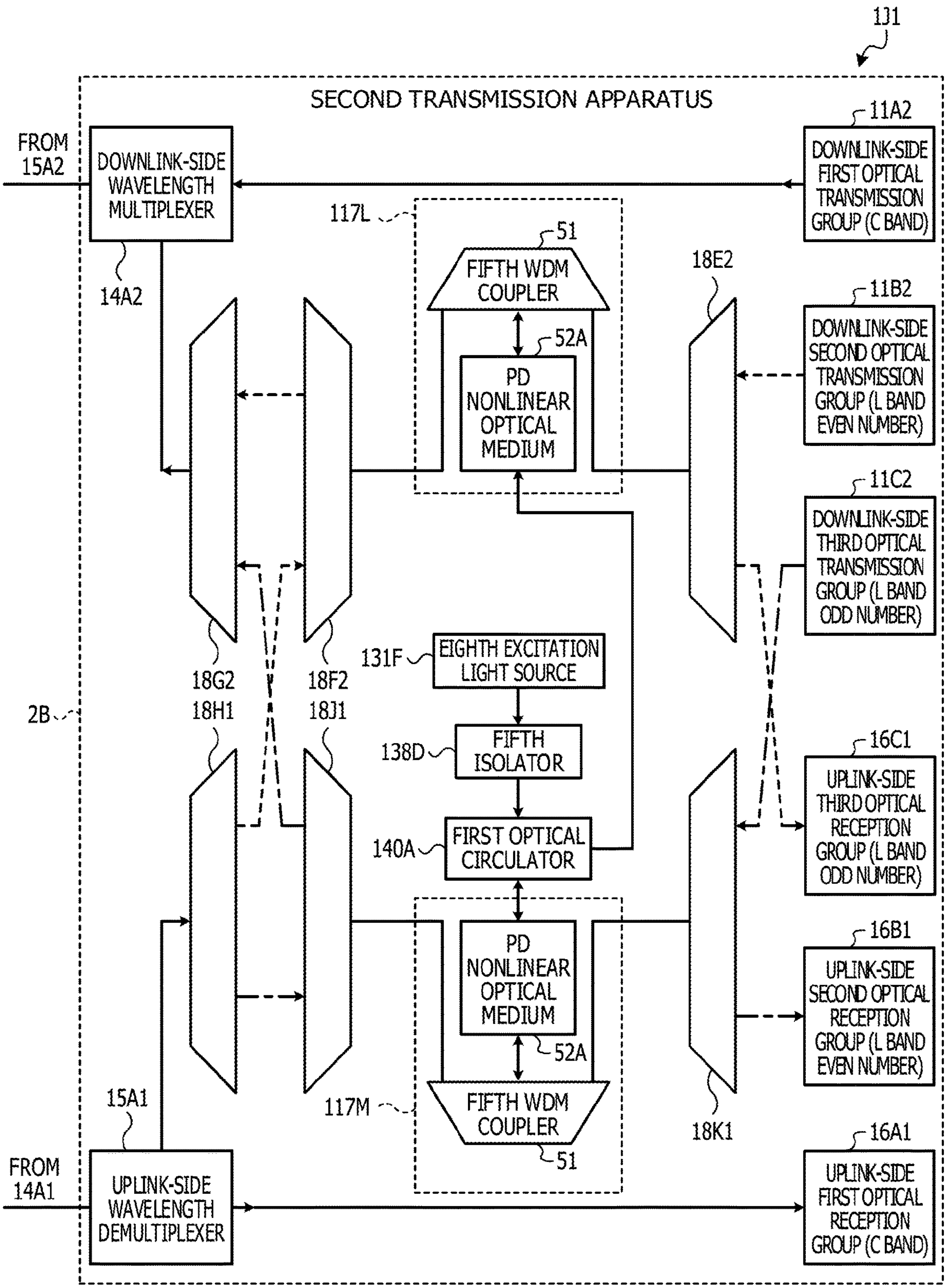

FIG. 49 is an explanatory diagram illustrating an example of a transmission system 1J1 of the example 41. The identical symbols are assigned to the identical configuration of the transmission system 1H1 of the example 40, and thus description of the overlapping configurations and operations is omitted. The twentieth wavelength converter 117K includes the PD nonlinear optical medium 52A, the fifth WDM coupler 51, a first optical circulator 140A, a fifth isolator 138D, and an eighth excitation light source 131F. The fifth WDM coupler 51 connects to the PD nonlinear optical medium 52A, connects to the downlink-side twentieth interleaver 18K2, and the downlink-side nineteenth interleaver 18J2. The PD nonlinear optical medium 52A connects to the first optical circulator 140A.

The nineteenth wavelength converter 117J includes the PD nonlinear optical medium 52A and the fifth WDM coupler 51. The fifth WDM coupler 51 connects to the PD nonlinear optical medium 52, connects to the uplink-side fifteenth interleaver 18E1, and connects to the uplink-side sixteenth interleaver 18F1. The PD nonlinear optical medium 52A in the nineteenth wavelength converter 117J connects to the first optical circulator 140A in the twentieth wavelength converter 117K. The PD nonlinear optical medium 52A in the twentieth wavelength converter 117K connects to the first optical circulator 140A, connects the fifth isolator 138D to the first optical circulator 140A, and connects the eighth excitation light source 131F to the fifth isolator 138D. The fifth WDM coupler 51 in the nineteenth wavelength converter 1173 connects to the first optical circulator 140A. The eighth excitation light source 131F supplies the first and second excitation light to the fifth WDM coupler 51 in the twentieth wavelength converter 117K by way of the first optical circulator 140A. Furthermore, the first optical circulator 140A supplies the remaining excitation light used in the PD nonlinear optical medium 52A in the twentieth wavelength converter 117K to the PD nonlinear optical medium 52A in the nineteenth wavelength converter 117J. The twenty-second wavelength converter 117M includes the PD nonlinear optical medium 52A, the fifth WDM coupler 51, the first optical circulator 140A, the fifth isolator 138D, and the eighth excitation light source 131F. The fifth WDM coupler 51 connects to the PD nonlinear optical medium 52A, connects to the uplink-side nineteenth interleaver 18J1, and connects to the uplink-side twentieth interleaver 18K1. The PD nonlinear optical medium 52A in the twenty-second wavelength converter 117M connects to the first optical circulator 140A.

The twenty-first wavelength converter 117L includes the PD nonlinear optical medium 52A and the fifth WDM coupler 51. The fifth WDM coupler 51 connects to the PD nonlinear optical medium 52A in the twenty-first wavelength converter 117L, connects to the downlink-side fifteenth interleaver 18E2, and the downlink-side sixteenth interleaver 18F2. The PD nonlinear optical medium 52A in the twenty-first wavelength converter 117L connects to the first optical circulator 140A in the twenty-second wavelength converter 117M and connects the fifth isolator 138D to the first optical circulator 140A. The PD nonlinear optical medium 52A further connects the eighth excitation light source 31F to the fifth isolator 138D. The fifth WDM coupler 51 in the twenty-first wavelength converter 117L connects to the first optical circulator 140A. The eighth excitation light source 131F supplies the first and second excitation light to the fifth WDM coupler 51 in the twenty-first wavelength converter 117L by way of the first optical circulator 140A. Furthermore, the first optical circulator 140A supplies the remaining excitation light source used in the PD nonlinear optical medium 52A in the twenty-second wavelength converter 117M to the PD nonlinear optical medium 52A in the twenty-first wavelength converter 117L.

The PD nonlinear optical medium 52A in the twentieth wavelength converter 117K inputs the first and second excitation light from the eighth excitation light source 31F by way of the first optical circulator 140A and the fifth isolator 138D. The fifth WDM coupler 51 in the twentieth wavelength converter 117K outputs to the PD nonlinear optical medium 52A the uplink-side third multiplex light of the C band of the odd-numbered channels from the downlink-side twentieth interleaver 18K2. Using the first and second excitation light from the eighth excitation light source 31F, the PD nonlinear optical medium 52A wavelength-converts the uplink-side third multiplex light of the C band of the odd-numbered channels into the uplink-side third multiplex light of the L band of the odd-numbered channels, and outputs to the fifth WDM coupler 51. The fifth WDM coupler 51 outputs the uplink-side third multiplex light of the C band of the odd-numbered channels to the uplink-side seventeenth interleaver 18G1 by way of the downlink-side nineteenth interleaver 18J2.

Furthermore, the fifth WDM coupler 51 in the twentieth wavelength converter 117K outputs to the PD nonlinear optical medium 52A the downlink-side second multiplex light of the L band of the even-numbered channels inputted from the downlink-side nineteenth interleaver 18J2. Using the first and second excitation light from the eighth excitation light source 131F, the PD nonlinear optical medium 52A wavelength-converts the downlink-side second multiplex light of the L band of the even-numbered channels into the downlink-side second multiplex light of the C band of the even-numbered channels and outputs to the fifth WDM coupler 51. The fifth WDM coupler 51 outputs the downlink-side second multiplex light of the C band of the even-numbered channels to the downlink-side second optical reception group 16B2 by way of the downlink-side twentieth interleaver 18K2.

The PD nonlinear optical medium 52A in the nineteenth wavelength converter 117J outputs the remaining excitation light used in the twentieth wavelength converter 117K to the PD nonlinear optical medium 52A by way of the first optical circulator 140A in the twentieth wavelength converter 117K. The fifth WDM coupler 51 in the nineteenth wavelength converter 117J outputs the uplink-side second multiplex light of the C band of the even-numbered channels from the uplink-side fifteenth interleaver 18E1 to the PD nonlinear optical medium 52A. Using the remaining excitation light, the PD nonlinear optical medium 52A wavelength converts the uplink-side second multiplex light of the C band of the even-numbered channels into the uplink-side second multiplex light of the L band of the even-numbered channels, and outputs to the fifth WDM coupler 51. The fifth WDM coupler 51 outputs the uplink-side second multiplex light of the L band of the even-numbered channels to the uplink-side seventeenth interleaver 18G1 by way of the uplink-side sixteenth interleaver 18F1.

Furthermore, the fifth WDM coupler 51 in the nineteenth wavelength converter 117J outputs to the PD nonlinear optical medium 52A the downlink-side third multiple link of the L band of the odd-numbered channels inputted from the uplink-side sixteenth interleaver 18F1. Using the remaining excitation light from the first optical circulator 140A, the PD nonlinear optical medium 52A wavelength-converts the downlink-side third multiplex light of the L band of the odd-numbered channels into the downlink-side third multiplex light of the C band of the odd-numbered channels, and outputs to the fifth WDM coupler 51. The fifth WDM coupler 51 outputs the downlink-side third multiplex light of the C band of the odd-numbered channels to the downlink-side third optical reception group 16C2 by way of the uplink-side fifteenth interleaver 18E1.

The PD nonlinear optical medium 52A in the twenty-second wavelength converter 117M inputs the first and second excitation light from the eighth excitation light source 131F by way of the first optical circulator 140A and the fifth isolator 138D. The fifth WDM coupler 51 in the twenty-second wavelength converter 117M outputs the uplink-side second multiplex light of the L band of the even-numbered channels from the uplink-side nineteenth interleaver 18J1 to the PD nonlinear optical medium 52A. Using the first and second excitation light from the eighth excitation light source 31F, the PD nonlinear optical medium 52A wavelength-converts the uplink-side second multiplex light of the L band of the even-numbered channels into the uplink-side second multiplex light of the C band of the even-numbered channels, and outputs to the fifth WDM coupler 51. The fifth WDM coupler 51 outputs the uplink-side second multiplex light of the L band of the even-numbered channels to the uplink-side second optical reception group 16B1 by way of the uplink-side twentieth interleaver 18K1.

Furthermore, the fifth WDM coupler 51 in the twenty-second wavelength converter 117M outputs to the PD nonlinear optical medium 52A the downlink-side third multiplex light of the C band of the odd-numbered channels inputted from the uplink-side twentieth interleaver 18K1. Then, using the first and second excitation light from the eighth excitation light source 31F, the PD nonlinear optical medium 52A wavelength-converts the downlink-side third multiplex light of the C band of the odd-numbered channels into the downlink-side third multiplex light of the L band of the odd-numbered channels, and outputs to the fifth WDM coupler 51. The fifth WDM coupler 51 outputs the downlink-side third multiplex light of the L band of the odd-numbered channels to the downlink-side seventeenth interleaver 18G2 by way of the uplink-side nineteenth interleaver 18J1.

The PD nonlinear optical medium 52A in the twenty-first wavelength converter 117L inputs the remaining excitation light used in the twenty-second wavelength converter 117M by way of the first optical circulator 140A in the twenty-second wavelength converter 117M. The fifth WDM coupler 51 in the twenty-first wavelength converter 117L outputs the downlink-side second multiplex light of the C band of the even-numbered channels from the downlink-side fifteenth interleaver 18E2 to the PD nonlinear optical medium 52A. Using the remaining excitation light from the first optical circulator 140A, the PD nonlinear optical medium 52A wavelength-converts the downlink-side second multiplex light of the C band of the even-numbered channels into the downlink-side second multiplex light of the L band of the even-numbered channels, and outputs to the fifth WDM coupler 51. The fifth WDM coupler 51 outputs the downlink-side second multiplex light of the L band of the even-numbered channels to the downlink-side seventeenth interleaver 18G2 by way of the downlink-side sixteenth interleaver 18F2.

Furthermore, the fifth WDM coupler 51 in the twenty-first wavelength converter 117L outputs the uplink-side third multiplex light of the L band of the odd-numbered channels inputted from the downlink-side sixteenth interleaver 18F2 to the PD nonlinear optical medium 52A. Using the remaining excitation light from the first optical circulator 140A, the PD nonlinear optical medium 52A wavelength-converts the uplink-side third multiplex light of the L band of the odd-numbered channels into the uplink-side third multiplex light of the C band of the odd-numbered channels, and outputs to the fifth WDM coupler 51. The fifth WDM coupler 51 outputs the uplink-side third multiplex light of the C band of the odd-numbered channels to the uplink-side third optical reception group 16C1 by way of the downlink-side fifteenth interleaver 18E2.

The nineteenth wavelength converter 117J in the first transmission apparatus 2A of the example 41 wavelength-converts the uplink-side second multiplex light and the downlink-side third multiplex light, using the remaining excitation light of the twentieth wavelength converter 117K by way of the first optical circulator 140A. As a result, the first transmission apparatus 2A may combine the excitation light sources into one and reduce the number of the excitation light sources.

Using the remaining excitation light of the twenty-second wavelength converter 117M, the twenty-first wavelength converter 117L in the second transmission apparatus 2B wavelength-converts the uplink-side third multiplex light and the downlink-side second multiplex light by the first optical circulator 140A. As a result, the second transmission apparatus 2B may combine the excitation light sources into one and reduce the number of excitation light sources.

The first transmission apparatus 2A in the transmission system 131 illustrated in FIG. 49 shares the eighth excitation light source 131F in the twentieth wavelength converter 117K with the nineteenth wavelength converter 117J and the twentieth wavelength converter 117K. However, the configuration is not limited to this, and is described below as an example 42.

Example 42

Figure 50A:
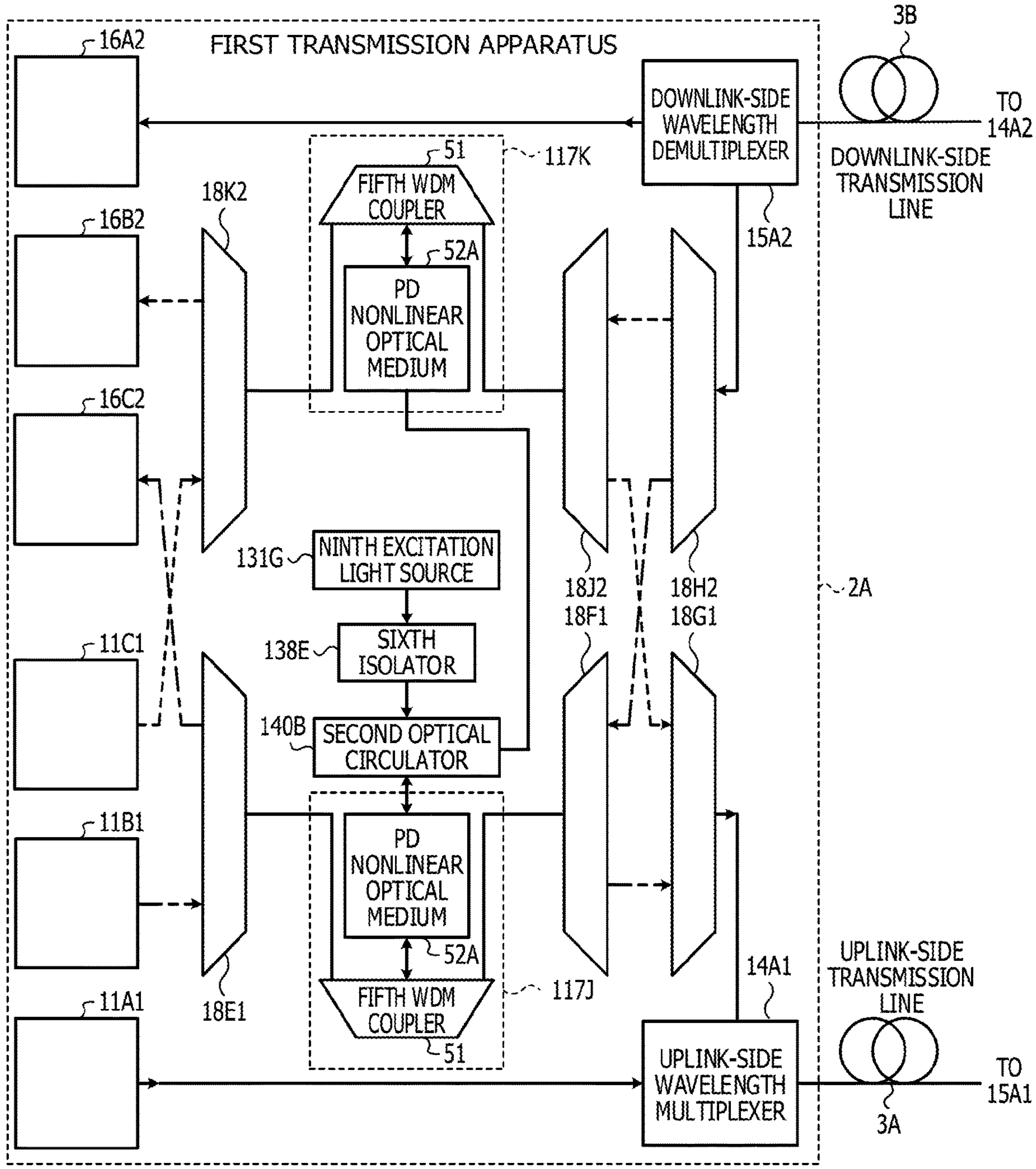
FIGS. 50A and 50B are explanatory diagrams illustrating an example of a transmission system of an example 42.
Figure 50B:
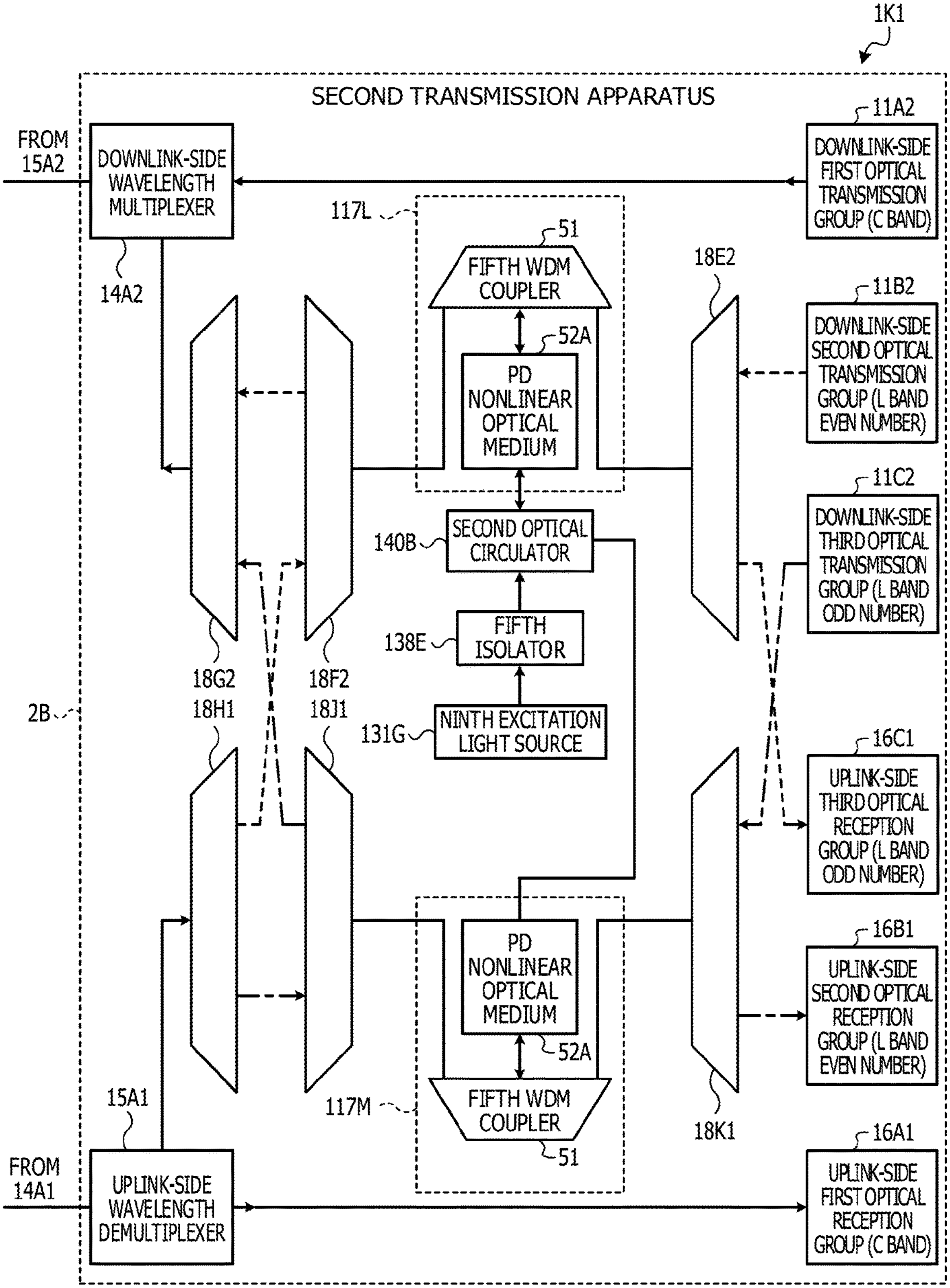

FIG. 50 is an explanatory diagram illustrating an example of a transmission system 1K1 of the example 42. The identical symbols are assigned to the identical configuration of the transmission system 1H1 illustrated in FIG. 48, and thus description of the overlapping configurations and operations is omitted. The nineteenth wavelength converter 117J in the first transmission apparatus 2A includes the PD nonlinear optical medium 52A, the fifth WDM coupler 51, a second optical circulator 140B, a sixth isolator 138E, and a ninth excitation light source 131G. The fifth WDM coupler 51 connects to the PD nonlinear optical medium 52A, connects to the uplink-side fifteenth interleaver 18E1, and connects to the uplink-side sixteenth interleaver 18F1.

The twentieth wavelength converter 117K in the first transmission apparatus 2A includes the PD nonlinear optical medium 52A and the fifth WDM coupler 51. The fifth WDM coupler 51 connects to the PD nonlinear optical medium 52A, connects to the downlink-side nineteenth interleaver 18J2, and connects to the downlink-side twentieth interleaver 18K2. The PD nonlinear optical medium 52A connects to the second optical circulator 140B in the nineteenth wavelength converter 119J.

The first transmission apparatus 2A connects the second optical circulator 140B to the PD nonlinear optical medium 52A in the nineteenth wavelength converter 117J and connects the sixth isolator 138E to the second optical circulator 140B. The first transmission apparatus 2A further connects the ninth excitation light source 131G to the sixth isolator 138E. The first transmission apparatus 2A connects the second optical circulator 140B to the PD nonlinear optical medium 52A in the twentieth wavelength converter 117K. The ninth excitation light source 131G supplies the first and second excitation light to the PD nonlinear optical medium 52A in the nineteenth wavelength converter 117J by way of the second optical circulator 140B. Furthermore, the second optical circulator 140B supplies the remaining excitation light used in the PD nonlinear optical medium 52A in the nineteenth wavelength converter 117J to the PD nonlinear optical medium 52A in the twentieth wavelength converter 17K.

The twenty-first wavelength converter 117L in the second transmission apparatus 2B includes the PD nonlinear optical medium 52A, the fifth WDM coupler 51, the second optical circulator 140B, the sixth isolator 138E, and the ninth excitation light source 131G. The fifth WDM coupler 51 connects to the PD nonlinear optical medium 52A, connects to the downlink-side fifteenth interleaver 18E2, and connects to the downlink-side sixteenth interleaver 18F2. The twenty-second wavelength converter 117M in the second transmission apparatus 2B includes the PD nonlinear optical medium 52A and the fifth WDM coupler 51. The fifth WDM coupler 51 connects to the PD nonlinear optical medium 52A, connects to the uplink-side nineteenth interleaver 18J1, and connects to the uplink-side twentieth interleaver 18K1.

The second transmission apparatus 2B connects the second optical circulator 140B to the PD nonlinear optical medium 52A in the twenty-first wavelength converter 117L and connects the sixth isolator 138E to the second optical circulator 140B. The second transmission apparatus 2B further connects the ninth excitation light source 131G to the sixth isolator 138E. The second transmission apparatus 2B connects the second optical circulator 140B to the PD nonlinear optical medium 52A in the twenty-second wavelength converter 117M. The ninth excitation light source 131G supplies the first and second excitation light to the PD nonlinear optical medium 52A in the twenty-first wavelength converter 117L by way of the second optical circulator 140B. Furthermore, the second optical circulator 140B supplies the remaining excitation light used in the PD nonlinear optical medium 52A in the twenty-first wavelength converter 117L to the PD nonlinear optical medium 52A in the twenty-second wavelength converter 117M.

The PD nonlinear optical medium 52A in the nineteenth wavelength converter 117J inputs the first and second excitation light from the ninth excitation light source 131G by way of the second optical circulator 140B and the sixth isolator 138E. The PD nonlinear optical medium 52A in the twentieth wavelength converter 117K connects to the second optical circulator 140B in the nineteenth wavelength converter 117J, and inputs the first and second excitation light from the ninth excitation light source 131G by the second optical circulator 140B.

The fifth WDM coupler 51 in the nineteenth wavelength converter 117J outputs the uplink-side second multiplex light of the C band of the even-numbered channels from the uplink-side fifteenth interleaver 18E1 to the PD nonlinear optical medium 52A. Using the first and second excitation light from the ninth excitation light source 131G, the PD nonlinear optical medium 52A wavelength-converts the uplink-side second multiplex light of the C band of the even-numbered channels into the uplink-side second multiplex light of the L band of the even-numbered channels, and outputs to the fifth WDM coupler 51. The fifth WDM coupler 51 outputs the uplink-side second multiplex light of the L band of the even-numbered channels to the uplink-side seventeenth interleaver 18G1 by way of the uplink-side sixteenth interleaver 18F1.

Furthermore, the fifth WDM coupler 51 in the nineteenth wavelength converter 117J outputs the downlink-side third multiplex light of the L band of the odd-numbered channels inputted from the uplink-side sixteenth interleaver 18F1 to the PD nonlinear optical medium 52A. Using the first and second excitation light from the ninth excitation light source 131G, the PD nonlinear optical medium 52A wavelength-converts the downlink-side third multiplex light of the L band of the odd-numbered channels into the downlink-side third multiplex light of the C band of the odd-numbered channels, and outputs to the fifth WDM coupler 51. The fifth WDM coupler 51 outputs the downlink-side third multiplex light of the C band of the odd-numbered channels to the downlink-side third optical reception group 16C2 by way of the uplink-side fifteenth interleaver 18E1.

The fifth WDM coupler 51 in the twentieth wavelength converter 117K outputs the uplink-side third multiplex light of the C band of the odd-numbered channels from the downlink-side twentieth interleaver 18K2 to the PD nonlinear optical medium 52A. Using the remaining excitation light from the second optical circulator 140B, the PD nonlinear optical medium 52A wavelength-converts the uplink-side third multiplex light of the C band of the odd-numbered channels into the uplink-side third multiplex light of the L band of the odd-numbered channels, and outputs to the fifth WDM coupler 51. The fifth WDM coupler 51 outputs the uplink-side third multiplex light of the L band of the odd-numbered channels to the uplink-side seventeenth interleaver 18G1 by way of the downlink-side nineteenth interleaver 18J2.

Furthermore, the fifth WDM coupler 51 in the twentieth wavelength converter 117K outputs the downlink-side second multiplex light of the L band of the even-numbered channels inputted from the downlink-side nineteenth interleaver 18J2 to the PD nonlinear optical medium 52A. Then, using the remaining excitation light from the second optical circulator 40B, the PD nonlinear optical medium 52A wavelength-converts the downlink-side second multiplex light of the L band of the even-numbered channels into the downlink-side second multiplex light of the C band of the even-numbered channels, and outputs to the fifth WDM coupler 51. The fifth WDM coupler 51 outputs the downlink-side second multiplex light of the C band of the even-numbered channels to the downlink-side second optical reception group 16B2 by way of the downlink-side twentieth interleaver 18K2.

The PD nonlinear optical medium 52A in the twenty-first wavelength converter 117L inputs the first and second excitation light from the ninth excitation light source 131G by way of the second optical circulator 140B and the sixth isolator 138E. The fifth WDM coupler 51 in the twenty-first wavelength converter 117L outputs the downlink-side second multiplex light of the C band of the even-numbered channels from the downlink-side fifteenth interleaver 18E2 to the PD nonlinear optical medium 52A. Using the first and second excitation light from the ninth excitation light source 131G, the PD nonlinear optical medium 52A wavelength-converts the downlink-side second multiplex light of the C band of the even-numbered channels into the downlink-side second multiplex light of the L band of the even-numbered channels, and outputs to the fifth WDM coupler 51. The fifth WDM coupler 51 outputs the downlink-side second multiplex light of the L band of the even-numbered channels to the downlink-side seventeenth interleaver 18G2 by way of the downlink-side sixteenth interleaver 18F2.

Furthermore the fifth WDM coupler 51 in the twenty-first wavelength converter 117L outputs the uplink-side third multiplex light of the L band of the odd-numbered channel inputted from the downlink-side sixteenth interleaver 18F2 to the PD nonlinear optical medium 52A. Then, using the first and second excitation light from the ninth excitation light source 131G, the PD nonlinear optical medium 52A wavelength-converts the uplink-side third multiplex light of the L band of the odd-numbered channels into the uplink-side third multiplex light of the C band of the odd-numbered channels, and outputs to the fifth WDM coupler 51. The fifth WDM coupler 51 outputs the uplink-side third multiplex light of the C band of the odd-numbered channels to the uplink-side third optical reception group 16C1 by way of the downlink-side fifteenth interleaver 18E2.

The PD nonlinear optical medium 52A in the twenty-second wavelength converter 117M connects to the second optical circulator 140B in the twenty-first wavelength converter 117L, and inputs the remaining excitation light from the second optical circulator 140B. The fifth WDM coupler 51 in the twenty-second wavelength converter 117M outputs the downlink-side third multiplex light of the C band of the odd-numbered channels from the uplink-side twentieth interleaver 18K1 to the PD nonlinear optical medium 52A. Using the remaining excitation light from the second optical circulator 40B, the PD nonlinear optical medium 52A wavelength-converts the downlink-side third multiplex light of the C band of the odd-numbered channels into the downlink-side third multiplex light of the L band of the odd-numbered channels, and outputs to the fifth WDM coupler 51. The fifth WDM coupler 51 outputs the downlink-side third multiplex light of the L band of the odd-numbered channels to the downlink-side seventeenth interleaver 18G2 by way of the uplink-side nineteenth interleaver 18J1.

Furthermore, the fifth WDM coupler 51 in the twenty-second wavelength converter 117M outputs the uplink-side second multiplex light of the L band of the even-numbered channels inputted from the uplink-side nineteenth interleaver 18J1 to the PD nonlinear optical medium 52A. Then, using the remaining excitation light from the second optical circulator 140B, the PD nonlinear optical medium 52A wavelength-converts the uplink-side second multiplex light of the L band of the even-numbered channels into the uplink-side second multiplex light of the C band of the even-numbered channels, and outputs to the fifth WDM coupler 51. The fifth WDM coupler 51 outputs the uplink-side second multiplex light of the C band of the even-numbered channels into the uplink-side second optical reception group 16B1 by way of the uplink-side twentieth interleaver 18K1.

The twentieth wavelength converter 117K in the first transmission apparatus 2A of the example 42 wavelength-converts the uplink-side third multiplex light and the downlink-side second multiplex light, using the remaining excitation light of the nineteenth wavelength converter 117J by way of the second optical circulator 140B. As a result, it is possible to combine the excitation light sources in the first transmission apparatus 2A into one and reduce the number of the excitation light sources.

The twenty-second wavelength converter 117M in the second transmission apparatus 2B wavelength-converts the uplink-side second multiplex light and the downlink-side third multiplex light, using the remaining excitation light of the twenty-first wavelength converter 117L by way of the second optical circulator 140B. As a result, it is possible to combine the excitation light sources in the second transmission apparatus 2B into one and reduce the number of the excitation light sources.

Example 43

Figure 51:
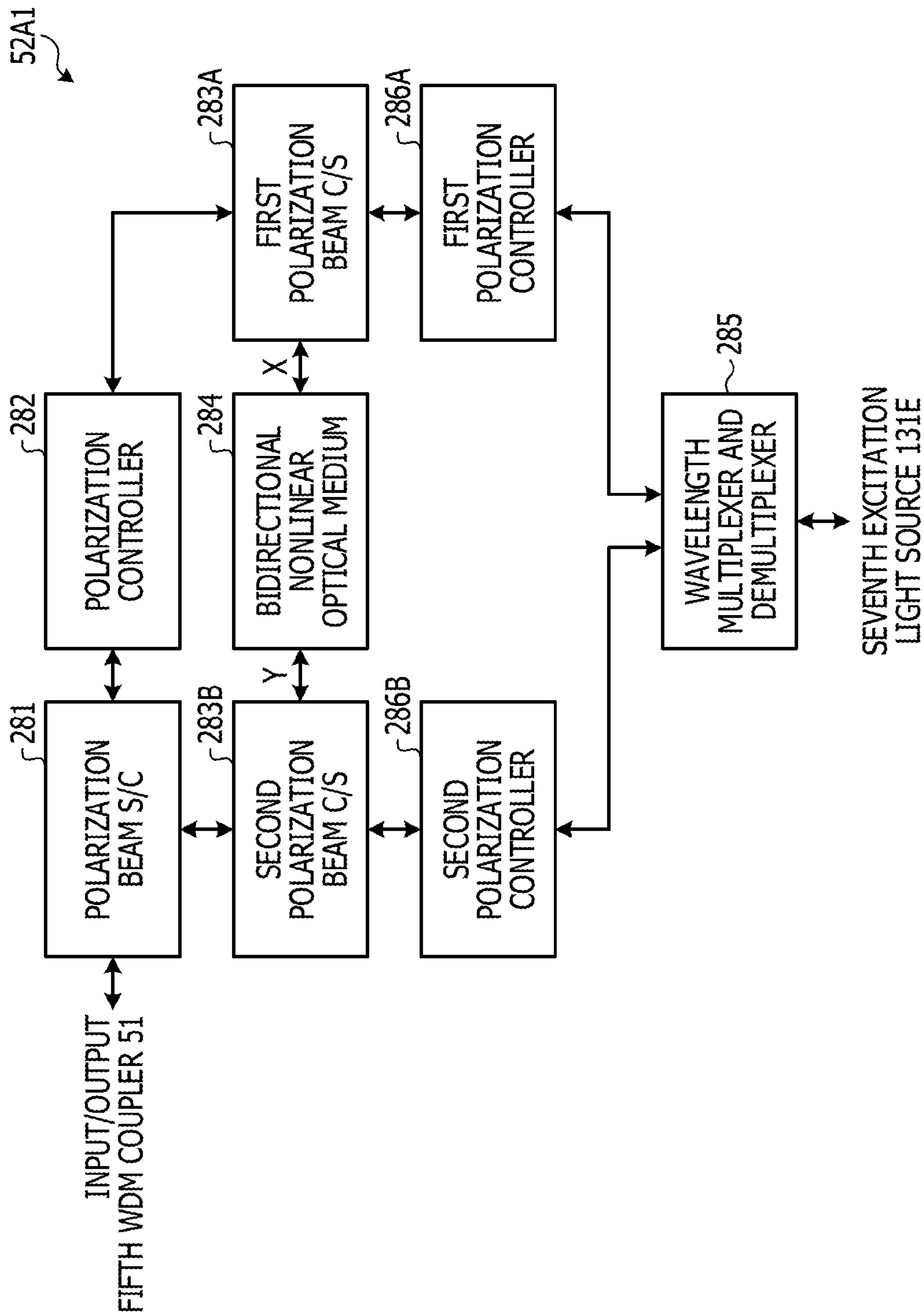
FIG. 51 is an explanatory diagram illustrating an example of a PD nonlinear optical medium of an example 43.

Next, the PD nonlinear optical medium 52A in the wavelength converters 117J to 117M illustrated in FIGS. 48 to 50 are varied, and thus an embodiment of which is described below as an example 43. FIG. 51 is an explanatory diagram illustrating an example of the PD nonlinear optical medium 52A of the example 43. The identical symbols are assigned to the identical configuration of the transmission system 1H1 illustrated in FIG. 48, and thus description of the overlapping configurations and operations is omitted. A PD nonlinear optical medium 52A1 illustrated in FIG. 51 includes a polarization beam S/C 281, a polarization controller 282, a first polarization beam C/S 283A, a bidirectional nonlinear optical medium 284, and a second polarization beam C/S

283B. The PD nonlinear optical medium 52A1 includes a wavelength multiplexer and demultiplexer 285, a first polarization controller 286A, and a second polarization controller 286B.

The polarization beam S/C 281 inputs the second and third multiplex light from the fifth WDM coupler 51. The polarization beam S/C 281 polarization-controls the second and third multiplex light of the vertical polarization to the second and third multiplex light of the horizontal polarization, and outputs to the first polarization beam C/S 283A the second and third multiplex light of the horizontal polarization after the polarization control. The wavelength multiplexer and demultiplexer 285 distributes and outputs the first and second excitation light from the seventh excitation light source 131E to the first polarization controller 286A and the second polarization controller 286B. The first polarization controller 286A polarization-controls the first and second excitation light, and outputs to the first polarization beam C/S 283A the first and second excitation light after the polarization control. The first polarization beam C/S 283 outputs the second and third multiplex light of the horizontal polarization and the first and second excitation light to the forward port X of the bidirectional nonlinear optical medium 284. Using the first and second excitation light, the bidirectional nonlinear optical medium 284 wavelength-converts the second and third multiplex light of the horizontal polarization from the forward port X, and outputs to the second polarization beam C/S 283B the second and third multiplex light of the horizontal polarization after the wavelength conversion. Then, the second polarization beam C/S 283B outputs to the polarization beam S/C 281 the second and third multiplex light of the horizontal polarization after the wavelength conversion, and outputs the remaining excitation light to the second polarization controller 286B.

The second polarization beam C/S 283B outputs the second and third polarization light and the first and second excitation light of the horizontal polarization to the backward port Y of the bidirectional nonlinear optical medium 284. Using the first and second excitation light, the bidirectional nonlinear optical medium 284 wavelength-converts the second and third multiplex light of the horizontal polarization from the backward port Y, and outputs to the first polarization beam C/S 283A the second and third multiplex light of the horizontal polarization after the wavelength conversion. Then, the first polarization beam C/S 283A outputs to the polarization controller 282 the second and third multiplex light of the horizontal polarization after the wavelength conversion, and outputs the remaining excitation light to the first polarization controller 286A. The first polarization controller 286A and the second polarization controller 286B output the remaining excitation light to the wavelength multiplexer and demultiplexer 285.

The polarization controller 282 polarization-controls the second multiplex light and the third multiplex light of the horizontal polarization after the wavelength conversion to the second and third multiplex light of the horizontal polarization, and outputs to the polarization beam S/C 281 the second and third multiplex light of the vertical polarization after the polarization control. The polarization beam S/C 281 outputs to the fifth WDM coupler 51 the second and third multiplex light of the vertical polarization from the polarization controller 282 and the second and third multiplex light of the horizontal polarization from the second polarization beam C/S 283B.

Although the PD nonlinear optical medium 52A1 of an example 43 has the reflection-type loop processing configuration of the single direction input and output, the PD nonlinear optical medium 52A1 may wavelength-convert the second and third multiplex light, using the first and second excitation light. For the purpose of illustration, although the case is illustrated in which the second multiplex light and the third multiplex light are wavelength-converted, the wavelength conversion is not limited to this and may be changed appropriately.

Example 44

Figure 52:
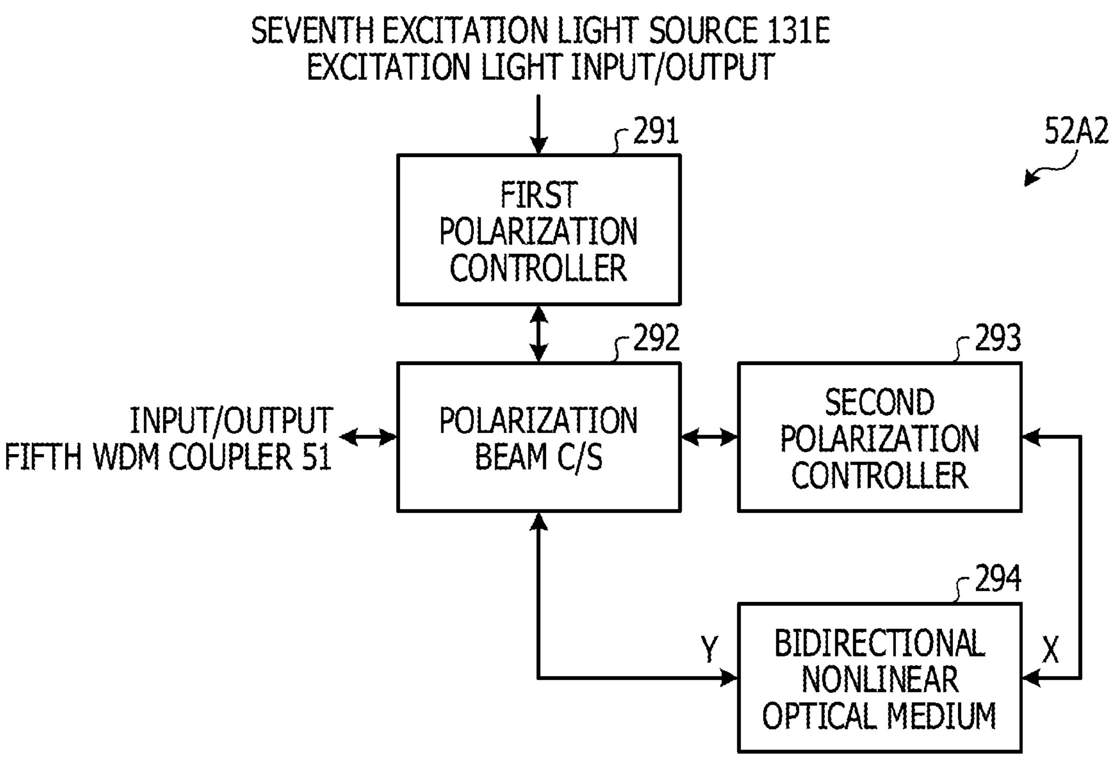
FIG. 52 is an explanatory diagram illustrating an example of a PD nonlinear optical medium of an example 44.

FIG. 52 is an explanatory diagram illustrating an example of the PD nonlinear optical medium 52A2 of an example 44. The PD nonlinear optical medium 52A2 illustrated in FIG. 52 includes a first polarization controller 291, a polarization beam S/C 292, a second polarization controller 293, and a bidirectional nonlinear optical medium 294. The polarization beam S/C 292 inputs the second and third multiplex light from the fifth WDM coupler 51. The first polarization controller 291 outputs to the polarization beam S/C 292 the first and second excitation light from the seventh excitation light source 131E. The polarization beam S/C 292 outputs to the second polarization controller 293 the second and third multiplex light of the vertical polarization and the first and second excitation light after the polarization control. Furthermore, the polarization beam S/C 292 outputs the second and third multiplex light of the horizontal polarization and the first and second excitation light after the polarization control to the backward port Y of the bidirectional nonlinear optical medium 294.

The second polarization controller 293 polarization-controls the second and third multiplex light of the vertical polarization to the second and third multiplex light of the horizontal polarization, and outputs to the forward port X of the bidirectional nonlinear optical medium 294 the second and third multiplex light of the horizontal polarization after the polarization control and the first and second excitation light after the polarization control. Using the first and second excitation light, the bidirectional nonlinear optical medium 294 wavelength-converts the second and third multiplex light of the horizontal polarization from the forward port X. Then, the bidirectional nonlinear optical medium 294 outputs to the polarization beam S/C 292 the second and third multiplex light of the horizontal polarization after the wavelength conversion.

Using the first and second excitation light, the bidirectional nonlinear optical medium 294 wavelength-converts the second and third multiplex light of the horizontal polarization from the backward port Y, and outputs to the second polarization controller 293 the second and third multiplex light of the horizontal polarization after the wavelength conversion. The second polarization controller 293 polarization-controls the second and third multiplex light of the horizontal polarization to the second and third multiplex light of the vertical polarization, and outputs to the polarization beam S/C 292 the second and third multiplex light of the vertical polarization after the polarization control. The polarization beam S/C 292 outputs to the fifth WDM coupler 51 the second and third multiplex light of the vertical polarization from the second polarization controller 293 and the second and third multiplex light of the horizontal polarization from the bidirectional nonlinear optical medium 294. The polarization beam S/C 292 outputs the remaining excitation light to the first polarization controller 291. The first polarization controller 291 outputs the remaining excitation light after the polarization control.

Although the PD nonlinear optical medium 52A2 of the example 31 has the loop processing configuration of the single direction input and output, the PD nonlinear optical medium 52A2 may wavelength-control the second and third multiplex light, using the first and second excitation light. For the purpose of illustration, although the case is illustrated in which the second multiplex light and the third multiplex light are wavelength-converted, the wavelength conversion is not limited to this and may be changed appropriately.

Example 45

For the wavelength converter, advance designing of signal light, excitation light, and converted light, which is the signal light after being wavelength converted, is important. For example, if a WDM signal (multiplex light) of large capacity is wavelength-converted at equally spaced intervals such as intervals of 50 GHz and in many channels using nonlinear optical effects, nonlinear optical distortions generated between the WDM signals increase and deteriorate the signal quality. Furthermore, if the signal light is wavelength-converted using the excitation light, the signal quality is also deteriorated due to the cross talk of a difference frequency component generated due to interactions between the excitation light and the signal light.

Figure 53:
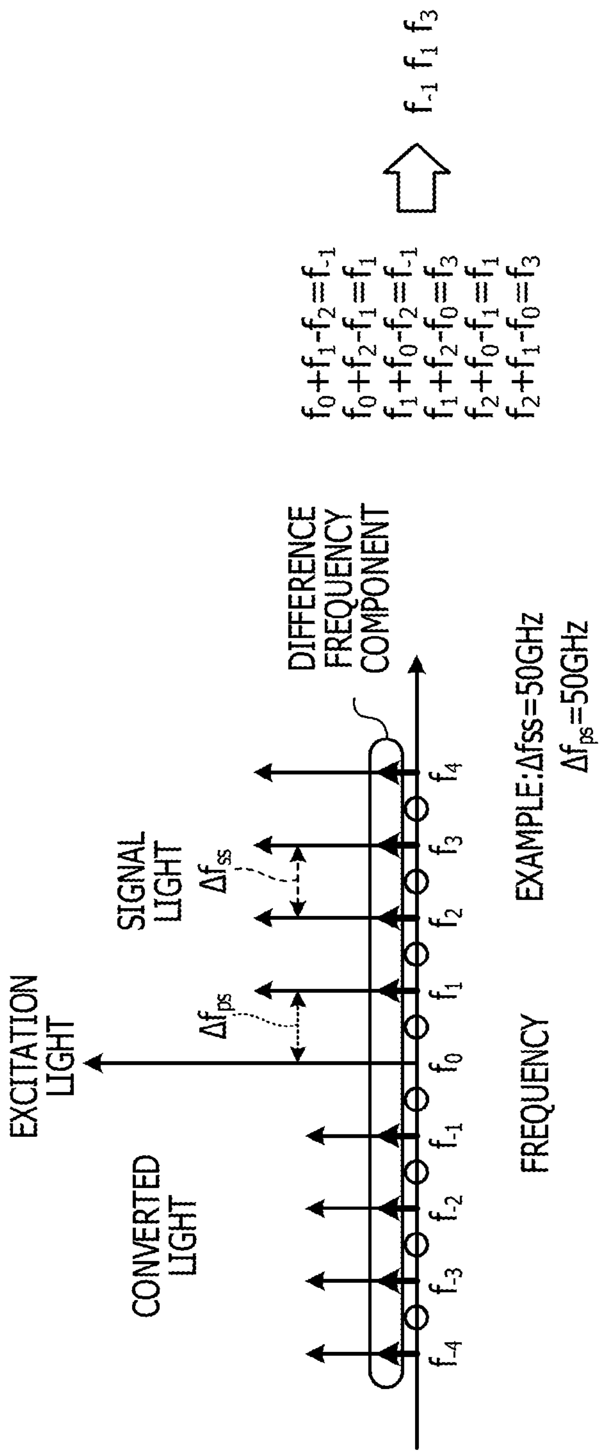
FIG. 53 is an explanatory diagram illustrating an example of occurrence of crosstalk related to signal light, excitation light, and converted light.

FIG. 53 is an explanatory diagram illustrating an example of occurrence of the crosstalk related to the signal light, the excitation light, and the converted light. In FIG. 53, an excitation light-signal light interval Δfps between excitation light f0 and immediate signal light f1 is 50 GHz, and signal light intervals Δfss between adjacent signal light is 50 GHz, and Δfps=Δfss. That is, if the signal light at equally spaced intervals is wavelength-converted using the excitation light f0, the difference frequency component due to the interactions between the excitation light and the signal light is generated at a same frequency as the signal light and the converted light. In the case of optical four-wave mixing of three wavelengths of the excitation light f0 and the signal light f1 and f2 illustrated in FIG. 53, the difference frequency component of f0±(f1−f2) is generated. For example, in the case of the optical four-wave mixing of two wavelengths of the excitation light f0 and the signal light f1 and f3, the difference frequency component of f0±(f1−f3) is also generated. As a result, if the excitation light-signal light interval Δfps and the signal light interval Δfss are at equally spaced intervals, the cross talk occurs because the difference frequency component is generated in the same frequency as the signal light and wavelength-converted light.

Figure 54:
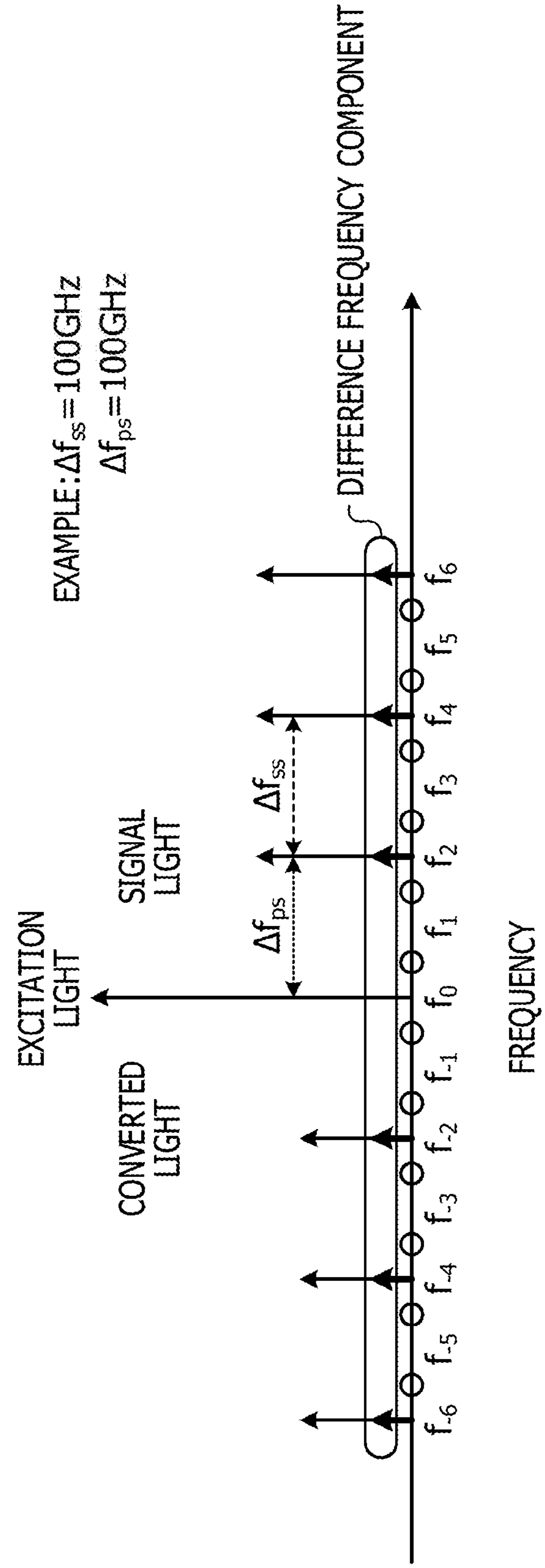
FIG. 54 is an explanatory diagram illustrating an example of the occurrence of the crosstalk related to the signal light, the excitation light, and the converted light.

FIG. 54 is an explanatory diagram illustrating an example of the occurrence of the crosstalk related to the signal light, the excitation light, and the converted light. In FIG. 54, the excitation light-signal light interval Δfps and the signal interval Δfss are extended and, for example the signal light interval Δfss is 100 GHz, and the excitation light-signal light interval Δfps is 100 GHz. The difference frequency component is generated in a frequency for which only the signal light interval between the signal light f2 and f4 (±n×Δfss) and the signal light interval (±n×Δfss) between the signal light f4 and f6 are shifted to the right and left, with the excitation light f0 illustrated in FIG. 54 as an origin. n is a channel number of a natural number. That is, the difference frequency component is generated in the frequency of f0±n×100 GHz. As a result, even in a case where the excitation light-signal light interval Δfps and the signal light interval Δfss are extended, the cross talk occurs if the Δfps and Δfss are at equally spaced intervals because the difference frequency component is generated in the frequency which is same as the signal light and the wavelength-converted light.

Figure 55:
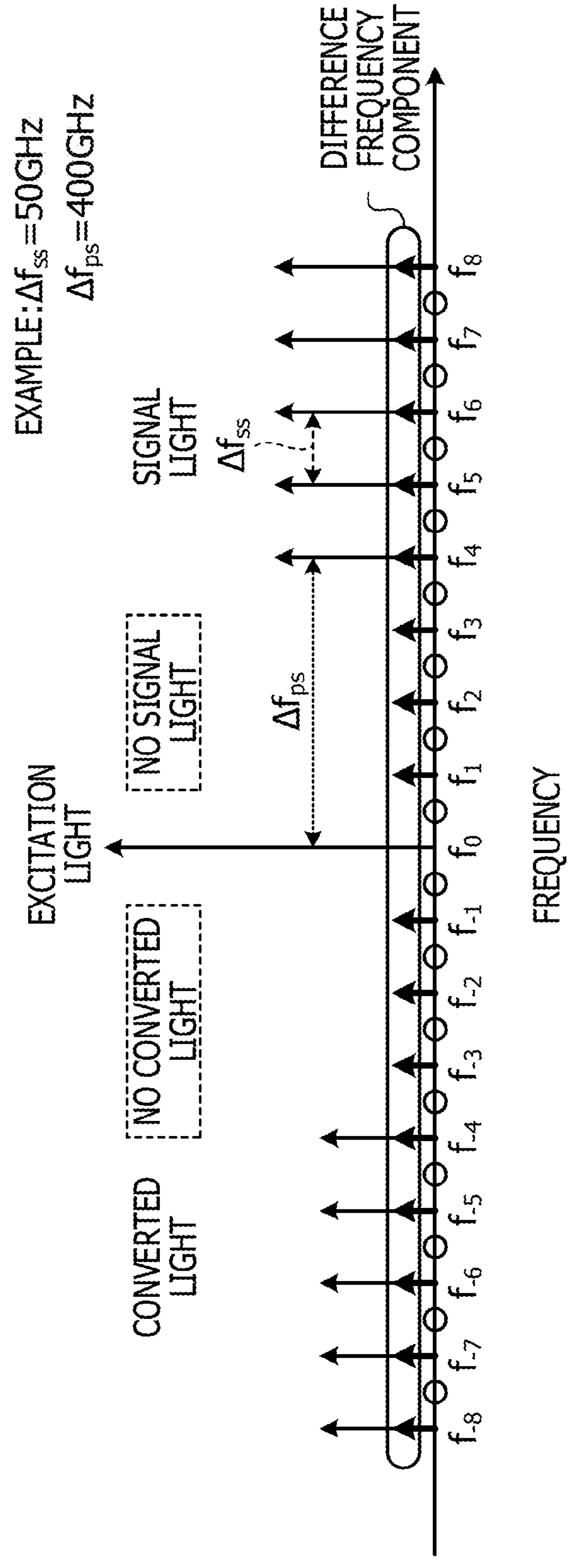
FIG. 55 is an explanatory diagram illustrating an example of the occurrence of the crosstalk related to the signal light, the excitation light, and the converted light.

FIG. 55 is an explanatory diagram illustrating an example of the occurrence of the crosstalk related to the signal light, the excitation light, and the converted light. In FIG. 55, the excitation light-signal light interval Δfps is extended more than the signal interval Δfss, and for example, the signal light interval Δfss is 400 GHz and the excitation light-signal light interval Δfps is 50 GHz. The difference frequency component is generated in the frequency for which only the signal light interval between the signal light f4 and f5 (±n×Δfss) and the signal light interval between the signal light f5 and f6 (±n×Δfss) are shifted to the right and left, with the excitation light f0 illustrated in FIG. 55 as the origin. That is, the difference frequency component is generated in the frequency of f0±n×50 GHz. As a result, even in a case where the excitation light-signal light interval Δfps is extended, the cross talk occurs if the excitation light-signal light interval Δfps is the integral multiple of the signal interval Δfss because the difference frequency component is generated in the frequency which is same as the signal light and the wavelength-converted light.

Figure 56:
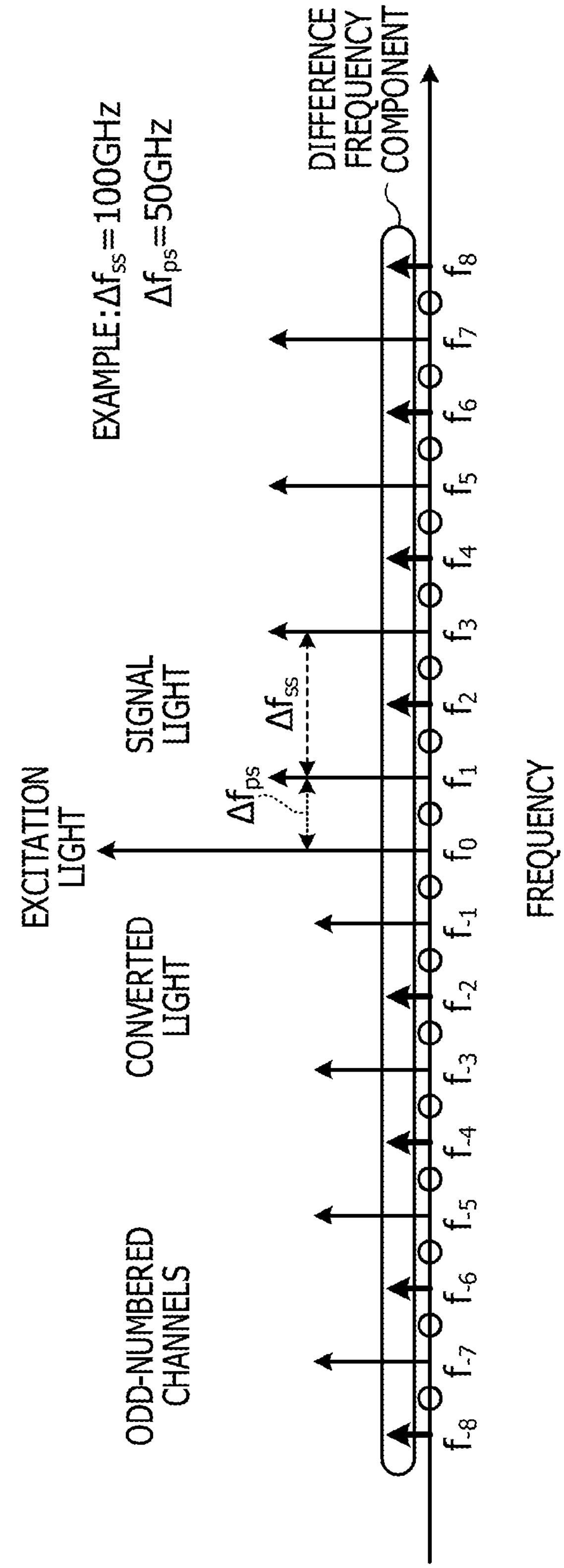
FIG. 56 is an explanatory diagram illustrating an example of crosstalk avoidance of odd-numbered channels.

Thus, after the signal light is branched to the even-numbered channels and the odd-numbered channels, the frequency of the excitation light to be used in the wavelength conversion of the odd-numbered channels is set as follows. FIG. 56 is an explanatory diagram illustrating an example of crosstalk avoidance of the odd-numbered channels. In FIG. 56, for example, the signal light interval Δfss is 100 GHz, the excitation light-signal light interval Δfps is 50 GHz, and the odd-numbered channels ae f1, f3, f5, f7 . . . . The difference frequency component is generated in the frequency (even-numbered channels) for which only the signal light interval between the signal light f1 and f3 (±n×Δfss) and the signal light interval between the signal light f3 and f5 (±n×Δfss) are shifted to the right and left, with the excitation light f0 illustrated in FIG. 56 as the origin. That is, the difference frequency component is generated in the frequency of the even-numbered channels of f0±n×100 GHz. As a result, for example, since the difference frequency component is generated in the even-numbered channels such as f2 and f−2, or the like, the difference frequency component does no overlap the odd-numbered channels and the wavelength-converted light. Accordingly, the cross talk may be avoided.

Figure 57:
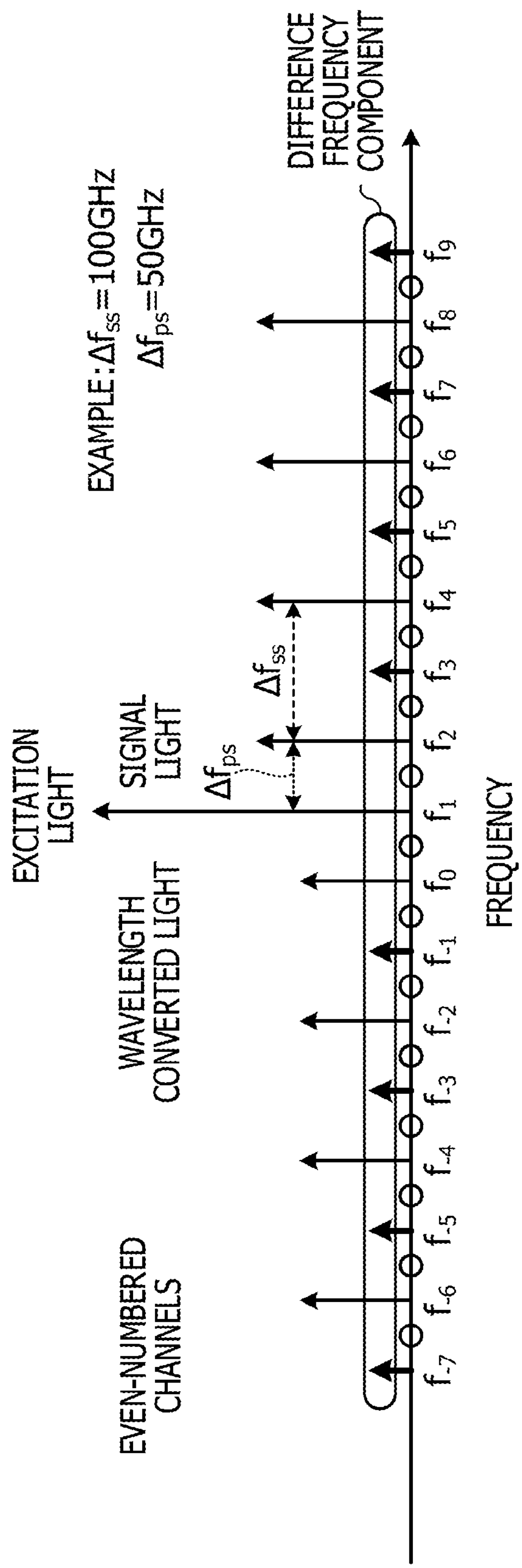
FIG. 57 is an explanatory diagram illustrating an example of the crosstalk avoidance of even-numbered channels.

Furthermore, if the same excitation light as the odd-numbered channels is used for the even-numbered channels, the difference frequency component is generated in the signal light and the wavelength converted light of the even-numbered channels. Thus, the excitation light f1, which is the excitation light of the even-numbered channels shifted by, for example, 50 GHz, is used. FIG. 57 is an explanatory diagram illustrating an example of the crosstalk avoidance of the even-numbered channels. In FIG. 57, for example, the signal light interval Δfss is 100 GHz, the excitation light-signal light interval Δfps is 50 GHz, the excitation light is f1, and the even-numbered channels are f2, f4, f6, f8 . . . . The difference frequency component is generated in the frequency (odd-numbered channels) for which only the signal light interval between the signal light f2 and f4 (±n×Δfss) and the signal light interval between the signal light f4 and f6 (±n×Δfss) are shifted to the right and left, with the excitation light f1 illustrated in FIG. 57 as the origin. The difference frequency component is generated in the frequency of the odd-numbered channels of f0±n×100 GHz. As a result, for example, since the difference frequency component is generated in the odd-numbered channels such as f1 and f−1, or the like, the difference frequency component does not overlap the even-numbered channels and the wavelength-converted light. Accordingly, the cross talk may be avoided.

That is, the wavelength converter sets the signal light interval Δfss at equally spaced intervals and the excitation light-signal light interval Δfps as non-integral multiple of the signal light interval Δfss, and divides the signal light into the odd-numbered channels and the even-numbered channels. Furthermore, the wavelength converter sets excitation light to be used for the wavelength conversion of the signal light of the odd-numbered channels for the even-numbered channels, and wavelength-converts the signal light of the odd-numbered channels, using the excitation light of the even-numbered channels. Furthermore, the wavelength converter sets the excitation light to be used for the wavelength conversion of the signal light of the even-numbered channels for the odd-numbered channels, and wavelength-converts the signal light of the even-numbered channels, using the excitation light of the odd-numbered channels. As a result, influence of the cross talk may be avoided.

Figure 58:
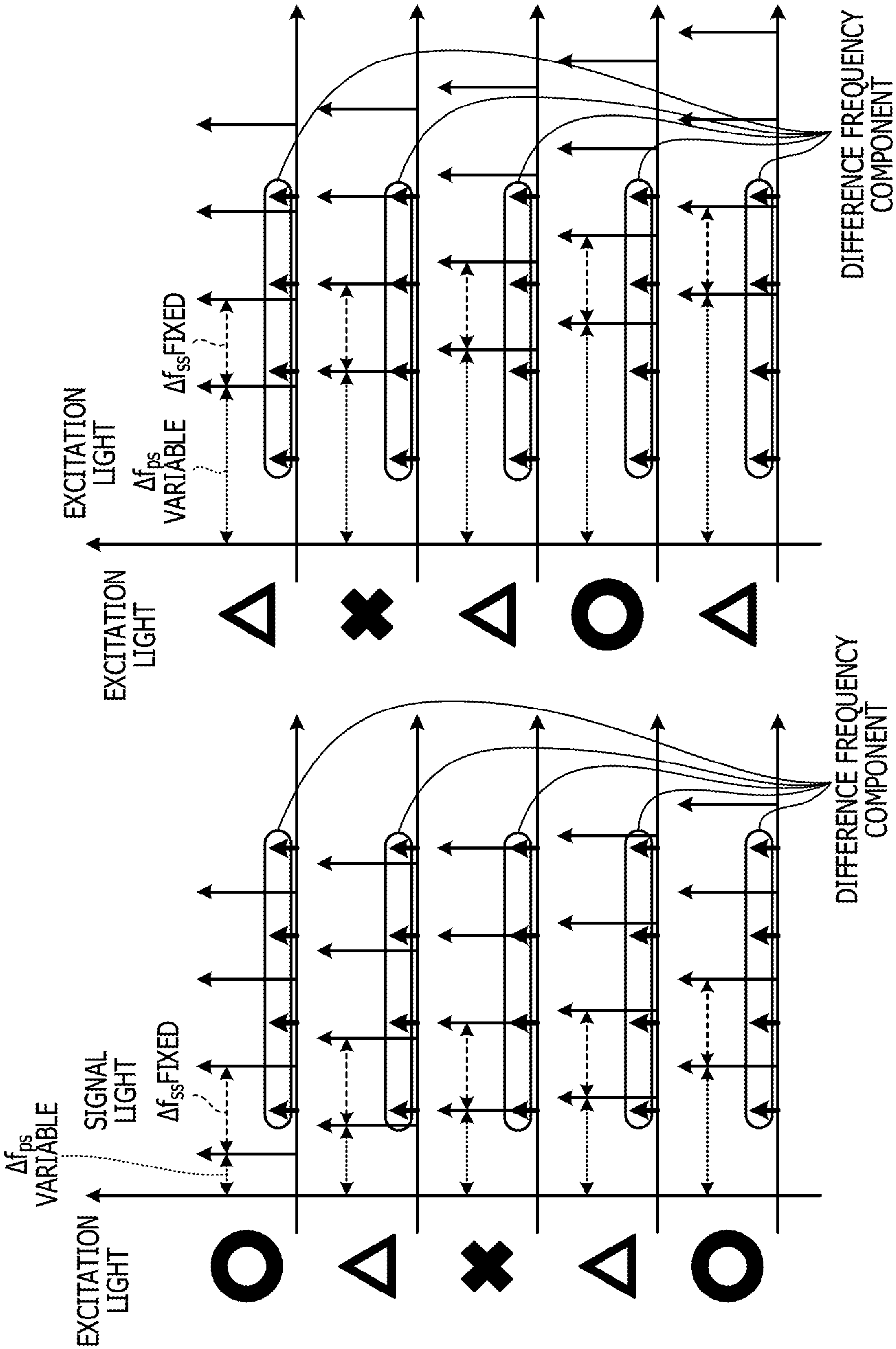
FIG. 58 is an explanatory diagram illustrating an example of whether or not the crosstalk occurs for each setting of a signal light interval Δfss and an excitation light-signal light interval Δfps.

FIG. 58 is an explanatory diagram illustrating an example of whether or not the crosstalk occurs for each setting of the signal light interval Δfss and the excitation light-signal light interval Δfps. This is a case in which the excitation light-signal light interval Δfps is variable and the signal light interval Δfss is fixed. In setting in which the signal light illustrated in FIG. 58 overlaps the difference frequency component, a state is that the influence of the cross talk is large (× mark). In the setting in which the signal light is close to the difference frequency component, the state is that there is the influence of the cross talk (Δ mark). In the setting in which the signal light is away from the difference frequency component the state is that the influence of the cross talk is small (○ mark).

Figure 59:
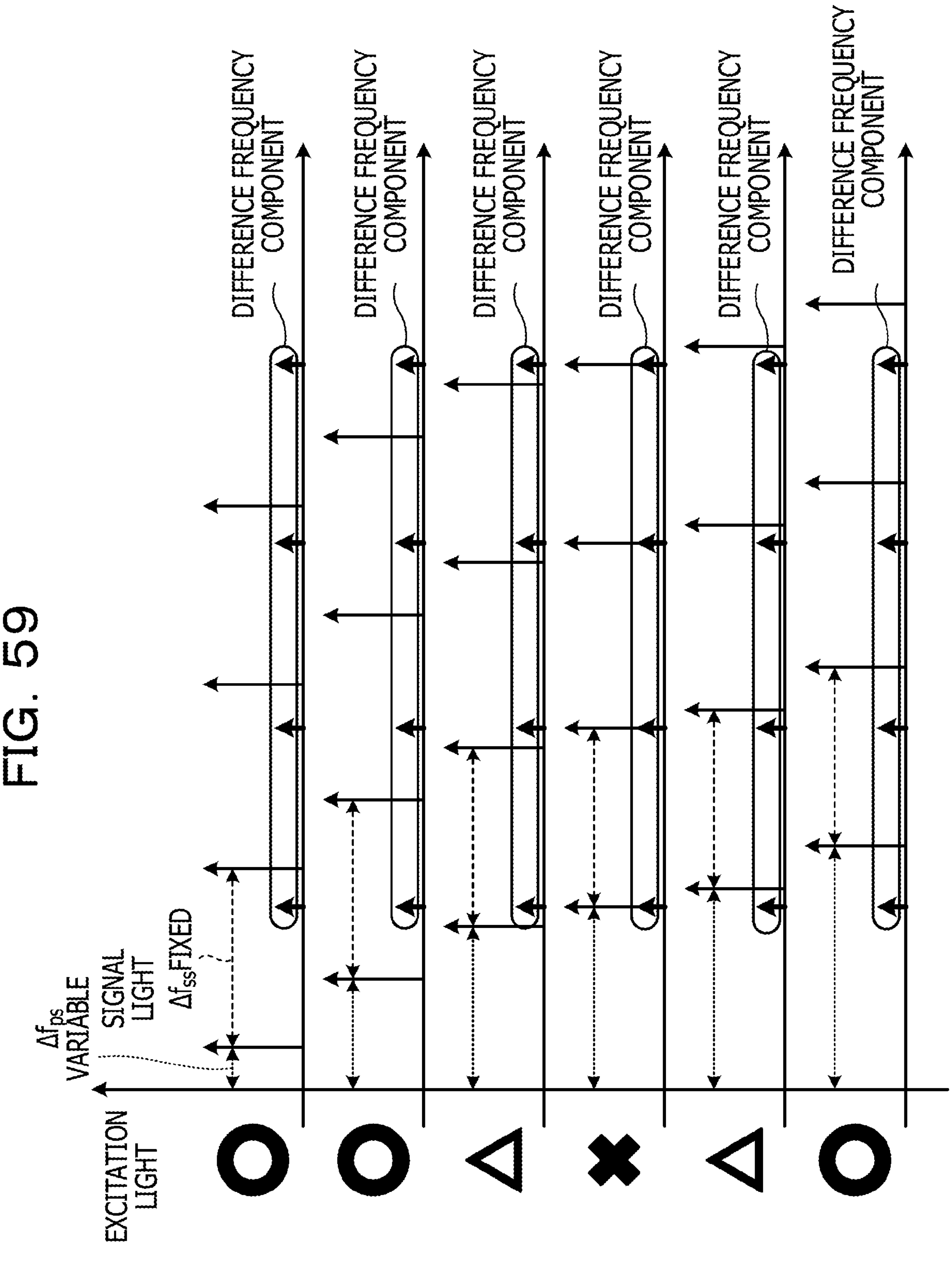
FIG. 59 is an explanatory diagram illustrating an example of whether or not the crosstalk occurs for each setting of the signal light interval Δfss and the excitation light-signal light interval Δfps.

FIG. 59 is an explanatory diagram illustrating an example of whether or not the crosstalk occurs for each setting of the signal light interval Δfss and the excitation light-signal light interval Δfps. This is a case in which the excitation light-signal light interval Δfps is fixed and the signal light interval Δfss is variable. In the setting in which the signal light illustrated in FIG. 59 overlaps the difference frequency component, the state is that the influence of the cross talk is large (× mark). In the setting in which the signal light is close to the difference frequency setting, the state is that there is the influence of the cross talk (Δ mark). In the setting in which the signal light is away from the difference frequency component the state is that the influence of the cross talk is small (○ mark). If the signal light interval is set wide, regions that become Δ or × decrease.

Figure 60:
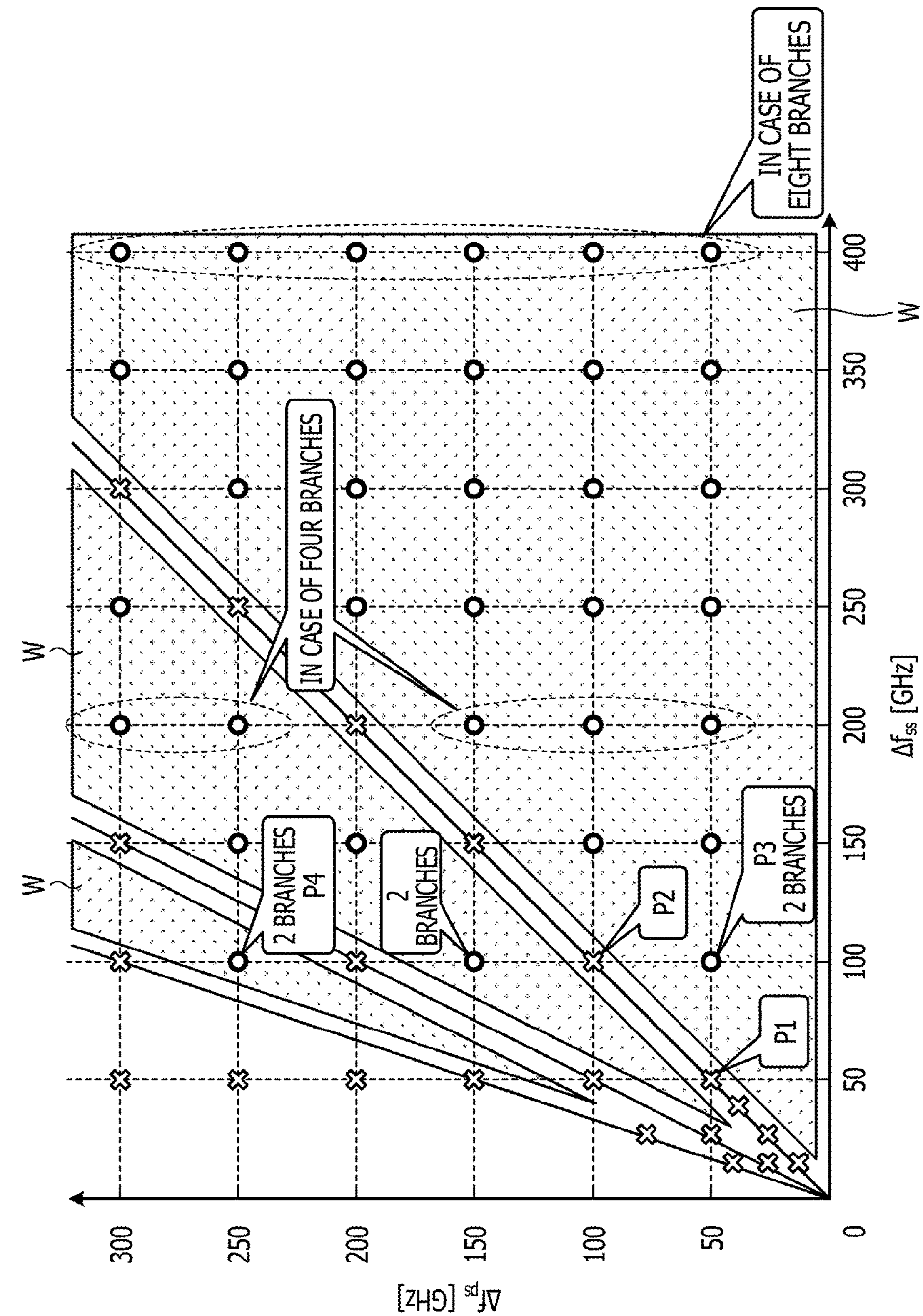
FIG. 60 is an explanatory diagram illustrating an example of correspondence of whether or not the crosstalk occurs for each setting of the signal light interval Δfss and the excitation light-signal light interval Δfps.

FIG. 60 is an explanatory diagram illustrating an example of correspondence of whether or not the crosstalk occurs for each setting of the signal light interval Δfss and the excitation light-signal light interval Δfps. A vertical axis is Δfps and a horizontal axis is Δfss. The × mark illustrated in FIG. 60 represents the state in which the influence of the cross talk is large, the region around × mark is in the state in which there is the influence of the cross talk, and the mark ○ represents the state in which the influence of the cross talk is small. For example, in setting P1 in which the excitation light-signal light interval Δfps is 50 GHz and the signal light interval Δfss is 50 GHz, the state is that the influence of the cross talk is large, as illustrated in FIG. 53. For example, in setting P2 in which the excitation light-signal light interval Δfps is 100 GHz and the signal light interval Δfss is 100 GHz, the state is that the influence of the cross talk is large, as illustrated in FIG. 54. For example, in setting P3 in which the excitation light-signal light interval Δfps is 50 GHz and the signal light interval Δfss is 100 GHz, the state is that the influence of the cross talk is small, as illustrated in FIGS. 56 and 57. For example, in the setting in which the excitation light-signal light interval Δfps is 150 GHz and the signal light interval Δfss is 100 GHz, the state is that the influence of the cross talk is small. For example, in the setting in which the excitation light-signal light interval Δfps is 100 GHz and the signal light interval Δfss is 200 GHz, the state is that the influence of the cross talk is large. For example, in setting P5 in which the excitation light-signal light interval Δfps is 250 GHz and the signal light interval Δfss is 100 GHz, the state is that the influence of the cross talk is small. For the purpose of illustration, although a grid line is illustrated in the example illustrated in FIG. 60, it is possible to ensure the state of the small influence of the cross talk by setting and changing, as appropriate, the excitation light-signal light interval Δfps and the signal light interval Δfss within the W region.

FIG. 61 is an explanatory diagram illustrating an example of settings of odd-numbered channels, even-numbered channels, and the excitation light of a C/L wavelength converter. The signal light interval Δfss is 100 GHz and the excitation light-signal light interval Δfps is 250 GHz. This setting is the P5 setting illustrated in FIG. 60. The excitation light of the odd-numbered channels is, for example, 191.15 THz. The excitation light of the even-numbered channels is, for example, 191.10 THz.

FIG. 62 is an explanatory diagram illustrating an example of the settings of the odd-numbered channels, the even-numbered channels, and the excitation light of the C/S wavelength converter. The signal light interval Δfss is 100 GHz and the excitation light-signal light interval Δfps is 250 GHz. The excitation light of the odd-numbered channels is, for example, 195.95 THz. The excitation light of the even-numbered channels is, for example, 195.90 THz.

The wavelength converter expands the interval of the signal light intervals Δfss and then wavelength-converts using the plurality of wavelength converters. Thus, the wavelength converter may reduce the deterioration in the signal quality due to the nonlinear optical distortions generated between signals and expand the dynamic range. Furthermore, although the two branches are adopted that divide the signal light into the even-numbered channels and the odd-numbered channels, four branches or eight branches may be used and a change may be made appropriately. Furthermore, the wavelength converter may avoid the cross talk between the excitation light and the signal light by appropriately selecting the frequency of the excitation light, and ensuring that the difference frequency component, which is generated by the interactions between the signal light and the excitation light, does not overlap the frequency of the signal light or the wavelength converted light.

Instead of the method of dividing the signal light intervals at equally spaced intervals may be used a method of dividing into two channel groups (for example, ch1, 2, 4 and ch3, 5, 6) for which the wavelength intervals are determined for every six waves. As a result, for example, cross talk components between WDM signals of two waves and three waves of 100 GHz intervals or smaller no longer occur, and thus the cross talk may be reduced.

In the transmission system 1 of the examples 2 to 22, the uplink-side third optical transmission group 11C1 and the downlink-side third optical transmission group 11C2 are sorted to the even-numbered channels, and the uplink-side second optical transmission group 11B1 and the downlink-side second optical transmission group 11B2 are sorted to the odd-numbered channels. However, sorting is not limited to the odd-numbered channels and the even-numbered channels, and for example, sorting to a first group and second group may also be acceptable, and an embodiment in that case is described below as an example 46.

Example 46

Figure 63A:
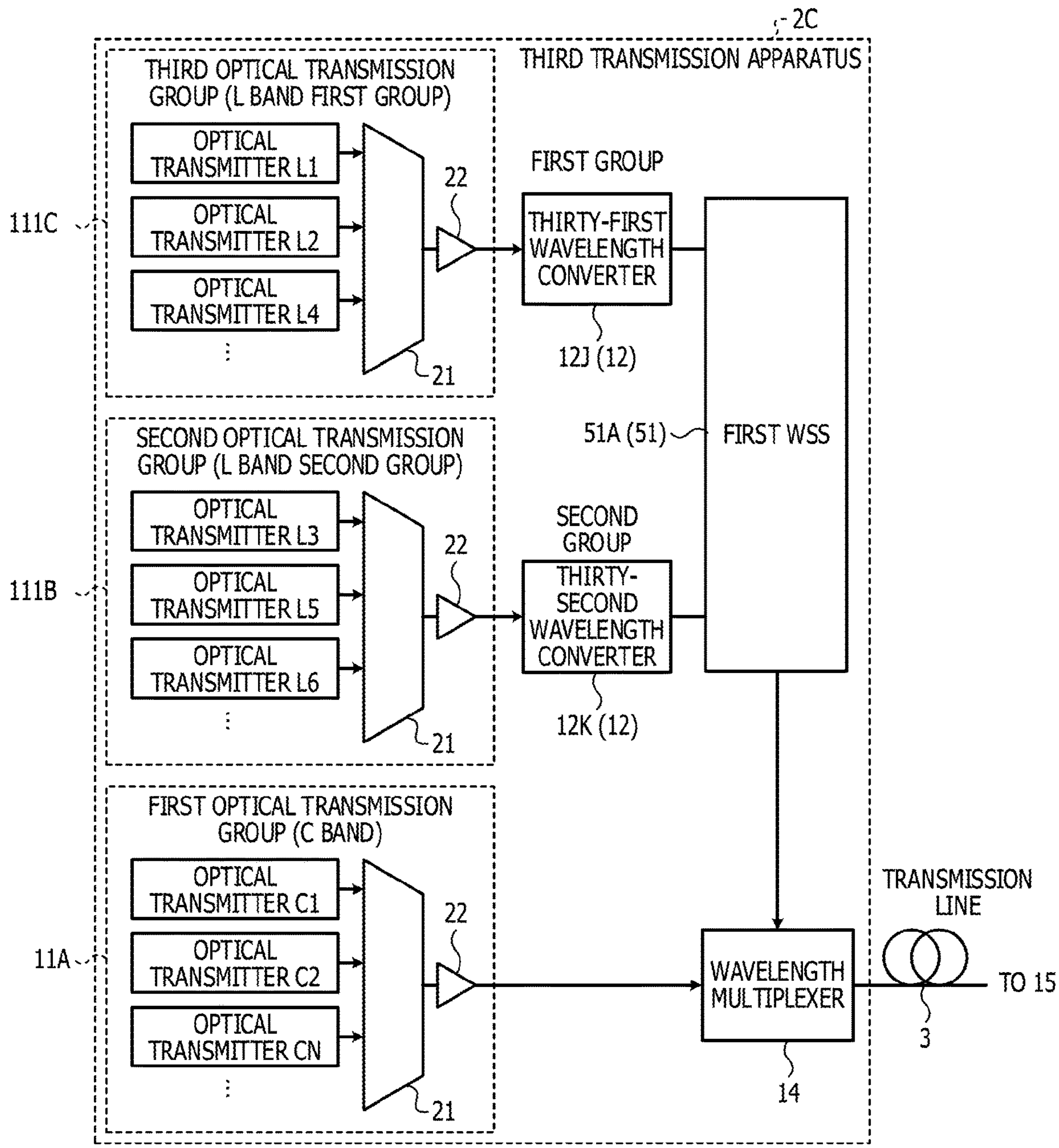
FIGS. 63A and 63B are explanatory diagrams illustrating an example of a transmission system of an example 46.
Figure 63B:
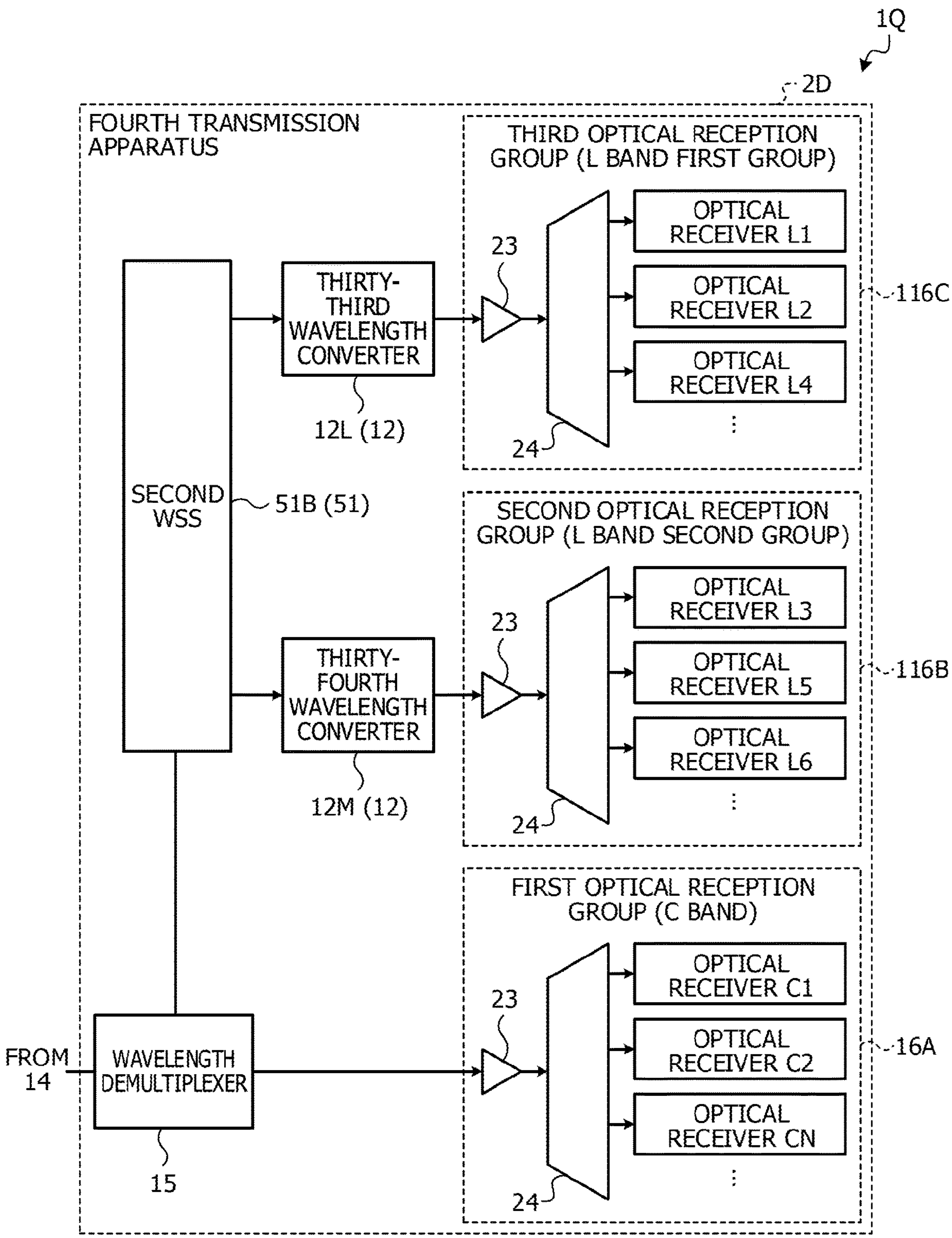

FIG. 63 is an explanatory diagram illustrating an example of a transmission system 1Q of the example 46. The identical symbols are assigned to the identical configuration of the transmission system 1 of the example 1, and thus description of the overlapping configurations and operations is omitted.

A third transmission apparatus 2C includes the first optical transmission group 11A, a second optical transmission group 111B, and a third optical transmission group 111C. The third optical transmission group 111C includes a plurality of optical transmission groups that output third multiplex light of the C band of first group channels. The second optical transmission group 111B includes a plurality of optical transmission groups that output second multiplex light of the C band of second group channels. The first group channels are a group of channels of a plurality of arbitrary wavelengths, of a plurality of wavelength channels in a predetermined range. The second group channels are a group of channels of wavelengths other than the first group channels, of the plurality of the wavelength channels in the predetermined range.

The third transmission apparatus 2C includes a thirty-first wavelength converter 12J, a thirty-second wavelength converter 12K, a first wavelength selective switch (WSS) 51A, and the wavelength multiplexer 14. Using the excitation light, the thirty-first wavelength converter 12J wavelength-converts the third multiplex light of the C band of the first group channels from the third optical transmission group 111C into the third multiplex light of the L band, and outputs to the first WSS 51A the third multiplex light of the L band of the first group channels after the conversion.

Using the excitation light, the thirty-second wavelength converter 12K wavelength-coverts the second multiplex light of the C band of the second group channels from the second optical transmission group 111B into the second multiplex light of the L band, and outputs to the first WSS 51A the second multiplex light of the L band of the second group channels after the conversion. The first WSS 51A multiplexes the third multiplex light of the L band of the first group channels with the second multiplex light of the L band of the second group channels, and outputs to the wavelength multiplexer 14 the second and third multiplex light of the L band after the multiplexing. The wavelength multiplexer 14 multiplexes the second and third multiplex light of the L band with the first multiplex light of the C band from the first optical transmission group 11A and outputs to the transmission line 3 the multiplex light after the multiplexing.

A fourth transmission apparatus 2D includes the first optical reception group 16A, a second optical reception group 116B, and a third optical reception group 116C. The third optical reception group 116C includes a plurality of optical receivers that receive the third multiplex light of the C band of the first group channels. The second optical reception group 116B includes a plurality of optical receivers that receive the second multiplex light of the C band of the second group channels.

The fourth transmission apparatus 2D includes the wavelength demultiplexer 15, a second WSS 51B, a thirty-third wavelength converter 12L, and a thirty-fourth wavelength converter 12M. The wavelength demultiplexer 15 demultiplexes the second and third multiplex light of the L band and the first multiplex light of the C band from the multiplex light from the transmission line 3, outputs the second and third multiplex light of the L band to the second WSS 51B, and outputs the first multiplex light of the C band to the first optical reception group 16A. The second WSS 51B separates and outputs the second and third multiplex light of the L band, which is demultiplexed by the wavelength demultiplexer 15, to the third multiplex light of the L band of the first group channels and the second multiplex light of the L band of the second group channels. The second WSS 51B outputs the third multiplex light of the L band of the first group channels to the thirty-third wavelength converter 12L, and outputs the second multiplex light of the L band of the second group channel to the thirty-fourth wavelength converter 12M.

Using the excitation light, the thirty-third wavelength converter 12L wavelength-converts the third multiplex light of the L band of the first group channels into the third multiplex light of the C band, and outputs the third multiplex light of the C band of the first group channels after the conversion to the third optical reception group 116C. Using the excitation light, the thirty-fourth wavelength converter 12M wavelength-converts the second multiplex light of the L band of the second group channels into the second multiplex light of the C band, and outputs to the second optical reception group 116B the second multiplex light of the C band of the second group channel after the conversion.

The transmission system 1 of the example 46 divides the WDM signal into the first group channels and the second group channels, and wavelength-converts using the wavelength converter for each of the group channels. As a result, the input optical power of the WDM signal to the wavelength converter is made smaller. That is, it is possible to expand the dynamic range while reducing the deterioration of the signal quality by decreasing the number of wavelengths to be converted by one wavelength converter and thereby reducing the nonlinear optical distortions. The nonlinear optical distortions between the signals may be reduced, because the channels are sorted to the first group channels and the second group channels and thus there are a few adjacent channels. For example, even if the signals at 50 GHz intervals are wavelength-converted by dividing the signals into a first group and a second group, the nonlinear optical distortions may be reduced. In addition, for example, even for the intervals below 100 GHz, the nonlinear optical distortions are no longer generated between the signals, thus making it possible to reduce the cross talk. In addition, FlexGrid may also be accommodated.

Figure 64:
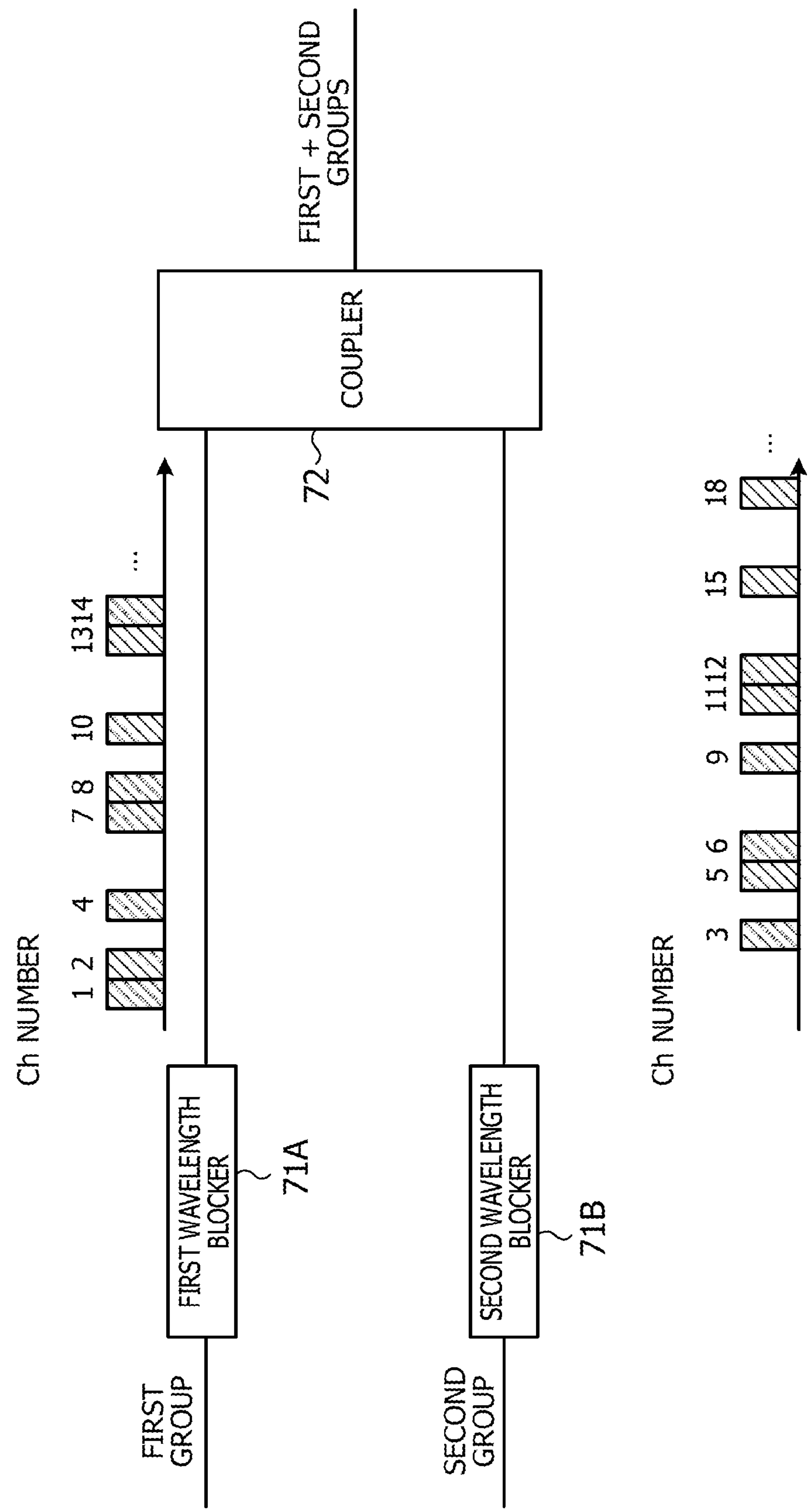
FIG. 64 is an explanatory diagram illustrating an alternative example of a first WSS.

Since the first WSS 51A and the second WSS 51B used in the third transmission apparatus 2C and the fourth transmission apparatus 2D are expensive parts, an alternative part may be used, an embodiment of which is described. FIG. 64 is an explanatory diagram illustrating an alternative example of the first WSS 51A. The alternative example illustrated in FIG. 64 includes a first wavelength blocker 71A, a second wavelength blocker 71B and a coupler 72. The first wavelength blocker 71A is a filter that extracts only the third multiplex light of the first group channels from the second and third multiplex light. The second wavelength blocker 71B is a filter that extracts the second multiplex light of the second group channels from the second and third multiplex light. The coupler 72 multiplexes the third multiplex light extracted by the first wavelength blocker 71A with the second multiplex light extracted by the second wavelength blocker 71B, and outputs the second and third multiplex light to the wavelength multiplexer 14. For the purpose of illustration, in FIG. 64, although the alternative example of the first WSS 51A is illustrated, this may also apply to the second WSS 51B.

The transmission system 1Q of the example 46 illustrates a method of transmitting the second multiplex light in the uplink direction from the third transmission apparatus 2C to the fourth transmission apparatus 2D. However, a method of transmitting the second multiplex light in the downlink direction from the fourth transmission apparatus 2D to the third transmission apparatus 2C is also similar, an embodiment of which is described below as an example 47.

Example 47

Figure 65A:
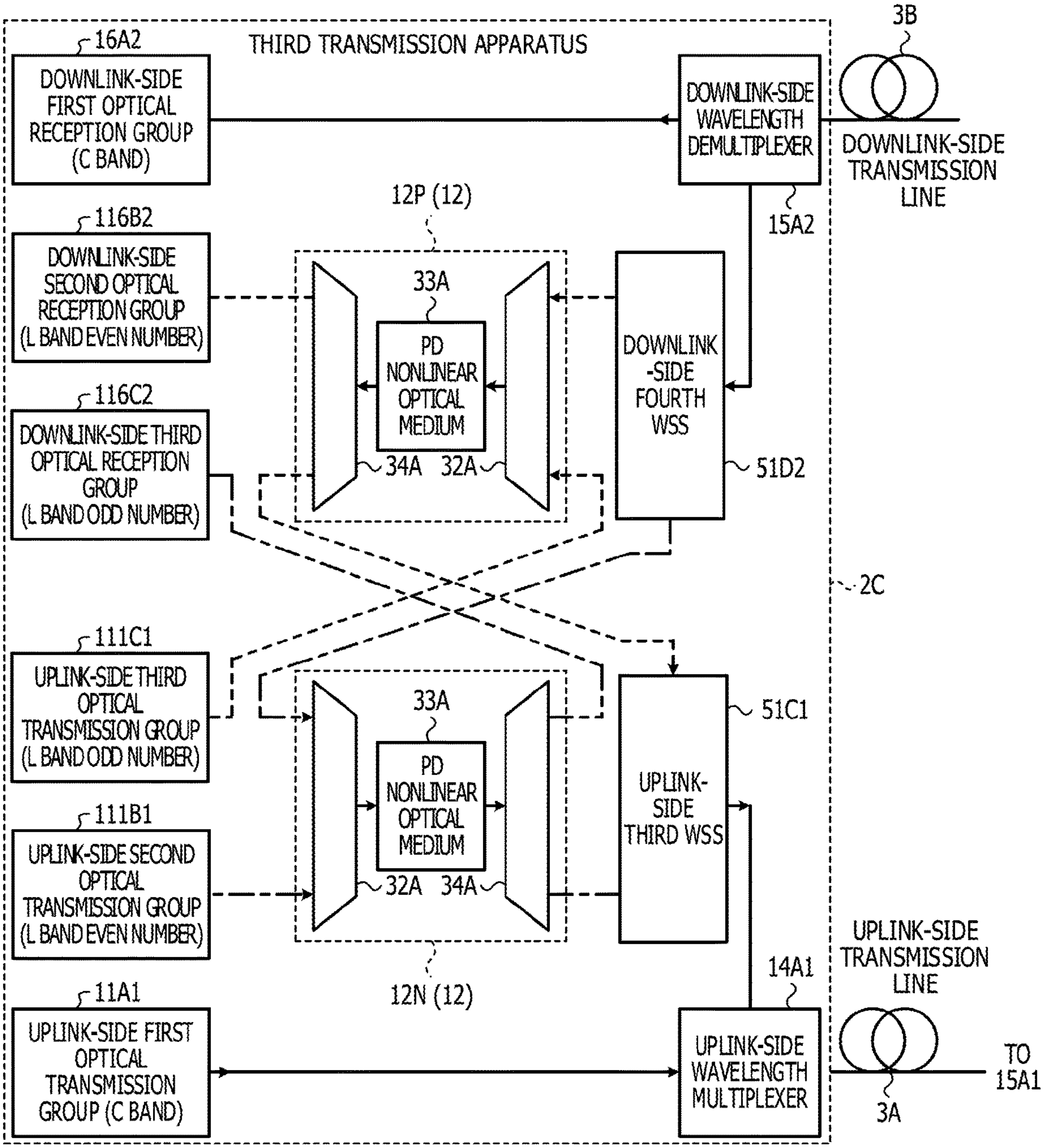
FIGS. 65A and 65B are explanatory diagrams illustrating an example of a transmission system of an example 47.
Figure 65B:
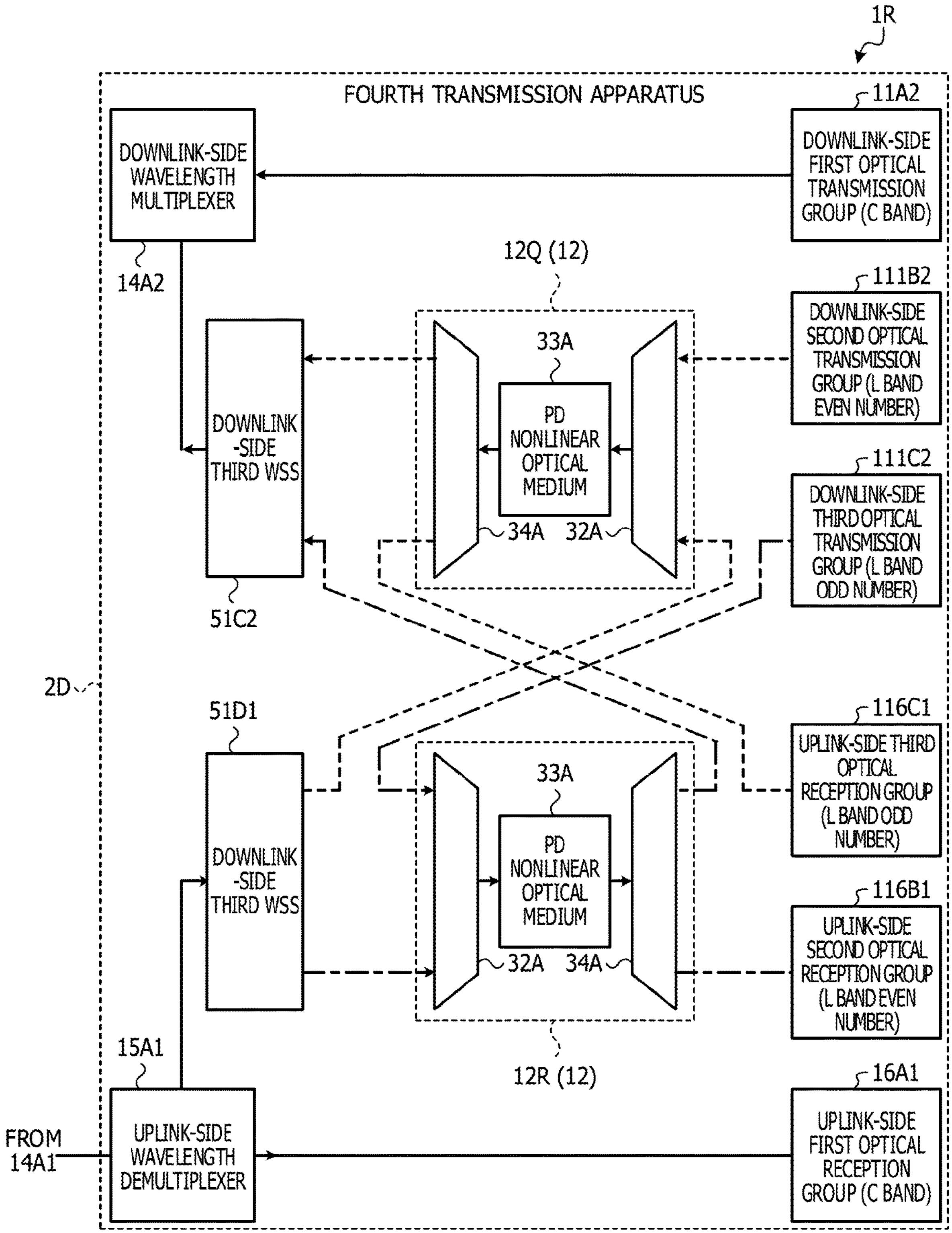

FIG. 65 is an explanatory diagram illustrating an example of a transmission system 1R of the example 47. The identical symbols are assigned to the identical configuration of the transmission system 1Q of the example 46, and thus description of the overlapping configurations and operations is omitted.

The third transmission apparatus 2C illustrated in FIG. 65 includes the uplink-side first optical transmission group 11A1, an uplink-side second optical transmission group 111B1, and an uplink-side third optical transmission group 111C1. The third transmission apparatus 2C includes the downlink-side first optical reception group 16A2, a downlink-side second optical reception group 116B2, and a downlink-side third optical reception group 116C2. The third transmission apparatus 2C includes a thirty-fifth wavelength converter 12N, a thirty-sixth wavelength converter 12P, an uplink-side third WSS 51C1, the uplink-side wavelength multiplexer 14A1, a downlink-side fourth WSS 51D2, and the downlink-side wavelength demultiplexer 15A2.

The uplink-side third optical transmission group 111C1 includes a plurality of optical transmitters that output the third multiplex light of the C band of the first group channels. The uplink-side second optical transmission group 11161 includes a plurality of optical transmitters that output the second multiplex light of the C band of the second group channel. The uplink-side first optical transmission group 11A1 includes a plurality of optical transmitters that outputs the first multiplex light of the C band. The downlink-side third optical reception group 116C2 includes a plurality of optical receivers that receive the third multiplex light of the C band of the first group channels. The downlink-side second optical reception group 116B2 includes a plurality of optical receivers that receive the second multiplex light of the C band of the second group channels. The downlink-side first optical reception group 16A2 includes a plurality of optical receivers that receive the first multiplex light of the C band.

The thirty-fifth wavelength converter 12N includes a tenth WDM coupler 32A, the PD nonlinear optical medium 33A, and an eleventh WDM coupler 34A. The thirty-fifth wavelength converter 12N flows the second and third multiplex light in a single direction from, for example, the tenth WDM coupler 32A→the PD nonlinear optical medium 33A→the eleventh WDM coupler 34A. The thirty-sixth wavelength converter 12P also includes the tenth WDM coupler 32A, the PD nonlinear optical medium 33A, and the eleventh WDM coupler 34A. The thirty-sixth wavelength converter 12P flows the second and third light in the single direction from, for example, the tenth WDM coupler 32A→the PD nonlinear optical medium 33A the eleventh WDM coupler 34A.

The tenth WDM coupler 32A in the thirty-fifth wavelength converter 12N connects to the uplink-side second optical transmission group 11161 and connects to the downlink-side fourth WSS 51D2. The tenth WDM coupler 32A inputs the uplink-side second multiplex light of the C band of a second channel group from the uplink-side second optical transmission group 11161, and inputs the downlink-side third multiplex light of the L band of a first channel group from the downlink-side fourth WSS 51D2.

The tenth WDM coupler 32A in the thirty-fifth wavelength converter 12N outputs to the PD nonlinear optical medium 33A the uplink-side second multiplex light of the C band of the second channel group, the downlink-side third multiplex light of the L band of the first channel group, and the excitation light. Then, the PD nonlinear optical medium 33A converts the uplink-side second multiplex light of the C band of the second channel group into the uplink-side second multiplex light of the L band. Furthermore, the PD nonlinear optical medium 33A converts the downlink-side third multiplex light of the L band of the first channel group into the downlink-side third multiplex light of the C band. Then the PD nonlinear optical medium 33A outputs to the eleventh WDM coupler 34A the uplink-side second multiplex light of the L band of the second channel group and the downlink-side third multiplex light of the C band of the first channel group. Then, the eleventh WDM coupler 34A outputs to the uplink-side third WSS 51C1 the uplink-side third multiplex light of the L band of the first channel group after the wavelength conversion. The eleventh WDM coupler 34A outputs to the downlink-side third optical reception group 116C2 the downlink-side second multiplex light of the C band of the second group channel after the wavelength conversion.

The tenth WDM coupler 32A in the thirty-sixth wavelength converter 12P connects to the uplink-side third optical transmission group 111C1 and connects to the downlink-side fourth WSS 51D2. The tenth WDM coupler 32A inputs the uplink-side second multiplex light of the C band of the second channel group from the uplink-side third optical transmission group 111C1, and inputs the downlink-side third multiplex light of the L band of the first channel group from the downlink-side fourth WSS 51D2.

The tenth WDM coupler 32A in the thirty-sixth wavelength converter 12P outputs to the PD nonlinear optical medium 33A the uplink-side second multiplex light of the C band of the second channel group, the downlink-side third multiplex light of the L band of the first channel group, and the excitation light. Then, using the excitation light, the PD nonlinear optical medium 33A converts the uplink-side second multiplex light of the C band of the second channel group into the uplink-side second multiplex light of the L band, and converts the downlink-side third multiplex light of the L band of the first channel group into the downlink-side third multiplex light of the C band. Then, the PD nonlinear optical medium 33A outputs to the eleventh WDM coupler 34A the uplink-side second multiplex light of the L band of the second channel group and the downlink-side third multiplex light of the C band of the first channel group. Then, the eleventh WDM coupler 34A outputs to the uplink-side third WSS 51C1 the uplink-side second multiplex light of the L band of the second channel group after the wavelength conversion. The eleventh WDM coupler 34A outputs to the downlink-side second optical reception group 11662 the downlink-side third multiplex light of the C band of the first group channels after the wavelength conversion.

The uplink-side third WSS 51C1 multiplexes the uplink-side third multiplex light of the L band of the first channel group from the thirty-fifth wavelength converter 12N with the uplink-side second multiplex light of the L band of the second channel group from the thirty-sixth wavelength converter 12P. The uplink-side third WSS 51C1 outputs the uplink-side second and third multiplex light of the L band to the uplink-side wavelength multiplexer 14A1.

The uplink-side wavelength multiplexer 14A1 multiplexes the uplink-side second and third multiplex light of the L band with the uplink-side first multiplex light of the C band from the uplink-side first optical transmission group 11A1, and outputs the multiplexed multiplex light to the fourth transmission apparatus 2D by way of the uplink-side transmission line 3A.

The fourth transmission apparatus 2D includes the downlink-side first optical transmission group 11A2, a downlink-side second optical transmission group 11162, a downlink-side third optical transmission group 111C2, the uplink-side first optical reception group 16A1, an uplink-side second optical reception group 11661, and an uplink-side third optical reception group 116C1. The fourth transmission apparatus 2D includes a thirty-seventh wavelength converter 12Q, a thirty-eighth wavelength converter 12R, an uplink-side fourth WSS 51D1, the uplink-side wavelength demultiplexer 15A1, a downlink-side third WSS 51C2, and the downlink-side wavelength multiplexer 14A2.

The downlink-side third optical transmission group 111C2 includes a plurality of optical transmitters that output the third multiplex light of the C band of the first group channels. The downlink-side second optical transmission group 11162 includes a plurality of optical transmitters that output the third multiplex light of the C band of the first group channel. The downlink-side first optical transmission group 11A2 includes a plurality of optical transmitters that output the first multiplex light of the C band. The uplink-side third optical reception group 116C1 includes a plurality of optical receivers that receive the third multiplex light of the C band of the first group channel. The uplink-side second optical reception group 116B1 includes a plurality of optical receivers that receive the second multiplex light of the C band of the second group channels. The uplink-side first optical reception group 16A1 includes a plurality of optical receivers that receive the first multiplex light of the C band.

The thirty-seventh wavelength converter 12Q includes the tenth WDM coupler 32A, the PD nonlinear optical medium 33A, and the eleventh WDM coupler 34A. The thirty-seventh wavelength converter 12Q flows the second and third multiplex light in the single direction from, for example, the tenth WDM coupler 32A→the PD nonlinear optical medium 33A→the eleventh WDM coupler 34A. The thirty-eighth wavelength converter 12R also includes the tenth WDM coupler 32A, the PD nonlinear optical medium 33A, and the eleventh WDM coupler 34A. The thirty-seventh wavelength converter 12Q flows the second and third multiplex light in the single direction from, for example, the tenth WDM coupler 32A→the PD nonlinear optical medium 33A→the eleventh WDM coupler 34A.

The tenth WDM coupler 32A in the thirty-seventh wavelength converter 12Q connects to the downlink-side second optical transmission group 111B2 and connects to the uplink-side fourth WSS 51D1. The tenth WDM coupler 32A inputs the downlink-side second multiplex light of the C band of the second channel group from the downlink-side second optical transmission group 11162, and inputs the uplink-side third multiplex light of the L band of the first channel group from the uplink-side fourth WSS 51D1.

The tenth WDM coupler 32A in the thirty-seventh wavelength converter 12Q outputs to the PD nonlinear optical medium 33A the downlink-side second multiplex light of the C band of the second channel group, the uplink-side third multiplex light of the L band of the first channel group, and the excitation light. Then, the PD nonlinear optical medium 33A converts the downlink-side second multiplex light of the C band of the second channel group into the downlink-side second multiplex light of the L band, and converts the uplink-side third multiplex light of the L band of the first channel group into the uplink-side third multiplex light of the C band. Then, the PD nonlinear optical medium 33A outputs to the eleventh WDM coupler 34A the downlink-side second multiplex light of the L band of the second channel group and the uplink-side third multiplex light of the C band of the first channel group. Then, the eleventh WDM coupler 34A outputs to the downlink-side third WSS 51C2 the downlink-side second multiplex light of the L band of the first channel group after the wavelength conversion. The eleventh WDM coupler 34A outputs to the uplink-side third optical reception group 116C1 the uplink-side second multiplex light of the C band of the second group channel after the wavelength conversion.

The tenth WDM coupler 32A in the thirty-eighth wavelength converter 12R connects to the downlink-side third optical transmission group 111C2 and connects to the uplink-side fourth WSS 51D1. The tenth WDM coupler 32A inputs the downlink-side third multiplex light of the C band of the first channel group from the downlink-side third optical transmission group 111C2, and inputs the uplink-side second multiplex light of the L band of the second channel group from the uplink-side fourth WSS 51D1.

The tenth WDM coupler 32A in the thirty-eighth wavelength converter 12R outputs to the PD nonlinear optical medium 33A the downlink-side third multiplex light of the C band of the first channel group, the uplink-side second multiplex light of the L band of the second channel group, and the excitation light. Then, the PD nonlinear optical medium 33A converts the downlink-side third multiplex light of the C band of the first channel group into the downlink-side third multiplex light of the L band, and converts the uplink-side second multiplex light of the L band of the second channel group into the uplink-side second multiplex light of the C band. The PD nonlinear optical medium 33A outputs to the eleventh WDM coupler 34A the downlink-side third multiplex light of the L band of the first channel group and the uplink-side second multiplex light of the C band of the second channel group. Then, the eleventh WDM coupler 34A outputs to the downlink-side fourth WSS 51D2 the downlink-side third multiplex light of the L band of the first channel group after the wavelength conversion. Furthermore, the eleventh WDM coupler 34A outputs to the uplink-side second optical reception group 116B1 the uplink-side second multiplex light of the C band of the second group channel after the wavelength conversion.

Figure 66:
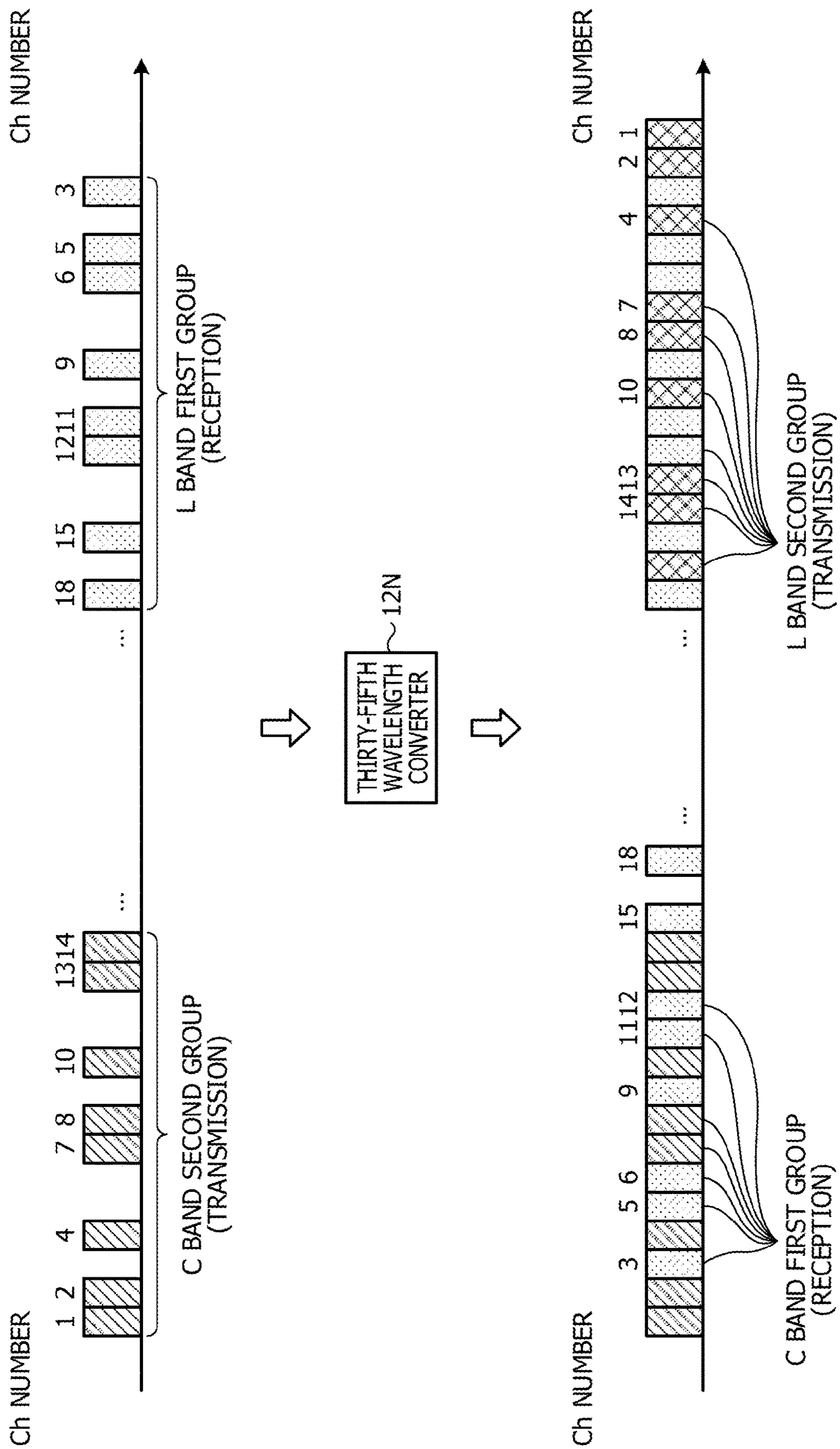
FIG. 66 is an explanatory diagram illustrating an example of a wavelength conversion operation of a thirty-fifth wavelength converter.

FIG. 66 is an explanatory diagram illustrating an example of the wavelength conversion operation of the thirty-fifth wavelength converter 12N. The thirty-fifth wavelength converter 12N inputs to the PD nonlinear optical medium 33A the uplink-side third multiplex light of the C band of the first channel group, the downlink-side second multiplex light of the L band of the second channel group, and the excitation light. The first channel group is, for example, the channel number "1", "2", "4", "7", "8", "10", "13", and "14" or the like. The second channel group is, for example, the channel number "3", "5", "6", "9", "11", "12", "15", and "18" or the like. Then, the thirty-fifth wavelength converter 12N wavelength-converts the uplink-side third multiplex light of the C band of the first channel group into the uplink-side third multiplex light of the L band of the first channel group. Furthermore, the thirty-fifth wavelength converter 12N wavelength-converts the downlink-side second multiplex light of the L band of the second channel group into the downlink-side second multiplex light of the C and of the second channel group.

The uplink-side third WSS 51C1 in the third transmission apparatus 2C rearranges the uplink-side third multiplex light of the L band of the first channel group and the uplink-side second multiplex light of the L band of the second channel group in numerical order of the channel numbers. Then, the uplink-side third WSS 51C1 outputs the uplink-side second and third multiplex light to the uplink-side wavelength multiplexer 14A1. The uplink-side wavelength multiplexer 14A1 multiplexes the uplink-side first multiplex light of the C band and the second with third multiplex light of the L band to output to the uplink-side transmission line 3A.

The downlink-side fourth WSS 51D2 in the third transmission apparatus 2C separates the downlink-side third multiplex light of the L band of the first channel group and the downlink-side second multiplex light of the L band of the second channel group from the downlink-side second multiplex light from the downlink-side wavelength demultiplexer 15A2. The downlink-side fourth WSS 51D2 inputs the downlink-side third multiplex light of the L band of the first channel group into the tenth WDM coupler 32A in the thirty-fifth wavelength converter 12N. The downlink-side fourth WSS 51D2 inputs the downlink-side second multiplex light of the L band of the second channel group to the tenth WDM coupler 32A in the thirty-sixth wavelength converter 12P.

The downlink-side third WSS 51C2 in the fourth transmission apparatus 2D rearranges the downlink-side third multiplex light of the L band of the first channel group and the downlink-side second multiplex light of the L band of the second channel group in numerical order of the channel numbers. Then, the downlink-side third WSS 51C2 outputs the downlink-side second and third multiplex light to the downlink-side wavelength multiplexer 14A2. The downlink-side wavelength multiplexer 14A2 multiplexes the downlink-side first multiplex light of the C band and the downlink-side second with third multiplex light of the L band to output to the downlink-side transmission line 3B.

The uplink-side fourth WSS 51D1 in the fourth transmission apparatus 2D separates the uplink-side third multiplex light of the L band of the first channel group and the uplink-side second multiplex light of the L band of the second channel group from the uplink-side second multiplex light from the uplink-side wavelength demultiplexer 15A1. The uplink-side fourth WSS 51D1 inputs the uplink-side third multiplex light of the L band of the first channel group to the tenth WDM coupler 32A in the thirty-seventh wavelength converter 12Q. The uplink-side fourth WSS 51D1 inputs the uplink-side second multiplex light of the L band of the second channel group to the tenth WDM coupler 32A in the thirty-eighth wavelength converter 12R.

In the example 47, the input optical power to the wavelength converter of the WDM signal in the same bands (C band and L band) is made smaller. That is, the number of wavelengths in the same bands (C band and L band) to be converted by one wavelength converter is decreased to reduce the nonlinear optical distortions. As a result, it is possible to expand the dynamic range, while reducing the deterioration of the signal quality.

The thirty-fifth wavelength converter 12N propagates the uplink-side second multiplex light of the C band of the second channel group, the downlink-side third multiplex light of the L band of the first channel group, and the excitation light via the PD nonlinear optical medium 33A. The thirty-fifth wavelength converter 12N wavelength-converts the uplink-side second multiplex light of the C band of the second channel group into the uplink-side second multiplex light of the L band of the second channel group. The thirty-fifth wavelength converter 12N wavelength-converts the downlink-side third multiplex light of the L band of the first channel group into the downlink-side third multiplex light of the C band of the first channel group. The thirty-fifth wavelength converter 12N may reduce the nonlinear optical distortions generated in the adjacent wavelengths by diverting the wavelength converter in the uplink and the downlink, and assigning the second channel group to the uplink-side second multiplex light and the first channel group to the downlink-side third multiplex light.

The thirty-sixth wavelength converter 12P propagates the downlink-side second multiplex light of the L band of the second channel group, the uplink-side third multiplex light of the C band of the first channel group, and the excitation light via the PD nonlinear optical medium 33A. The thirty-sixth wavelength converter 12P wavelength-converts the downlink-side second multiplex light of the L band of the second channel group into the downlink-side second multiplex light of the C band of the second channel group. The thirty-sixth wavelength converter 12P wavelength-converts the uplink-side third multiplex light of the C band of the first channel group into the uplink-side third multiplex light of the L band of the first channel group. The thirty-sixth wavelength converter 12P may reduce the nonlinear optical distortions generated in the adjacent wavelengths by diverting the wavelength converter in the uplink and the downlink, and assigning the first channel group to the uplink-side third multiplex light and the second channel group to the downlink-side second multiplex light.

The thirty-seventh wavelength converter 12Q propagates the downlink-side second multiplex light of the C band of the second channel group, the uplink-side third multiplex light of the L band of the first channel group, and the excitation light over the PD nonlinear optical medium 33A. The thirty-seventh wavelength converter 12Q wavelength-converts the downlink-side second multiplex light of the C band of the second channel group into the downlink-side second multiplex light of the L band of the second channel group. The thirty-seventh wavelength converter 12Q wavelength-converts the uplink-side third multiplex light of the L band of the first channel group into the uplink-side third multiplex light of the C band of the first channel group. The thirty-seventh wavelength converter 12Q may reduce the nonlinear optical distortions generated in the adjacent wavelengths by diverting the wavelength converter in the uplink and the downlink, and assigning the second channel group to the downlink-side second multiplex light and the first channel group to the uplink-side third multiplex light.

The thirty-eighth wavelength converter 12R propagates the uplink-side second multiplex light of the L band of the second channel group, the downlink-side third multiplex light of the C band of the first channel group, and the excitation light over the PD nonlinear optical medium 33A. The thirty-eighth wavelength converter 12R wavelength-converts the uplink-side second multiplex light of the L band of the second channel group into the uplink-side second multiplex light of the C band of the second channel group. The thirty-eighth wavelength converter 12R wavelength-converts the downlink-side third multiplex light of the C band of the first channel group into the downlink-side third multiplex light of the L band of the first channel group. The thirty-eighth wavelength converter 12R may reduce the nonlinear optical distortions generated in the adjacent wavelengths by diverting the wavelength converter in the uplink and the downlink, and assigning the second channel group to the uplink-side second multiplex light and the first channel group to the downlink-side third multiplex light.

The transmission system 1R of the example 47 divides the channels into two groups of the first channel group and the second channel group and assigning the two groups to the two wavelength converters 12N and 12P. However, this is not limited to the two groups. For examples, if the channels are divided into three groups, the three groups are assigned to the three wavelength converters.

Although the transmission system of the foregoing example illustrates the transmission system if the wavelength conversion takes place between the C band and the L band, the transmission system of the foregoing example may also be applied to a case in which the wavelength conversion takes place between the C band and the S band. Although description is given based on the C band for the purpose of illustration, this mechanism may also apply to the transmission system which performs wavelength conversion between the S band and the L band, that is, the S band to the L band and the L band to the S band, which may be changed appropriately.

Although the first transmission apparatus 2A of the foregoing example reuses the excitation light to be used in the wavelength converter 17 for the wavelength converter 17 in the same apparatus, the excitation light to be used in the optical component such as the optical amplifier may also be used for the wavelength converter 17 in the same apparatus or other optical component, which may be changed appropriately.

Although the wavelength converter 17 wavelength-converts the multiplex light into any wavelength band by propagating the second multiplex light and the excitation light to the nonlinear optical medium, the wavelength converter 17 may use the excitation light of FM modulation (or PM modulation).

In the foregoing example, although the wavelength converter 17 for polarization multiplex light is adopted, a wavelength converter for polarization single light may be adopted, which may be changed appropriately.

The wavelength of the excitation light is different from light before and after the wavelength conversion. The wavelength interval of the excitation light of two wavelengths is wider than the bandwidth of the C band and is, for example, between the C band and the S band or between the C band and the L band. However, it is sufficient if the wavelength interval of the light before and after the wavelength conversion and the wavelength interval of the excitation light meet a same condition.

In the foregoing example, the system is illustrated that wavelength-converts the multiplex light of the C band into the S band or the L band, using the optical component of the C band, and transmits to the transmission line 3. However, this may also apply to a system that wavelength-converts the multiplex light of the S band into the C band or the L band, using the optical component of the S band and transmits to the transmission line 3 or a system that wavelength-converts the multiplex light of the L band into the C band or the S band, using the optical component of the L band and transmits to the transmission line 3.

In the foregoing example, although the wavelength ranges of the C band, the S band, and the L band are defined, the wavelength range is not limited to this wavelength range and the range may be changed appropriately.

The wavelength converter 17 internally has the unillustrated optical amplifier for optically amplifying the multiplex light, for each wavelength. However, the optical amplifier may be provided outside of the wavelength converter 17, that is, in an output stage of the wavelength converter 17.

Furthermore, in the foregoing example, although the case is illustrated in which the C band, the S band, and the L band are used, the band is not limited to the C band, the S band, and the L band. For example, this may also apply to an original (O) band (1260 nm to 1360 nm), an extended (E) band (1360 nm to 1460 nm) or an ultralong wavelength (U) band (1625 nm to 1675 nm), which may be changed appropriately.

For example, although the case in which the first transmission apparatus 2A internally has the optical transmitter or the optical receiver, the disclosure of the application may also apply if the first transmission apparatus 2A is externally connected to the optical transmitter or the optical receiver. Although the first transmission apparatus 2A reuses the excitation light of the excitation light source as the excitation light of the optical component in the same apparatus, the transmission path of the remaining excitation light is not limited and may be changed appropriately.

For the purpose of illustration, although the case is illustrated in which the optical components such as the excitation light source, the isolator, and the optical circulator are built-in in the wavelength converter, the optical components such as the excitation light source, the isolator, and the optical circulator may not be built-in in the wavelength converter.

It is not desirable that the respective components of the respective units illustrated be physically configured as illustrated. That is, specific forms of distribution and integration of the respective units are not limited to what are illustrated, and all or some of the specific forms may be configured by being functionally or physically distributed or integrated in any unit, depending on various types of loads or use conditions, or the like.

Furthermore, all or any some of the various types of processing functions performed in the respective apparatuses may also be performed on a central processing unit (CPU) (or a microcomputer such as a micro processing unit (MPU), and a micro controller unit (MCU)). It goes without saying that all or any some of the various types of processing functions may be performed on a program analyzed and executed by the CPU (or the microcomputer such as the MPU, MCU, or the like) or on hardware by wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus that transmits wavelength multiplex light to a transmission line, the transmission apparatus comprising:

- a first multiplexer configured to multiplex light of wavelengths of a first wavelength band to output first wavelength multiplex light;
- a first wavelength converter configured to convert the first wavelength multiplex light into wavelengths of a second wavelength band which is different from the first wavelength band, by using first excitation light;

a second multiplexer configured to multiplex light of wavelengths of the first wavelength band which are different from the wavelengths of the first wavelength multiplex light to output second wavelength multiplex light;

a second wavelength converter configured to convert the second wavelength multiplex light into wavelengths of the second wavelength band, by using second excitation light; and a third multiplexer configured to multiplex the first wavelength multiplex light converted into the wavelengths of the second wavelength band, and the second wavelength multiplex light converted into the wavelengths of the second wavelength band, wherein the first multiplexer configured to output the first wavelength multiplex light obtained by multiplexing light of wavelengths of a first channel group, of channels of wavelengths in the first wavelength multiplex light; and the second multiplexer outputs the second wavelength multiplex light obtained by multiplexing light of wavelengths of a second channel group which is different from the first channel group, of the channels of the wavelengths in the first wavelength multiplex light, and the first excitation light uses the light of a wavelength of the second channel group, and the second excitation light uses the light of a wavelength of the first channel group.

2. The transmission apparatus according to claim 1, wherein the first multiplexer outputs the first wavelength multiplex light obtained by multiplexing light of wavelengths of an even-numbered channel group, of channel numbers that identify the wavelengths in the first wavelength multiplex light; and the second multiplexer outputs the second wavelength multiplex light obtained by multiplexing light of wavelengths of an odd-numbered channel group, of the channel numbers that identify the wavelengths in the first wavelength multiplex light, and the first excitation light uses the light of a wavelength of the odd-numbered channel group and the second excitation light uses the light of a wavelength of the even-numbered channel group.

* * * * *